US007551921B2

(12) United States Patent
Petermann

(10) Patent No.: US 7,551,921 B2
(45) Date of Patent: Jun. 23, 2009

(54) WIRELESS COMMUNICATIONS SYSTEM WITH PARALLEL COMPUTING ARTIFICIAL INTELLIGENCE-BASED DISTRIBUTIVE CALL ROUTING

(75) Inventor: Jerry Petermann, Pflugerville, TX (US)

(73) Assignee: Wahoo Communications Corporation, Lorena, TX (US)

( * ) Notice: Subject to any disclaimer, the term of this patent is extended or adjusted under 35 U.S.C. 154(b) by 99 days.

(21) Appl. No.: 11/474,910

(22) Filed: Jun. 26, 2006

(65) Prior Publication Data
US 2006/0246911 A1 Nov. 2, 2006

Related U.S. Application Data

(63) Continuation-in-part of application No. 10/937,158, filed on Sep. 23, 2004, now Pat. No. 7,085,560, which is a continuation-in-part of application No. 10/063,283, filed on Apr. 8, 2002, now Pat. No. 6,842,617, which is a continuation-in-part of application No. 09/583,839, filed on May 31, 2000, now Pat. No. 6,374,078.

(51) Int. Cl.
H04W 4/00 (2006.01)

(52) U.S. Cl. .................... 455/422.1; 455/453; 455/444; 455/554.1; 455/554.2

(58) Field of Classification Search ............. 455/422.1, 455/453, 444, 554.1, 554.2, 555, 419
See application file for complete search history.

(56) References Cited

U.S. PATENT DOCUMENTS 3,967,058 A * 6/1976 Moriya et al. ............... 370/294

* cited by examiner

*Primary Examiner*—Alexander Eisen
*Assistant Examiner*—Wayne Cai
(74) *Attorney, Agent, or Firm*—Everest Intellectual Property Law Group; Michael S. Leonard

(57) ABSTRACT

The present invention is directed to devices and methods that provide a user of a decentralized asynchronous parallel-configured wireless communication system for voice, data and live digital video streaming communication with the ability to select various communication paths and calling bandwidths as needed. The system uses a novel Time-Shared Full Duplex (TSFD) protocol for communications. The TSFD protocol allows the transmission of live digital video signals from one wireless device to another wireless device. The system provides local communication as well as optional links to external networks, and does not require a synchronous centralized switching center. It further provides secure operation, emergency notification and a way to collect revenue from the system, and allows for control of the operational state of the internal network and optional remote control of the operational state control of systems external to the network.

65 Claims, 30 Drawing Sheets

Time-Shared Full Duplex Transmission Diagram

TSFD Call Initiation and Call Maintenance
Channel Flow Diagram

TSFD Wireless Handset

TSFD Communications Docking Bay "ComDoc"

| FUNCTION | Prefix code | Description |
|---|---|---|
| Page a TSFD Handset | ##PG | Page a designated TSFD wireless handset from ComDoc |
| Release Call | #*#* | Release ComDoc from a TSFD wireless call (emergency) |
| CCAP Code | ###* | Activates Contiguous Acquisition Protocol |
| CCAP Code | #### | Activates Contiguous Acquisition Protocol Plus |
| ComDoc call to TSFD Handset | #TSFD | Call to a TSFD wireless handset from handsets connected to a ComDoc by wire, PSTN in call waiting mode |
| TSFD Handset call to ComDoc | #HOM | Call to a handset attached to a ComDoc from another TSFD wireless handset, PSTN in standby mode |
| Activate Intercom to home wireline handsets | #com | Activates intercom functions between wireline handsets in the home which are already connected to the ComDoc, PSTN and TSFD in standby modes |
| Internet message | #IMMS | Enables ComDoc to display Internet communications to URL address assigned to ComDoc |
| Security | *SEC | Reports a home security system fault to the TSFD wireless system when the PSTN connection has failed |
| Caller ID | #REF | Enables automatic reporting of stored messages, prerecorded alerts, and caller ID numbers to assigned TSFD wireless sets |
| Activate Broadband | #CCP | Activates ComDoc interface to broadband network for Internet or other broadband service |
| These disclosed Functions, Prefix codes and descriptions are only | | known examples of ComDoc capabilities. Disclosure of these examples shall not limit ComDoc to items disclosed within this table |

ComDoc Calling and Function Codes

FIG. 17

TSFD X-DatCom

PC –DatCom Card

TSFD Parallel-configured Signal Extender - A

TSFD Parallel-configured Signal Extender - B

Parallel-configured TSFD Network Extender - A

Parallel-configured TSFD Network Extender - B

| Channel Type | Function | PCS Block (ABC) | PCS Block (DEF) |
|---|---|---|---|
| Extended Path | Voice/Data | 63 | 19 |
| Local Path | Voice/Data | 63 | 19 |
| Reference | Signaling | 1 | 1 |
| Call Initiation | Signaling | 1 | 1 |
| Call Maintenance | Signaling | 1 | 1 |

TSFD Broadcast Channel Designators

FIG. 26

| PCS Block | Fedge (MHz) | Fmid (MHz) | Fguard (MHz) | Bandwidth (MHz) |
|---|---|---|---|---|
| A | 1850 | 1857.5 | 0.012500 | 0.825000 |
| B | 1870 | 1877.5 | | |
| C | 1895 | 1902.5 | | |
| D | 1865 | 1867.5 | 0.037500 | 0.275000 |
| E | 1885 | 1887.5 | | |
| F | 1890 | 1892.5 | | |

United States of America Wireless PCS Block Data

FIG. 27

| Microcell Type | Extended | Local |
|---|---|---|
| A1 | 0 | 1 |
| B1 | 1 | 2 |
| C1 | 2 | 0 |
| A2 | 3 | 4 |
| B2 | 4 | 5 |
| C2 | 5 | 3 |
| A3 | 6 | 7 |
| B3 | 7 | 8 |
| C3 | 8 | 6 |

TSFD Wireless Block Frequency Translation Diagram

FIG. 28

Artificial Intelligence-based Distributive Routing
Virtual Macrocell LAN

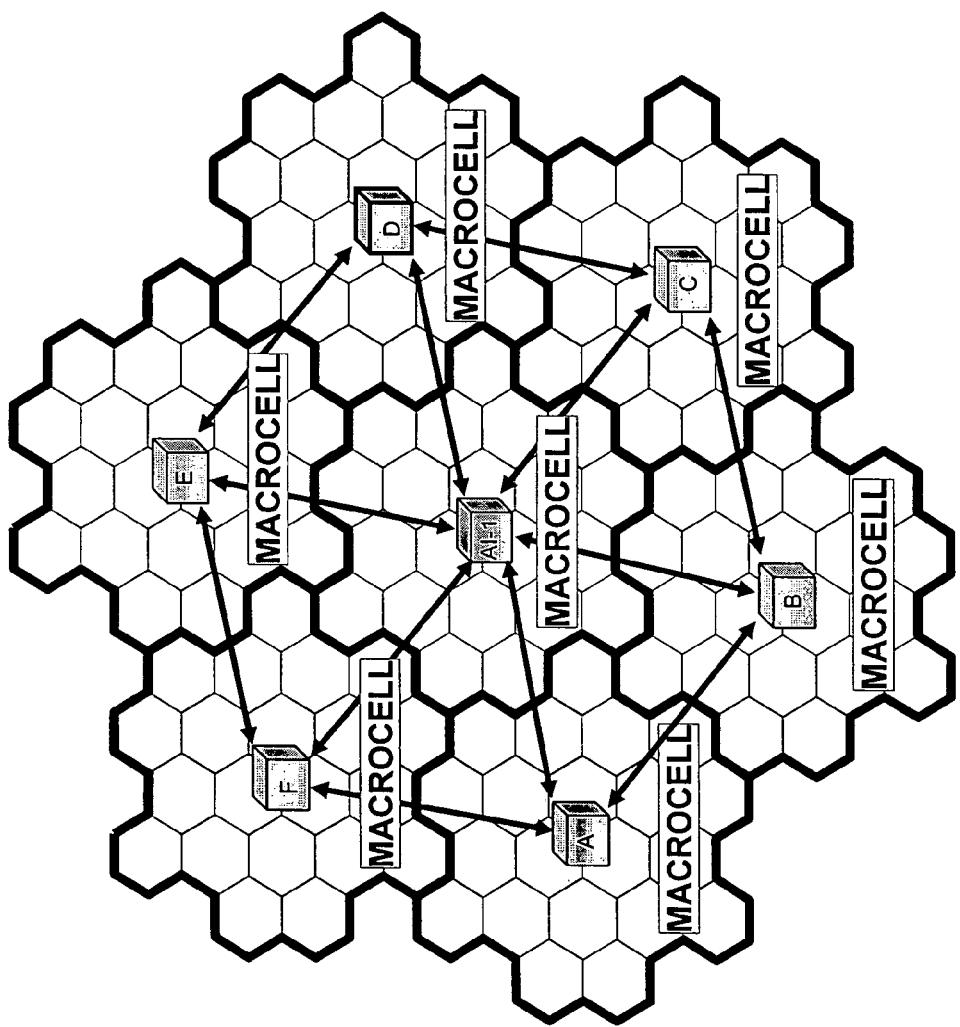

WIRELESS COMMUNICATIONS SYSTEM WITH PARALLEL COMPUTING ARTIFICIAL INTELLIGENCE-BASED DISTRIBUTIVE CALL ROUTING

CROSS-REFERENCE TO RELATED APPLICATIONS

This application is a continuation-in-part of U.S. patent application Ser. No. 10/937,158 filed on Sep. 23, 2004, now U.S. Pat. No. 7,085,560 which is a continuation-in-part of U.S. patent application Ser. No. 10/063,283, filed on Apr. 8, 2002, now U.S. Pat. No. 6,842,617, which is a continuation-in-part of application Ser. No. 09/583,839, filed on May 31, 2000, now U.S. Pat. No. 6,374,078.

FEDERALLY SPONSORED RESEARCH OR DEVELOPMENT

Not Applicable.

BACKGROUND OF THE INVENTION

The invention relates generally to wireless communication systems and, particularly, to asynchronous wireless communication systems and devices that use radio frequencies for transmitting and receiving voice, data and digital video signals within an internal communications network and to an external communication network. More particularly, the wireless communication systems and devices operate with a novel Time-Shared Full Duplex (TSFD) asynchronous wireless communication protocol.

Wireless communication systems continue to grow, particularly in the areas of cellular and digital telephony and in paging systems. Wireless systems are especially popular in remote areas of the world that have limited wired service because of the cost and difficulty of building a wired infrastructure.

Traditional wireless communication systems such as cellular telephones use radio communication between a plurality of subscriber units within the synchronous wireless system and between subscriber units and the Public Switched Telephone Network (PSTN) for calls that are outside of the wireless system. Most of these systems are characterized by wireless mobile telephone units communicating synchronously with base stations that are connected to centralized mobile switching centers (MSC), which are in turn connected to the PSTN. The centralized MSC performs a number of functions, including routing wireless mobile units calls to other mobile units and wired (land-line) users and routing land-line calls to mobile units. At no time do these traditional wireless communications systems allow the handset to interface with the PSTN or other external networks directly. The very core of the centralized wireless communications theory requires every PSTN interface to be made through an MSC. This is the only interface allowed.

Others' systems use point-to-point radio communication where mobile units may communicate with other mobile units in the local area. They send origin and destination address formation and make use of squelching circuits to direct the wireless transmission to the correct destination address. Most of these systems do not appear to provide a connection to a PSTN to send and receive calls outside the wireless network. This type of system is decentralized, but because of the decentralization, collecting accurate billing information may be a problem.

Another form of wireless system is called a local multipoint distribution service (LDMS). In an LMDS system, a local area or cell that is approximately 4 km in diameter contains fixed base stations, geographically distributed throughout the local area. One or more antennas within the local area receive calls from the fixed base stations and relay the calls to other fixed base stations. In order for the system to work, the fixed base stations must be within the line-of-sight path of at least one of the antenna units. The LDMS does not provide for mobile stations. Calls can only be routed within the local area and not to an external network. The system is essentially a centralized system within a local area. If one station is not within the line of sight of the antenna, it is effectively cut off from communication.

There is a need for decentralized wireless communication systems that are capable of handling voice, data and real-time digital streaming video communication that allow for a multiplicity of communication paths. It is desirable to have an ability to call on bandwidths as needed, to provide local communication links, and to access links to external networks. Such networks may include public switch Telephone Networks, high speed-broadband cable, Internet, satellites and radio emergency networks. It is desirable to have a system that does not require a centralized switching center, provides for secure operation, allows for control of the operational state of the internal network, provides for emergency notification and provides a way to collect revenue from the system. It is desirable to have elements within the system that allow for the remote controlled gathering of data, the preprogrammed remote gathering of data, the remote controlling of systems external to the internal network, the remote controlling of the operational state of systems external to the network and providing alternative paths for the relaying of signals. It is also desirable to provide alternate direct-path communication between wireless devices and the PSTN, without centralized switching or to provide alternate direct-path communication between remotely placed wireless data collection, reporting and remote control devices and the PSTN, also without centralized switching. Such interfaces augment the conventional path routing and reduce call loads on any central communications interface. It is also prudent to oversee the entire operational state of the network, its various components and signal routing devices with an Artificial Intelligence (AI)-based Distributive Routing System; an artificial "machine" learning software based logic manager prepared to assist and/or provide guidance during any unfortunate catastrophic failure of major wireless infrastructure elements or during inevitable wireless set call connection failures due to peak hours call overloading experienced in a mature wireless system.

It is further desirable to have the AI system govern and administer parallel computing and system hardware operations during catastrophic failures.

The present invention discloses such a system, herein referred to as the Time-Shared Full Duplex (TSFD) Parallel Computing Artificial Intelligence-based Distributive Call Routing Wireless Communication System, or simply known in its short form the TSFD wireless communication system. This system is particularly suitable for operation in rural areas where population density is low and wireless coverage is either not currently available or inadequately serviced and where limited remote data gathering or remote control of systems or devices via wireless means is in operation. In the United States, the system is suitable for operation using the PCS spectrum (1850-1960 MHz or the Wireless Communications Service (WCS) spectrum at 2320-2360 MHz that are licensed by the Federal Communications Commission (FCC) or any other such frequency as may be determined suitable above 50 megahertz and less than 5 gigahertz. The wireless devices in the system incorporate a modular multi-mode capability to extend the wireless service area with a potential variety of standard wireless formats and bands, such as AMPS, D-AMPS, IS-95, IS-136, and GSM1900. This is an important feature because widespread deployment of a new wireless service takes appreciable time, and there are many other wireless standards from which to choose since these new customers may also venture into standard PCS or cellular markets.

With the advent of music, video and ringtone downloads into wireless handsets, camera pics, digital video capturing and sending, the world is ready for a system where the Internet and computer transmission formats (asynchronous packets) can be enable in a mobile wireless handset. Soon, even the term "handset" will vanish as the world transitions to wireless enabled microcomputers. Even the "modern" Personal Digital Assist (PDA) will become incapable of retaining all the information the users will expect of tote with them. Music and I-Pod device technologies alone have propelled the expansion of memory storage and file management to ever higher levels of proficiencies.

Overall, the US rural market and other major applications for the TSFD wireless communication system of the present invention are enormous. A few of these include: emerging nations, especially those that presently have limited or no telephone service, and those communities or groups that require a stand alone wireless communication network that can be quickly and cost-effectively deployed. Further; military, law enforcement, disaster management or remote commercial installations yield extremely viable market potentials.

The TSFD wireless communication system's attributes of low cost remote sensing and remote control of other devices and processing through such versatile wireless devices is also critical to markets isolated from major urban economies and is ideally suited to developing nations hunger for affordable technology.

BRIEF DESCRIPTION OF THE DRAWINGS

These and other features, aspects, and advantages of the present invention will become understood with regard to the following description, appended claims, and accompanying drawings where:

FIG. 17 shows examples of prefix codes for accessing TSFD wireless ComDoc functions;

FIG. 26 shows the TSFD Broadcast Channel Designators

FIG. 27 shows the USA PCS Frequency Block Designations;

FIG. 28 shows TSFD Wireless Block Frequency Translation Table;

FIG. 30 shows the Artificial Intelligence-based Distributive Routing Virtual macrocell LAN.

DETAILED DESCRIPTION OF THE INVENTION

Figure 1:
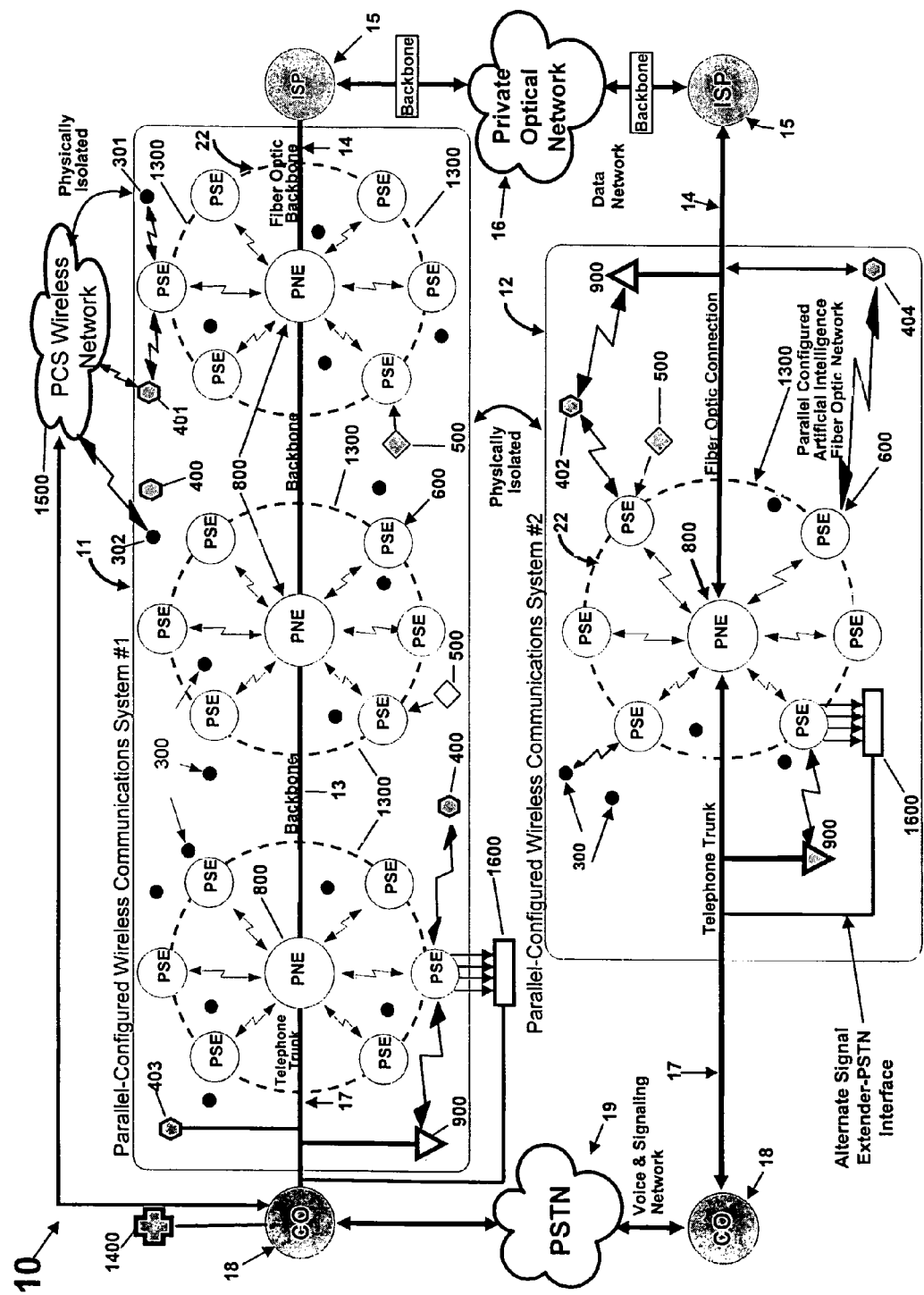
FIG. 1 shows a deployment of two embodiments of the present TSFD wireless communication system.

While this invention is susceptible of embodiment in many different forms, there is shown in the drawings, and will be described herein in detail, specific embodiments thereof with the understanding that the present disclosure is to be considered as an exemplification of the principles of the invention and is not intended to limit the invention to the specific embodiments illustrated.

The present invention is directed to devices and methods that provide a user of a decentralized asynchronous parallel-configured wireless communication system for voice, data and live digital video streaming communication with the ability to select various communication paths and calling bandwidths as needed. In a preferred embodiment, the system uses a novel Time-Shared Full Duplex (TSFD) protocol for communications. The TSFD protocol allows the transmission of live digital video signals from one wireless device to another wireless device by using the novel Integrated Direct Data Transfer (IDDT) inserted in the TSFD protocol. The system provides local communication as well as optional links to external networks, and does not require a synchronous centralized switching center. It further provides secure operation, emergency notification and a way to collect revenue from the system, and allows for control of the operational state of the internal network and optional remote control of the operational state control of systems external to the network. The operational state can be a static state in which the internal network is turned "ON" or "OFF" by a command, or the operational state can by a dynamic state controlling of the functions and operations of the systems. Communications between the various elements of the TSFD wireless communication system are monitored and analyzed by a system-resident and fully decentralized Parallel Computing Artificial Intelligence-based Distributive Routing System, resulting in re-directing the communication paths to ensure call loads of the Parallel-configured Signal Extender (PSE) and Parallel-configured Network Extender (PNE) in the system do not exceed a predetermined limit for each PSE or PNE, to optimize call loads of the PSE and PNE in the system, or to bypass any failed PSE or PNE in the system.

The decentralized asynchronous communication system of the present invention using the TSFD communication protocol, herein referred to as the Time-Shared Full Duplex (TSFD) Parallel Computing Artificial Intelligence-based Distributive Call Routing Wireless Communication System (or simply known as the TSFD wireless communication system), comprises six primary elements: (1) TSFD wireless handsets carried by mobile users; (2) TSFD wireless Personal Computer Data Communications Cards (TSFD wireless PC-DatCom Cards), also known as the Personal Computer TSFD Multi-mode Wireless Access Cards, which may include a TSFD Telephone, PCS telephone, Wireless Fidelity (WiFi) links, Bluetooth links, and Red Fang Links; (3) TSFD wireless external data communications modules (TSFD wireless X-DatComs) for remotely gathering data or remotely controlling systems external to the device or to the network; (4) TSFD wireless communications docking bays (TSFD wireless X-DatComs) for providing alternative connections to internal or external networks; (5) Parallel-configured TSFD Signal Extenders (PSEs) for relaying TSFD wireless handset, TSFD wireless PC-DatCom Card, TSFD wireless ComDoc or X-DatCom signals; and (6) Parallel-configured TSFD Network Extenders (PNEs) for interconnecting signals from PSEs or other PNEs. The first four elements are collectively known as the "wireless devices" or the "wireless set" for the TSFD wireless communication system in the present invention. The PSEs and PNEs comprise the infrastructure equipment that is located at antenna tower sites while TSFD wireless ComDoc sets are located in a subscriber's home or business, TSFD wireless X-DatComs comprise a varied array of remotely placed data gathering or remote control devices, TSFD wireless PC-DatCom Cards are a multiple network access "WiFi-like" card of Personal Computers and TSFD wireless handsets provide the mainstay of the entire TSFD wireless communication system. For the system to be functional, it is not required to have all the six elements. The system can function with the PSEs, the PNEs and one or more of the wireless devices selected from the TSFD wireless handsets, TSFD wireless PC-DatCom Cards, TSFD wireless X-DatComs, and TSFD wireless ComDocs. Alternatively, the wireless devices can communicate with each other directly without having to communicate via a PSE and/or a PNE. The TSFD wireless devices share the same basic design. However, each wireless device can serve one or more specific functions either as a handset, a ComDoc, an X-DatCom or a PC-DatCom Card as needed. Thus, a wireless device can have a single function or have multiple functions. Unless otherwise stated, the TSFD wireless handset in the present disclosure can be a stand-alone wireless handset to be carried by a mobile user, or it can be associated with another TSFD wireless device including the TSFD wireless PC-DatCom Card, the TSFD wireless X-DatCom, and the TSFD wireless ComDoc. What is meant by "associated" is that the device has a dual function. For example, a TSFD wireless handset associated with a TSFD wireless X-DatCom means that the device has both the functions of the TSFD wireless handset and the functions of the TSFD X-DatCom combined in one device.

In further illuminating the TSFD wireless communication system, any fixed location wireless component that is permanently fixed to a location is known as a "TSFD Anchored Component" and all TSFD wireless devices which are not fixed to a permanent location are known as "TSFD Mobile Devices." Thus, the "TSFD Anchored Components" include the PSEs and the PNEs while the "TSFD Mobile Devices" include the TSFD wireless handsets, TSFD wireless ComDocs, TSFD wireless X-DatComs and TSFD wireless PC-DatCom Cards. Although the TSFD wireless X-DatComs are intended to be placed in a "fixed" location and are not intended to be "mobile" in certain applications, the TSFD wireless X-DatComs are still considered as a "TSFD Mobile Device" since it is not fixed to a permanent location and can be moved easily if needed. These terms are essential in disclosures of operations and configurations of the TSFD E-911 Locator System described herein.

TSFD wireless handsets, TSFD wireless ComDocs, TSFD wireless X-DatComs and TSFD wireless PC-DatCom Cards are assigned standard telephone numbers and are capable of placing and accepting calls with telephones in the Public Switched Telephone Network (PSTN) through the PNEs. Calls that are placed between TSFD wireless handsets, TSFD wireless ComDocs, TSFD wireless X-DatComs or TSFD wireless PC-DatCom Cards contained within the TSFD wireless network do not require routing through a PSTN. A TSFD wireless ComDoc interface device is designed to allow restricted and private access to a TSFD wireless handset owner's home or office telephone landline, thus creating a private link to the PSTN without necessity of routing the wireless call through the PNE for an interface to the PSTN. TSFD wireless X-DatComs are varied in design to meet application needs but all have the capabilities of being placed in remote locations to gather data or control processes or devices external to their own circuitry or to the network. TSFD wireless X-DatComs may facilitate a communication between other external network devices equipped for ultra short range communication. These include ultra-wide-band, Red Fang, Bluetooth, or infrared spectrum protocols. Besides handling voice, data and the proprietary Integrated Direct Data Transfer (IDDT) for inserting a live video data stream into a standard Time Shared Full Duplex Protocol transmissions, the overall system also supports a wide variety of telephone features such as Internet access, cable modem access, bi-directional data transfer and variable bandwidth wireless calling channels. Direct connection to other external networks include: the PSTN, cable and other wireless protocols via the multi-mode module in the Radio Frequency (RF) section of TSFD wireless handsets, TSFD wireless ComDocs, TSFD wireless X-DatComs and TSFD wireless PC-DatCom Cards. The TSFD wireless handsets, TSFD wireless ComDocs, TSFD wireless PC-DatCom Cards and TSFD wireless X-DatComs may have Wireless Fidelity (WiFi) options to establish wireless connectivity to other devices. Communication between the various elements of the TSFD wireless communication system is monitored by a system-resident and fully decentralized Parallel Computing Artificial Intelligence-based Distributive Routing System.

The Parallel Computing Artificial Intelligence (AI)-based Distributive Routing System comprises a group of computers of the Personal Computer style, with superior features and performance linked together by a dedicated Local Area Network (LAN) and each computer having a Parallel Computing Artificial Intelligence software program to gather information regarding timely calling data, routing and wireless device use histories and to analyze the information for recommending or executing alternative communication paths within the entire system of the PSEs and the PNE during excessive peak hours loading of the PNE or during a catastrophic failure of any PSE or a PNE. Further, during such times as a failure occurs and is detected by the AI system, within any fixed location or "Anchored" TSFD system, the Parallel Computing Artificial Intelligence System is solely responsible for switching systems and subsystems to maintain continuous and "seamless" operations within these Parallel-configured TSFD Infrastructure Components. The primary computer in the group would reside near, but not within, a PNE, with all other computers residing in the electronic component environmental housing of each PSE. All units share information and are programmed to operate as a single "entity" via the TSFD LAN. Any single computer can be disconnected and the system will still function. The term "parallel computing" is an operational function of the system, wherein a task could be distributed at the same time to several units for analysis. Failure of analysis is then less likely since the transactions are computed in "parallel". Resulting data (answers to the transaction) are utilized by the first system to complete the task.

The Parallel Computing Artificial Intelligence System may further provide reports the day's gathered information to each of the other PSE AI Computers for comparative analysis and the making of logical suggestions to the TSFD wireless handsets, TSFD wireless ComDocs, TSFD wireless PC-DatCom Cards and TSFD wireless X-DatComs operating within the system. The Parallel Computing Artificial Intelligence System is programmed to gather relevant data from remotely placed TSFD wireless X-DatCom modules by means of a wireless protocol established for operations of the system. The Time-Shared Full Duplex (TSFD) wireless protocol is established for operations of the system interfaced with a network including for example, but is not limited to, Public Switch Telephone Network lines, a fiber optic communication link, a coaxial cable, a public TCP/IP network, a directional emergency tower to tower microwave link, a satellite communication link, a ComDoc routed to other destinations and data collection devices selected by the Parallel Computing Artificial Intelligence System.

The enhanced 911 (E-911) wireless device locator of the TSFD wireless "Mobile" devices is supported and shared equally by the Parallel Computing Artificial Intelligence-based System and the resident operations computer within the PNE. Should one of these systems fail in the location process, the other assumes the task.

An embodiment of the present invention discloses a method of operating a parallel-configured TSFD wireless communication system for voice and data signals, the system comprising one or more macrocells and each macrocell having a plurality of microcells. The method comprises: establishing a local communication path for transmitting and receiving signals between a local TSFD wireless device and a remotely placed local TSFD wireless device within a same microcell via a PSE; establishing an extended communication path for transmitting and receiving signals between an extended TSFD wireless device and a remotely placed extended TSFD wireless device located within different microcells positioned within a same macrocell via PSEs and a PNE; establishing a distant communication path for transmitting and receiving signals between a distant TSFD wireless device and a remotely placed distant TSFD wireless device located within different microcells positioned within different macrocells via PSEs and PNEs; and asynchronously transmitting and receiving half-duplex signals over the communication paths using pairs of assigned communication path frequencies stabilized by a GPS-based frequency reference source. The TSFD wireless device can be selected from the group consisting of TSFD wireless handsets, TSFD wireless PC-DatCom Cards, TSFD wireless DatComs, and TSFD wireless ComDocs. The communication paths can be monitored and analyzed by a system-resident and decentralized Parallel Computing Artificial Intelligence-based Distributive Routing System, resulting in re-directing the communication paths to ensure call loads of the PSE and PNE in the system do not exceed a predetermined limit for each PSE or PNE, to optimize call loads of the PSE and PNE in the system, or to bypass any failed PSE or PNE in the system. The step of establishing a local communication path may comprise: transmitting signals from the local TSFD wireless devices to the PSE; receiving and re-transmitting signals by the PSE to the local TSFD wireless devices; and receiving signals from the PSE by the local TSFD wireless devices. The step of establishing an extended communication path may comprise: transmitting signals from the extended TSFD wireless devices to the PSE; receiving and re-transmitting signals from the extended TSFD wireless devices by the PSE to a PNE; receiving and re-transmitting signals from the PSE by the PNE to the PSE; receiving and retransmitting signals from the PNE by the PSE to the extended TSFD wireless devices; and receiving signals from the PSE by the extended TSFD wireless devices. The step of establishing a distant communication path may comprise: transmitting signals from the distant TSFD wireless devices to the PSEs; receiving and re-transmitting signals from the distant TSFD wireless devices by the PSEs to the PNEs; receiving and re-transmitting signals from the PSEs by a PNE to another PNE; receiving and re-transmitting signals from a PNE by another PNE to PSEs; receiving and re-transmitting signals from PNEs by PSEs to the distant TSFD wireless devices; and receiving signals from PSEs by the distant TSFD wireless devices. The step of receiving and re-transmitting signals by a PNE to another PNE may be selected from, but is not limited to, the group consisting of transmitting signals over a Public Switch Telephone Network (PSTN), transmitting signals over a fiber optic communication link, transmitting signals over a coaxial cable, transmitting signals over a public TCP/IP network, and transmitting signals over a satellite communication link. Half of the signals received by a PSE in a microcell may be transmitted by TSFD wireless devices in the microcell in a low radio frequency band and half of the signals received by the PSE in a macrocell may be transmitted by a PNE in the macrocell in a low radio frequency band. Half of the signals transmitted by a PSE in a microcell may be received by a TSFD wireless device in the microcell in a high radio frequency band and half of the signals transmitted by the PSE in a macrocell may be received by a PNE in the macrocell in a high radio frequency band. The transmitting and receiving signals between a TSFD wireless device or PSE or a PNE and another TSFD wireless device or PSE or PNE may be conducted asynchronously with a TSFD protocol. The step of establishing a local voice communication path between a local TSFD wireless device and a remotely placed local TSFD wireless device may comprise using two fixed frequencies in a sub-band spectrum for establishing a local voice channel.

The step of establishing a local data communication path under a four channel Contiguous Channel Acquisition Protocol between a local TSFD wireless device and a remotely placed local TSFD wireless device may comprise using two fixed frequencies having a bandwidth of four times the bandwidth of a local voice channel by combining four contiguous voice channels. The step of establishing a local data communication path under a twelve channel Contiguous Channel Acquisition Protocol Plus between a local TSFD wireless device and a remotely placed local TSFD wireless device under a twelve channel Contiguous Channel Acquisition Protocol Plus may comprise using two fixed frequencies having a bandwidth of twelve times the bandwidth of a local voice channel by combining twelve continuous voice channels. The step of establishing an extended voice communication path may comprise using four fixed frequencies in a sub-band spectrum for establishing an extended voice channel. The step of establishing an extended data communication path under a four channel Contiguous Channel Acquisition Protocol between an extended TSFD wireless device and a remotely placed extended TSFD wireless device may comprise using four fixed frequencies having a bandwidth of four times the bandwidth of an extended voice channel by combining four contiguous voice channels. The step of establishing an extended data communication path under a twelve channel Contiguous Channel Acquisition Protocol Plus between an extended TSFD wireless device and a remotely placed extended TSFD wireless device may comprise using four fixed frequencies having a bandwidth of twelve times a bandwidth of an extended voice channel by combining twelve contiguous voice channels. The step of establishing a distant voice communication path may comprise using four fixed frequencies in a sub-band spectrum for establishing a distant voice channel. The step of establishing a distant data communication path under a four channel Contiguous Channel Acquisition Protocol between a distant TSFD wireless device and a remotely placed distant TSFD wireless device may comprise using four fixed frequencies having a bandwidth of four times the bandwidth of a distant voice channel by combining four contiguous voice channels. The step of establishing a distant data communication path under a twelve channel Contiguous Channel Acquisition Protocol Plus between a distant TSFD wireless device and a remotely placed distant TSFD wireless device may comprise using four fixed frequencies having a bandwidth of twelve times a bandwidth of a distant voice channel by combining twelve contiguous voice channels. The method may further comprise establishing a communication path for transmitting and receiving signals between a TSFD wireless device and an external network via a PSE and a PNE connected to the external network. The external network may be selected from, but is not limited to, the group consisting of a Public Switch Telephone Network (PSTN), a fiber optic communication link, a coaxial cable, a public TCP/IP network, and a satellite communication link. The method may further comprise establishing a communication path for transmitting and receiving signals between a TSFD wireless device and an external network via a TSFD wireless device connected to the external network. The external network may be selected from, but is not limited to, the group consisting of a Public Switch Telephone Network (PSTN), a fiber optic communication link, a coaxial cable, a public TCP/IP network, and a satellite communication link. The method may further comprise establishing a communication path for transmitting and receiving signals between a TSFD wireless device and a local communication network.

The local communication network may be selected from, but is not limited to, the group consisting of TSFD wireless handsets associated with TSFD wireless ComDocs, TSFD wireless PC-DatCom Cards, TSFD wireless X-DatComs or other TSFD wireless handsets further associated with local extension telephones connected to a Public Switch Telephone Network via a TSFD wireless PC-DatCom Card, a TSFD wireless ComDoc, an infrared link, a Red Fang link, a Bluetooth link, a wired computer local area network, a wireless local area computer network, a security system and another such TSFD wireless set links.

Another embodiment of the present invention is a method of operating a wireless communication system for voice and data signals, the system comprising one or more macrocells and each macrocell having a plurality of microcells. The method comprises: establishing a local communication path for transmitting and receiving signals between a local TSFD wireless device and a remotely placed local TSFD wireless device within a same microcell comprising: receiving and transmitting signals between the local TSFD wireless device and a PSE; receiving and transmitting signals between the PSE, the local TSFD wireless device and the remotely placed local TSFD wireless device; and receiving and transmitting signals between the remotely placed local TSFD wireless device and the PSE; establishing an extended communication path for transmitting and receiving signals between an extended TSFD wireless device and a remotely placed extended TSFD wireless device within different microcells positioned within a same macrocell comprising" transmitting and receiving signals between the extended TSFD wireless device and a first PSE; transmitting and receiving signals between the first PSE and a PNE; transmitting and receiving signals between the PNE and a second PSE, transmitting and receiving signals between the second PSE and the remotely placed extended TSFD wireless device; and transmitting and receiving signals between the remotely placed extended TSFD wireless device and the second PSE; establishing a distant communication path for transmitting and receiving signals between a distant TSFD wireless device and a remotely placed distant TSFD wireless device within different microcells positioned within different macrocells comprising" transmitting and receiving signals between the distant TSFD wireless device and a first PSE; transmitting and receiving signals between the first PSE and a first PNE; transmitting and receiving signals between the first PNE and a second PNE; transmitting and receiving signals between the second PNE and a second PSE; transmitting and receiving signals between the second PSE and the remotely placed distant TSFD wireless device; transmitting and receiving signals between the remotely placed distant TSFD wireless device and the second PSE; and asynchronously transmitting and receiving half-duplex signals over the communication paths using pairs of assigned communication path frequencies stabilized by a GPS-based frequency reference source. The TSFD wireless device can be selected from the group consisting of: TSFD wireless handsets, TSFD wireless PC-DatCom Cards, TSFD wireless DatComs, and TSFD wireless ComDocs. The communication paths can be monitored and analyzed by a system-resident and decentralized Parallel Computing Artificial Intelligence-based Distributive Routing System, resulting in re-directing the communication paths to ensure call loads of the PSE and PNE in the system do not exceed a predetermined limit for each PSE or PNE, to optimize call loads of the PSE and PNE in the system, or to bypass any failed PSE or PNE in the system. The step of transmitting signals between the first PNE and the second PNE may be selected from, but is not limited to, the group consisting of transmitting signals over a Public Switch Telephone Network (PSTN), transmitting signals over a fiber optic communication link, transmitting signals over a coaxial cable, transmitting signals over a public TCP/IP network, and transmitting signals over a satellite communication link. The steps of transmitting signals from the TSFD wireless device to the PSE may be in a low radio frequency band and transmitting signals from the PSE to the TSFD wireless device may be in a high radio frequency band, transmitting signals from the PSE to the PNE may be in a high radio frequency band and transmitting signals from the PNE to the PSE may be in the low radio frequency band, and transmitting signals between the PNE may be on a high data rate system backbone. Half of the signals received by a PSE in a microcell may be transmitted by TSFD wireless devices in the microcell in a low radio frequency band and half of the signals received by the PSE in a microcell may be transmitted by a PNE in the macrocell in a low radio frequency band. Half of the signals transmitted by a PSE in a microcell may be received by TSFD wireless devices in the microcell in a high radio frequency band and half of the signals transmitted by the PSE in a microcell may be received by a PNE in the macrocell in a high radio frequency band. The transmitting and receiving signals between a TSFD wireless device and another TSFD wireless device may be conducted asynchronously with transmitting signals between other TSFD wireless devices. The steps of transmitting and receiving signals may comprise using Frequency Division Multiple Access techniques for determining sub-bands in the high and low radio frequency bands. The steps of transmitting and receiving signals may comprise using Gaussian Minimum Shift Keying modulation for producing a radio frequency waveform. The transmitting and receiving signals from a TSFD wireless device and another TSFD device may comprise a primary mode and an optional secondary mode of operation. The primary mode of operation may comprise the TSFD wireless frequency protocol. The secondary mode of operation may be selected from, but is not limited to, the group of wireless protocols consisting of AMPS, D-AMPS, IS-95, IS-136, and GSM1900. The method may further comprise controlling an operational state of the TSFD wireless communication system by transmitting an operational state command to a PNE from the TSFD wireless device. The step of establishing a local voice communication path between a local TSFD wireless device and a remotely placed local TSFD wireless device may comprise using two fixed frequencies in a sub-band spectrum for establishing a local voice channel. The step of establishing a local data communication path under a four channel Contiguous Channel Acquisition Protocol between a local TSFD wireless device and a remotely placed local TSFD wireless device may comprise using two fixed frequencies having a bandwidth of four times the bandwidth of a local voice channel by combining four contiguous voice channels. The step of establishing a local data communication path under a twelve channel Contiguous Channel Acquisition Protocol Plus between a local TSFD wireless device and a remotely placed local TSFD wireless device may comprise using two fixed frequencies having a bandwidth of twelve times the bandwidth of a local voice channel by combining twelve contiguous voice channels. The step of establishing an extended voice communication path may comprise using four fixed frequencies in a sub-band spectrum for establishing an extended voice channel. The step of establishing an extended data communication path under a four channel Contiguous Channel Acquisition Protocol between an extended TSFD wireless device and a remotely placed extended TSFD wireless device may comprise using four fixed frequencies having a bandwidth of four times the bandwidth of an extended voice channel by combining four contiguous voice channels. The step of establishing an extended data communication path under a twelve channel Contiguous Channel Acquisition Protocol Plus between an extended TSFD wireless device and a remotely placed extended TSFD wireless device may comprise using four fixed frequencies having a bandwidth of twelve times the bandwidth of an extended voice channel by combining twelve contiguous voice channels. The step of establishing a distant voice communication path may comprise using four fixed frequencies in a sub-band spectrum for establishing a distant voice channel. The step of establishing a distant data communication path under a four channel Contiguous Channel Acquisition Protocol between a distant TSFD wireless device and a remotely placed distant TSFD wireless device may comprise using four fixed frequencies having a bandwidth of four times the bandwidth of a distant voice channel by combining four contiguous voice channels. The step of establishing a distant data communication path under a twelve channel Contiguous Channel Acquisition Protocol Plus between a distant TSFD wireless device and a remotely placed distant TSFD wireless device may comprise using four fixed frequencies having a bandwidth of twelve times the bandwidth of a distant voice channel by combining twelve contiguous voice channels. The method may further comprise establishing a communication path for transmitting and receiving signals between a TSFD wireless device and an external network via another TSFD wireless device connected to the external network. The external network may be selected from, but is not limited to, the group consisting of a Public Switch Telephone Network, a fiber optic communication link, a coaxial cable, a public TCP/IP network, and a satellite communication link. The transmitting signals may comprise digitizing, buffering and encoding voice frames and transmitting the voice frames in packets at a date rate that is at least twice that required for real-time decoding, whereby transmitting time requires less than half of real time, and receiving signals may comprise receiving and decoding the voice frame packets at a data rate that is equal to that required for real-time decoding, whereby receiving time requires less than half of real-time. The method may further comprise transmitting and receiving information over a reference channel for providing a TSFD wireless device and another TSFD wireless device with time and date information, microcell and macrocell identification code, attention codes, and broadcast text messages. The method may further comprise transmitting and receiving information over a call initiation channel for handling TSFD wireless device and receiving Mobile TSFD wireless device initial registration, periodic registration, authorization and short identification (ID) assignment, call requests, call frequency assignment, call progress prior to voice and data channel use, and acknowledgement. The method may further comprise transmitting and receiving information over a call maintenance channel for call completion, call request, 911 position report, call handoff frequency, call waiting notification, voice message notification, text message notification, and acknowledgement.

In a further embodiment of the present invention, a TSFD wireless communication system for voice and data signals comprises: one or more macrocells and each macrocell having a plurality of microcells; a TSFD wireless set comprising one or more TSFD wireless devices selected from TSFD wireless handsets, TSFD wireless ComDocs, TSFD wireless X-DatComs, and TSFD wireless PC-DatCom Cards; a PSE located in the microcell; a PNE located in the macrocell; means for establishing a local communication path for transmitting and receiving signals between a local TSFD wireless device and a remotely placed local TSFD wireless device within a same microcell via a PSE; means for establishing an extended communication path for transmitting and receiving signals between an extended TSFD wireless device and a remotely placed extended TSFD wireless device located within different microcells positioned within a same macrocell via PSE and a PNE; means for establishing a distant communication path for transmitting and receiving signals between a distant TSFD wireless device and a remotely placed distant TSFD wireless device located within different microcells positioned within different macrocells via PSE and PNE; means for asynchronously transmitting and receiving half-duplex signals over the communication paths using pairs of assigned communication path frequencies stabilized by a GPS-based frequency reference source; and a system-resident and decentralized Parallel Computing Artificial Intelligence-based Distributive Routing System for monitoring and analyzing the transmitted and received signals over the communication paths, resulting in re-directing the communication paths to ensure call loads of the PSE and PNE in the system do not exceed a predetermined limit for each PSE or PNE, to optimize call loads of the PSE and PNE in the system, or to bypass any failed PSE or PNE in the system. The means for establishing a local communication path for transmitting and receiving signals between a local TSFD wireless device and a remotely placed local TSFD wireless device within a same microcell via a PSE may comprise: a local TSFD wireless device for encoding voice and data frame packets and transmitting these packets as radio frequency signals in a low radio frequency band; a PSE for receiving, amplifying, and shifting a frequency of the local TSFD wireless device and the remotely placed local TSFD wireless device's signals in the low radio frequency band to a high radio frequency band and transmitting the high radio frequency band signals; a local TSFD wireless handset for receiving signals in the high radio frequency band from the PSE and decoding the received signals into a voice and data frame packet; the local TSFD wireless device for encoding voice and data frame packet and transmitting these packets as radio frequency signals in a low radio frequency band; and the local TSFD wireless device for receiving signals in the high radio frequency band from the PSE and decoding the received signals into a voice and data frame packet. The means for establishing an extended communication path for transmitting and receiving signals between an extended TSFD wireless device and a remotely placed extended TSFD wireless device within different microcells positioned within a same macrocell via PSE and a PNE may comprise: an extended TSFD wireless device for encoding voice and data frame packet and transmitting these packets as radio frequency signals in a low frequency band; a first PSE for receiving, amplifying, and shifting a frequency of the extended TSFD wireless device signals in the low radio frequency band to a high radio frequency band and transmitting the high radio frequency band signals from the first PSE to the PNE; the PNE for receiving, amplifying, and shifting a frequency of PSE signals in the high radio frequency band to a low radio frequency band and transmitting the low radio frequency band signals from the PNE to selected PSEs; a second PSE for receiving, amplifying, and shifting a frequency of the PNE signals in the low frequency band to a high radio frequency band and transmitting the high radio frequency band signals; a remotely placed extended TSFD wireless device for receiving the second PSE signals in the high radio frequency band and decoding the received signals into a voice and data frame packet; the remotely placed extended TSFD wireless device for encoding voice and data frame packet and transmitting these packets as radio frequency signals in a low frequency band; the second PSE for receiving, amplifying, and shifting a frequency of the TSFD wireless handset signals in the low radio frequency band to a high radio frequency band and transmitting the high radio frequency band signals from the second PSE to the PNE; the first PSE for receiving, amplifying, and shifting a frequency of the PNE signals in the low frequency band to a high radio frequency band and transmitting the high radio frequency band signals; and the extended TSFD wireless device for receiving the first PSE signals in the high radio frequency band and decoding the received signals into a voice and data frame packet. The means for establishing a distant communication path for transmitting and receiving signals between a distant TSFD wireless device and a remotely placed distant TSFD wireless device within different microcells positioned within different macrocells via PSEs and PNEs may further comprise: a first PNE for receiving, amplifying first PSE signals from a first PSE and transmitting the first PSE signals to a second PNE over a dedicated communication link; and the second PNE for receiving and shifting a frequency of first PSE signals in the high radio frequency band to a low radio frequency band and transmitting the low radio frequency band signals from the second PNE to the second PSE. A microcell may comprise a geographical area containing one or more wireless devices (selected from TSFD wireless handsets, TSFD wireless TSFD wireless ComDocs, TSFD wireless X-DatComs, and TSFD wireless TSFD wireless PC-DatCom Cards) and a PSE, and a macrocell may comprise a geographical area containing between one and twenty one microcells, and a PNE. The TSFD wireless handset may comprise external communication paths for transmitting and receiving signals between the TSFD wireless device and an external communication network to enable TSFD wireless device and devices associated with another TSFD wireless device to connect to the external network through the TSFD wireless device. The external network may be selected from, but is not limited to, the group consisting of a Public Switch Telephone Network, a fiber optic communication link, a coaxial cable, a public TCP/IP network, and a satellite communication link. The TSFD wireless device may comprise local communication paths for transmitting and receiving signals between the TSFD wireless device and a local communication network. The local communication network may be selected from the group consisting of TSFD wireless handsets associated with TSFD wireless communication docking bays, TSFD wireless handset associated with TSFD wireless PC-DatCom Cards, TSFD wireless handsets associated with TSFD wireless communication docking bays, TSFD wireless communication docking bays associated with TSFD wireless X-DatComs, or TSFD wireless X-DatComs associated with other TSFD wireless X-DatComs, local extension telephones connected to a Public Switch Telephone Network via the TSFD wireless X-DatCom, an infrared link, a Red Fang Link, a Bluetooth link, a WiFi link, a wired computer local area network, a wireless local area computer network, a security system and another TSFD wireless handset link. The TSFD wireless device may comprise: a processor for controlling TSFD wireless device operation comprising a digital signal processor, a controller, and memory; a user interface comprising, but is not limited to, a display, a keypad, visual indication or, audio annunciator, microphone and speaker, a vocoder connected to a microphone and speaker interface, a power manager, battery and power source; an external data interface; connections for fixed telephone handset extensions; connections to a Public Switch Telephone Network; a primary mode transceiver having a transmitter and two receivers connected to an omni-directional antenna for use with a TSFD protocol; and an optional secondary mode transceiver for providing service using another standard protocol. The TSFD wireless device may include an optional interface connection such as, but is not limited to, an infrared data interface, an external keyboard interface, an external monitor interface, a video camera interface, A WiFi Link, a Red Fang link, a Bluetooth interface, a LAN/cable modem interface, an E-911 position locator interface, a GPS position locator interface, a hard drive interface, a CD/DVD drive interface, a Public Switch Telephone Network modem interface, or an external antenna interface. The TSFD wireless handsets, TSFD wireless PC-DatCom Cards, TSFD wireless X-DatComs and TSFD wireless ComDocs may transmit voice and data packets half of the time and receive voice and data packets half of the time when in use. In an embodiment, a TSFD wireless device in the TSFD wireless system communicates directly with another TSFD wireless device using the TSFD wireless protocol without communicating via a signal or network extender.

In a further embodiment, the present invention discloses a wireless device for use in an asynchronous wireless communication system using an asynchronous wireless protocol as its primary mode of operation, the device comprises: a processor for controlling wireless device operation comprising a digital signal processor, a controller, and memory; a user interface comprising a display, a keypad, visual indication or, audio annunciator, microphone and speaker, a vocoder connected to a microphone and speaker interface; a power manager, battery and power source; an external data interface; connections for fixed telephone handset extensions; connections to a Public Switch Telephone Network; a primary mode transceiver having a transmitter and two receivers connected to an omni-directional antenna for use with an asynchronous wireless protocol; and an optional roaming transceiver operating in a secondary mode for providing service using another standard protocol selected from the group consisting of wireless protocols and landline protocols. In a preferred embodiment the wireless protocol for the secondary mode is selected from the group consisting of AMPS, D-AMPS, IS-95, IS-136, and GSM1900. The wireless device may further include an interface connection to an infrared data interface, an external keyboard interface, an external monitor interface, a video camera interface, A Wireless Fidelity (WiFi) Link, a Red Fang link, a Bluetooth interface, a LAN/cable modem interface, an enhanced 911 (E-911) position locator interface, a GPS position locator interface, a hard drive interface, a CD/DVD drive interface, a Public Switch Telephone Network modem interface, or an external antenna interface. The wireless device of each has its unique telephone number in non-volatile memory and a unique electronic serial number in permanent memory. In another preferred embodiment, the wireless device is a TSFD wireless device wherein the primary asynchronous wireless protocol is Time-Shared Full Duplex (TSFD) wireless protocol. The TSFD wireless device can exercise static state control or dynamic state control. The TSFD wireless device may also have an enhanced-911 (E-911) locator. In an embodiment, the wireless device is a wireless handset carried by a mobile user. The handset is preferably a TSFD wireless handset which performs as a wireless hub or modem for WiFi, TSFD CCAP or CCAP+ to allow the handset and a laptop computer to create a link to any data source or external network through the wireless handset. The TSFD wireless handset may perform standard PCS video, music and ringtone downloads within a TSFD wireless communication system or from other networks while operating within the roaming transceiver mode. The TSFD wireless handset may further comprise a digital camera to capture images to be sent to, received and displayed by another TSFD wireless device through an Integrated Direct Data Transfer (IDDT) sub-protocol of the TSFD protocol, the captured images. The images can be stereoscopic images when captured by a plurality of digital cameras associated with the TSFD wireless handset and the stereoscopic images can be displayed by a viewing device attached to the receiving TSFD wireless device such as a virtual reality headset. In another embodiment, the wireless device is a Communication Docking Bay (ComDoc) placed at a user's home or business for providing alternative connections for other wireless devices to internal or external networks, an External Data Communication Module (X-DatCom) which has multiple external interface paths and is remotely operated or preprogrammed to be remotely placed to gather data, send or receive data, transfer data on a predetermined schedule, or a Personal Computer Data Communication Card (TSFD PC-DatCom Card) suitable for plugging into a personal computer, preferably a laptop computer, to send and receive signals with any TSFD wireless device within the wireless communication system. The X-DatCom can be a fixed-base wireless set having its own telephone number, functions as a handset-to-external network relay system, serves as a home-based high speed access device to wireless broadband Internet service for home computers, serves as a remote access interface device for high-speed wireless broadband Internet service between handset-laptop computer combinations and home installed broadband Internet connection; or serves as a wireless connection to Public Switched Telephone Network (PSTN). In an embodiment, the wireless devices of the present can communicate with each other using the asynchronous protocol, preferably the TSFD asynchronous protocol, without having to communicate via a signal extender or a network extender.

In yet another embodiment of the present invention discloses a Time-Shared Full Duplex (TSFD) asynchronous wireless communications protocol for use in a TSFD wireless communication system, wherein: the wireless protocol utilizes broadband radio frequency (RF) spectrum with low band reserved for Parallel-configured Signal Extender (PSE) receive frequencies and high band for PSE transmit frequencies; half of each band is reserved for signals between the PSEs and a TSFD device, the other half of each band is reserved for signals between PSEs and Parallel-configured Network Extenders (PNEs) with duplex filtering and a separation of from 10 to 80 megahertz between the low band and the high band such that the PSE can simultaneously receive and transmit signals without compromising receiver sensitivity; voice data channels (VDCs) containing voice or data frames and packets are used to carry voice/data call traffic in the wireless system wherein the VDC is a local VDC between a local wireless device and a remotely place local wireless device within a same microcell, an extended VDC between an extended wireless device and a remotely placed extended wireless device in different microcell in a same macrocell, or a distant VDC between a distant wireless device and a remotely placed wireless device in a different microcell in a different macrocell; the RF spectrum is divided into control and data channels wherein each channel comprises a transmit/receive pair of frequencies separated by 10 to 80 megahertz; signal transmission is un-multiplexed wherein compressed signals are sent continuously from multiple channels and decompressed and played back when received; the wireless protocol includes an Integrated Direct Data Transfer (IDDT) sub-protocol wherein the TSFD protocol can be transitioned to the IDDT sub-protocol to allow one-directional transfer of digital data from one wireless device to be received by another wireless device; the TSFD wireless protocol includes reference channel (RC) framing; the TSFD wireless protocol includes a call initiation channel (CIC) and a call maintenance channel (CMC); and the TSFD wireless protocol includes an optional Red Fang sub-protocol using an Ultra-Wide Band—Ultra Low Power operated at 5 Gigahertz. Bandwidth which can be varied as necessary and with communications limited to about 3 feet distance with line of sight as the optimum operating mode. The digital data transferred by the IDDT sub-protocol are preferably live streaming digital video signals. The TSFD wireless protocol allows a component of the TSFD wireless communication system an operational sate of the wireless communication system by transmitting an operational state control command, wherein the operational state control is a static state control or a dynamics state control. In an embodiment, the TSFD wireless protocol allows for the collection of revenue within the wireless system. Examples of methods for collecting revenue are disclosed in U.S. Pat. Nos. 6,141,531 and 6,842,617. In yet another embodiment, the TSFD wireless protocol allows for the migration of any TSFD wireless device off of the TSFD wireless network. The TSFD wireless protocol allows for the utilization of radio frequencies other than the standard United States of America PCS bands available to wireless service providers, wherein any frequency from 50 megahertz to 5 gigahertz, as available where law allows. The TSFD wireless protocol can also allow the communication of a TSFD wireless device to another TSFD wireless device without a network extender or signal extender wherein the full spectrum of the radio frequencies are received and transmitted directly from a TSFD wireless device to another TSFD wireless device.

In still a further embodiment, the present invention discloses an asynchronous monocell wireless communication system comprising a Parallel-configured Signal Extender (PSE) and one or more wireless devices selected from the group consisting of: wireless handsets, external data communication modules (X-DatCom), personal computer data communication cards (PC-DatCom Cards), and communication docking bays (ComDocs), wherein the wireless devices communicate with each other via the PSE using a Time-Shared Full Duplex protocol and wherein the system does not have a Parallel-configured Network Extender (PNE). The monocell wireless system can be powered by an alternate energy source such as, but is not limited to, a solar cell or a wind electrical power source to allow the system to operate in an autonomous mode. The monocell wireless system may further comprise a Parallel Computing Artificial Intelligence-based Call Routing system to monitor and analyze communication paths within and system and to allow the PSE to mimic the function of a PNE. External interface connections to an external network can be achieved wirelessly via a TSFD wireless Com-Doc attached to the external network. The monocell system may include a method for collecting revenue from each wireless set operating within the monocell system. Examples of methods for collecting revenue are disclosed in U.S. Pat. Nos. 6,141,531 and 6,842,617. In another embodiment, the monocell wireless system allows transmission in the CCAP or CCAP+ sub-protocol from one wireless device to another wireless device within the monocell system. In yet another embodiment, the monocell system can be controlled remotely by another wireless device outside the system via a satellite. In a further embodiment, the wireless devices in the monocell system can be remotely controlled by another wireless device outside the system via a satellite. Examples of methods to control the system or a wireless device in the system are disclosed in U.S. Pat. Nos. 6,374,078 and 6,842,617.

System Configurations

Turning now to FIG. 1, FIG. 1 shows a deployment 10 of two embodiments, 11 (Parallel-Configured Wireless Communications System #1) and 12 (Parallel-Configured Wireless Communications System #2), of a TSFD wireless communication system of the present invention connected to other communication networks 15, 16, 18, 19, and 1500. The TSFD wireless communication system comprises fundamental elements that include TSFD wireless handsets 300, TSFD wireless external data communication modules (TSFD wireless X-DatComs) 400, TSFD wireless personal computer data communications cards (TSFD wireless PC-DatCom Cards) 500, TSFD wireless communication docking bays (TSFD wireless ComDocs) 900, Parallel-configured TSFD Signal Extenders (PSEs) 600, and Parallel-configured TSFD Network Extenders (PNEs) 800. Communication between the various elements of the TSFD wireless communication system utilizes the Time-Shared Full Duplex (TSFD) protocol disclosed in the present invention, and the communication is monitored by a system-resident and fully decentralized Parallel Computing Artificial Intelligence-based Distributive Routing System 1300.

The TSFD wireless handsets 300, TSFD wireless X-Dat-Coms 400, TSFD wireless PC-DatCom Cards 500 and TSFD wireless ComDocs 900 are collectively herein referred to as the "TSFD wireless set" or the "TSFD wireless devices." Unless otherwise stated, TSFD wireless handsets 300 can be stand-alone handsets, or they can be associated with another TSFD wireless device.

Any fixed location wireless component that is permanently fixed to a location is known as a "TSFD Anchored Component" and all wireless devices which are not fixed to a permanent location are herein known as "TSFD Mobile Devices.' Thus, the "TSFD Anchored Components" include the PSEs 600 and the PNEs 800 while the "TSFD Mobile Devices" include the TSFD wireless handsets 300, TSFD wireless ComDocs 900, TSFD wireless X-DatComs 400 and TSFD wireless PC-DatCom Cards 500. Although the TSFD wireless X-DatComs 400 are intended to be placed in a "fixed" location and are not intended to be "mobile" in certain applications, the X-DatComs 400 are nevertheless considered as a "TSFD Mobile Device" since it is not fixed to a permanent location and can be moved easily if needed.

The TSFD wireless handsets 300 are similar in features and functions to cellular and PCS handsets. They can support one or more wireless communications protocols: the primary TSFD Protocol described in the present disclosure, and one or more optional secondary protocol selected from a multiple of wireless protocols (such as, but are not limited to, AMPS, D-AMPS, IS-95, IS-136, and GSM1900) and a PSTN 19 landline communications protocol. The system infrastructure for the secondary protocol is not addressed in this disclosure but is well known to those skilled in the art. The wireless communication system infrastructure; PSEs 600 and PNEs 800, and the TSFD wireless protocol are completely independent of the secondary wireless protocols. In a preferred embodiment, there is no formal or actual connection between the PSE 600 and the PSTN 19. The connection is accomplished by giving the PSE 600 its own TSFD wireless Com-Docs 900 waiting for the PSE 600 to utilize them wirelessly.

As further illustrated in FIG. 1, the TSFD wireless X-Dat-Com 400 is a communications device capable of utilizing one or more wireless communications protocols, the primary TSFD Protocol and one or more optional secondary protocols selected from a multiple of wireless protocols (such as, but are not limited to, AMPS, D-AMPS, IS-95, IS-136, and GSM1900) and a PSTN 19 landline communications protocol. The TSFD wireless X-DatCom 400 is a remotely operated or preprogrammed wireless communications device designed to be remotely placed to gather data, send or receive data, transfer data, and control such other devices as may be attached to its circuitry externally. The device, in its simplest form, is a transmitter with related circuitry that gathers and wirelessly sends data on a predetermined schedule. In its most complicated form, the TSFD wireless X-DatCom 400 is a remotely placed, remotely operated or preprogrammed autonomous TSFD wireless ComDoc-like device without handset recharging capabilities; capable of remote control by wireless sets within the asynchronous wireless network or by the Parallel Computing Artificial Intelligence-based Distributive Routing System 1300, which is a resident computer network within the asynchronous wireless network. The TSFD wireless X-DatCom 400 can be operated as an alternative communications path for a TSFD wireless device to reach the PSTN 19 without accessing a signal path to the PSTN 19 through the conventional PSE 600 to PNE 800 frequency links, and PNE 800 to PSTN 19 interface. It can also be operated to serve as a communications path from available and attached landline telephone sets, through the TSFD wireless X-DatCom 400 to a PSE 600 to a TSFD wireless device. The TSFD wireless X-DatCom 400 can also be operated to serve as an alternative communications path for delivery of bi-directional wireless wide-band Internet services to a selected computer via a PSE 600 to PNE 800 to PSTN 19 interface signal path. The PSE 600 is a relay that amplifies and translates the frequency of wireless radio frequency (RF) signals between TSFD wireless devices and a PNE 800, between two TSFD wireless devices, between a TSFD wireless ComDoc 900 and PSE 600, and between a TSFD wireless handset 300 to PSE 600 to TSFD wireless ComDoc 900 to PSTN 19, between a TSFD wireless X-DatCom 400 and PSE 600, and between TSFD wireless handset 300 to PSE 600 to TSFD wireless X-DatCom 400 to PSTN 19. The TSFD wireless X-DatCom 400 can also serve as an alternative communications path for delivering wireless signals to an external PCS network 1500 or for relaying signals from a computer through a TSFD wireless ComDoc 900 to a PSE 600 to the TSFD wireless X-DatCom 400 to reach such an external network PCS 1500.

Further illustrating the embodiments of FIG. 1, the TSFD wireless ComDoc 900 is a communications device capable of utilizing one or more wireless communications protocols: the primary TSFD Protocol and one or more optional secondary protocols selected from a multiple of wireless protocols (such as, but are not limited to, AMPS, D-AMPS, IS-95, IS-136, and GSM1900) and a PSTN 19 landline communications protocol. The TSFD wireless ComDoc 900 can be operated to serve as an alternative communications path for TSFD wireless handsets 300 to reach the PSTN 19 without accessing a signal path to the PSTN 19 through the conventional PSE 600 to PNE 800 frequency links, and PNE 800 to PSTN 19 interface. The TSFD wireless ComDoc 900 can also be operated to serve as an alternative communications path for the TSFD wireless X-DatCom 400 to reach the PSTN 19 without accessing a signal path to the PSTN 19 through the conventional PSE 600 to PNE 800 frequency links, and PNE 800 to PSTN 19 interface.

As illustrated in FIG. 1, the TSFD wireless ComDoc 900 can also be operated to serve as a communications path from the home or office landline telephone sets, through the TSFD wireless ComDoc 900 to a PSE 600 to a TSFD wireless handset 300. The TSFD wireless ComDoc 900 can also serve as an alternative communications path for delivery of bi-directional wireless wide-band Internet services to a home computer via a PSE 600 to PNE 800 to PSTN 19 interface signal path. The PSE 600 is a relay that amplifies and translates the frequency of wireless radio frequency (RF) signals between TSFD wireless handsets 300 and a PNE 800, between two TSFD wireless handsets 300, between a TSFD wireless ComDoc 900 and PSE 600, and between TSFD wireless handset 300 to PSE 600 to TSFD wireless ComDoc 900 to PSTN 19, between a TSFD wireless X-DatCom 400 and PSE 600, and between TSFD wireless handset 300 to PSE 600 to TSFD wireless X-DatCom 400 to PSTN 19. The TSFD wireless ComDoc 900 may be used to route a TSFD wireless handset 300, via a Bluetooth interface to connect to the PCS network 1500 wirelessly.

There are many permutations and combinations of signal paths that are possible in the present system. For example, TSFD wireless handsets 300, TSFD wireless X-DatComs 400, TSFD wireless PC-DatCom Cards 500, TSFD wireless TSFD wireless ComDocs 900 in the same microcell may communicate with one another via a PSE 600. TSFD wireless handsets 300, TSFD wireless X-DatComs 400, TSFD wireless PC-DatCom Cards 500, TSFD wireless ComDocs 900 in different microcells but within the same macrocell may communicate with on another via PSE 600 and PNE 800. Since computers and conventional telephones may be connected to a TSFD wireless X-DatCom 400, these devices may also communicate with other devices connected to the TSFD wireless network 11, 12 or to an external network such as 1500. Two or more computers may connect to one another via the TSFD wireless network, 11, 12 at a minimum data rate of 56 kbps using Contiguous Channel Acquisition Protocol, or up to a maximum data rate of 250 kbps using Contiguous Channel Acquisition Protocol Plus shown in FIG. 10, via a single PSE 600. Similarly, since a laptop computer may be connected to a TSFD wireless handset 300, it may also communicate with other devices connected to the TSFD wireless network 11, 12 or an external network 1500. Since a TSFD wireless X-DatCom 400 may also be connected to a PSTN 19, cable or other communication network medium, a TSFD wireless handset 300 may communicate directly or indirectly via a PSE 600 to a remotely placed TSFD wireless X-DatCom 400 to a PSTN 19 network or cable network. A TSFD wireless X-DatCom 400 may communicate via a PSE 600 and a PNE 800 to a PSTN network 19 or may communicate via a PSE 600 and a PNE 800 to a PSTN network 19 to an external device 1400 for remote data gathering or extended remote control or the external device 1400.

In another embodiment of the invention, FIG. 1 further illustrates that the antenna pattern between the PSE 600 and TSFD wireless handsets 300, TSFD wireless DatCom 400, TSFD wireless ComDocs 900 is generally omni-directional, since the TSFD wireless handsets 300 are typically mobile throughout the surrounding area of the PSE 600 or the TSFD wireless DatCom 400 or TSFD wireless TSFD wireless ComDocs 900 may be moved or placed in different locations at the discretion of the subscriber. The antenna pattern of a TSFD wireless handset 300, a TSFD wireless ComDoc 900 or a TSFD wireless X-DatCom 400, operating in the secondary mode, are also omni-directional. In contrast, the antenna pattern between the PSE 600 and PNE 800 can be a narrow beam since the PSE 600 and PNE 800 sites are both at fixed locations. The PSE 600 is analogous to a simplified "base transceiver station" or BTS in a cellular or PCS system. A key point to simplification is that the PSE 600 does not switch, process, or demodulate individual channels or calls unless otherwise instructed by the Parallel Computing Artificial Intelligence Computer Network 1300 to make such connections during a catastrophic failure of the PNE 800. It is generally limited in function to relaying blocks of RF spectrum. The PNE 800 is a central hub and primary switch for interconnecting calls both within the system and to external networks such as the PSTN 19. The PNE 800 assists TSFD wireless handsets 300 in establishing calls, assists in interconnecting TSFD wireless ComDocs 900 and TSFD wireless handsets 300, TSFD wireless X-DatCom 400 and TSFD wireless handsets 300, or TSFD wireless X-DatComs 400 and TSFD wireless ComDocs 900 within the TSFD Protocol service area, assists TSFD wireless ComDoc 900 to TSFD wireless ComDoc 900 data links within the TSFD Protocol service area, manages the voice/data and signaling channels, and effectively connects calls for PSEs 600 that are connected to the PNE 800. Since the PNE 800 must be in radio line-of-sight with the PSEs 600 that it services, its location site may be critical in system deployment. An alternative fiber-optic PSE 600-PNE 800 catastrophic failure network is also an option. A hardware connection between the PSE 600 and the PNE 800 may substitute for difficult line-of-site deployments. The PNE 800 is analogous to a simplified "mobile switching center" or MSC in a cellular or PCS system. While an MSC may be compared to a telephone CO (central office) or TO (toll office) 18, the PNE 800 more closely compares to a PBX (Private Branch Exchange), which connects to a CO or TO 18. The PNE 800 enables the TSFD wireless communication systems 11, 12 to function independently of an external network; with the AI Network, serving as a catastrophic failure backup Routing System 1300. Although FIG. 1 does not show a PC-DatCom Card, the antenna pattern between the PSE 600 and the other wireless devices applies to the PC-DatCom Card as well.

FIG. 1 further provides illustration of the embodiments of TSFD wireless communication systems 11, 12, deployed as networks. The networks 11, 12 each consists of one or more fixed Anchored PNE sites and a number of fixed PSE sites associated with each PNE 800. The networks 11, 12 are essentially the infrastructure required to service TSFD wireless handsets 300, TSFD wireless X-DatComs 400, TSFD wireless PC-DatCom Cards 500 and TSFD wireless ComDocs 900 in a given geographical area. A network that includes multiple PNEs 800 must support the exchange of digital voice, signaling, and data between the PNEs 800 in the network. The networks 11, 12 shown in FIG. 1, are isolated unless one or more PNEs 800 or PSEs 600 are connected to a PSTN 19, the Internet (for internet services or voice-over-IP) 15 or to a dedicated fiber optic network 16. With PSTN access, the networks 11, 12 can support calls between isolated networks 11, 12, as well as incoming and outgoing calls with other phones in the PSTN 19. Internet access via internet service providers (ISPs) 15 enable remote system monitoring, data entry, sharing of system databases and voice-over IP, while connection to a dedicated fiber optic cable 14 provides a dedicated fiber optic network 14 between PNE's 800, an alternate dedicated fiber optic network 14 signal route between PSEs 600 and PNEs 800, or an alternate dedicated fiber optic network 14 signal route between PSE 600 and PSE 600. In a preferred embodiment, there is no formal or actual connection between the PSE 600 and the PSTN 19. The connection can be accomplished by giving the PSE 600 its own TSFD wireless ComDocs 900 waiting for the PSE 600 to utilize them wirelessly.

Further illustrated in this alternate embodiment of the invention; FIG. 1, the Parallel-Configured Wireless Communications System #1, 11, comprises three macrocells 22, where each macrocell includes a PNE 800 communicating with a number of PSEs 600 that communicate with a number of TSFD wireless handsets 300, TSFD wireless X-DatComs 400, TSFD wireless PC-DatCom Cards 500 and TSFD wireless ComDocs 900. The PNEs 800 and the PSEs 600 are connected together by communication backbones 13. PNEs 800 may also connect to a PSTN 19 via a telephone trunk line 17 to a central switching office (CO) 18. PNEs 800 may also connect to the Internet via a connection 14 to an Internet service provider (ISP) 15. PSEs 600 may also connect to a PSTN 19 via backup trunk lines to a central switching office (CO) 18. PSEs 600 may also connect to the Internet via a connection 14 to an Internet service provider (ISP) 15. PSEs 600 may alternately connect to the PSTN 19 during a catastrophic failure of the PNE 800 as suggested by the AI Network 1300 through PSTN-PSE Interface 1600. In a preferred embodiment, there is no formal or actual connection between the PSE 600 and the PSTN 19. The connection is accomplished by giving the PSE 600 its own TSFD wireless ComDocs 900 waiting for the PSE 600 to utilize them wirelessly.

An additional embodiment of the invention, as illustrated in FIG. 1, TSFD wireless communication systems 11 and 12 may be interconnected through the Internet 15, PSTN 19 connections, a TSFD wireless ComDoc-to-PSTN interface, TSFD wireless ComDoc-to-PSTN-Internet interface, a TSFD wireless X-DatCom 400 to PSTN interface, a TSFD wireless X-DatCom 400 to PCS network 1500 interface, a TSFD wireless X-DatCom 400 to TSFD wireless ComDoc 900 interface, a TSFD wireless handset 300 to TSFD wireless X-DatCom 400 interface, a PSTN 19 to TSFD wireless X-DatCom 400 interface, a TSFD wireless X-DatCom 400 to PSTN 19 to External Device 1400 interface or a TSFD wireless X-DatCom 400 to PSTN 19 to Internet interface. Numerous other permutations of routing and connections are also possible but not shown specifically.

Figure 2:
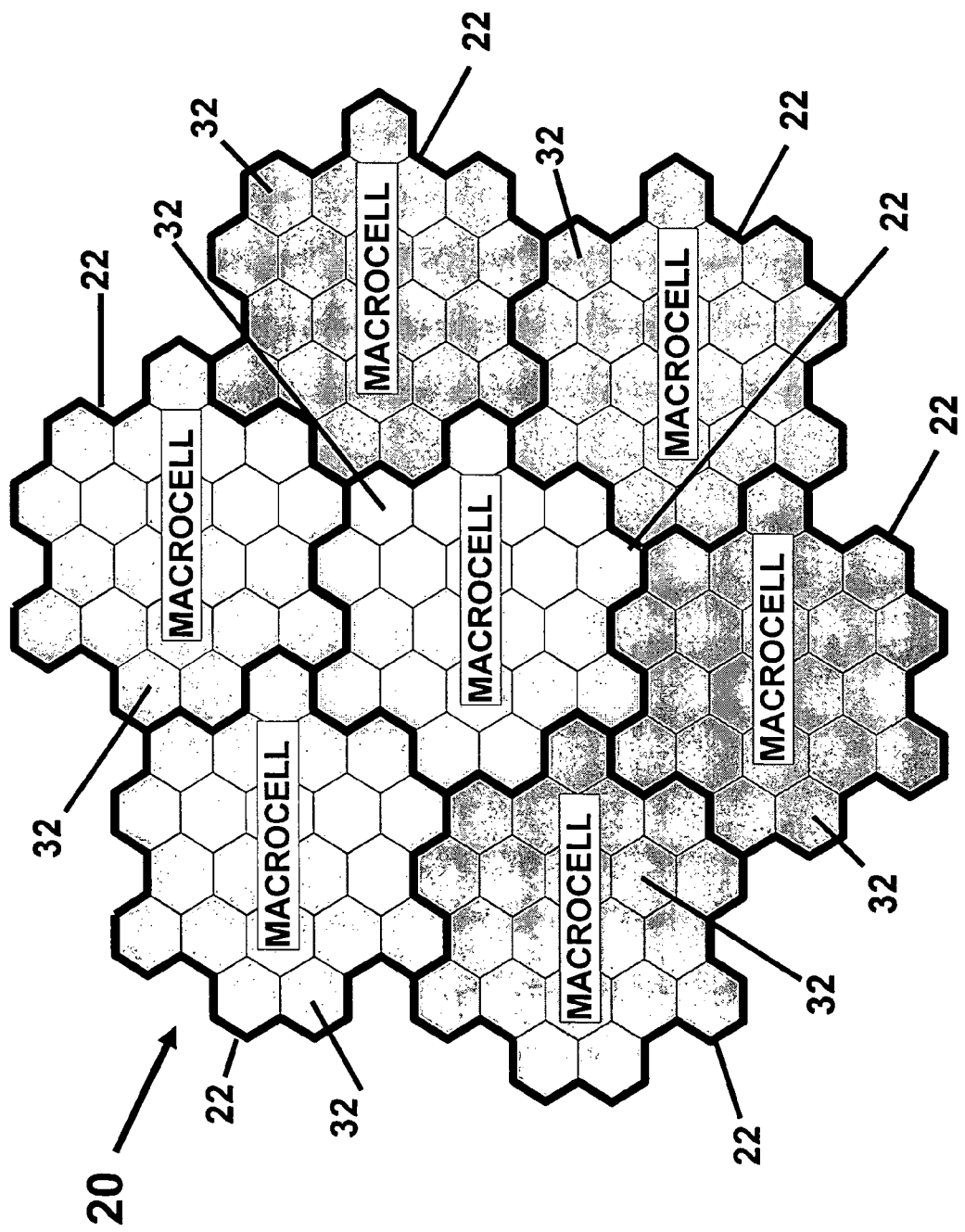
FIG. 2 shows an embodiment of a relationship between adjacent macrocells in a cellular topology.

Turning now to FIG. 2, FIG. 2 shows an embodiment of a relationship between adjacent macrocells 22 in a cellular topology 20. The fixed PNE and PSE sites of a TSFD wireless communication system are organized in a cellular topology 20 similar to the tower arrangement in a cellular or PCS system. The cellular topology 20 promotes frequency reuse and is effective in installation planning. In the present invention, two cell types are defined: microcells 32 and macrocells 22 containing a plurality of microcells 32. The microcell 32 is the basic building block, and the macrocell 22 is typically a group of 21 microcells 32 as shown in FIG. 2 in this embodiment.

Figure 3:
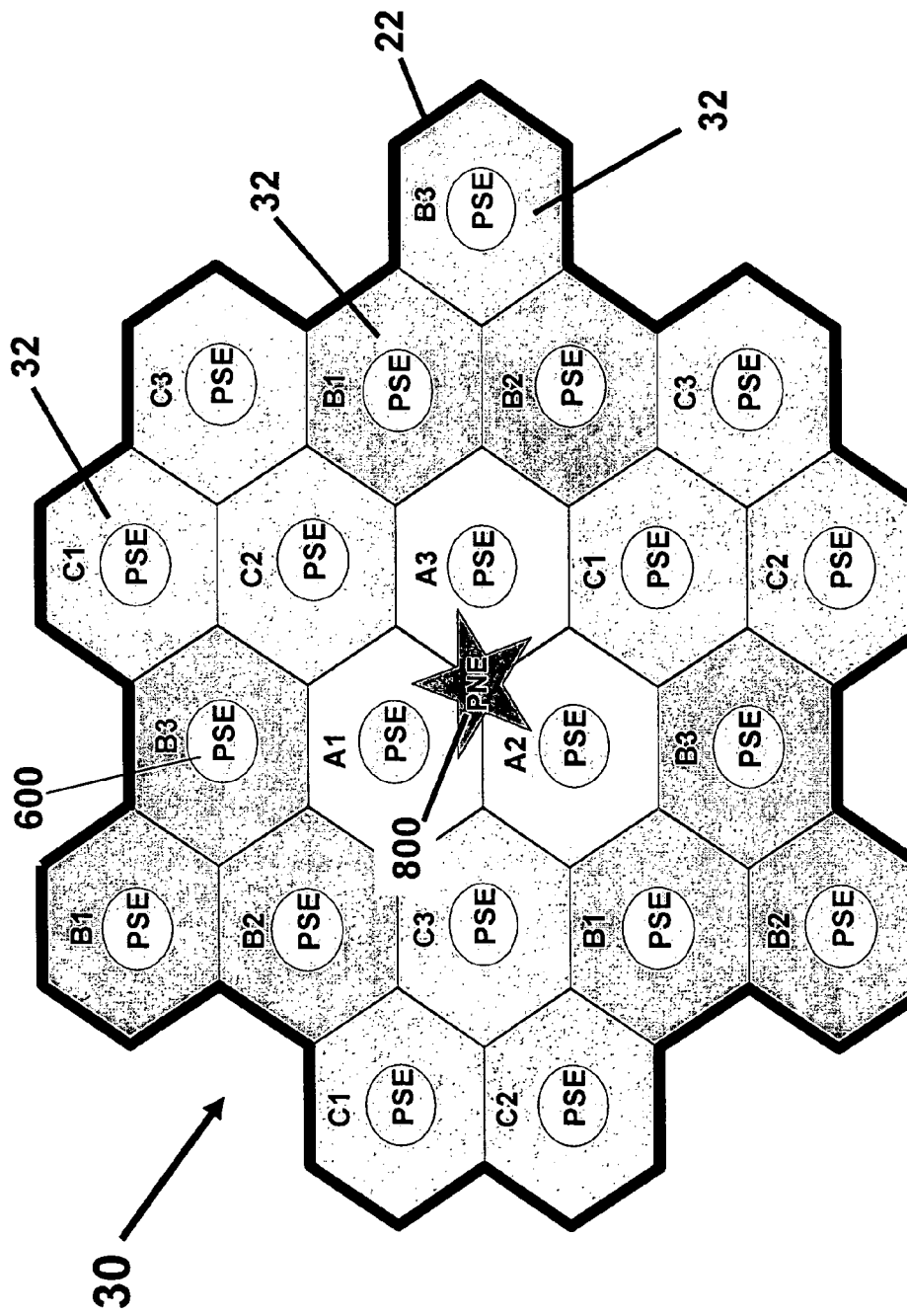
FIG. 3 shows an embodiment of a relationship between adjacent microcells in a macrocell topology.

Turning now to FIG. 3, FIG. 3 shows an embodiment of a relationship between adjacent microcells 32 in a macrocell topology 30. A PSE 600 is central to each microcell 32, while a PNE 800 is central to each macrocell 22. Nine different microcell types are defined, designated A1-3, B1-3, and C1-3, for the purpose of frequency division multiple access (FDMA). Each microcell type uses a common subset of frequencies. No two microcells 32 of the same type are ever adjacent, even when macrocells 32 are adjacent.

Figure 4:
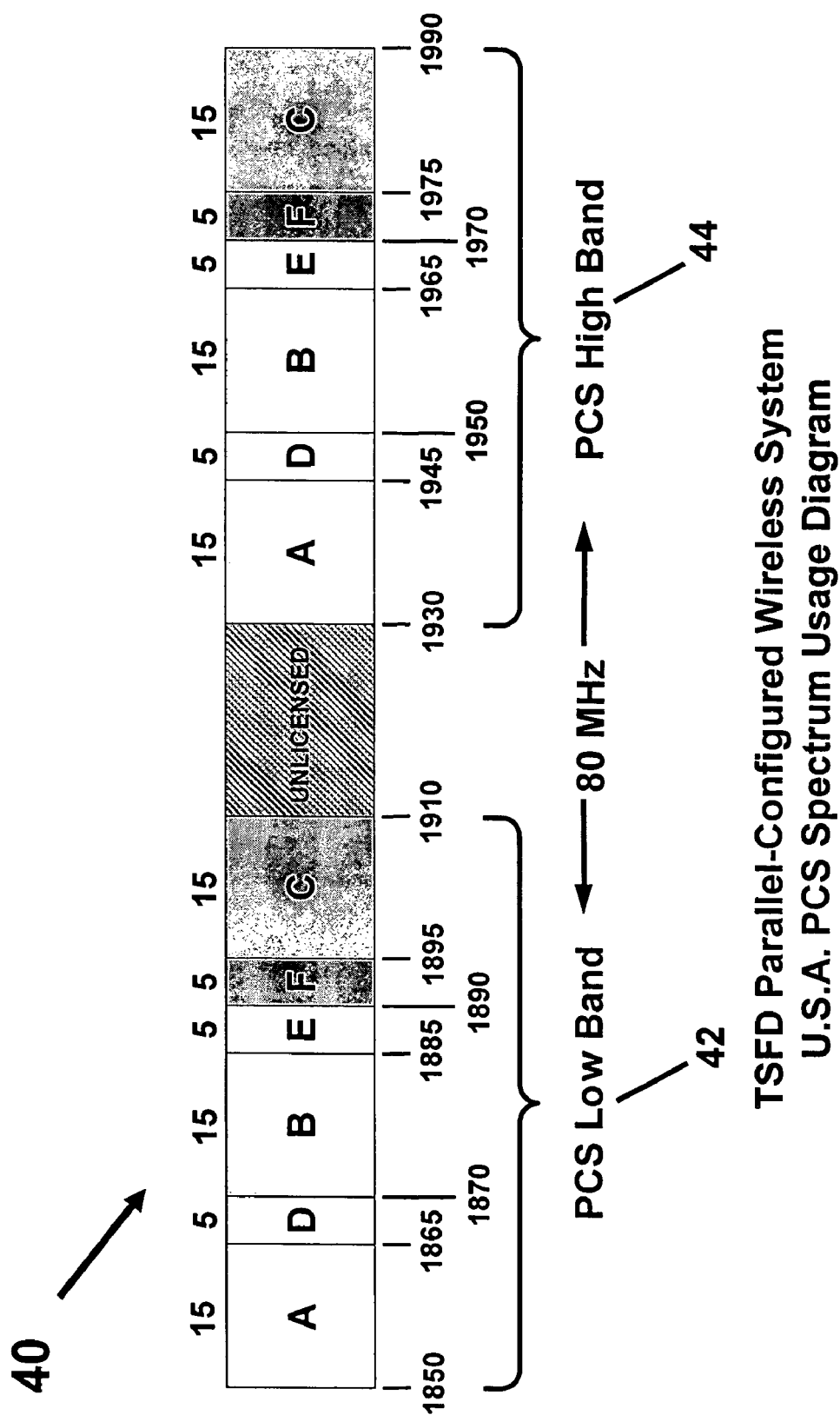
FIG. 4 shows the radio frequency spectrum used by the present wireless communication system.

Turning now to FIG. 4, FIG. 4 shows the radio frequency spectrum 40 used by the present TSFD wireless communication system. The present TSFD wireless communication system utilizes the Broadband radio frequency spectrum of from 50 megahertz to 5 gigahertz. The spectrum is divided into low band and high band separated by a separating spectrum of 10 to 80 megahertz, wherein the low band and the high band have an equal amount of the spectrum. In a preferred embodiment, the spectrum is the PCS spectrum licensed in the United States by the Federal Communications Commission (FCC). The frequency range that it covers is between 1850 megahertz and 1990 megahertz, and includes PCS low band 42 and PCS high band 44. Licenses must be acquired for one or more PCS blocks, A through F, shown in FIG. 4.

Figure 5:
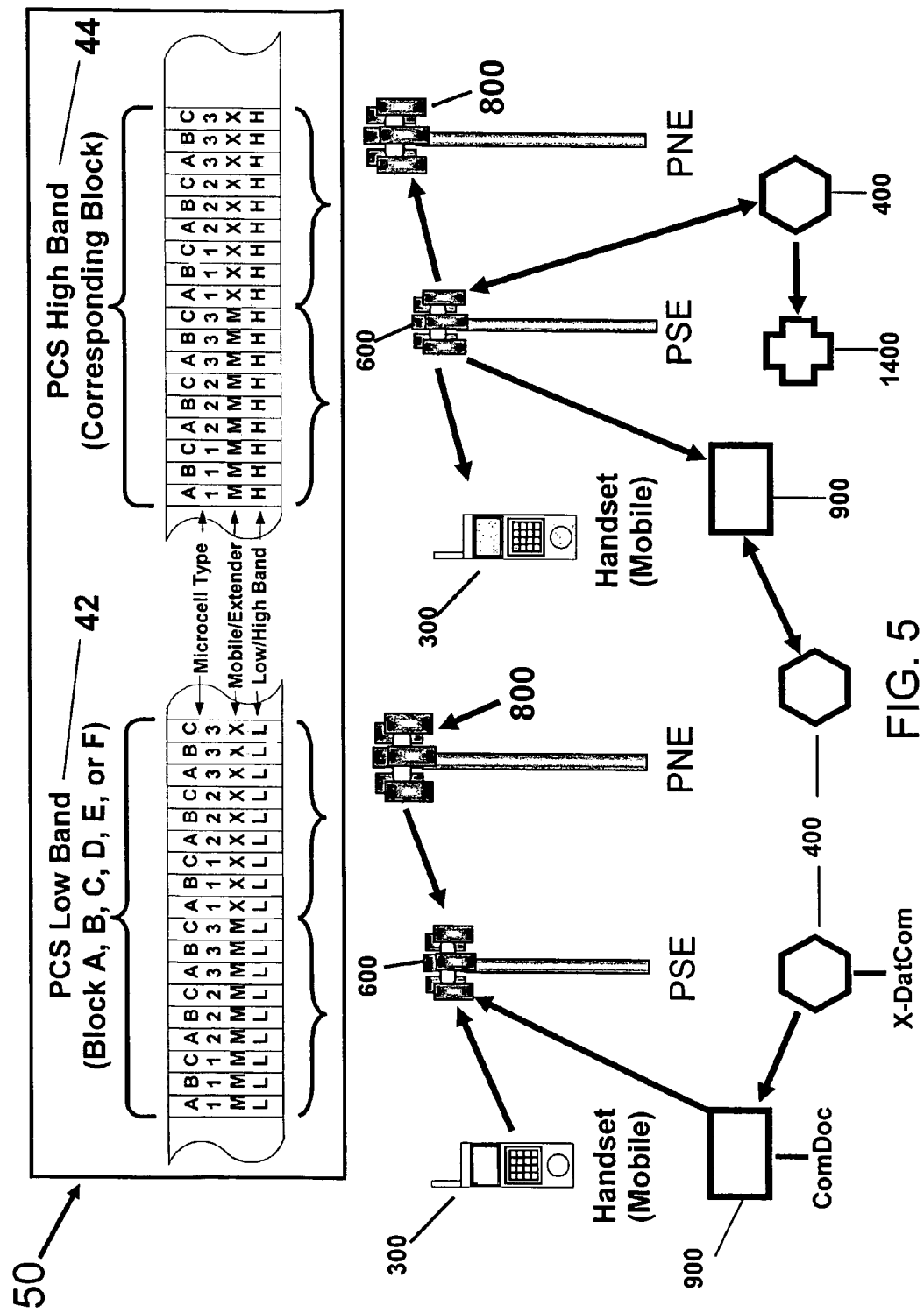
FIG. 5 shows the radio frequency protocol used by the present wireless communication system.

Turning now to FIG. 5, FIG. 5 provides that the TSFD radio frequency protocol 50 used by an embodiment of the present TSFD wireless communication system. The TSFD protocol 50 utilizes the PCS spectrum as illustrated in FIG. 5. The PCS low band 42 is reserved for PSE 600 receive frequencies, and the high band 44 for PSE 600 transmit frequencies. Half of each band is reserved for signals between the PSEs 600 and a TSFD wireless device with the other half for signals between the PSEs 600 and the PNE 800. Regarding the TSFD wireless communications system depicted in FIG. 5, a TSFD wireless ComDoc 900 communicates with a PSE 600 in the same manner that any TSFD wireless device. With duplex filtering and 80-MHz separation between the low band 42 and high band 44, the PSE 600 can simultaneously receive and transmit signals without compromising receiver sensitivity. This frequency plan allows calls to take place asynchronously, which simplifies the design. Although many possible timing architectures may be used in the present TSFD wireless communication system, an asynchronous system architecture is selected to provide the best fit to the key requirements of cost, range, user density and human limitations to perceptibility of delayed audio signals within the TSFD Protocol network. Asynchronous operation of the present TSFD wireless communication system allows greater flexibility in system geographic layout, simpler digital protocol, and channel separation structure. Conventional digital cellular and PCS systems are designed such that synchronous operation is a necessity. CDMA cellular/PCS systems require synchronous operation to insure demodulation and precise coordination of power control and TDMA cellular/PCS systems require synchronous operation to prevent time slot interference. Synchronous operation allows the system design to make very efficient use of the assigned spectrum (high user density) for a given size geographic area for a trade-offs in system complexity, cost, flexibility and limits on relaying signals within a cell site's control. The present TSFD wireless communication system has lower density requirements (rural environment), so the advantages of asynchronous operation became very beneficial to the required cost effectiveness of the present system design. Human physiology is unable to detect delays in an audio signal of up to 80 milliseconds. Advantages of this asynchronous operation becomes very beneficial when sending signals from PSE 600 to PSE 600 over great distances that approach this 80 millisecond human threshold of detect ability. Estimates by wireless engineers are in excess of 1,000 miles for the relaying of voice signals within this asynchronous system before the user becomes aware of a delay in the audio. No synchronous PCS system can even approach distances as great as 27 miles when relaying/repeating audio signals within a given cell tower's control; restricted by the speed of light and the absolute requirement to stay synchronized with the tower from which the audio signal derived and in which the handset is registered operationally. FIG. 5 also shows how the PCS bands are further divided into sub-bands dedicated for each of the 9 microcell types. Each microcell shown in FIG. 3 uses the sub-bands assigned for its particular type (alpha-numeric designator A1, A2, A3, B1, B2, B3, C1, C2, or C3) in order to preclude interference with adjacent microcells (since adjacent microcells are never of the same type). The microcell sub-bands are 825 kHz wide for PCS blocks ABC, and 275 kHz wide for blocks DEF. The definition of 9 microcell types provides two additional non-adjacent types beyond the minimum 7 that are required for a hexagonal cell layout with FDMA shown in FIG. 3. For a microcell 32 in the cell pattern illustrated in FIG. 3, the additional two non-adjacent types are the other two alpha designators with the same numeric designator. For example, the sub-bands for microcell types A2 and C2 are not used in the microcells adjacent to microcell B2. Sub-bands A1ML, A2ML, A3ML, B1ML, B2ML, B3ML, C1ML, C2ML and C3ML are assigned to communication from a TSFD wireless handset 300, a TSFD wireless ComDoc 900 or a TSFD wireless X-DatCom 400 to a PSE 600. Sub-bands A1MH, A2MH, A3MH, B1MH, B2MH, B3MH, C1MH, C2MH and C3MH are assigned to communication from a PSE 600 to a TSFD wireless handset 300, a TSFD wireless ComDoc 900 or a TSFD wireless X-DatCom 400. Sub-bands A1XL, A2XL, A3XL, B1XL, B2XL, B3XL, C1XL, C2XL and C3XL are assigned to communication from a PNE 800 to a PSE 600. Sub-bands A1XH, A2XH, A3XH, B1XH, B2XH, B3XH, C1XH, C2XH and C3XH are assigned to communication from a PSE 600 to a PNE 800. Although FIG. 5 does now show a TSFD wireless PC-DatCom Card, the TSFD radio frequency protocol 50 used as described above can be applied to the TSFD wireless PC-DatCom Card.

Figure 6:
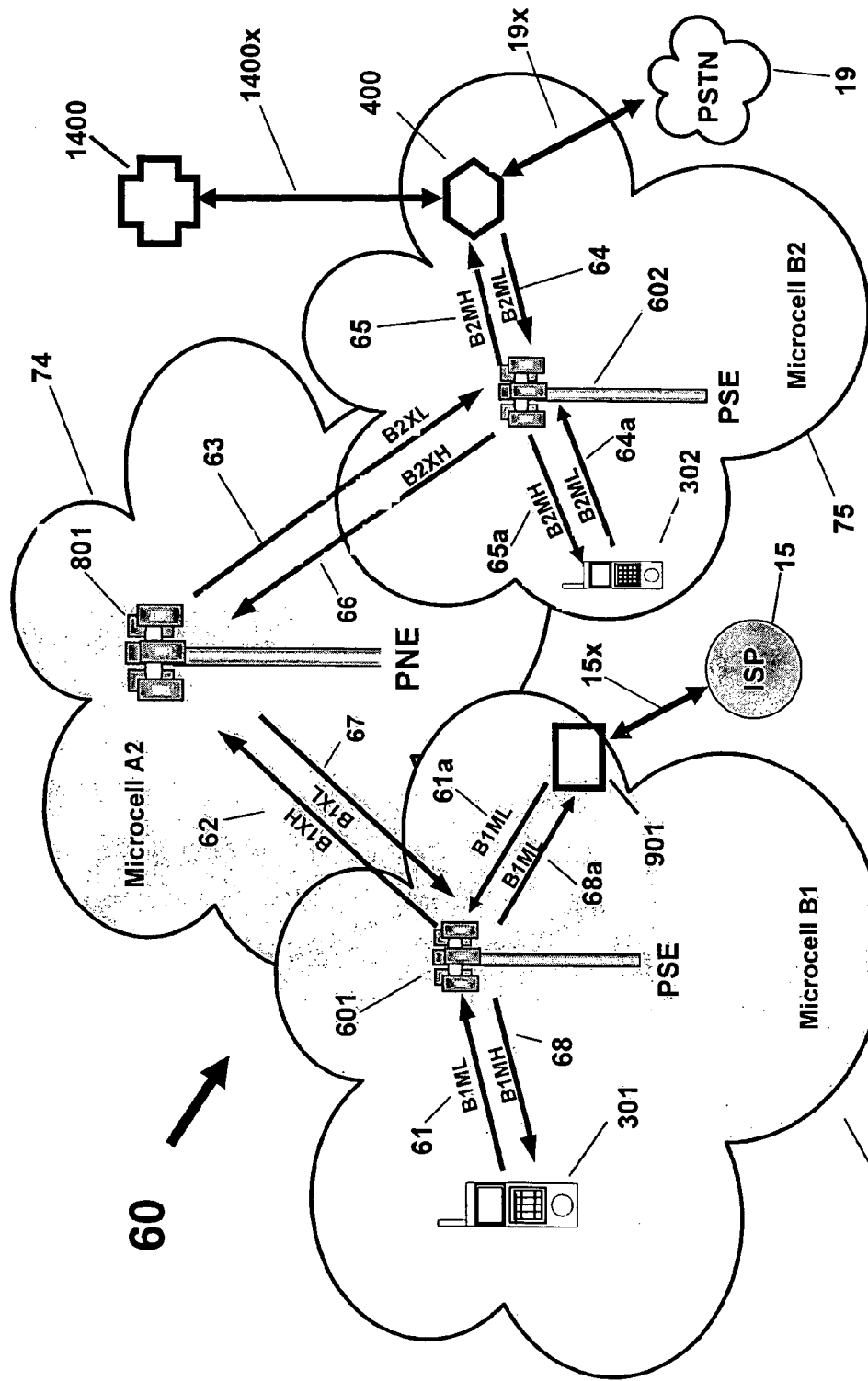
FIG. 6 shows a signal flow diagram of communication paths between a TSFD wireless handset in one microcell and a TSFD wireless ComDoc in another microcell.

Turning now to FIG. 6, FIG. 6 illuminates examples of signal flow in diagram 60 of communication paths 61, 62, 63, 64, 65, 66, 67, 68, 61a, 64a, 65a, 68a, 15x, 1400x and 19x. These paths illustrate signal flow between a TSFD wireless handset 302, a TSFD wireless ComDoc 901, located in two different microcells B1, 73 and B2, 75, respectively. These paths also illustrate a path of signal flow between a TSFD wireless handset 301 and a TSFD wireless X-DatCom 400; further connecting to a remote device 1400 via a dedicated connection 1400x; with TSFD wireless handset 301 and TSFD wireless X-DatCom 400 located in two different microcells B1, 73 and B2, 75, respectively. These paths further illustrate a path of signal flow between a TSFD wireless handset 301, a PSE 601, a PNE 801, a PSE 602, a remotely placed TSFD wireless X-DatCom 400, the PSTN 19, on to some designated landline number; with TSFD wireless handset 301 and TSFD wireless X-DatCom 400 located in two different microcells B1, 73 and B2, 75, respectively. Diagram 60 provides illustration of additional paths of signal flow between a TSFD wireless X-DatCom 400, a PSE 600, a PNE 800 and an Internet ISP 15. It also shows an example of a signal flow between TSFD wireless handset 301, a PSE 601, a TSFD wireless ComDoc 901, located in the same microcell B1; interconnecting to an ISP 15, externally via a Cable 15x. Additional paths are further illustrated through the signal flow between a TSFD wireless handset 302, a PSE 602, a TSFD wireless X-DatCom 400 and the PSTN 19; indicative of a path chosen to signal a TSFD wireless X-DatCom 400, via the TSFD wireless handset 302, to download data collected by the TSFD wireless X-DatCom 400, to a remote location attached to the PSTN 19 which is not shown.

Further illustrative of an embodiment of the present invention, FIG. 6 describes an extended path call is shown between the TSFD wireless handset 302 and the TSFD wireless ComDoc 901 in two different microcells 73, 75 that are switched at a PNE 801 in a macrocell A2, 74. The communication from the TSFD wireless handset 302 to the PSE 602 in microcell B2, 75 is omni-directional and is carried on sub-band B2ML 64a. The communication from the PSE 602 to the TSFD wireless handset 302 in microcell B2, 75 is omni-directional and is carried on sub-band B2MH 65a. The communication from the PSE 602 in microcell B2, 75 to the PNE 801 in macrocell A2, 74 is highly directional and is carried on sub-band B2XH 66. The communication from the PNE 801 in macrocell A2, 74 to the PSE 602 in microcell B2, 75 is highly directional and is carried on sub-band B2XL 63. The communication from the PNE 801 in macrocell A2, 74 to the PSE 601 in microcell B1, 73 is highly directional and is carried on sub-band B1XL 67. The communication from the PSE 601 in microcell B1, 73 to the PNE 801 in macrocell A2, 74 is highly directional and is carried on sub-band B1XH 62. The communication from the PSE 601 in microcell B1, 73 to the TSFD wireless ComDoc 901 in microcell B1, 73 is omni-directional and is carried on sub-band B1MH 68a. The communication from the TSFD wireless ComDoc 901 in microcell B1, 73 to the PSE 601 in microcell B1, 73 is omni-directional and is carried on sub-band B1ML 61a.

A second extended path call is shown; in FIG. 6, between the TSFD wireless handset 301 and a TSFD wireless X-DatCom 400 in two different microcells 73, 75 that are switched at a PNE 801 in a macrocell A2, 74. The communication from the TSFD wireless handset 301 to the PSE 601 in microcell B1, 73 is omni-directional and is carried on sub-band B1ML 61. The communication from the PSE 601 to the TSFD wireless handset 301 in microcell B1, 73 is omni-directional and is carried on sub-band B1MH 68. The communication from the PSE 601 in microcell B1, 73 to the PNE 801 in macrocell A2, 74 is highly directional and is carried on sub-band B1XH 62. The communication from the PNE 801 in macrocell A2, 74 to the PSE 601 in microcell B1, 73 is highly directional and is carried on sub-band B1XL 67. The communication from the PNE 801 in macrocell A2, 74 to the PSE 602 in microcell B2, 75 is highly directional and is carried on sub-band B2XL 63. The communication from the PSE 602 in microcell B2, 75 to the PNE 801 in macrocell A2, 74 is highly directional and is carried on sub-band B2XH 66. The communication from the PSE 602 in microcell B2, 75 to the TSFD wireless X-DatCom 400 in microcell B2, 75 is omni-directional and is carried on sub-band B2MH 65. The communication from the TSFD wireless X-DatCom 400 in microcell B2, 75 to the PSE 602 in microcell B2, 75 is omni-directional and is carried on sub-band B2ML 64. The path to and from the remote device 1400, is hardwired to the TSFD wireless X-DatCom 400. An alternate path at the TSFD wireless X-DatCom 400 may route the signal from the remote device 1400, subsequently to an external PSTN landline telephone located outside this diagram. The active signal to make such a signal divert within the TSFD wireless X-DatCom 400 from one destination to another may be sent by the origination TSFD wireless handset 301 via the same path previously designated between the TSFD wireless handset 301 and the TSFD wireless X-DatCom 400; via a proprietary control code.

A third extended path call is shown; in FIG. 6, between a TSFD wireless X-DatCom 400 and an Internet ISP 15 in two different microcells 73, 75 that are switched at a PNE 801 in a macrocell A2, 74. The communication from the TSFD wireless X-DatCom 400 to the PSE 602 in microcell B2, 75 is omni-directional and is carried on sub-band B2ML 64. The communication from the PSE 602 to the X-DatCom 400 in microcell B2, 75 is omni-directional and is carried on sub-band B2MH 65. The communication from the PSE 602 in microcell B2, 75 to the PNE 801 in macrocell A2, 74 is highly directional and is carried on sub-band B2XH 66. The communication from the PNE 801 in macrocell A2, 74 to the PSE 602 in microcell B2, 75 is highly directional and is carried on sub-band B2XL 63. The communication from the PNE 801 in macrocell A2, 74 to the PSE 601 in microcell B1, 73 is highly directional and is carried on sub-band B1XL 67. The communication from the PSE 601 in microcell B1, 73 to the PNE 801 in macrocell A2, 74 is highly directional and is carried on sub-band B1XH 62. The communication from the PSE 601 in microcell B1, 73 to the TSFD wireless ComDoc 901 in microcell B1, 73 is omni-directional and is carried on sub-band B1MH 68a. The communication from the TSFD wireless ComDoc 901 in microcell B1, 73 to the PSE 601 in microcell B1, 73 is omni-directional and is carried on sub-band B1ML 61a. The path to and from the ISP 15, from the TSFD wireless ComDoc 901, is achieved via a cable provided by the ISP service provider.

An alternate embodiment of the present invention provides, also in FIG. 6, a local path call is shown between the TSFD wireless handset 301, a PSE 601 and the TSFD wireless ComDoc 901 in the same microcell 73. The communication from the TSFD wireless handset 301 to the PSE 601 in microcell B1, 73 is omni-directional and is carried on sub-band B1ML 61. The communication from the PSE 601 to the handset 301 in microcell B1, 73 is omni-directional and is carried on sub-band B1MH 68. The communication from the PSE 601 in microcell B1, 73 to the TSFD wireless ComDoc 901 in microcell B1, 73 is omni-directional and is carried on sub-band B1MH 68a. The communication from the TSFD wireless ComDoc 901 in microcell B1, 73 to the PSE 601 in microcell B1, 73 is omni-directional and is carried on sub-band B1ML 61a.

An additional a local path call is shown; in FIG. 6, between the TSFD wireless handset 302, a PSE 602, the TSFD wireless X-DatCom 400 and an interface with the PSTN 19 in the same microcell 75. The communication from the TSFD wireless handset 302 to the PSE 602 in microcell B2, 75 is omni-directional and is carried on sub-band B2ML 64a. The communication from the PSE 602 to the TSFD wireless handset 302 in microcell B2, 75 is omni-directional and is carried on sub-band B2MH 65a. The communication from the PSE 602 in microcell B2, 75 to the X TSFD wireless -DatCom 400 in microcell B2, 75 is omni-directional and is carried on sub-band B2MH 65. The communication from the TSFD wireless X-DatCom 400 in microcell B2, 75 to the PSE 602 in microcell B2, 75 is omni-directional and is carried on sub-band B2ML 64. The path from the TSFD wireless X-DatCom 400 to the PSTN 19 is via a standard telephone line plugged into the TSFD wireless X-DatCom 400.

Figure 7:
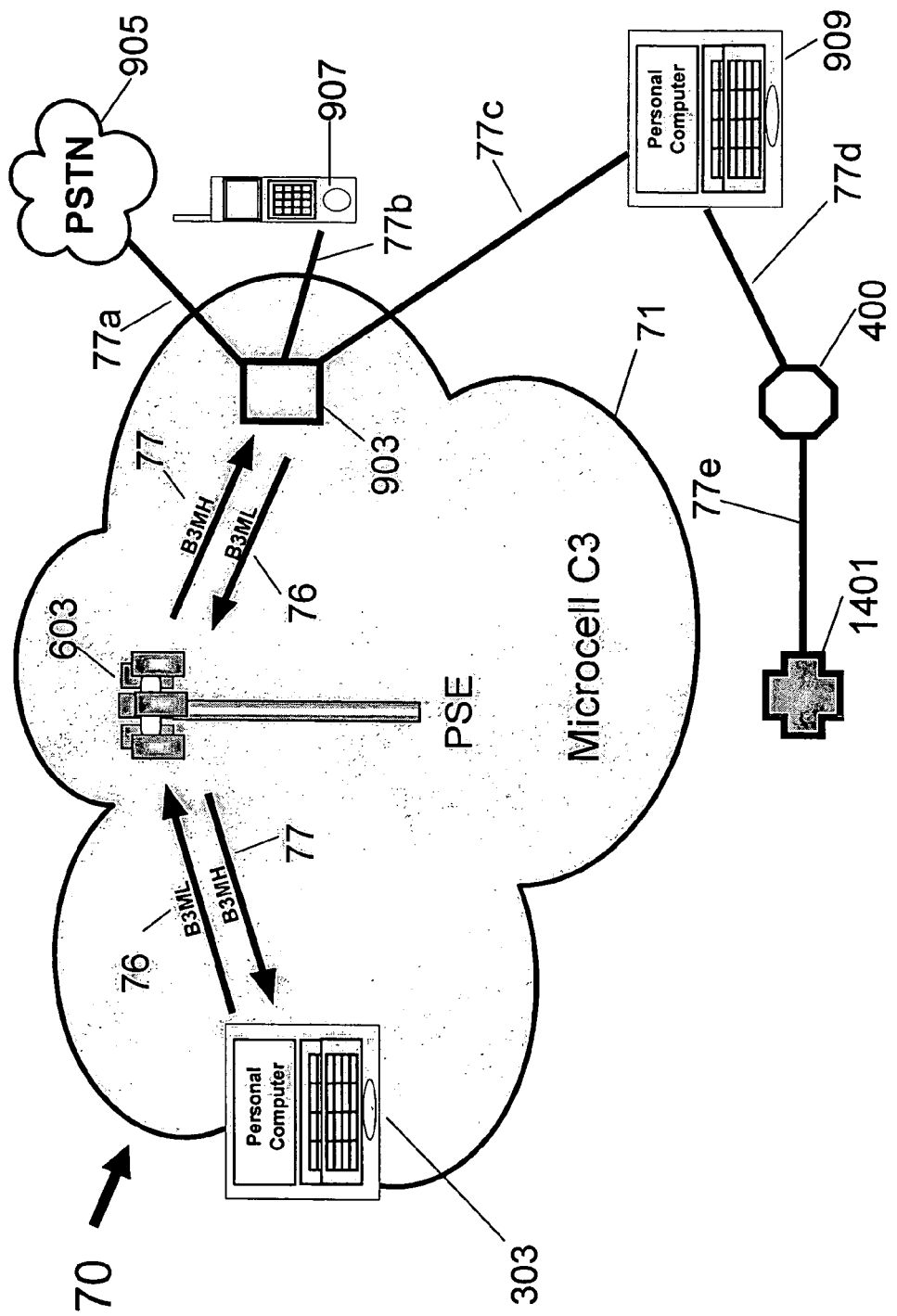
FIG. 7 shows a signal flow diagram of communication paths between a TSFD wireless handset and a TSFD wireless ComDoc in the same microcell.

Turning now to FIG. 7, FIG. 7 shows a signal flow diagram 70 of communication paths 76, 77, 77a, 77b, 77c, 77d, and 77e between a TSFD wireless X-DatCom 400, a computer 909, a Laptop Computer (with a TSFD wireless PC-DatCom Card 500 activated) 303, a PSE 603, a TSFD wireless ComDoc 903, alternately a route to a TSFD wireless handset 907, alternately a route to the PSTN 905, alternately a route to a computer 909, further on from the computer 909 to a TSFD wireless X-DatCom 400, further on from the TSFD wireless X-DatCom 400 to a remote device 1401; within the same microcell C3, 71. The signal flow diagram 60 illustrates an example of frequency usage in the system. In FIG. 7, a local path call is shown between the Laptop 303 and the TSFD wireless ComDoc 903 in the same microcell C3, 71, in which case no central PNE switching is required. Note in FIG. 7 that the sub-band used for the local path calls differs from the microcell type, but is usable because it is one of the two non-adjacent microcell types (i.e., different alpha, but same numeric designator). The communication path from the Laptop 303 (with the TSFD wireless PC-DatCom Card 500) to the PSE 603 is carried on sub-band B3ML 76, and the communication from the PSE 603 to the TSFD wireless ComDoc 903 is carried on sub-band B3MH 77. The communication path from the TSFD wireless ComDoc 903 to the PSE 603 is carried on sub-band B3ML 76, and the communication from the PSE 603 to the TSFD wireless ComDoc 903 is carried on sub-band B3MH 77. General control and operational state control have also been achieved over TSFD wireless X-DatCom 400 by this network link via the computer 909. The connection between TSFD wireless ComDoc 903 and computer 909 is achieved via a standard computer data cable.

In another embodiment of the present invention, FIGS. 6 and 7 depict the physical relationships between TSFD wireless handset 301 and 907, TSFD wireless ComDocs 900, 901, 903, PSEs 600, 601-603, PNE 801, TSFD wireless X-DatCom 400, remote devices 1400 and 1401 computers 303 and 909; microcells 71, 73, 74, and 75 and a macrocell. A macrocell is able to utilize the full amount of PCS spectrum that is licensed. This is achieved by including at least one microcell of each of the 9 types (A1-3, B1-3, C1-3) in a macrocell, as shown in FIG. 3. In addition, spectrum may be reused within a macrocell among non-adjacent microcells and through the use of directional antennas for the PSE 600-toPNE 800 communication links, which are between fixed sites. Spectrum may also be preserved by utilizing direct fiber optic connections between individual PSEs 600 and between PSEs 600 and PNEs 800. When all connections between PSEs 600 and PNEs 800 are by direct fiber optic connection, the spectrum reserved for PSE 600 to PNE 800 communication can be utilized by wireless devices communicating exclusively with PSEs 600. The radio frequency (RF) waveform within the TSFD protocol system is produced using GMSK (Gaussian Minimum Shift Keying) modulation and a data rate of 16 kbps. Baseband filtering limits the 3-dB channel bandwidth to 12.5 kHz. The resultant waveform is a "constant envelope" type, meaning that there is no intended amplitude modulation. The TSFD wireless communication system RF coverage and range depend upon the RF parameters of the system (frequency, bandwidth, transmit power, receive sensitivity, antenna gain, etc.), the radio horizon, and the amount of signal occlusion in the line-of-sight between the PSE 600 and TSFD wireless handset 300 or other such wireless devices found within the TSFD Protocol system. The RF parameters are specified so that the radio horizon is normally the limiting factor. The radio horizon is a function of the antenna heights and curvature of the earth. As an example, an PSE antenna on top of a 100-foot tower can "see" TSFD wireless handsets 300, or other such wireless devices, located out to about 14 miles actual ground distance from the base of the tower. Terrain and man-made structures present the potential for signal occlusions, i.e., non-line-of-sight conditions, which reduce effective coverage and range. Urban propagation models for RF signals show a significant decrease in range compared to clear line-of-sight conditions. For example, the RF conditions that yield 253 miles of range when operated with a clear line-of-sight yield only 4 miles with the urban model. For systems other than the PCS bands, higher or lower frequencies in the magnetic spectrum yield significantly different characteristics, such as when utilized for TSFD Protocol transmissions, which is frequency independent. The deployment of the TSFD wireless communication system in rural areas alleviates the potential for urban occlusions, but terrain is still a factor. Microcell/macrocell layout and PSE/PNE antenna site selection will be required for each installation based on careful planning, consideration, and test of the propagation conditions and physical constraints of the geographical area. The use of the 1.9-GHz PCS spectrum affects the range, amount of multi-path, and signal penetration capability compared to other frequency bands such as VHF and UHF, and therefore must be considered in site layout and planning.

As further illumination of the present invention, TSFD channelization protocol includes elements of control (signaling) and data (voice/data). The available RF spectrum; FIG. 4 and FIG. 5, is broken down into voice/data and signaling channels as shown in the table presented in FIG. 28, which shows the number of channels per microcell per PCS block. The total number of extended plus local channels may not be available for simultaneous use. A minimum total of 96 channels are required. Channels are comprised of a transmit/receive pair of frequencies separated by 80 MHz. The TSFD wireless handset uplink (handset to PNE) uses two channel halves, one for TSFD wireless handset 300 to PSE 600, and one for PSE 600 to PNE 800. Similarly, the TSFD wireless handset downlink (PNE to handset) uses the other halves of the same two channels, one for PNE 800 to PSE 600, and one for PSE 600 to TSFD wireless handset 300. The PSE 600 provides the necessary frequency translation for both the uplink and downlink. The TSFD wireless handset and PNE channel pairs are different, but 80 MHz separates each pair. The fixed 80-MHz offset is built into the TSFD wireless handset and PNE transceiver designs to allow for microsecond switching between receive and transmit functions. Local path calls, as shown in FIG. 7, present an exception to the channel concept described in the preceding discussion because these calls do not have an uplink/downlink with the PNE 800. As a result, they use only one channel pair, which is shared between the two TSFD wireless handsets 300. The PSE 600 is still required to provide the frequency translation.

Figure 8:
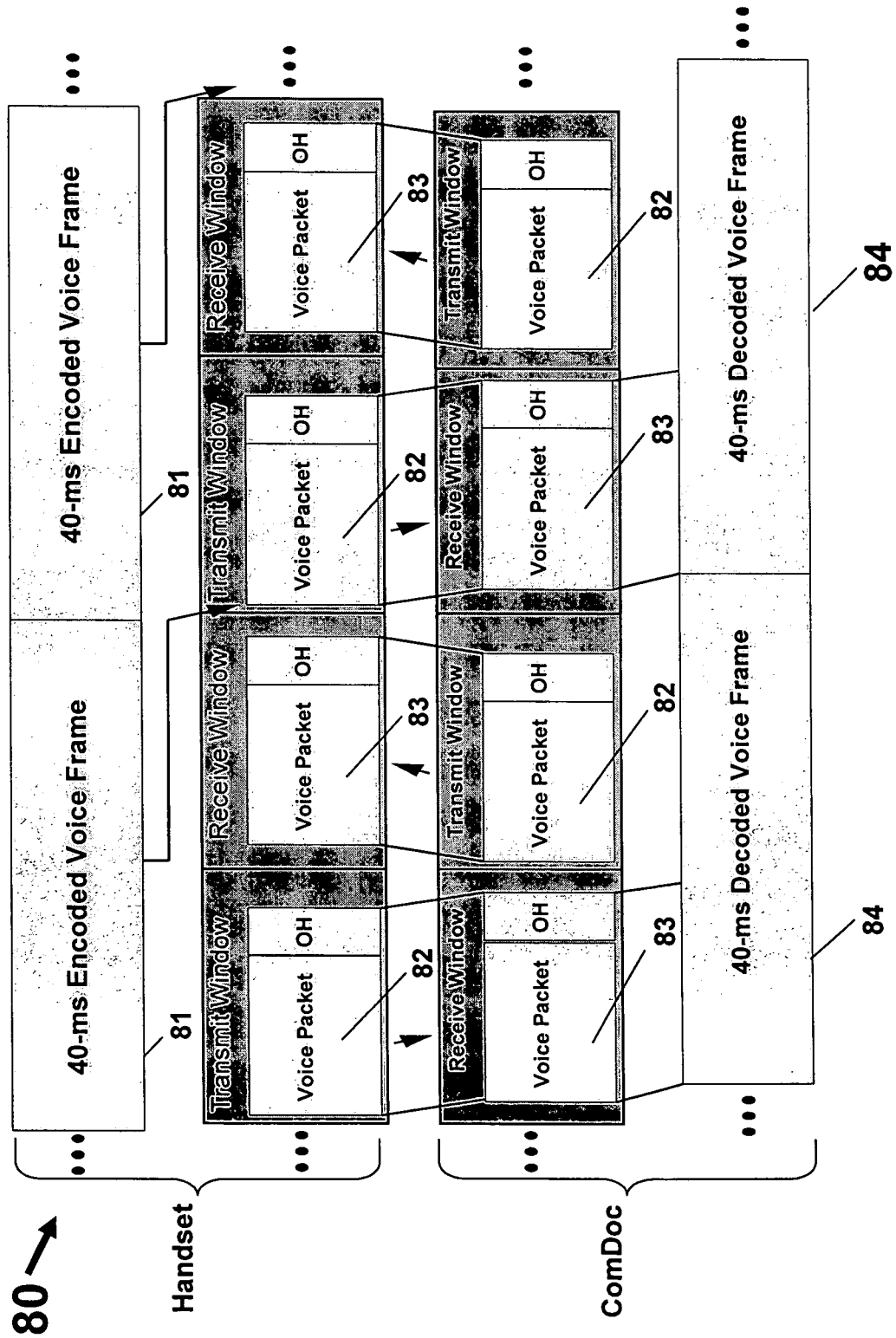
FIG. 8 shows single channel TSFD voice or data frames and packets between a TSFD wireless handset and a TSFD wireless ComDoc.

Turning now to FIG. 8—diagram 80, shows voice or data frames and packets between two TSFD wireless devices. In FIG. 8, a TSFD wireless handset and a TSFD wireless TSFD wireless ComDoc are shown for illustrative purposes. The TSFD wireless handset or the TSFD wireless ComDoc may actually, in practice, be any TSFD wireless device. A number of voice data channels (VDCs) are used in each microcell to carry voice/data call traffic in the TSFD wireless communication system. Each VDC is dedicated to a single call (i.e., voice/data channels are not multiplexed) to simplify the design. Two VDC types are defined, extended path and local path, as illustrated in FIGS. 6 and 7. Four fixed physical frequencies from the microcell sub-band spectrum are allocated for each extended VDC (i.e., uplink from TSFD wireless handsets 300 to PSE 600, uplink from PSE 600 to PNE 800, downlink from PNE 800 to PSE 600, and downlink from PSE 600 to TSFD wireless handsets 300). In contrast, the frequencies for the local VDCs are allocated from the subband spectrum of one of the two non-adjacent microcell types, which are identified by different alpha, but same numeric designator. For example, in microcell type B2, the local VDCs use the frequencies from microcell type A2 or C2. Since these cells are non-adjacent, interference is precluded. It is noted that for the local VDC, only two fixed physical frequencies are required (i.e., uplink from TSFD wireless handsets 300 to PSE 600, downlink from PSE 600 to TSFD wireless handsets 300) since the PNE 800 is not utilized. Local VDCs are contained within the microcell, while extended VDCs are connected through the PNE 800 to other microcells, macrocells, and/or the PSTN 19. Calls between TSFD wireless handsets 300 located in the same microcell use local VDCs to increase system capacity by reducing the number of calls switched through the PNE 800. The use of separate sub-band blocks for extended and local path/data channels allows the PSE 600 to relay the extended VDCs to the PNE 800, and the local VDCs back within the microcell for receipt by other TSFD wireless handsets 300. The number of VDCs in a microcell depends on the amount of spectrum that is available: 38 VDCs (19 local, 19 extended) as illustrated and defined in FIG. 26, in a 5-MHz block (D, E, or F) or 96 VDCs (63 max local, 63 max extended) also illustrated and defined in FIG. 26, in a 15-MHz block (A, B, or C). One VDC is required for each call in a microcell. Extended VDCs support one TSFD wireless handset or TSFD wireless ComDoc. Local VDCs support two TSFD wireless handsets 300, or a TSFD wireless handset and a TSFD wireless ComDoc, but still only one call. The advantage of the local VDC is that the TSFD wireless handsets 300 share the channel (which saves a VDC), and the complementary channels for the uplink/downlink are not required (which saves two more VDCs). The result is one channel pair required versus four channel pairs for an extended path call. Whenever one of the TSFD wireless handsets 300 on a local VDC call leaves the microcell, the call must be handed off to separate extended VDCs for each TSFD wireless handset. The VDC protocol is half-duplex on the physical channel, but is effectively full duplex from the user's perspective. This is achieved by buffering and encoding the digitized voice data, and transmitting it in packets at a higher data rate than is required for real-time decoding. As a result, the TSFD wireless handset is able to toggle back and forth between its transmit and receive functions at an even rate (50% transmit, 50% receive). This alternating transmit-receive "ping-pong" approach is illustrated in FIG. 8. An advantage of the ping-pong approach is that full-duplex transmit and receive functionality is not required of the TSFD wireless handset. Consequently the TSFD wireless handset architecture uses a transmit/receive (TR) switch instead of a duplexer, to significantly reduce cost, size, and weight. A 40 ms voice frame (20 ms transmit window, 20 ms receive window) will be utilized as shown in FIG. 8 based on the vocoder (voice encoder/decoder) packet size. The frame length sets the minimum buffering delay since the voice signal must be fully acquired in real-time and packetized before transmission. Delays due to frame lengths much above 40 ms may become perceptible to the user. On the other hand, short frame lengths much less than 40 ms reduce efficiency and are not desired. Some call maintenance actions require that the TSFD wireless handset drop a voice frame. This may be perceptible to the user but will be an infrequent occurrence. This approach allows the TSFD wireless handset to use only one transmitter to conserve size, weight, power consumption, and cost. A small amount of in-band signaling data is available on the VDC, for example, DTMF (dual-tone multi-frequency) codes for digits dialed during a call, and call progress codes including hang up indication. This in-band signaling data is shown on FIG. 8, labeled "OH" for overhead data. As shown in FIG. 8, 40 ms encoded voice frames 81 are compressed into a transmit window voice packet 82 and transmitted from the handset with overhead data OH. The voice and overhead packets are received as a received window voice packets 83 by the TSFD wireless TSFD wireless ComDoc and decompressed into 40 ms decoded voice frames 84. The reverse of this process is being carried on by the TSFD wireless TSFD wireless ComDoc compressing and transmitting to the handset where the voice frame is decompressed and decoded by the handset.

Figure 9:
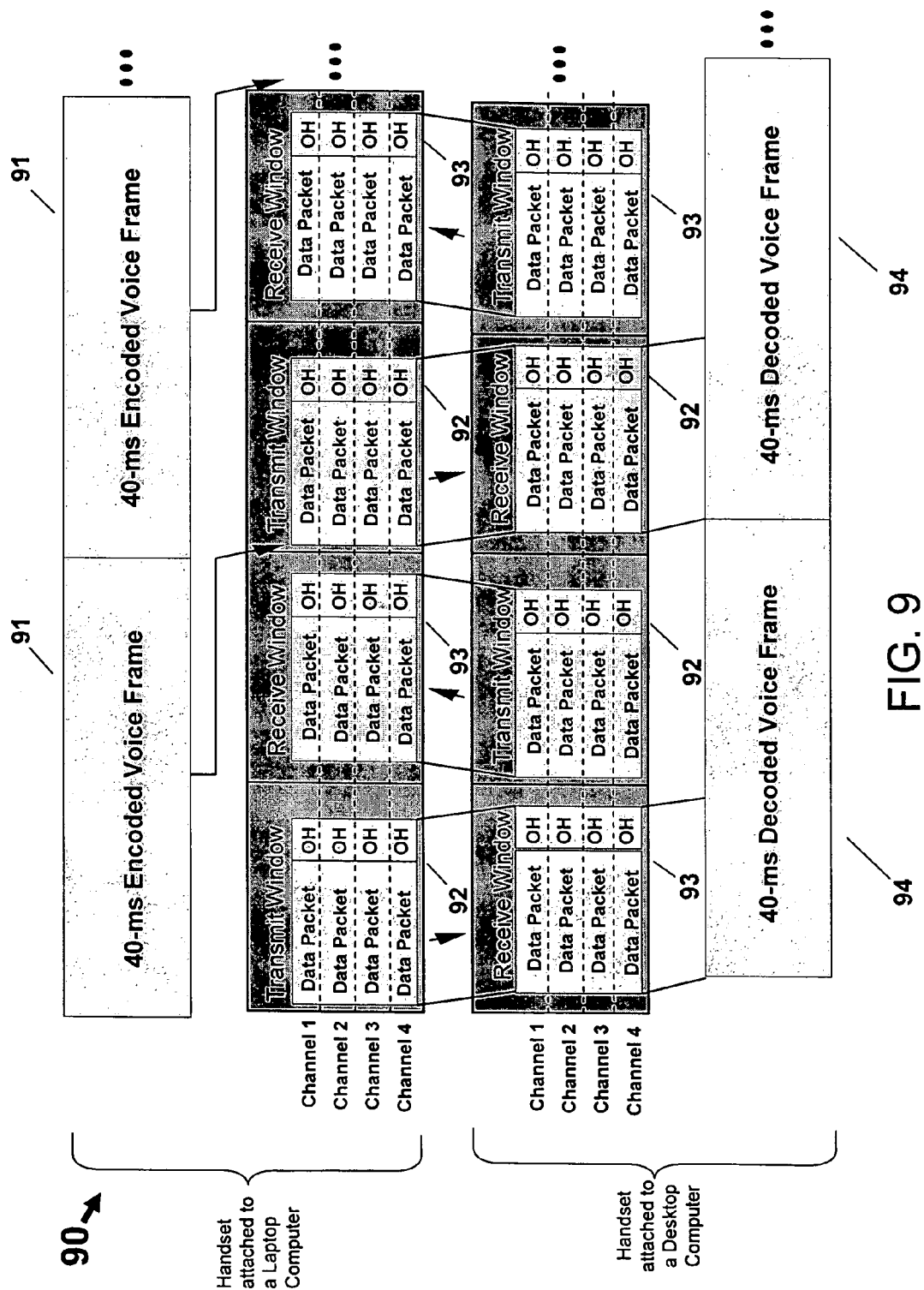
FIG. 9 shows four channels of TSFD CCAP data frames and packets between a TSFD wireless handset and a TSFD wireless ComDoc.

Turning now to FIG. 9 shows four channel Contiguous Channel Acquisition Protocol (CCAP) data frames and packets transmitting and receiving between any two TSFD wireless devices, as illustrated by a TSFD wireless handset and a TSFD wireless ComDoc in the figure. As shown in FIG. 9—diagram 90, 40 ms encoded voice frames 91 are compressed into a transmit window data packet 92, which comprises four contiguous voice channels, and transmitted from the TSFD wireless ComDoc with overhead data OH. The data and overhead packets are received as a received window data packets 93 by the TSFD wireless handset and decompressed into 40 ms decoded data frames TSFD wireless handset compressing and transmitting to the TSFD wireless ComDoc where the data frame is decompressed and decoded by the TSFD wireless handset. By using four contiguous voice channels to transmit data, the channel bandwidth is increased four-fold, or up to approximately 56 kbps. This feature enables a laptop computer connected to a TSFD wireless handset to communicate at a 56 kbps rate with a second computer connected to another TSFD wireless handset. Other communication paths are also possible, as in FIG. 7 where a laptop could be connected to a TSFD wireless handset communicating via a TSFD wireless ComDoc and a PSTN to an Internet service provider. If twelve contiguous voice channels were available to transmit data using a CCAP+ protocol, the channel bandwidth may be increased twelve-fold as illuminated in FIG. 10, or up to approximately 250 kbps. The added bandwidths are obtained by adding adjacent channels together to obtain a higher data rate. A third type of VDC, the distant VDC, is not shown in FIG. 8, but is similar to the extended VDC except that the communication path is between a distant TSFD wireless device and a remotely placed distant TSFD wireless device in a different microcell and in a different macrocell.

Figure 10:
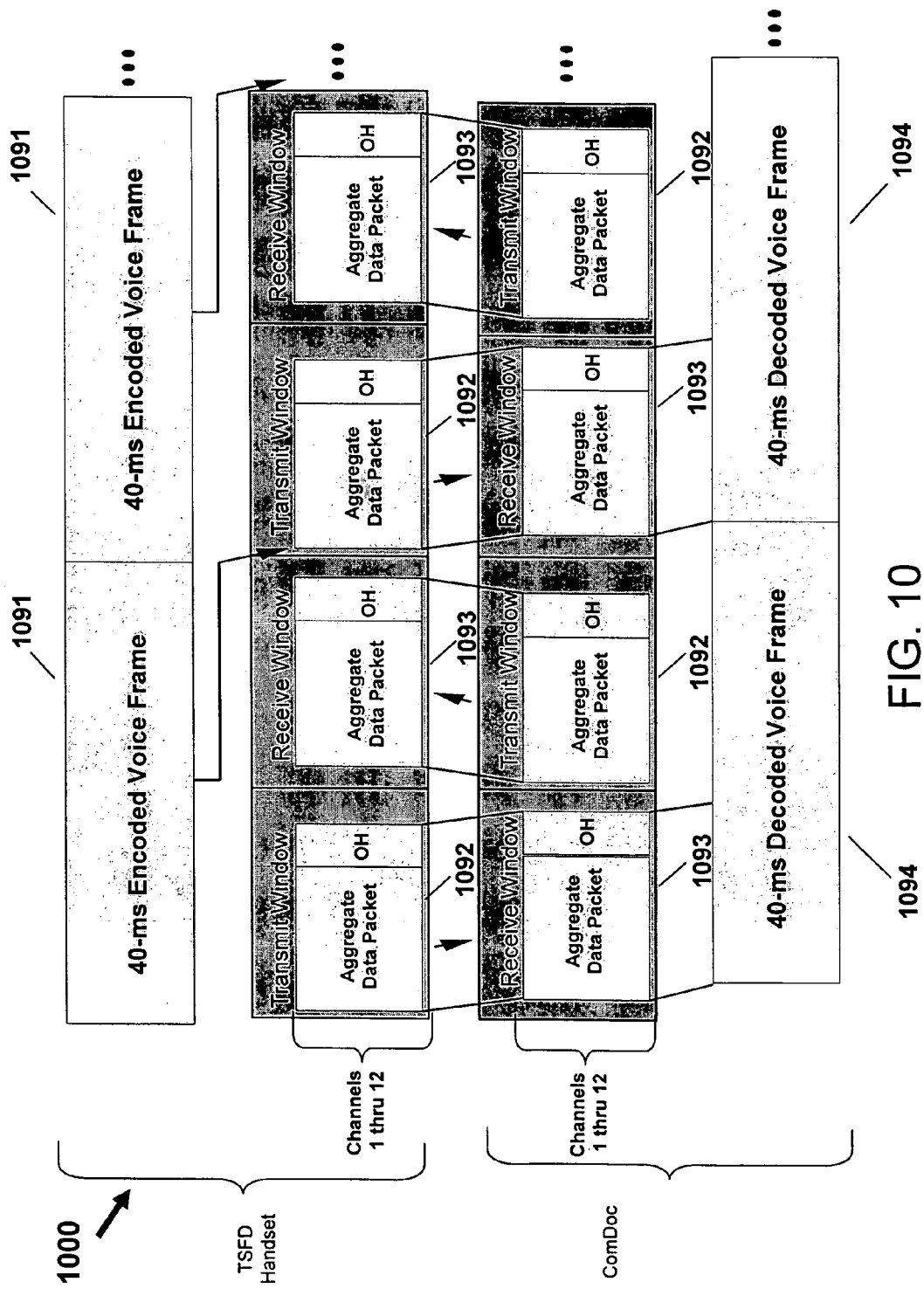
FIG. 10 shows twelve channels of TSFD CCAP+ data frames and packets between a TSFD wireless handset a TSFD wireless ComDoc.

Turning now to FIG. 10 shows 12 channel Contiguous Channel Acquisition Protocol (CCAP+) data frames and packets transmitting and receiving between any two TSFD wireless devices, as illustrated by a TSFD wireless handset and a TSFD wireless TSFD wireless ComDoc in the figure. As shown in FIG. 10—diagram 1000, 40 ms encoded voice frames are compressed into a transmit window data packet 1092, which comprises twelve contiguous voice channels, and transmitted from the handset with overhead data OH. The data and overhead packets are received as a received window data packets 1093 by the TSFD wireless ComDoc and decompressed into 40 ms decoded data frames TSFD wireless handset compressing and transmitting to the TSFD wireless ComDoc set where the data frame is decompressed and decoded by the TSFD wireless handset. By using twelve contiguous voice channels to transmit data, the channel bandwidth is increased four-fold, or up to approximately 250 kbps. This feature enables a laptop computer connected to a TSFD wireless handset to communicate at a 250 kbps. Other communication paths are also possible, as in FIG. 7 where such a laptop is connected to a TSFD wireless handset communicating via a TSFD wireless ComDoc and a PSTN to an Internet service provider. When twelve contiguous voice channels are available to transmit data using a CCAP+ protocol, the channel bandwidth may be increased twelve-fold as illuminated in FIG. 10, or up to approximately 250 kbps. The additional bandwidths may be obtained by adding adjacent channels together to obtain an even higher data rate.

Figure 11:
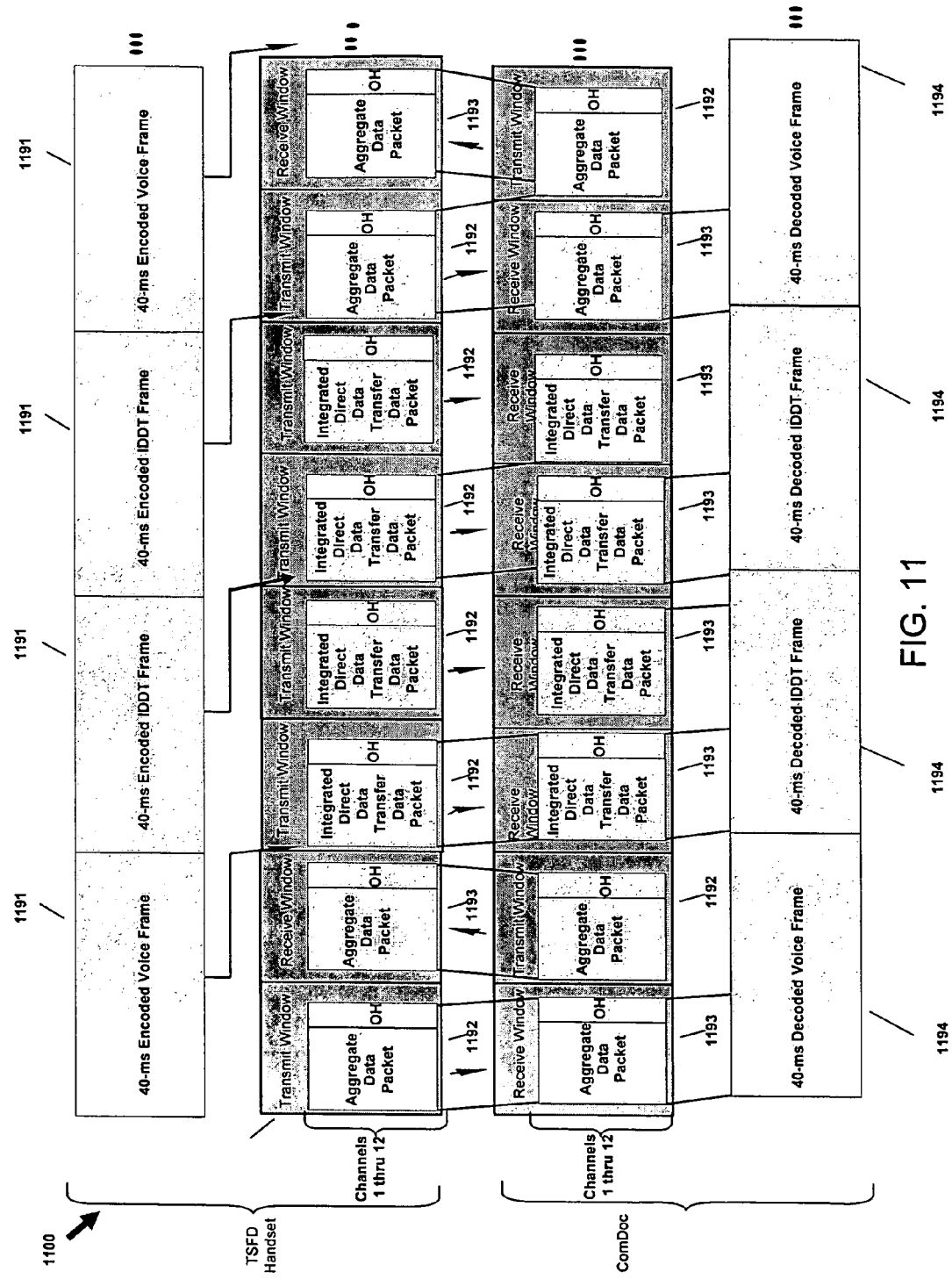
FIG. 11 shows TSFD Integrated Direct Digital Transfer (IDDT) with multi-channel voice and data frame and packets and inserted IDDT video streaming between a TSFD handset and another TSFD handset.

Turning now to FIG. 11 shows 12 channel Contiguous Channel Acquisition Protocol (CCAP+) data frames and packets transmitting and receiving between two TSFD wireless devices, as illustrated by a TSFD wireless handset and a TSFD wireless TSFD wireless ComDoc in the figure. As shown in FIG. 10—diagram 1000, 40 ms encoded voice frames are compressed into a transmit window data packet 1092, which comprises twelve contiguous voice channels, and transmitted from the handset with overhead data OH. The data and overhead packets are received as a received window data packets 1093 by the TSFD wireless ComDoc and decompressed into 40 ms decoded data frames TSFD wireless handset compressing and transmitting to the TSFD wireless ComDoc set where the data frame is decompressed and decoded by the TSFD wireless handset. By using twelve contiguous voice channels to transmit data, the channel bandwidth is increased four-fold, or up to approximately 250 kbps. This feature enables a laptop computer connected to a TSFD wireless handset to communicate at a 250 kbps.

Within the standard Time-Shared Full Duplex Protocol diagram an insertion is made of digital data in a continuous flow. This transition from TSFD to the Integrated Direct Data Transfer or IDDT sub-protocol requires that each wireless device formerly in the "Send-Receive" mode cease bi-directional broadcasts in favor of only one of the TSFD wireless devices sending and the other receiving. This condition cannot be activated independently of the TSFD Protocol; but is an integrated part of the protocol used exclusively to transfer digital data; i.e., live video streaming (packetized as in Internet transfers) Following the completion of the "feed" the system automatically returns to the previous mode of "Send-Receive" signaling. Setup and Teardown commands are part of the software driving the TSFD Protocol and as such is applicable to all TSFD wireless Anchored Components and TSFD Mobile Devices as defined and embodied within this disclosure.

Other communication paths are also possible, as in FIG. 7 where such a laptop is connected to a TSFD wireless handset 907 communicating via a TSFD wireless ComDoc 903 and a PSTN 905 to an Internet service provider. When twelve contiguous voice channels are available to transmit data using a CCAP+ protocol, the channel bandwidth may be increased twelve-fold as illuminated in FIG. 10, or up to approximately 250 kbps. The additional bandwidths may be obtained by adding adjacent channels together to obtain an even higher data rate.

Figure 12:
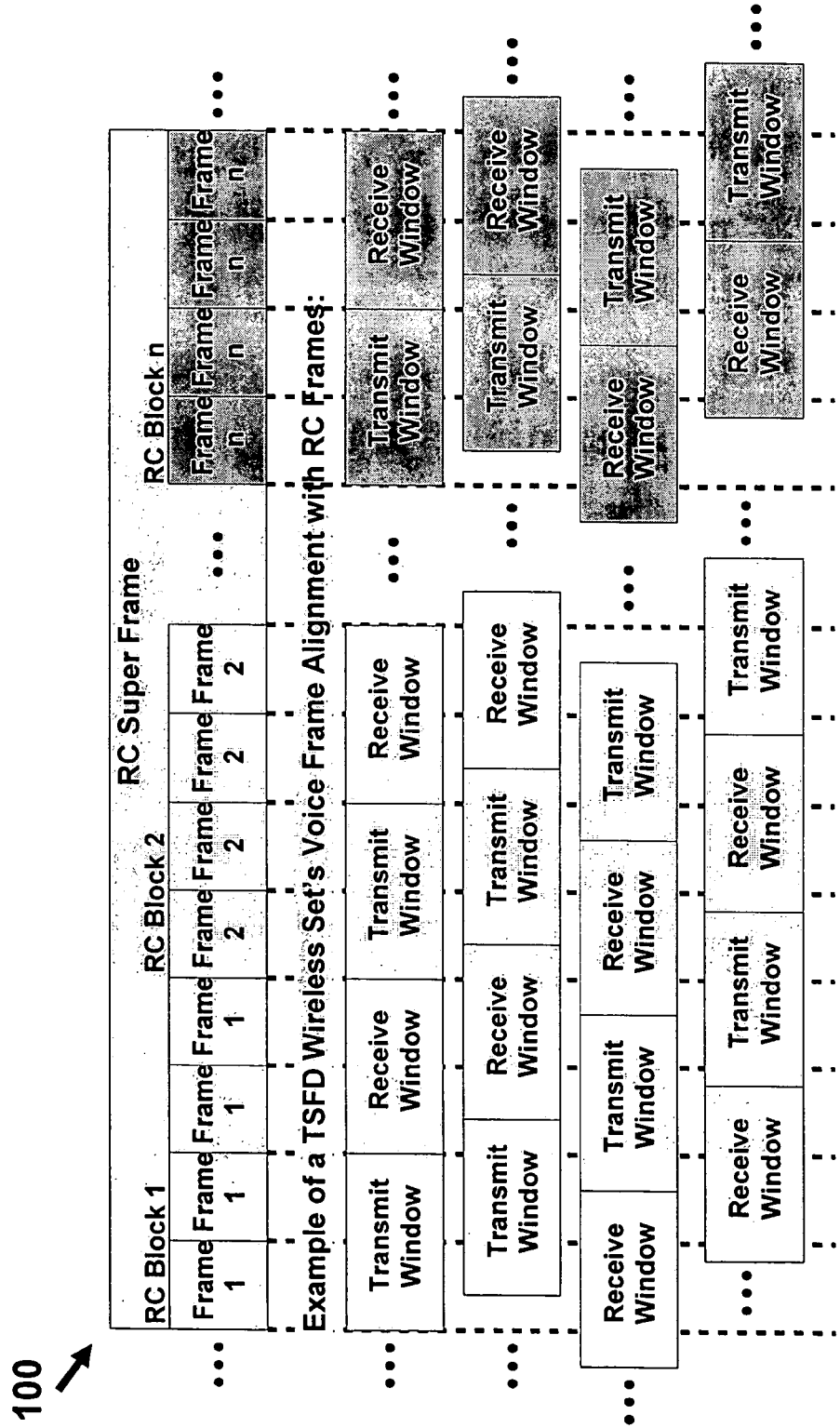
FIG. 12 shows reference channel framing.

Turning now to FIG. 12, FIG. 12—diagram 100, shows reference channel framing. A single, shared Reference Channel (RC) is used in each microcell for broadcast to TSFD wireless handsets 300, TSFD wireless X-DatComs 400, TSFD wireless PC-DatCom Cards 500 and TSFD wireless ComDocs 900. Four fixed physical frequencies from the microcell sub-band spectrum are allocated for the RC (i.e., uplink from TSFD wireless handsets 300, TSFD wireless ComDocs 900, X-DatComs 400 or TSFD wireless PC-DatCom 500 to PSE 600, uplink from PSE 600 to PNE 800, downlink from PNE 800 to PSE 600, and downlink from PSE 600 to TSFD wireless handsets 300), although the TSFD wireless handset 300, TSFD wireless ComDoc 900, TSFD wireless X-DatCom 400 and TSFD wireless PC-DatCom 500 uplink is not utilized. The TSFD wireless handsets 300, TSFD wireless X-DatComs 400, TSFD wireless PC-DatCom Cards 500 and TSFD wireless ComDocs 900 read the RC to identify the presence of service. Without the RC, the TSFD wireless handsets 300, TSFD wireless X-DatComs 400, TSFD wireless PC-DatCom Cards 500 and TSFD wireless ComDocs 900 are inoperable. Besides identifying wireless communication system service, the RC is used by the TSFD wireless handsets 300, TSFD wireless X-DatComs 400, TSFD wireless PC-DatCom Cards 500 and TSFD wireless ComDocs 900 to adjust its internal frequency reference (typically a voltage-controlled temperature-compensated crystal oscillator or VCTCXO). This adjustment capability allows the TSFD wireless handsets 300, TSFD wireless X-DatComs 400, TSFD wireless PC-DatCom Cards 500 and TSFD wireless ComDocs 900 to achieve increased frequency accuracy and stability and thus improved bit-error performance in demodulation of signals. The following information is also provided to the TSFD wireless handset on the RC:

Date and Time

Microcell/Macrocell Identification Code

TSFD Wireless Mobile Device Attention Codes (supports the CMC, described below)

Broadcast Text Messages

The PNE 800 also transmits special commands on the RC downlink that are addressed to the PSE 600 rather than the TSFD wireless handsets 300, TSFD wireless X-DatComs 400, TSFD wireless PC-DatCom Cards 500 and TSFD wireless ComDocs 900. These commands are used to remotely enable/disable the PSE 600 and assign the microcell type (which sets the frequency sub-blocks for use). Remote control of the microcell type provides system frequency agility. The RC uplink, while not used by the TSFD wireless handsets 300, TSFD wireless X-DatComs 400, TSFD wireless PC-DatCom Cards 500 and TSFD wireless ComDocs 900, is used by the PSE 600 for command acknowledgement and status reporting to the PNE 800. There are 9 unique RC frequencies in the TSFD wireless communication system, one for each microcell type. TSFD wireless handsets 300, TSFD wireless X-DatComs 400, TSFD wireless PC-DatCom Cards 500 and TSFD wireless ComDocs 900 continually scan the RCs in order to identify the TSFD wireless handsets 300, TSFD wireless X-DatComs 400, TSFD wireless PC-DatCom Cards 500 and TSFD wireless ComDocs 900 microcell/macrocell location. This is accomplished by monitoring the RC power levels and reading the microcell/macrocell ID codes. Real-time tracking of TSFD wireless handsets 300, TSFD wireless X-DatComs 400, TSFD wireless PC-DatCom Cards 500 and TSFD wireless ComDocs 900 microcell location is important for mobile wireless communication because TSFD wireless handsets 300, TSFD wireless X-DatComs 400, TSFD wireless PC-DatCom Cards 500 and TSFD wireless ComDocs 900 are required when TSFD wireless handsets 300, TSFD wireless X-DatComs 400, TSFD wireless PC-DatCom Cards 500 and TSFD wireless ComDocs 900 can move between microcells. In order to facilitate RC scanning while a call is active, the TSFD wireless handsets 300, TSFD wireless X-DatComs 400, TSFD wireless PC-DatCom Cards 500 and TSFD wireless ComDocs 900 architecture includes two parallel receivers; one dedicated to the VDC, and the other dedicated to RC scanning. As shown in FIG. 8, the handset/TSFD wireless ComDoc receive function is limited to about 50% duty factor when on a call. The length of the handset/TSFD wireless ComDoc receive window is 20 ms based on the vocoder packet size. At the system 16 kbps data rate, 20 ms amounts to 320 bits. In order for the TSFD wireless handsets 300, TSFD wireless X-DatComs 400, TSFD wireless PC-DatCom Cards 500 and TSFD wireless ComDocs 900 to ensure receipt of a complete RC message, the message length must be less than ½ of the handset/TSFD wireless ComDoc receive window, or 10 ms, which amounts to 160 bits. In this case, for design purposes, the RC frame is limited to 150 bits. In order to meet this size limitation, data may be distributed across multiple frames resulting in a super frame. For example, broadcast messages are distributed across a super frame with only a few bytes in each frame. Each RC frame within the super frame is repeated four consecutive times before advancing to the next frame; this is referred to as a block. Each block should be the same length as the 40 ms transmit/receive voice frame. Repeating the RC frame transmission four times ensures that a complete 10-ms RC frame will fall within the 20-ms handset/TSFD wireless ComDoc receive window no matter where the receive window begins within the 40-ms block. This process is illustrated in FIG. 9, which shows an example of TSFD Protocol wireless voice frame alignment with RC frames.

Figure 13:
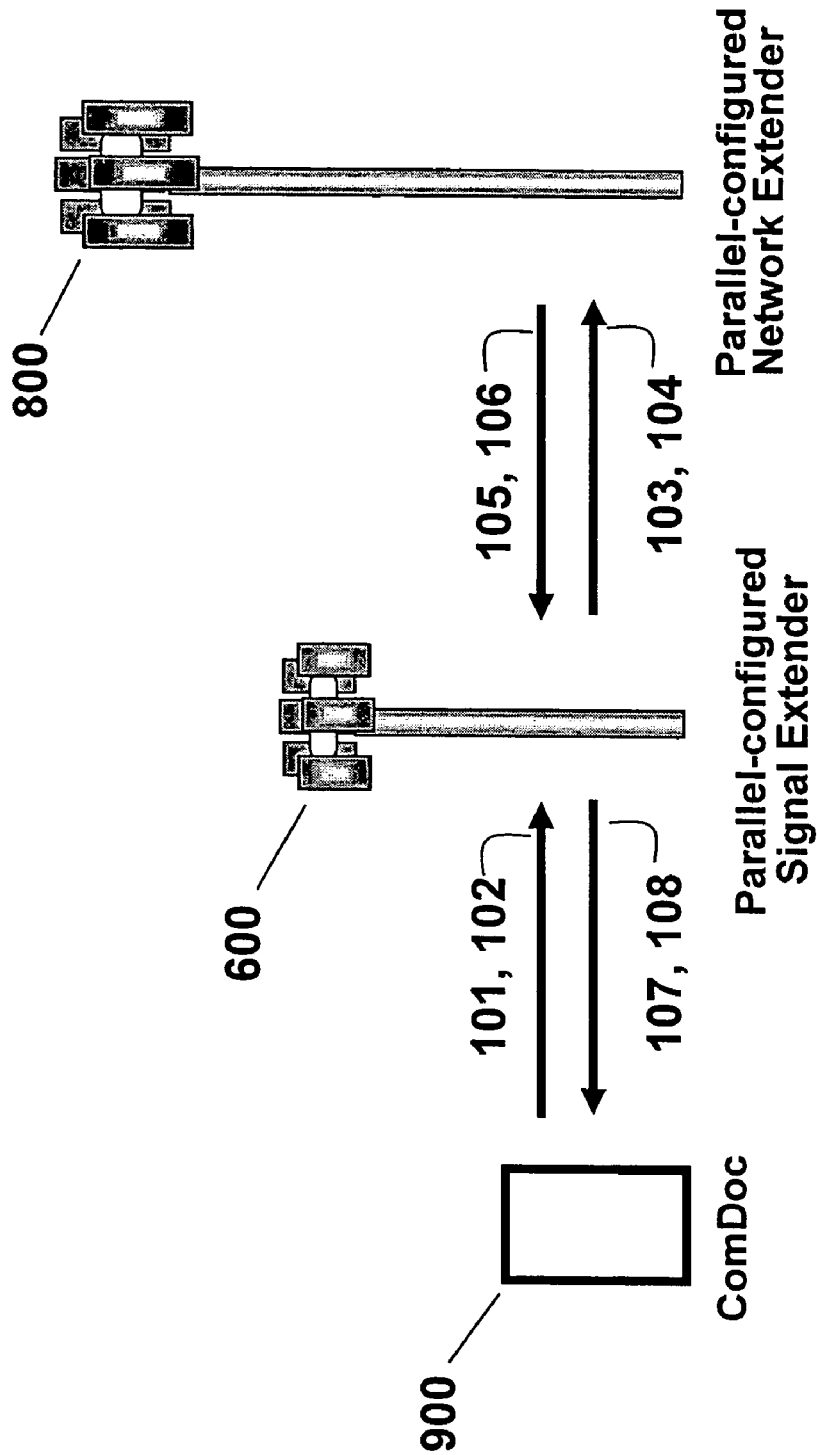
FIG. 13 shows a flow diagram for a call initiation channel and a call maintenance channel.

Turning now to FIG. 13, FIG. 13 shows the signal flows for a call initiation channel (CIC) 101, 103, 105, 107 and a call maintenance channel (CMC) 102, 104, 106, 108. A single, shared CIC 101, 103, 105, 107 is used in each microcell for TSFD wireless ComDoc 900 registration and call establishment. Four fixed physical frequencies from the microcell sub-band spectrum are allocated for the CIC 101, 103, 105, 107. These four frequencies include an uplink 101 from TSFD wireless ComDocs 900 to PSE 600, an uplink 103 from PSE 600 to PNE 800, a downlink 105 from PNE 800 to PSE 600, and a downlink 107 from PSE 600 to TSFD wireless ComDocs 900. The CIC uplink 101 is a random access channel whereby the TSFD wireless ComDocs 900 within a microcell compete for its use. The TSFD wireless ComDocs 900 listen for activity on the CIC downlink 107 from the PNE 800 and transmit a call initiation request when the channel is clear. Request messages include the TSFD wireless ComDoc address (identification number) and the request information. Response messages include the TSFD wireless ComDoc address along with requested information or simple acknowledgement depending on the request. If a downlink response is not received when expected, then the TSFD wireless ComDoc 900 will repeat its request following a randomly determined delay period. The delay period is intended to prevent collisions with transmissions from competing TSFD wireless ComDocs 900 and TSFD wireless handsets 300 on the shared uplink. The following functions are handled on the CIC:

The following functions are handled on the CIC:
- TSFD wireless handset 300, TSFD wireless PC-DatCom Cards 500, TSFD wireless ComDoc 900 and TSFD wireless X-DatCom 400 initial registration to PNE 800
- TSFD wireless handset 300, TSFD wireless ComDoc 900, TSFD wireless X-DatCom 400 and PC-DatCom card periodic registration refresh to PNE 800
- TSFD wireless handset 300, TSFD wireless PC-DatCom Cards 500, TSFD wireless ComDoc 900 and TSFD wireless X-DatCom 400 authorization and short id assignment to TSFD wireless handset 300, TSFD wireless PC-DatCom Cards 500, TSFD wireless ComDoc 900 and TSFD wireless X-DatCom 400
- Call request to PNE 800 or to TSFD wireless handset 300, TSFD wireless PC-DatCom Cards 500, TSFD wireless ComDoc 900 and TSFD wireless X-DatCom 400
- Call frequency assignment to TSFD wireless handset 300, TSFD wireless PC-DatCom Cards 500, TSFD wireless ComDoc 900 and TSFD wireless X-DatCom 400
- Call progress prior to voice/data channel use to TSFD wireless handset 300, TSFD wireless PC-DatCom Cards 500, TSFD wireless ComDoc 900 and TSFD wireless X-DatCom 400
- Acknowledgements to PNE 800 or to TSFD wireless handset 300, wireless PC-DatCom Cards 500, TSFD wireless ComDoc 900 and TSFD wireless X-DatCom 400

TSFD wireless handset 300, TSFD wireless PC-DatCom Cards 500, TSFD wireless ComDoc 900 and TSFD wireless X-DatCom 400 ID, either an electronic serial number (ESN) or phone number, is 40 bits. When a TSFD wireless handset 300, TSFD wireless PC-DatCom Cards 500, TSFD wireless ComDoc 900 or TSFD wireless X-DatCom 400 initially registers in a new microcell, it will be assigned an 8-bit temporary ID for use while registered with that microcell. The shorter ID significantly reduces message lengths on the RC, CIC, and CMC where \ TSFD wireless handset 300, TSFD wireless PC-DatCom Cards 400, TSFD wireless ComDoc 900 and TSFD wireless X-DatCom 400 addresses are required.

In an alternate embodiment of the present invention FIG. 13, a shared Call Maintenance Channel (CMC) 102, 104, 106, 108 is used in each microcell for out-of-band signaling functions once a call has been established. Four fixed physical frequencies from the microcell sub-band spectrum are allocated for the CMC 102, 104, 106, 108. These include an uplink 102 from TSFD wireless ComDocs 900 to PSE 600, an uplink 104 from PSE 600 to PNE 800, a downlink 106 from PNE 800 to PSE 600, and a downlink 108 from PSE 600 to TSFD wireless ComDocs 900. The CMC uplink 102 is a random access channel whereby the TSFD wireless ComDocs 900 and TSFD wireless handsets 300 within a microcell compete for its use, just like the CIC uplink. The following functions are handled on the CMC:
- Call completion to PNE 800
- Call handoff request to PNE 800
- 911 position report to PNE 800
- Call handoff frequency to a TSFD wireless handset 300, TSFD wireless PC-DatCom Cards 500, TSFD wireless ComDoc 900 or TSFD wireless X-DatCom 400
- Call waiting notification to a TSFD wireless handset 300, TSFD wireless PC-DatCom Cards 500, TSFD wireless ComDoc 900 or TSFD wireless X-DatCom 400
- Voice message notification to a TSFD wireless handset 300, TSFD wireless PC-DatCom Cards 500, TSFD wireless ComDoc 900 or TSFD wireless X-DatCom 400
- Text message notification to a TSFD wireless handset 300, TSFD wireless PC-DatCom Cards 500, TSFD wireless ComDoc 900 or TSFD wireless X-DatCom 400
- Acknowledgements to PNE 800 or to a TSFD wireless handset 300, TSFD wireless PC-DatCom Cards 500, TSFD wireless ComDoc 900 or TSFD wireless X-DatCom 400

When a CMC message is pending for a TSFD wireless ComDoc 900, the PNE 800 transmits an attention code for the TSFD wireless ComDoc 900 on the RC. Since the RC is periodically monitored by the TSFD wireless ComDoc 900, even while it is on a call, the TSFD wireless ComDoc 900 is able to identify the attention code and then monitor the CMC downlink 108 for the message. When the TSFD wireless ComDoc 900 uses the CMC, it drops a 40-ms voice frame in order to use the channel. Consequently, CMC usage must be infrequent and messages should be sized to fit within a single voice frame. If no response is received to a TSFD wireless ComDoc request, the request will be retransmitted on another frame after a random delay. Subsequent frames are selected randomly, but the dropping of back-to-back frames is precluded.

System Components

I. TSFD Wireless Handsets

Figure 14:
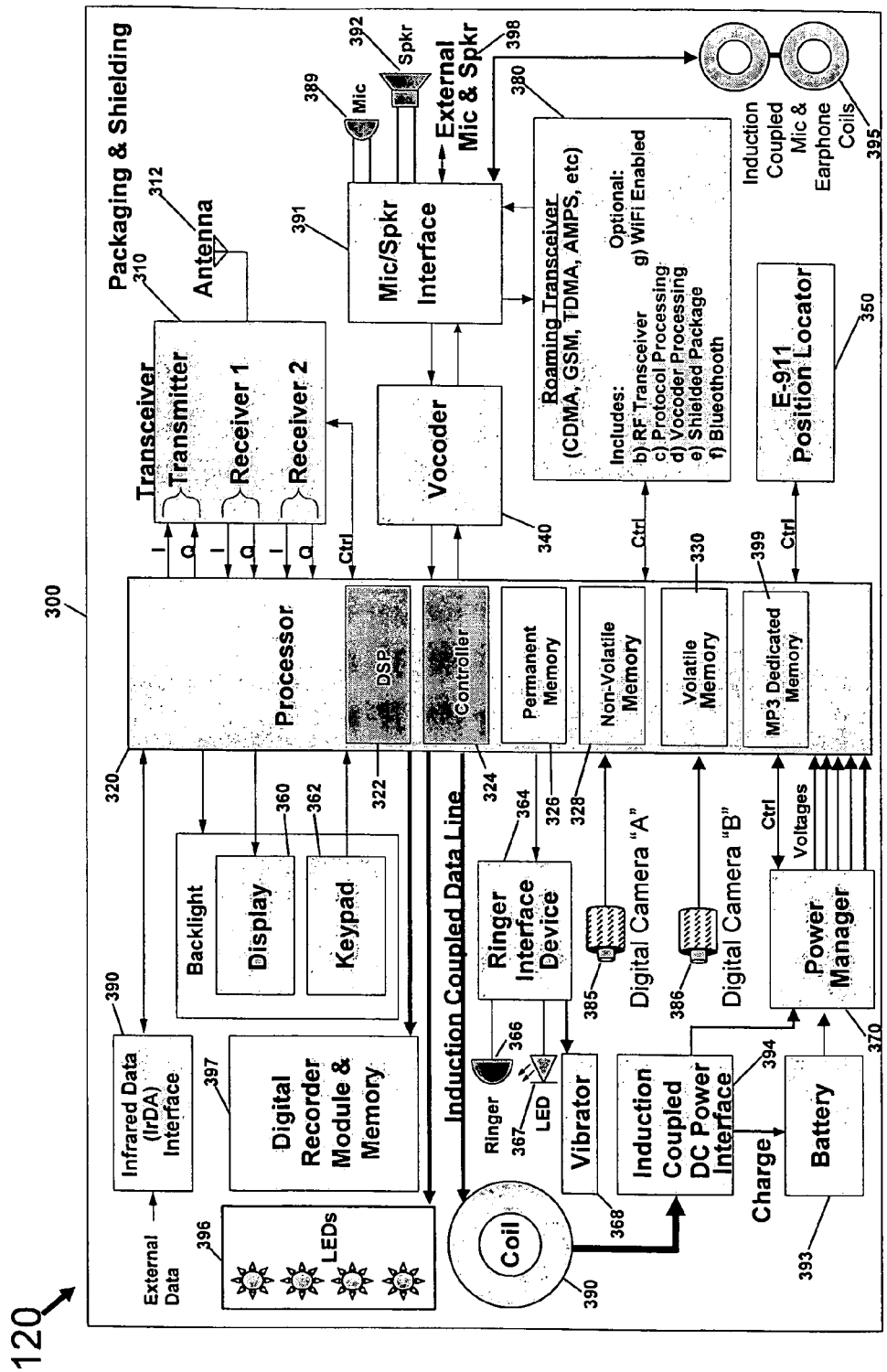
FIG. 14 shows a block diagram of a TSFD wireless handset.

Turning now to FIG. 14, FIG. 14 shows a block diagram 120 of an embodiment of a TSFD wireless handset 300. The TSFD wireless handset 300 includes a transceiver 310 and antenna 312. The transceiver 310 consists of two receivers, one transmitter, and two programmable frequency synthesizers. The antenna 312 may be integrated into the transceiver, or may be a modular type that plugs into the case. The transceiver transmit power is adjustable in 3 dB steps over a 50 dB range relative to the maximum transmit power. The gain of the transceiver antenna 312 is in the range of 0 to 2.5 dB under controlled conditions. The transceiver 310 is capable of simultaneously receiving and demodulating two signals on independently programmed frequencies. The transceiver architecture includes an 80-MHz offset oscillator to facilitate switching between transmit and receive operations on a single channel pair without needing to re-program a frequency synthesizer. A processor 320 provides centralized control to the TSFD wireless handset 300 and includes a digital signal processing (DSP) 322 for demodulating signals, a controller 324 for display/keypad servicing, permanent memory 326, non-volatile memory 328, and volatile memory 330. Firmware is embedded in the processor memory to implement protocols, control the user interfaces for the display, keypad, menus, etc., and control the application program interface (API) for the secondary mode (roaming) protocol. The firmware includes a bootstrap loader that is stored in permanent memory 326 to enable download of the main code. The main code is stored in non-volatile memory 328 so that it is not lost in the absence of power, but can be overwritten by subsequent downloads, e.g., firmware updates. In addition to the main code, there also exist a number of configuration variables that are downloaded to activate the TSFD wireless handset 300. These configuration variables set the user's phone number and services subscribed, and are also stored in non-volatile memory. The handset firmware also manages non-volatile user memory for storage of phone book names and numbers, received text messages, and the current operating mode selections (ringer volume/type, beep volume, etc.). The Processor 320 shall have peripheral interfaces to the following elements:

In an alternate embodiment of the invention, the Induction Coupled Data Line is disclosed thus: this line attaches to the recharger and may import and export data from a TSFD wireless handset via inductive coupling 390 through the environmental package (case). The handset environmental package integrity can be preserved when entering data via the induction coil 390 which is also used for the recharging of the internal batteries. The integrity of the environmental package can be maintained via the induction coil 390 through the case of the environmental package without any external metal contact. Externally Direct LEDs: These LEDs 396 are included to give the handset user external illumination. The LEDs 396 are in effect, a processor controlled-keypad controlled, flashlight with auto-off features. Earphone and Microphone Induction Coupled Coils 395: These internal case coils couple earphone and microphone function to a headset wherein the handset case is of the sealed, water tight variety. Digital Recorder 397: This device chip enables the processor to activate a fully functional digital recorder within the TSFD wireless handset 300. Processor interface gives the recorder access to call recording, external-to-the-case recording via the handset microphone or remote activation of recorder functions via another TSFD Protocol wireless device so coded for such action.

Vocoder 340
E-911 position locator 350
Transceiver 310
Keypad 362
Display 360
Power Manager 370
Roaming Transceiver 380
External Data Interface 390

Miscellaneous controls include ringer 366, LED 367 and vibrator 368, MP3 Dedicated Memory 399, Induction Coupled Mic and Earphone coil connections 395, external hookup for external mic and speaker 398, digital recorder module 397, Digital Camera "A" 385 and Digital Camera "B" 386. Permanent memory 326 is utilized for the processor bootstrap firmware and electronic serial number. Each TSFD wireless handset 300 contains a unique electronic serial number in permanent memory 326. The serial number permits a minimum of 1 billion unique serial numbers. Bootstrap software is also contained in permanent memory 326 to enable download of the operational software through the TSFD wireless handset external data port. The nonvolatile read/write memory 328 is used for storing initialization parameters and phone book data so that battery removal or replacement does not require re-initialization initialization. Each handset contains its phone number in non-volatile memory. The operational software is downloadable to change features or otherwise update the code. The operational software is stored in non-volatile memory 328. The operational software is downloadable using capabilities of the bootstrap software, the external data port 390, and external software. The TSFD wireless handset 300 is capable of maintaining user data in non-volatile memory 328, such as phone book entries. The TSFD wireless handset 300 includes a vocoder (voice coder/decoder) 340 for processing the digitized voice signals. The vocoder 340 compresses and channel code the digitized voice data in order to meet the voice quality requirement and to enable implementation of the RF and communication protocols. The TSFD wireless handset 300 includes a microphone/speaker interface 391 for interfacing a microphone 389 and speaker 392 to other handset components. The TSFD wireless handset 300 may accept an external microphone input signal and shall provide an external speaker output signal. The TSFD wireless handset 300 includes a power manager 370 to assist in extending battery life. The TSFD wireless handset 300 includes a rechargeable battery 393, but is also capable of connection to an external 11-16 Vdc power source through an external power interface 394. The TSFD wireless handset 300 includes a roaming transceiver 380 to serve as an optional secondary or alternate mode to the TSFD wireless communication system described. The roaming transceiver 380 implements one or more of the following standard wireless protocols:

PCS CDMA (IS-95)
PCS TDMA (IS-136)
GSM 1900
AMPS
Bluetooth
WiFi (optional)

The roaming transceiver 380 includes functions for an antenna, RF transceiver, protocol processing, and vocoder processing. The TSFD wireless handset 300 may also include a position locator 350 function to support the enhanced 911 (E911) requirements.

In an alternate embodiment of the present invention, the TSFD wireless handset 300 performs as a wireless hub/modem for WiFi, TSFD CCAP or CCAP+. This arrangement allows for a TSFD wireless handset 300 and a standard laptop to create a link to any data source or external network through the TSFD wireless handset 300 exclusively. In this alternate mode of operation, the TSFD wireless handset 300 acts as a master access point to any one of several networks for an ordinary laptop with a standard WiFi card.

In an alternate embodiment of the present invention, the TSFD wireless handset 300 (or any other TSFD wireless Mobile device) may perform standard PCS music and ringtone downloads from the TSFD network or from networks other than the TSFD network while operating within the roaming transceiver mode.

Further, another embodiment of the invention describes: the positioning of Digital Cameras "A" 385 and Digital Camera "B" 386 on the case/body of the TSFD wireless handset whereas camera 385 and camera 386 are forward-looking in the same direction, the same inclination and in the same side to side positioning such that a true stereoscopic image made be obtained through the capturing of both digital signals. The encoding of the separate signals shall be such that the signals can be sent to other TSFD wireless devices enabled to receive these stereoscopic images. The display of such images can be made through the attachment of a device for the stereoscopic display of video images; i.e., a virtual reality viewing headset for such purposes. The transmission and the receipt of these stereoscopic digital images shall be made through the TSFD Sub-Protocol IDDT (Integrated Direct Data Transfer) on the TSFD network exclusively. Single still or video captured images may be obtained from digital camera "A" 385 where there is no need to capture stereoscopic images. The transfer of such still or prerecorded digital images from camera "A" only, may be made on the standard TSFD voice bandwidth, or with the TSFD CCAP or CCAP+routines as defined in FIG. 8 or FIG. 9.

II. The TSFD Wireless Communication Docking Bays

Figure 15:
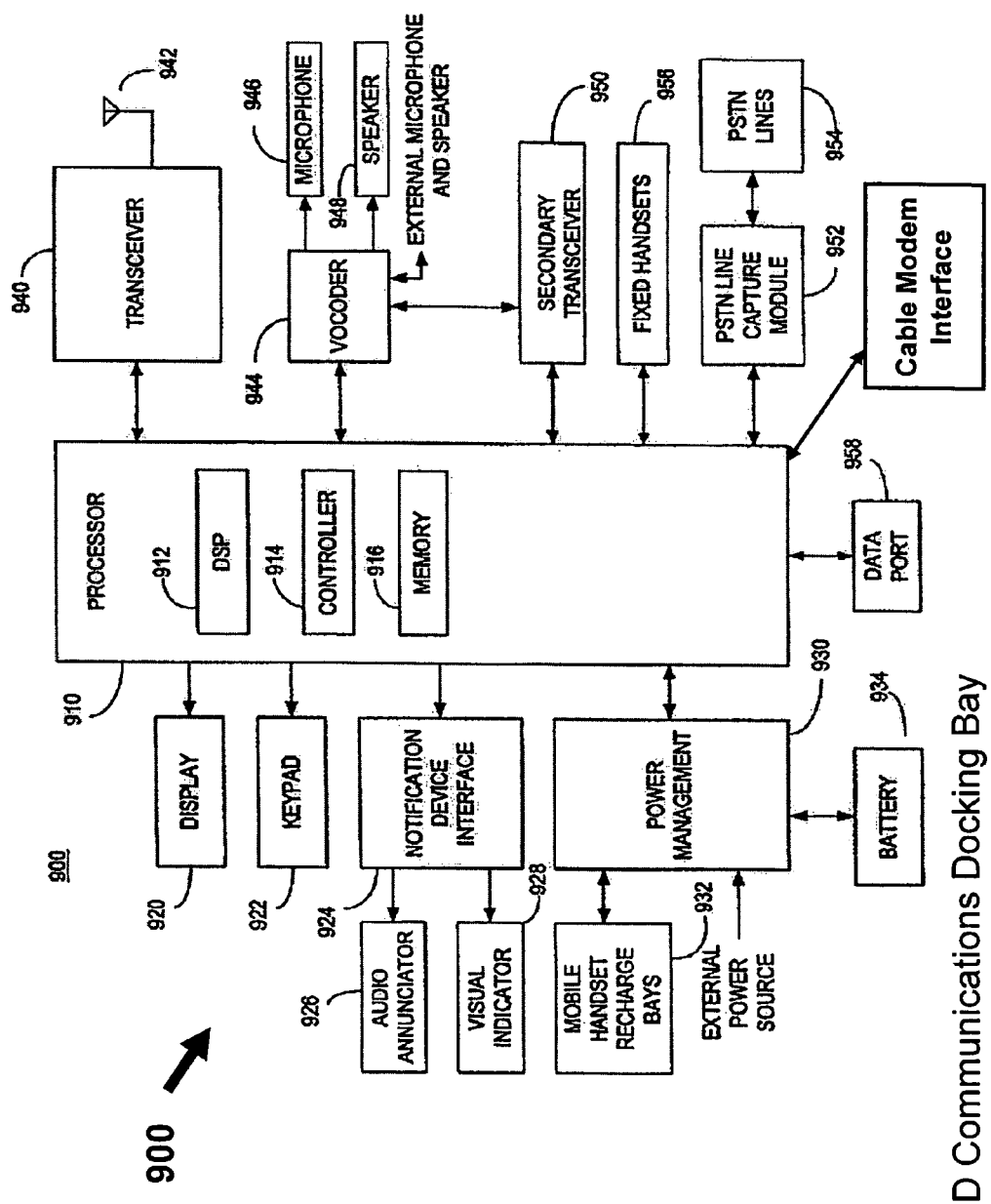
FIG. 15 shows a block diagram of a TSFD wireless ComDoc.

Turning now to FIG. 15, FIG. 15 shows a block diagram of an embodiment of a TSFD wireless Communication Docking Bay (TSFD wireless ComDoc) 900. The TSFD wireless ComDoc 900 includes all the features and functions of a TSFD wireless handset 300, as described above and shown in FIG. 14. The TSFD wireless ComDoc 900 includes a transceiver 940 and antenna 942. The transceiver 940 consists of two receivers, one transmitter, and two programmable frequency synthesizers. The antenna 942 may be integrated into the transceiver 940, or may be a modular type that plugs into the unit. The transceiver 940 transmit power is adjustable in 3 dB steps over a 50 dB range relative to the maximum transmit power. The gain of the transceiver antenna 942 is in the range of 0 to 2.5 dBi under controlled conditions. The transceiver 940 is capable of simultaneously receiving and demodulating two signals on independently programmed frequencies. The transceiver architecture includes an 80-MHz offset oscillator to facilitate switching between transmit and receive operations on a single channel pair without needing to re-program a frequency synthesizer. A processor 910 provides centralized control to the TSFD wireless ComDoc 900 and includes a digital signal processing (DSP) 912 for demodulating signals, a controller 914 for display/keypad servicing, and permanent, non-volatile and volatile memory 916. Firmware is embedded in the processor memory to implement protocols, control the user interfaces for the display, keypad, menus, etc., and control the application program interface (API) for the secondary mode protocol. The firmware includes a bootstrap loader that is stored in permanent memory 916 to enable download of the main code. The main code is stored in non-volatile memory 916 so that it is not lost in the absence of power, but can be overwritten by subsequent downloads, e.g., firmware updates. In addition to the main code, there also exist a number of configuration variables that are downloaded to activate the TSFD wireless ComDoc 900. These configuration variables set the user's phone number and services subscribed, and are also stored in non-volatile memory. The handset firmware also manages non-volatile user memory for storage of phone book names and numbers, received text messages, and the current operating mode selections (ringer volume/type, beep volume, etc.). The Processor 910 shall have peripheral interfaces to the following elements:

Vocoder 944
Transceiver 940
Keypad 920
Display 922
Power Manager 930
Secondary Transceiver 950
Notification Device Interface 924
Digital Camera "A" 985
Digital Camera "B" 986

Permanent memory 916 is utilized for the processor bootstrap firmware and electronic serial number. Each TSFD wireless ComDoc 900 contains a unique electronic serial number in permanent memory 916. The serial number permits a minimum of 1 billion unique serial numbers. Bootstrap software is also contained in permanent memory 916 to enable download of the operational software through an external data port 958. The nonvolatile read/write memory 916 is used for storing initialization parameters and phone book data so that battery removal or replacement does not require re-initialization. Each TSFD wireless ComDoc contains its phone number in non-volatile memory. The operational software is downloadable to change features or otherwise update the code. The operational software is stored in non-volatile memory 916. The operational software is downloadable using capabilities of the bootstrap software, an external data port, and external software. The TSFD wireless ComDoc is capable of maintaining user data in non-volatile memory 916, such as phone book entries. The TSFD wireless ComDoc includes a vocoder (voice coder/decoder) 944 for processing the digitized voice signals. The vocoder 944 compresses and channel code the digitized voice data in order to meet the voice quality requirement and to enable implementation of the RF and communication protocols. The TSFD wireless ComDoc 900 includes a microphone 946 and speaker 948. The TSFD wireless ComDoc 900 may accept an external microphone input signal and shall provide an external speaker output signal. The TSFD wireless ComDoc 900 includes a power manager 930 to assist in extending battery life. The TSFD wireless ComDoc 900 includes a rechargeable battery 934, but is also capable of connection to an external power source through an external power interface. The TSFD wireless ComDoc 900 includes an optional secondary transceiver 950 to serve as a secondary or alternate mode to the TSFD wireless communication system described. The secondary transceiver implements one or more of the following standard wireless protocols:

PCS CDMA (IS-95)
PCS TDMA (IS-136)
GSM 1900
AMPS
BLUETOOTH
WIFI

The secondary transceiver 950 includes functions for an antenna, RF transceiver, protocol processing, and vocoder processing. The TSFD wireless ComDoc 900 also includes provisions for a position locator function to support the enhanced 911 (E911) requirements if needed. The TSFD wireless ComDoc 900 includes a PSTN line capture module 952 for connection to one or more PSTN lines. This enables multiple telephone jacks to be provided on the TSFD wireless ComDoc 900 for connecting fixed telephone handsets 956 and computer modems to the PSTN lines 954. In addition to an audio annunciator 926 and a visual indicator 928, the TSFD wireless ComDoc 900 provides handset recharge bays 932.

Turning again to FIG. 16, FIG. 16 shows optional features that may be added to the TSFD wireless ComDoc 900 to expand its capability. Communication interfaces include an infrared data interface 960, a Bluetooth interface 968, a LAN/cable modem interface 970, a PSTN modem interface 980, and an external antenna interface 982 for the wireless communications network. User interfaces include an external keyboard interface 962, an external video monitor interface 964, and a video camera interface 966. Interfaces to locator equipment include an E-911 position locator interface 972 and a GPS position locator interface 974. Storage device interfaces include a hard drive interface 976 and a CD/DVD drive interface 978.

Figure 16:
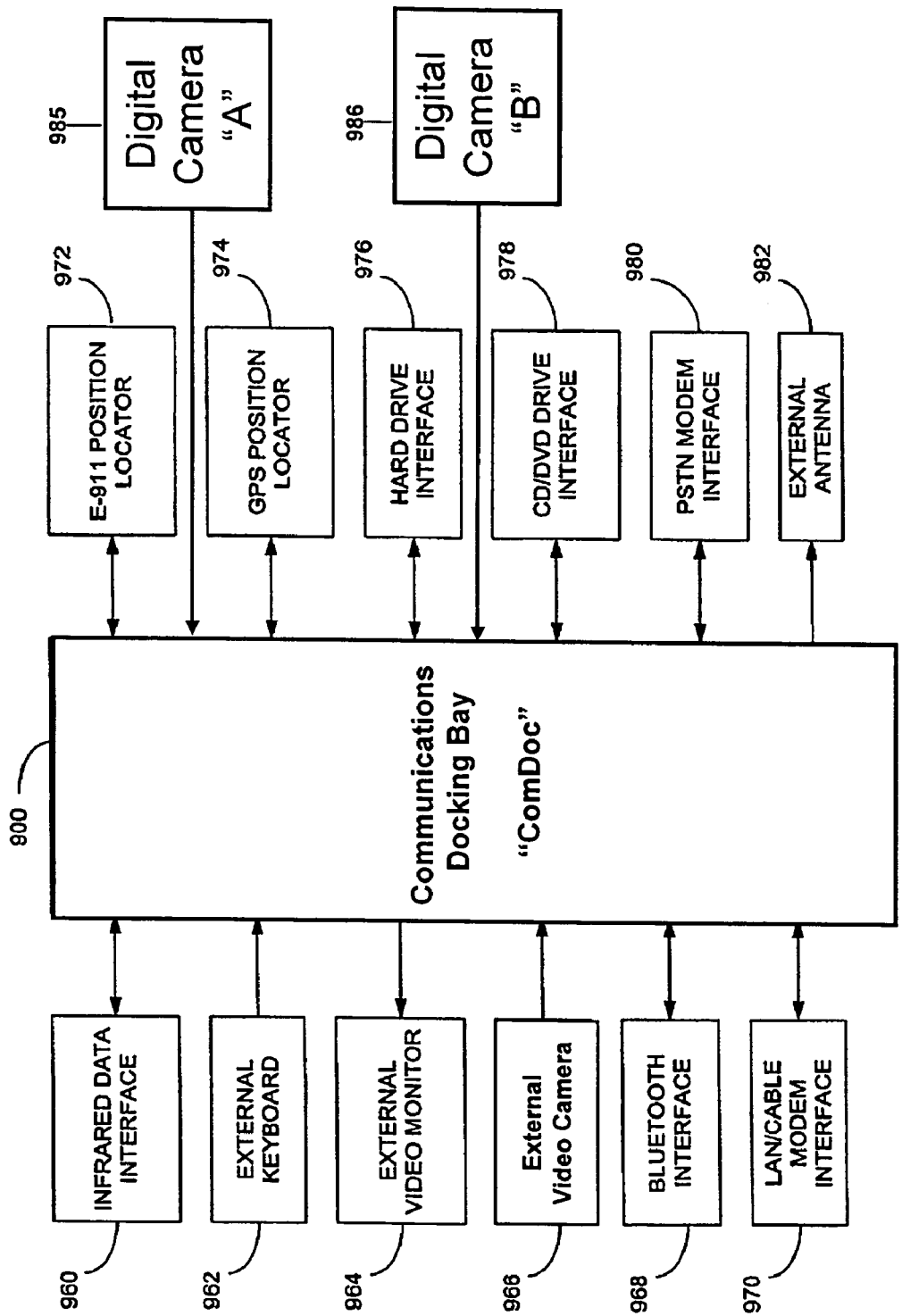
FIG. 16 shows optional features that may be added to the TSFD wireless ComDoc to expand its capability.
Figure 18:
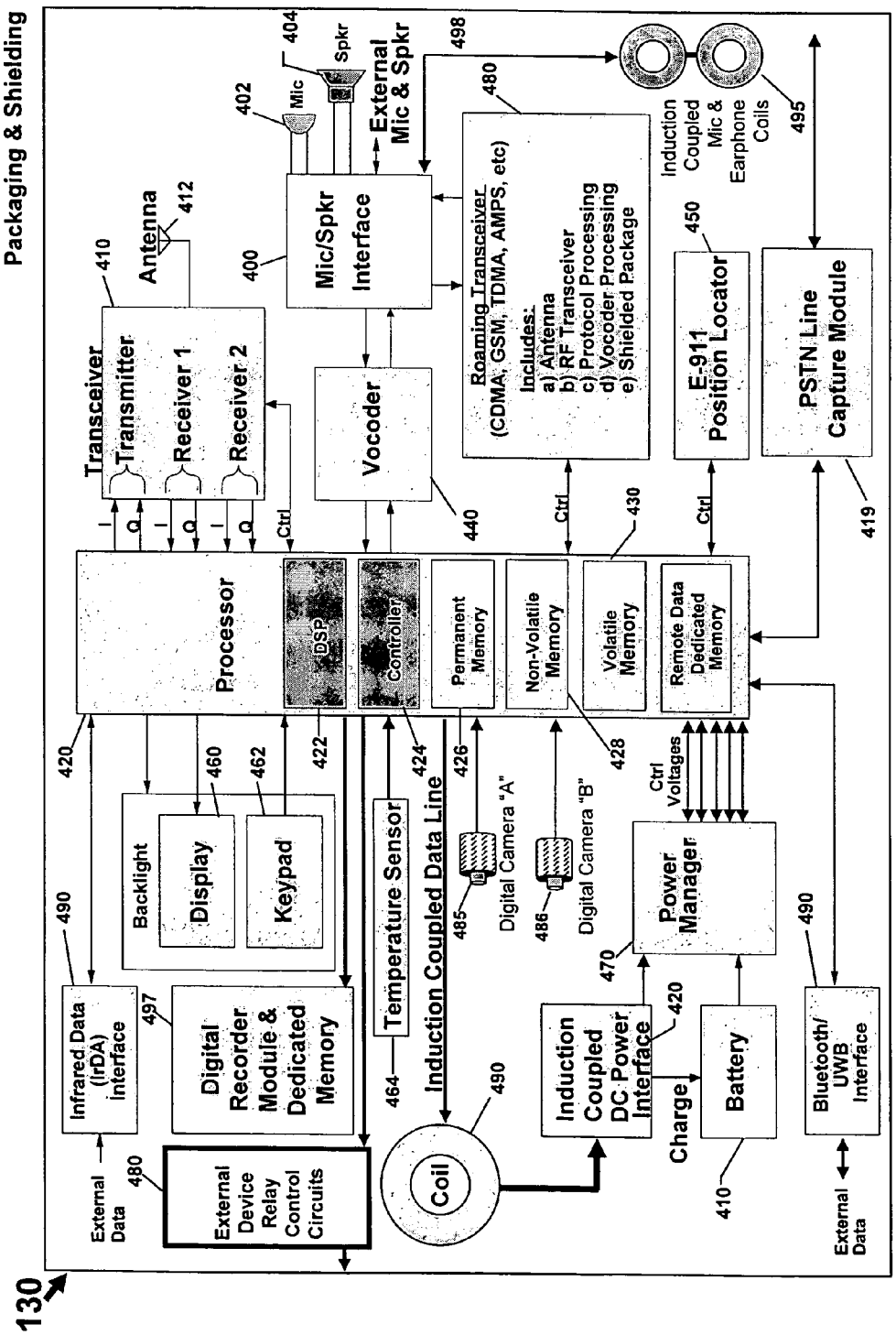
FIG. 18 shows a block diagram of a TSFD wireless X-DatCom.

Further disclosing embodiments of this invention, the TSFD wireless ComDoc 900 may have additional features similar to those in the TSFD wireless X-DatCom shown in FIG. 18 which are not shown in FIG. 15 or FIG. 16. For example, the TSFD wireless ComDoc 900 may include the connection of the power manager 930 to an external power source through an external power interface or through an inductive coupled recharge coil. The TSFD wireless ComDoc environmental package of integrity can be preserved when entering data via the induction coupling coil which is also used for the recharging of the internal batteries. The integrity of the environmental package can be maintained via the induction coil through the case of the environmental package without any external metal contact.

In an alternate embodiment of the present invention, the TSFD wireless ComDoc 900 can exercise an Operational Static State Control or an Operational Dynamic State Control. It can express the functionality of a "Convergence" as well as "Divergence" device, i.e., ON network or OFF network. It can act as a simple TSFD or a traditional PSC wireless device, allowing the user to make ordinary wireless calls on any of a multiple of networks; i.e., TSFD or PCS Style: (PCS, AMPS, TDMA, CDMA) determined by whatever contract the user may have with wireless carrier provider. The TSFD wireless ComDoc enables TSFD wireless network users to access a multiple of external networks; i.e., cable Internet, PSTN Landline, WiFi, LANs, other computers, etc. The device has an internal hard drive, a PCS antenna, external antenna interface as further illuminated in FIG. 15.

Operational Static State Control by a TSFD Wireless ComDoc:

1. A TSFD wireless device is used to command a TSFD wireless ComDoc 900 to exercise Static State Control of a PC Home Computer via the TSFD wireless ComDoc's peripheral interface connections.
2. A TSFD wireless device is used to command a TSFD wireless ComDoc 900 to exercise Static State Control of a cable modem for access by the TSFD wireless device to the Internet via the TSFD wireless ComDoc's peripheral interface connections.
3. A TSFD wireless device is used to command a TSFD wireless ComDoc 900 to exercise Static State Control of a PSTN/DSL modem for access by the TSFD wireless device to the Internet via the TSFD wireless ComDoc's peripheral interface connections.
4. A TSFD wireless device is used to command a TSFD wireless ComDoc 900 to exercise Static State Control of a LAN modem for access by the TSFD wireless device to the Internet via the TSFD wireless ComDoc's peripheral interface connections.
5. A TSFD wireless device is used to command a TSFD wireless ComDoc 900 to exercise Static State Control of an External Hard Drive for the retrieval of digital data via the TSFD wireless ComDoc's peripheral interface connections.
6. A TSFD wireless device is used to command a TSFD wireless ComDoc 900 to exercise Static State Control of a CD/DVD Drive for the retrieval of digital data via the TSFD wireless ComDoc's peripheral interface connections.
7. A TSFD wireless device is used to command a TSFD wireless ComDoc 900 to exercise Static State Control of an Infrared Data Sensor via the TSFD wireless ComDoc's peripheral interface connections.
8. A TSFD wireless device is used to command a TSFD wireless ComDoc 900 to exercise Static State Control of an External Video Camera via the TSFD wireless ComDoc's peripheral interface connections.
9. A PCS wireless device is used to command a TSFD wireless ComDoc 900 to exercise Static State Control of a PC Home Computer via the TSFD wireless ComDoc's peripheral interface connections.
10. A PCS wireless device is used to command a TSFD wireless ComDoc 900 to exercise Static State Control of a cable modem for access by the PCS wireless device to the Internet via the TSFD wireless ComDoc's peripheral interface connections.
11. A PCS wireless device is used to command a TSFD wireless ComDoc 900 to exercise Static State Control of a PSTN/DSL modem for access by the PCS wireless device to the Internet via the TSFD wireless ComDoc's peripheral interface connections.
12. A PCS wireless device is used to command a TSFD wireless ComDoc 900 to exercise Static State Control of a LAN modem for access by the PCS wireless device to the Internet via the TSFD wireless ComDoc's peripheral interface connections.
13. A PCS wireless device is used to command a TSFD wireless ComDoc 900 to exercise Static State Control of an External Hard Drive for the retrieval of digital data via the TSFD wireless ComDoc's peripheral interface connections.
14. A PCS wireless device is used to command a TSFD wireless ComDoc 900 to exercise Static State Control of a CD/DVD Drive for the retrieval of digital data via the TSFD wireless ComDoc's peripheral interface connections.
15. A PCS wireless device is used to command a TSFD wireless ComDoc 900 to exercise Static State Control of an Infrared Data Sensor via the TSFD wireless ComDoc's peripheral interface connections.
16. A PCS wireless device is used to command a TSFD wireless ComDoc 900 to exercise Static State Control of an External Video Camera via the TSFD wireless ComDoc's peripheral interface connections.

Operational Dynamic State Control by a TSFD Wireless ComDoc 900:

1. A TSFD wireless device is used to command a TSFD wireless ComDoc 900 to exercise Dynamic State Control of a PC Home Computer via the TSFD wireless ComDoc's peripheral interface connections.
2. A TSFD wireless device is used to command a TSFD wireless ComDoc 900 to exercise Dynamic State Control of a cable modem for access by the TSFD wireless device to the Internet via the TSFD wireless ComDoc's peripheral interface connections.
3. A TSFD wireless device is used to command a TSFD wireless ComDoc 900 to exercise Dynamic State Control of a PSTN/DSL modem for access by the TSFD wireless device to the Internet via the TSFD wireless ComDoc's peripheral interface connections.
4. A TSFD wireless device is used to command a TSFD wireless ComDoc 900 to exercise Dynamic State Control of a LAN modem for access by the TSFD wireless device to the Internet via the TSFD wireless ComDoc's peripheral interface connections.
5. A TSFD wireless device is used to command a TSFD wireless ComDoc 900 to exercise Dynamic State Control of an External Hard Drive for the retrieval of digital data via the TSFD wireless ComDoc's peripheral interface connections.
6. A TSFD wireless device is used to command a TSFD wireless ComDoc 900 to exercise Dynamic State Control of a CD/DVD Drive for the retrieval of digital data via the TSFD wireless ComDoc's peripheral interface connections.
7. A TSFD wireless device is used to command a TSFD wireless ComDoc 900 to exercise Dynamic State Control of an Infrared Data Sensor via the TSFD wireless ComDoc's peripheral interface connections.

8. A TSFD wireless device is used to command a TSFD wireless ComDoc 900 to exercise Dynamic State Control of an External Video Camera via the TSFD wireless ComDoc's peripheral interface connections.
9. A PCS, TDMA, CDMA, AMPS or GSM protocol wireless device is used to command a TSFD wireless ComDoc 900 to exercise Dynamic State Control of a PC Home Computer via the TSFD wireless ComDoc's peripheral interface connections.
10. A PCS, TDMA, CDMA, AMPS or GSM protocol wireless device is used to command a TSFD wireless ComDoc 900 to exercise Dynamic State Control of a cable modem for access by the PCS, TDMA, CDMA, AMPS or GSM protocol wireless device to the Internet via the TSFD wireless ComDoc's peripheral interface connections.
11. A PCS, TDMA, CDMA, AMPS or GSM protocol wireless device is used to command a TSFD wireless ComDoc 900 to exercise Dynamic State Control of a PSTN/DSL modem for access by the PCS, TDMA, CDMA, AMPS or GSM protocol wireless device to the Internet via the TSFD wireless ComDoc's peripheral interface connections.
12. A PCS, TDMA, CDMA, AMPS or GSM protocol wireless device is used to command a TSFD wireless ComDoc 900 to exercise Dynamic State Control of a LAN modem for access by the PCS, TDMA, CDMA, AMPS or GSM protocol wireless device to the Internet via the TSFD wireless ComDoc's peripheral interface connections.
13. A PCS, TDMA, CDMA, AMPS or GSM protocol wireless device is used to command a TSFD wireless ComDoc 900 to exercise Dynamic State Control of an External Hard Drive for the retrieval of digital data via the TSFD wireless ComDoc's peripheral interface connections.
14. A PCS, TDMA, CDMA, AMPS or GSM protocol wireless device is used to command a TSFD wireless ComDoc 900 to exercise Dynamic State Control of a CD/DVD Drive for the retrieval of digital data via the TSFD wireless ComDoc's peripheral interface connections.
15. A PCS, TDMA, CDMA, AMPS or GSM protocol wireless device is used to command a TSFD wireless ComDoc 900 to exercise Dynamic State Control of an Infrared Data Sensor via the TSFD wireless ComDoc's peripheral interface connections.
16. A PCS, TDMA, CDMA, AMPS or GSM protocol wireless device is used to command a TSFD wireless ComDoc 900 to exercise Dynamic State Control of an External Video Camera via the TSFD wireless ComDoc's peripheral interface connections.

Further, an additional embodiment of the invention describes: the positioning of Digital Cameras "A" 985 and Digital Camera "B" 986 on the case/body of the TSFD wireless TSFD wireless ComDoc 900 whereas; camera 485 and camera 986 are forward-looking in the same direction, the same inclination and in the same side to side positioning such that a true stereoscopic image made be obtained through the capturing of both digital signals. The encoding of the separate signals shall be such that the signals can be sent to other TSFD wireless devices enabled to receive these stereoscopic images. The display of such images can be made through the attachment of a device for the stereoscopic display of video images; i.e., a virtual reality viewing headset for such purposes. The transmission and the receipt of these stereoscopic digital images shall be made through the TSFD Sub-Protocol IDDT (Integrated Direct Data Transfer) on the TSFD network exclusively. Single still or video captured images may be obtained from digital camera "A" 985 where there is no need to capture stereoscopic images. The transfer of such still or prerecorded digital images from camera "A" only, may be made on the standard TSFD voice bandwidth, or with the TSFD CCAP or CCAP+ routines as defined in FIG. 8 or FIG. 9.

Turning now to FIG. 17, FIG. 17 shows examples of prefix codes that may be used to access TSFD wireless ComDoc functions. To access a function, one of the four-digit prefix codes presented in FIG. 17 must be entered prior to entering a TSFD wireless handset access number. The access codes are meant to be examples of means for accessing available functions in the TSFD wireless ComDoc through a TSFD wireless handset keyboard. The present TSFD wireless ComDoc invention is a unique external networks interface that may be deployed in a home or business as a fixed-base device. It is primarily composed of a fully functional TSFD wireless handset circuitry and numerous internal peripheral devices dedicated to providing multiple external interface paths for a wireless network. The device can stand alone as a fixed-base wireless set having its own wireless telephone number, can function as a handset-to-external networks relay system, can serve as a home-based high-speed access device to wireless broadband Internet service for home computers, and can serve as a remote access interface device for high-speed wireless broadband Internet service between handset-laptop computer combinations and home installed broadband Internet connection. It has several other unique capabilities such as serving as a home intercom system for extension phones, a speakerphone, security system wireless PSTN 19 connection in the event of PSTN 19 line failure, and interface with Bluetooth/IR devices in the home for wireless remote control of "Smart House" technology. A novel feature of the TSFD wireless ComDoc 900 is to be a backup communications path to the PSTN 19 for any wireless handset subscriber who also has permanent access to a PSTN 19 landline in their home or business within the greater wireless system service area. It is most effective however, within the range of a PSE 600 that is also within range of the business or home. By using a TSFD wireless ComDoc 900 connection to a PSTN 19, the calling load on the PNE 600 for access to the PSTN 19 could be greatly reduced thus saving the wireless system operator monthly line charges for maintaining switch access to the PSTN 19.

III. TSFD Wireless External Data Communications Modules

In alternate embodiment of the invention, an embodiment of the TSFD wireless X-DatCom 400 of the present invention, FIG. 18, is a Mobile TSFD external networks interface and may be deployed in a home or business as a fixed-base device. It may also be remotely placed for the collection of data through attached sensors or devices or the TSFD wireless X-DatCom 400 may be employed to remotely control the limited or total operational state of an external device attached to the TSFD wireless X-DatCom 400. It is primarily composed of a fully functional TSFD Protocol handset circuitry and numerous internal peripheral devices dedicated to providing multiple external interface paths for a wireless network or for the collection of data or the remote control of external devices. The device can stand alone as a fixed-base wireless set having its own wireless telephone number, can function as a handset-to-external networks relay system, can serve as a home-based high-speed access device to wireless broadband Internet service for home computers, and can serve as a remote access interface device for high-speed wireless broadband Internet service between handset-laptop computer combinations and home installed broadband Internet connection. It has several other capabilities such as serving as a speakerphone, security system wireless PSTN 19 connection in the event of PSTN 19 line failure, and interface with Bluetooth/IR devices in the home or office for wireless remote control of "Smart House" technology. A feature of the TSFD wireless X-DatCom 400 is to be a backup communications path to the PSTN19 for any wireless handset subscriber who also has permanent access to a PSTN landline in their home or business within the greater wireless system service area. It is most effective however, within the range of a PSE 600 that is also within range of the business or home. By using a TSFD wireless X-DatCom 400 connection to a PSTN, the vast quantities of data could be remotely collected, numerous and varied devices could be remotely controlled and access to otherwise inaccessible external networks could be achieved by TSFD Protocol devices associated with particular TSFD wireless X-DatCom 400 devices.

Turning now to FIG. 18, a block diagram 130 of a TSFD wireless X-DatCom 400 is shown. The TSFD wireless X-DatCom 400 includes all the features and functions of a TSFD wireless handset 300 as described in FIG. 14, and many of those found in a TSFD wireless TSFD wireless ComDoc 900 in FIG. 15. The TSFD wireless X-DatCom 400 includes a transceiver 410 and antenna 412. The transceiver 410 consists of two receivers, one transmitter, and two programmable frequency synthesizers. The antenna 412 may be integrated into the transceiver, or may be a modular type that plugs into the unit. The transceiver transmit power is adjustable in 3 dB steps over a 50 dB range relative to the maximum transmit power. The gain of the transceiver antenna 412 is in the range of 0 to 2.5 dBi under controlled conditions. The transceiver 410 is capable of simultaneously receiving and demodulating two signals on independently programmed frequencies. The transceiver architecture includes an 80-MHz offset oscillator to facilitate switching between transmit and receive operations on a single channel pair without needing to re-program a frequency synthesizer. A processor 420 provides centralized control to the TSFD wireless X-DatCom 400 and includes a digital signal processing (DSP) 422 for demodulating signals, a controller 424 for display/keypad servicing, and permanent, non-volatile and volatile memory 426. Firmware is embedded in the processor memory to implement protocols, control the user interfaces for the display, keypad, menus, etc., and control the application program interface (API) for the secondary mode protocol. The firmware includes a bootstrap loader that is stored in permanent memory 426 to enable download of the main code. The main code is stored in non-volatile memory 428 so that it is not lost in the absence of power, but can be overwritten by subsequent downloads, e.g., firmware updates. In addition to the main code, there also exist a number of configuration variables that are downloaded to activate the TSFD wireless X-DatCom 400. These configuration variables set the user's phone number and services subscribed, and are also stored in non-volatile memory. The TSFD wireless X-DatCom 400 firmware also manages non-volatile user memory for storage of phone book names and numbers. The Processor 420 shall have peripheral interfaces to the following elements:

Vocoder 440

Transceiver 410

Keypad 462

Display 460

Power Manager 470

Secondary Transceiver 480

Digital Camera "A" 485

Digital Camera "B" 485

Permanent memory 426 is utilized for the processor bootstrap firmware and electronic serial number. Each TSFD wireless X-DatCom 400 contains a unique electronic serial number in permanent memory 426. The serial number permits a minimum of 1 billion unique serial numbers. Bootstrap software is also contained in permanent memory 426 to enable download of the operational software through an external data port 490. The nonvolatile read/write memory 428 is used for storing initialization parameters and phone book data so that battery removal or replacement does not require re-initialization. Each TSFD wireless X-DatCom 400 contains its phone number in non-volatile memory. The operational software is downloadable to change features or otherwise update the code. The operational software is stored in non-volatile memory 428. The operational software is downloadable using capabilities of the bootstrap software, an external data port, and external software. The TSFD wireless X-DatCom 400 is capable of maintaining user data in non-volatile memory 428, such as phone book entries. The TSFD wireless X-DatCom 400 includes a vocoder (voice coder/decoder) 440 for processing the digitized voice signals. The vocoder 440 compresses and channel code the digitized voice data in order to meet the voice quality requirement and to enable implementation of the RF and communication protocols. The TSFD wireless X-DatCom 400 includes a microphone 402, speaker 4404, and an interface 408 for the microphone 402 and the speaker 404. The TSFD wireless X-DatCom 400 may accept an external microphone input signal and shall provide an external speaker output signal. The TSFD wireless X-DatCom 400 includes a power manager 470 to assist in extending battery life or facilitating input of fluctuating alternative power voltages. The TSFD wireless X-DatCom 400 includes a rechargeable battery 410, but is also capable of connection to an external power source through an external power interface or through the inductive coupled recharge coil 490 in its case. The TSFD wireless X-DatCom 400 includes an optional secondary transceiver 480 to serve as a secondary or alternate mode to the wireless communication system described. The secondary transceiver implements one or more of the following standard wireless protocols:

PCS CDMA (IS-95)

PCS TDMA (IS-136)

GSM 1400

AMPS

The secondary transceiver 480 includes functions for an antenna, RF transceiver, protocol processing, and vocoder processing. The TSFD wireless X-DatCom 400 also includes provisions for a position locator function to support the enhanced 911 (E911) requirements if needed. The TSFD wireless X-DatCom 400 includes a PSTN line capture module 452 for connection to one or more PSTN lines. This enables multiple telephone jacks to be provided on the TSFD wireless X-DatCom 400 for connecting fixed telephone handsets 456 and computer modems to the PSTN lines 454. The TSFD wireless X-DatCom 400 environmental package integrity can be preserved when entering data via the induction coil 490 which is also used for the recharging of the internal batteries. The integrity of the environmental package can be maintained via the induction coil 490 through the case of the environmental package without any external metal contact.

Static State Control of Optional Peripheral Systems via TSFD Wireless Devices:
1. A TSFD wireless device is used to command a TSFD wireless X-DatCom 400 to exercise Static State Control of a PC Computer via the TSFD wireless X-DatCom's optional peripheral interface connections.
2. A TSFD wireless device is used to command a TSFD wireless X-DatCom 400 to exercise Static State Control of a cable modem for access by the TSFD wireless device to the Internet via the TSFD wireless X-DatCom's optional peripheral interface connections.
3. A TSFD wireless device is used to command a TSFD wireless X-DatCom 400 to exercise Static State Control of a PSTN/DSL modem for access by the TSFD wireless device to the Internet via the TSFD wireless X-DatCom's optional peripheral interface connections.
4. A TSFD wireless device is used to command a TSFD wireless X-DatCom 400 to exercise Static State Control of a LAN modem for access by the TSFD wireless device to the Internet via the TSFD wireless X-DatCom's optional peripheral interface connections.
5. A TSFD wireless device is used to command a TSFD wireless X-DatCom 400 to exercise Static State Control of an External Hard Drive for the retrieval of digital data via the TSFD wireless X-DatCom's optional peripheral interface connections.
6. A TSFD wireless device is used to command a TSFD wireless X-DatCom 400 to exercise Static State Control of a CD/DVD Drive for the retrieval of digital data via the TSFD wireless X-DatCom's optional peripheral interface connections.
7. A TSFD wireless device is used to command a TSFD wireless X-DatCom 400 to exercise Static State Control of an Infrared Data Sensor via the TSFD wireless X-DatCom's optional peripheral interface connections.
8. A TSFD wireless device is used to command a TSFD wireless X-DatCom 400 to exercise Static State Control of an External Video Camera via the TSFD wireless X-DatCom's optional peripheral interface connections.
9. A PCS, TDMA, CDMA, AMPS or GSM protocol wireless device is used to command a TSFD wireless X-DatCom 400 to exercise Static State Control of a PC Computer via the TSFD wireless X-DatCom's optional peripheral interface connections.
10. A PCS, TDMA, CDMA, AMPS or GSM protocol wireless device is used to command a TSFD wireless X-DatCom 400 to exercise Static State Control of a cable modem for access by the PCS wireless device to the Internet via the TSFD wireless X-DatCom's optional peripheral interface connections.
11. A PCS, TDMA, CDMA, AMPS or GSM protocol wireless device is used to command a TSFD wireless X-DatCom 400 to exercise Static State Control of a PSTN/DSL modem for access by the PCS wireless device to the Internet via the X-DatCom's optional peripheral interface connections.
12. A PCS, TDMA, CDMA, AMPS or GSM protocol wireless device is used to command a TSFD wireless X-DatCom 400 to exercise Static State Control 400 of a LAN modem for access by the PCS wireless device to the Internet via the TSFD wireless X-DatCom's optional peripheral interface connections.
13. A PCS, TDMA, CDMA, AMPS or GSM protocol wireless device is used to command a TSFD wireless X-DatCom 400 to exercise Static State Control of an External Hard Drive for the retrieval of digital data via the TSFD wireless X-DatCom's optional peripheral interface connections.
14. A PCS, TDMA, CDMA, AMPS or GSM protocol wireless device is used to command a TSFD wireless X-DatCom 400 to exercise Static State Control of a CD/DVD Drive for the retrieval of digital data via the TSFD wireless X-DatCom's optional peripheral interface connections.
15. A PCS, TDMA, CDMA, AMPS or GSM protocol wireless device is used to command a TSFD wireless X-DatCom 400 to exercise Static State Control of an Infrared Data Sensor via the TSFD wireless X-DatCom's optional peripheral interface connections.
16. A PCS, TDMA, CDMA, AMPS or GSM protocol wireless device is used to command a TSFD wireless X-DatCom 400 to exercise Static State Control of an External Video Camera via the TSFD wireless X-DatCom's optional peripheral interface connections.

Dynamic State Control of Optional Peripheral Systems via Wireless Devices
1. A TSFD wireless device is used to command a TSFD wireless X-DatCom 400 to exercise Dynamic State Control of a PC Home Computer via the TSFD wireless X-DatCom's optional peripheral interface connections.
2. A TSFD wireless device is used to command a TSFD wireless X-DatCom 400 to exercise Dynamic State Control of a cable modem for access by the TSFD wireless device to the Internet via the TSFD wireless X-DatCom's optional peripheral interface connections.
3. A TSFD wireless device is used to command a TSFD wireless X-DatCom 400 to exercise Dynamic State Control of a PSTN/DSL modem for access by the TSFD wireless device to the Internet via the TSFD wireless X-DatCom's optional peripheral interface connections.
4. A TSFD wireless device is used to command a TSFD wireless X-DatCom 400 to exercise Dynamic State Control of a LAN modem for access by the TSFD wireless device to the Internet via the TSFD wireless X-DatCom's optional peripheral interface connections.
5. A TSFD wireless device is used to command a TSFD wireless X-DatCom 400 to exercise Dynamic State Control of an External Hard Drive for the retrieval of digital data via the TSFD wireless X-DatCom's optional peripheral interface connections.
6. A TSFD wireless device is used to command a TSFD wireless X-DatCom 400 to exercise Dynamic State Control of a CD/DVD Drive for the retrieval of digital data via the TSFD wireless X-DatCom's optional peripheral interface connections.
7. A TSFD wireless device is used to command a TSFD wireless X-DatCom 400 to exercise Dynamic State Control of an Infrared Data Sensor via the TSFD wireless X-DatCom's optional peripheral interface connections.
8. A TSFD wireless device is used to command a TSFD wireless X-DatCom 400 to exercise Dynamic State Control of an External Video Camera via the TSFD wireless X-DatCom's optional peripheral interface connections.
9. A PCS, TDMA, CDMA, AMPS or GSM protocol wireless device is used to command a TSFD wireless X-DatCom 400 to exercise Dynamic State Control of a PC Home Computer via the TSFD wireless X-DatCom's optional peripheral interface connections.
10. A PCS, TDMA, CDMA, AMPS or GSM protocol wireless device is used to command a TSFD wireless X-DatCom 400 to exercise Dynamic State Control of a cable modem for access by the PCS, TDMA, CDMA, AMPS or GSM protocol wireless device to the Internet via the TSFD wireless X-DatCom's optional peripheral interface connections.

11. A PCS, TDMA, CDMA, AMPS or GSM protocol wireless device is used to command a TSFD wireless X-DatCom 400 to exercise Dynamic State Control of a PSTN/DSL modem for access by the Internal TSFD wireless X-DatCom Software is used to command a TSFD wireless X-DatCom 400 to exercise Static State Control of a cable modem for access by a TSFD wireless device to the Internet via the TSFD wireless X-DatCom's optional peripheral interface connections.

12. Internal TSFD wireless X-DatCom Software is used to command a TSFD wireless X-DatCom 400 to exercise Static State Control of a PSTN/DSL modem for access by a TSFD wireless device to the Internet via the TSFD wireless X-DatCom's optional peripheral interface connections.

13. Internal TSFD wireless X-DatCom Software is used to command a TSFD wireless X-DatCom 400 to exercise Static State Control of a LAN modem for access by a TSFD wireless device to the Internet via the TSFD wireless X-DatCom's optional peripheral interface connections.

14. Internal TSFD wireless X-DatCom Software is used to command a TSFD wireless X-DatCom 400 to exercise Static State Control of a cable modem for access by a TSFD wireless device to the Internet via the TSFD wireless X-DatCom's optional peripheral interface connections.

15. Internal TSFD wireless X-DatCom Software is used to command a TSFD wireless X-DatCom 400 to exercise Static State Control of a PSTN/DSL modem for access by a TSFD wireless device to the Internet via the TSFD wireless X-DatCom's optional peripheral interface connections.

16. Internal TSFD wireless X-DatCom Software is used to command a TSFD wireless X-DatCom 400 to exercise Static State Control of a LAN modem for access by a TSFD wireless device to the Internet via the TSFD wireless X-DatCom's optional peripheral interface connections.

17. Internal TSFD wireless X-DatCom Software is used to command a TSFD wireless X-DatCom 400 to gain access to the Internet via the TSFD wireless X-DatCom's optional peripheral interface connections.

18. A PCS, TDMA, CDMA, AMPS or GSM protocol wireless device is used to command a TSFD wireless X-DatCom 400 to exercise Dynamic State Control of a LAN modem for access by the PCS, TDMA, CDMA, AMPS or GSM protocol wireless device to the Internet via the TSFD wireless X-DatCom's optional peripheral interface connections.

19. A PCS, TDMA, CDMA, AMPS or GSM protocol wireless device is used to command a TSFD wireless X-DatCom 400 to exercise Dynamic State Control of an External Hard Drive for the retrieval of digital data via the TSFD wireless X-DatCom's optional peripheral interface connections.

20. A PCS, TDMA, CDMA, AMPS or GSM protocol wireless device is used to command a TSFD wireless X-DatCom 400 to exercise Dynamic State Control of a CD/DVD Drive for the retrieval of digital data via the TSFD wireless X-DatCom's optional peripheral interface connections.

21. A PCS, TDMA, CDMA, AMPS or GSM protocol wireless device is used to command a TSFD wireless X-DatCom 400 to exercise Dynamic State Control of an Infrared Data Sensor via the TSFD wireless X-DatCom's optional peripheral interface connections.

22. A PCS, TDMA, CDMA, AMPS or GSM protocol wireless device is used to command a TSFD wireless X-DatCom 400 to exercise Dynamic State Control of an External Video Camera via the TSFD wireless X-DatCom's optional peripheral interface connections.

Static State Control of Optional Peripheral Systems via the Parallel Computing Artificial Intelligence-Based Distributive Routing System (AIRDS) 1300

1. The Parallel Computing Artificial Intelligence-based Distributive Routing System 1300 is used to command a TSFD wireless X-DatCom 400 to exercise Static State Control of a PC Computer via the TSFD wireless X-DatCom's optional peripheral interface connections.

2. The Parallel Computing Artificial Intelligence-based Distributive Routing System 1300 is used to command a TSFD wireless X-DatCom 400 to exercise Static State Control of a cable modem for access by the Parallel Computing Artificial Intelligence-based Distributive Routing System 1300 to the Internet via the TSFD wireless X-DatCom's optional peripheral interface connections.

3. The Parallel Computing Artificial Intelligence-based Distributive Routing System 1300 is used to command a TSFD wireless X-DatCom 400 to exercise Static State Control of a PSTN/DSL modem for access by the Parallel Computing Artificial Intelligence-based Distributive Routing System 1300 to the Internet via the TSFD wireless X-DatCom's optional peripheral interface connection.

4. The Parallel Computing Artificial Intelligence-based Distributive Routing System 1300 is used to command a TSFD wireless X-DatCom 400 to exercise Static State Control of a LAN modem for access by the Parallel Computing Artificial Intelligence-based Distributive Routing System 1300 to the Internet via the TSFD wireless X-DatCom's optional peripheral interface connections.

5. The Parallel Computing Artificial Intelligence-based Distributive Routing System 1300 is used to command a TSFD wireless X-DatCom 400 to exercise Static State Control of an External Hard Drive for the retrieval of digital data via the TSFD wireless X-DatCom's optional peripheral interface connections.

6. The Parallel Computing Artificial Intelligence-based Distributive Routing System 1300 is used to command a TSFD wireless X-DatCom 400 to exercise Static State Control of a CD/DVD Drive for the retrieval of digital data via the TSFD wireless X-DatCom's optional peripheral interface connections.

7. The Parallel Computing Artificial Intelligence-based Distributive Routing System 1300 is used to command a TSFD wireless X-DatCom 400 to exercise Static State Control of an Infrared Data Sensor via the TSFD wireless X-DatCom's optional peripheral interface connections.

8. The Parallel Computing Artificial Intelligence-based Distributive Routing System 1300 is used to command a TSFD wireless X-DatCom 400 to exercise Static State Control of an External Video Camera via the TSFD wireless X-DatCom's optional peripheral interface connections.

Dynamic State Control of Optional Peripheral Systems via the Parallel Computing Artificial Intelligence-Based Distributive Routing System 1300

1. The Parallel Computing Artificial Intelligence-based Distributive Routing System 1300 is used to command a TSFD wireless X-DatCom 400 to exercise Dynamic State Control of a PC Computer via the TSFD wireless X-DatCom's optional peripheral interface connections.
2. The Parallel Computing Artificial Intelligence-based Distributive Routing System 1300 is used to command a TSFD wireless X-DatCom 400 to exercise Dynamic State Control of a cable modem for access by the Parallel Computing Artificial Intelligence-based Distributive Routing System 1300 to the Internet via the TSFD wireless X-DatCom's optional peripheral interface connections.
3. The Parallel Computing Artificial Intelligence-based Distributive Routing System 1300 is used to command a TSFD wireless X-DatCom 400 to exercise Dynamic State Control of a PSTN/DSL modem for access by the Parallel Computing Artificial Intelligence-based Distributive Routing System 1300 to the Internet via the TSFD wireless X-DatCom's optional peripheral interface connections.
4. The Parallel Computing Artificial Intelligence-based Distributive Routing System 1300 is used to command a TSFD wireless X-DatCom 400 to exercise Dynamic State Control of a LAN modem for access by the Parallel Computing Artificial Intelligence-based Distributive Routing System 1300 to the Internet via the TSFD wireless X-DatCom's optional peripheral interface connections.
5. The Parallel Computing Artificial Intelligence-based Distributive Routing System 1300 is used to command a TSFD wireless X-DatCom 400 to exercise Dynamic State Control of an External Hard Drive for the retrieval of digital data via the TSFD wireless X-DatCom's optional peripheral interface connections.
6. The Parallel Computing Artificial Intelligence-based Distributive Routing System 1300 is used to command a TSFD wireless X-DatCom 400 to exercise Dynamic State Control of a CD/DVD Drive for the retrieval of digital data via the TSFD wireless X-DatCom's optional peripheral interface connections.
7. The Parallel Computing Artificial Intelligence-based Distributive Routing System 1300 is used to command a TSFD wireless X-DatCom 400 to exercise Dynamic State Control of an Infrared Data Sensor via the TSFD wireless X-DatCom's optional peripheral interface connections.
8. The Parallel Computing Artificial Intelligence-based Distributive Routing System 1300 is used to command a TSFD wireless X-DatCom 400 to exercise Dynamic State Control of an External Video Camera via the TSFD wireless X-DatCom's optional peripheral interface connections.

Static State Control of Optional Peripheral Systems via Internal TSFD Wireless X-DatCom Software:

1. Internal TSFD wireless X-DatCom Software is used to command a TSFD wireless X-DatCom 400 to exercise Static State Control of a PC Computer via the TSFD wireless X-DatCom's optional peripheral interface connections.
2. Internal TSFD wireless X-DatCom Software is used to command a TSFD wireless X-DatCom 400 to exercise Static State Control of a cable modem for access by a TSFD wireless device to the Internet via the TSFD wireless X-DatCom's optional peripheral interface connections.
3. Internal TSFD wireless X-DatCom Software is used to command a TSFD wireless X-DatCom 400 to exercise Static State Control of a PSTN/DSL modem for access by a TSFD wireless device to the Internet via the TSFD wireless X-DatCom's optional peripheral interface connections.
4. Internal TSFD wireless X-DatCom Software is used to command a TSFD wireless X-DatCom 400 to exercise Static State Control of a LAN modem for access by a TSFD wireless device to the Internet via the TSFD wireless X-DatCom's optional peripheral interface connections.
5. Internal TSFD wireless X-DatCom Software is used to command a TSFD wireless X-DatCom 400 to exercise Static State Control of a cable modem for access by a TSFD wireless device to the Internet via the TSFD wireless X-DatCom's optional peripheral interface connections.
6. Internal TSFD wireless X-DatCom Software is used to command a TSFD wireless X-DatCom 400 to exercise Static State Control of a PSTN/DSL modem for access by a TSFD wireless device to the Internet via the TSFD wireless X-DatCom's optional peripheral interface connections.
7. Internal TSFD wireless X-DatCom Software is used to command a TSFD wireless X-DatCom 400 to exercise Static State Control of a LAN modem for access by a TSFD wireless device to the Internet via the TSFD wireless X-DatCom's optional peripheral interface connections.
8. Internal TSFD wireless X-DatCom Software is used to command a TSFD wireless X-DatCom 400 to exercise Static State Control of a cable modem for access by a PCS, TDMA, CDMA, AMPS or GSM protocol wireless device to the Internet via the TSFD wireless X-DatCom's optional peripheral interface connections.
9. Internal TSFD wireless X-DatCom Software is used to command a TSFD wireless X-DatCom to exercise Static State Control of a PSTN/DSL modem for access by a PCS, TDMA, CDMA, AMPS or GSM protocol wireless device to the Internet via the TSFD wireless X-DatCom's optional peripheral interface connections.
10. Internal TSFD wireless X-DatCom Software is used to command a TSFD wireless X-DatCom 400 to exercise Static State Control of a LAN modem for access by a PCS, TDMA, CDMA, AMPS or GSM protocol wireless device to the Internet via the TSFD wireless X-DatCom's optional peripheral interface connections.
11. Internal TSFD wireless X-DatCom Software is used to command a TSFD wireless X-DatCom 400 to exercise Static State Control of a cable modem for access by a PCS, TDMA, CDMA, AMPS or GSM protocol wireless device to the Internet via the TSFD wireless X-DatCom's optional peripheral interface connections.
12. Internal TSFD wireless X-DatCom Software is used to command a TSFD wireless X-DatCom 400 to exercise Static State Control of a PSTN/DSL modem for access by a PCS, TDMA, CDMA, AMPS or GSM protocol wireless device to the Internet via the TSFD wireless X-DatCom's optional peripheral interface connections.
13. Internal TSFD wireless X-DatCom Software is used to command a TSFD wireless X-DatCom 400 to exercise Static State Control of a LAN modem for access by a PCS, TDMA, CDMA, AMPS or GSM protocol wireless device to the Internet via the TSFD wireless X-DatCom's optional peripheral interface connections.

14. Internal TSFD wireless X-DatCom Software is used to command a TSFD wireless X-DatCom 400 to exercise Static State Control of an External Hard Drive for the retrieval of digital data via the TSFD wireless X-DatCom's optional peripheral interface connections.

15. Internal TSFD wireless X-DatCom Software is used to command a TSFD wireless X-DatCom 400 to exercise Static State Control of a CD/DVD Drive for the retrieval of digital data via the TSFD wireless X-DatCom's optional peripheral interface connections.

16. Internal TSFD wireless X-DatCom Software is used to command a TSFD wireless X-DatCom 400 to exercise Static State Control of an Infrared Data Sensor via the TSFD wireless X-DatCom's optional peripheral interface connections.

17. Internal TSFD wireless X-DatCom Software is used to command a TSFD wireless X-DatCom 400 to exercise Static State Control of an External Video Camera via the TSFD wireless X-DatCom's optional peripheral interface connections.

Dynamic State Control of Optional Peripheral Systems via Internal TSFD Wireless X-DatCom Software 1. Internal TSFD wireless X-DatCom Software is used to command a TSFD wireless X-DatCom 400 to exercise Dynamic State Control of a PC Computer via the TSFD wireless X-DatCom's optional peripheral interface connections.

2. Internal TSFD wireless X-DatCom Software is used to command a TSFD wireless X-DatCom 400 to exercise Dynamic State Control of a cable modem for access by a TSFD wireless device to the Internet via the TSFD wireless X-DatCom's optional peripheral interface connections.

3. Internal TSFD wireless X-DatCom Software is used to command a TSFD wireless X-DatCom 400 to exercise Dynamic State Control of a PSTN/DSL modem for access by a TSFD wireless device to the Internet via the TSFD wireless X-DatCom's optional peripheral interface connections.

4. Internal TSFD wireless X-DatCom Software is used to command a TSFD wireless X-DatCom 400 to exercise Dynamic State Control of a LAN modem for access by a TSFD wireless device to the Internet via the TSFD wireless X-DatCom's optional peripheral interface connections.

5. Internal TSFD wireless X-DatCom Software is used to command a TSFD wireless X-DatCom 400 to exercise Dynamic State Control of a cable modem for access by a TSFD wireless device to the Internet via the TSFD wireless X-DatCom's optional peripheral interface connections.

6. Internal TSFD wireless X-DatCom Software is used to command a TSFD wireless X-DatCom 400 to exercise Dynamic State Control of a PSTN/DSL modem for access by a TSFD wireless device to the Internet via the TSFD wireless X-DatCom's optional peripheral interface connections.

7. Internal TSFD wireless X-DatCom Software is used to command a TSFD wireless X-DatCom 400 to exercise Dynamic State Control of a LAN modem for access by a TSFD wireless device to the Internet via the TSFD wireless X-DatCom's optional peripheral interface connections.

8. Internal TSFD wireless X-DatCom Software is used to command a TSFD wireless X-DatCom 400 to exercise Dynamic State Control of a cable modem for access by a PCS, TDMA, CDMA, AMPS or GSM protocol wireless device to the Internet via the TSFD wireless X-DatCom's optional peripheral interface connections.

9. Internal TSFD wireless X-DatCom Software is used to command a TSFD wireless X-DatCom 400 to exercise Dynamic State Control of a PSTN/DSL modem for access by a PCS, TDMA, CDMA, AMPS or GSM protocol wireless device to the Internet via the TSFD wireless X-DatCom's optional peripheral interface connections.

10. Internal TSFD wireless X-DatCom Software is used to command a TSFD wireless X-DatCom 400 to exercise Dynamic State Control of a LAN modem for access by a PCS, TDMA, CDMA, AMPS or GSM protocol wireless device to the Internet via the TSFD wireless X-DatCom's optional peripheral interface connections.

11. Internal TSFD wireless X-DatCom Software is used to command a TSFD wireless X-DatCom 400 to exercise Dynamic State Control of a cable modem for access by a PCS, TDMA, CDMA, AMPS or GSM protocol wireless device to the Internet via the TSFD wireless X-DatCom's optional peripheral interface connections.

12. Internal TSFD wireless X-DatCom Software is used to command a TSFD wireless X-DatCom 400 to exercise Dynamic State Control of a PSTN/DSL modem for access by a PCS, TDMA, CDMA, AMPS or GSM protocol wireless device to the Internet via the TSFD wireless X-DatCom's optional peripheral interface connections.

13. Internal TSFD wireless X-DatCom Software is used to command a TSFD wireless X-DatCom 400 to exercise Dynamic State Control of a LAN modem for access by a PCS, TDMA, CDMA, AMPS or GSM protocol wireless device to the Internet via the TSFD wireless X-DatCom's optional peripheral interface connections.

14. Internal TSFD wireless X-DatCom Software is used to command a TSFD wireless X-DatCom 400 to exercise Dynamic State Control of an External Hard Drive for the retrieval of digital data via the TSFD wireless X-DatCom's optional peripheral interface connections.

15. Internal TSFD wireless X-DatCom Software is used to command a TSFD wireless X-DatCom 400 to exercise Dynamic State Control of a CD/DVD Drive for the retrieval of digital data via the TSFD wireless X-DatCom's optional peripheral interface connections.

16. Internal TSFD wireless X-DatCom Software is used to command a TSFD wireless X-DatCom 400 to exercise Dynamic State Control of an Infrared Data Sensor via the TSFD wireless X-DatCom's optional peripheral interface connections.

Internal TSFD wireless X-DatCom Software is used to command a TSFD wireless X-DatCom 400 to exercise Dynamic State Control of an External Video Camera via the TSFD wireless X-DatCom's optional peripheral interface connections. In an alternate embodiment of the present invention, Remote Controlled Systems is defined as devices or systems attached to a TSFD wireless X-DatCom 400 for the purposes of changing the Operational States (Static or Dynamic) or for the purposes of sending to or retrieving data from such attached devices. One can turn a device on or off or one can send or receive data (or both) using a TSFD wireless X-DatCom 400 through one or more external networks or by the activation of internal TSFD wireless X-DatCom 400 software. Internal Software can gather information and periodically report that information over any of a number of external networks. Internal Software can input information into some attached device periodically; i.e.; from stored instructions in the TSFD wireless X-DatCom 400 or from data received from some such device which then triggers the TSFD wireless X-DatCom 400 to respond automatically. Example: Natural Gas Well Monitoring—The TSFD wireless X-DatCom 400 can monitor the gas well for pressure changes and flow rates via well sensors attached to the TSFD wireless X-DatCom 400 and the TSFD wireless X-DatCom 400 can then make such changes to the flow rate from the well as pressure reading dictate; up or down via electronically controlled actuators. (Reporting: can take place to some external network should this process need further attention)

External Activation of the TSFD wireless X-DatCom 400 can be achieved via any number of selected external networks for the purpose of sending remote control commands to some attached device. (Reporting back to that network device can then give feedback as to the effectiveness of the command.)

External Activation of the TSFD wireless X-DatCom 400 can be achieved via any number of selected external networks for the purpose of retrieving data accumulated from some device attached to the TSFD wireless X-DatCom 400.

Further, the TSFD wireless X-DatCom 400 may contain sensors for the monitoring of the immediate surroundings of the TSFD wireless X-DatCom 400 device; i.e; dropping a TSFD wireless X-DatCom 400 device into a forest wherein the device is designed to snag on the branches of a tree and provide an "Above the Ground" monitoring of the area for forest ambient moisture, temperature, barometric pressure, or visual data acquisition via a digital camera. Reporting would be in data bursts thus conserving a lithium battery and providing extreme extended service.

The TSFD wireless X-DatCom 400 can be attached to and control or monitor: (not a complete list and disclosing these examples does not limit future)

Well Head Sensors and Actuators
Advertising Sign Lighting
Fire Sensors and sprinkler remote controls
Small Remote Weather Stations
In-Cab Trucker Notification Systems
In-Cab Taxi Notification Systems
Remote/Rural Railroad Crossing Signals
Soft Drink Machine Reporting Contents
Vending machines reporting till and contents
In-vehicle tracking and wireless reporting
In-vehicle remote shutdown system-antitheft
Large animal tracking-electronic tagging
Remote control of wild animal feeders
Wireless Heart Monitor/blood pressure monitor
Wireless heart defibrillator and reporting system
Large Cargo Container tracking and reporting
Remote control of lighted signage and reporting
Traffic sensors-reporting by audio and visual
Electric gate control and reporting by audio and visual
In-car driver notification system and reporting
In-classroom monitoring by audio and visual
Security system wireless interface and reporting device
Agricultural Conditions monitor: moisture, temp, barometric pressure
Hurricane/Tornado Data sensors dropped into a hurricane/tornado to radio back info Further, an additional embodiment of the invention describes: the positioning of Digital Cameras "A" 485 and Digital Camera "B" 486 on the case/body of the TSFD wireless X-DatCom 400 whereas; camera 485 and camera 486 are forward-looking in the same direction, the same inclination and in the same side to side positioning such that a true stereoscopic image made be obtained through the capturing of both digital signals. The encoding of the separate signals shall be such that the signals can be sent to other TSFD wireless devices enabled to receive these stereoscopic images. The display of such images can be made through the attachment of a device for the stereoscopic display of video images; ie.e, a virtual reality viewing headset for such purposes. The transmission and the receipt of these stereoscopic digital images shall be made through the TSFD Sub-Protocol IDDT (Integrated Direct Data Transfer) on the TSFD network exclusively. Single still or video captured images may be obtained from digital camera "A" 485 where there is no need to capture stereoscopic images. The transfer of such still or prerecorded digital images from camera "A" only, may be made on the standard TSFD voice bandwidth, or with the TSFD CCAP or CCAP+ routines as defined in FIG. 8 or FIG. 9.

IV. Personal Computer TSFD Multi-Mode Wireless Access Cards

Figure 19:
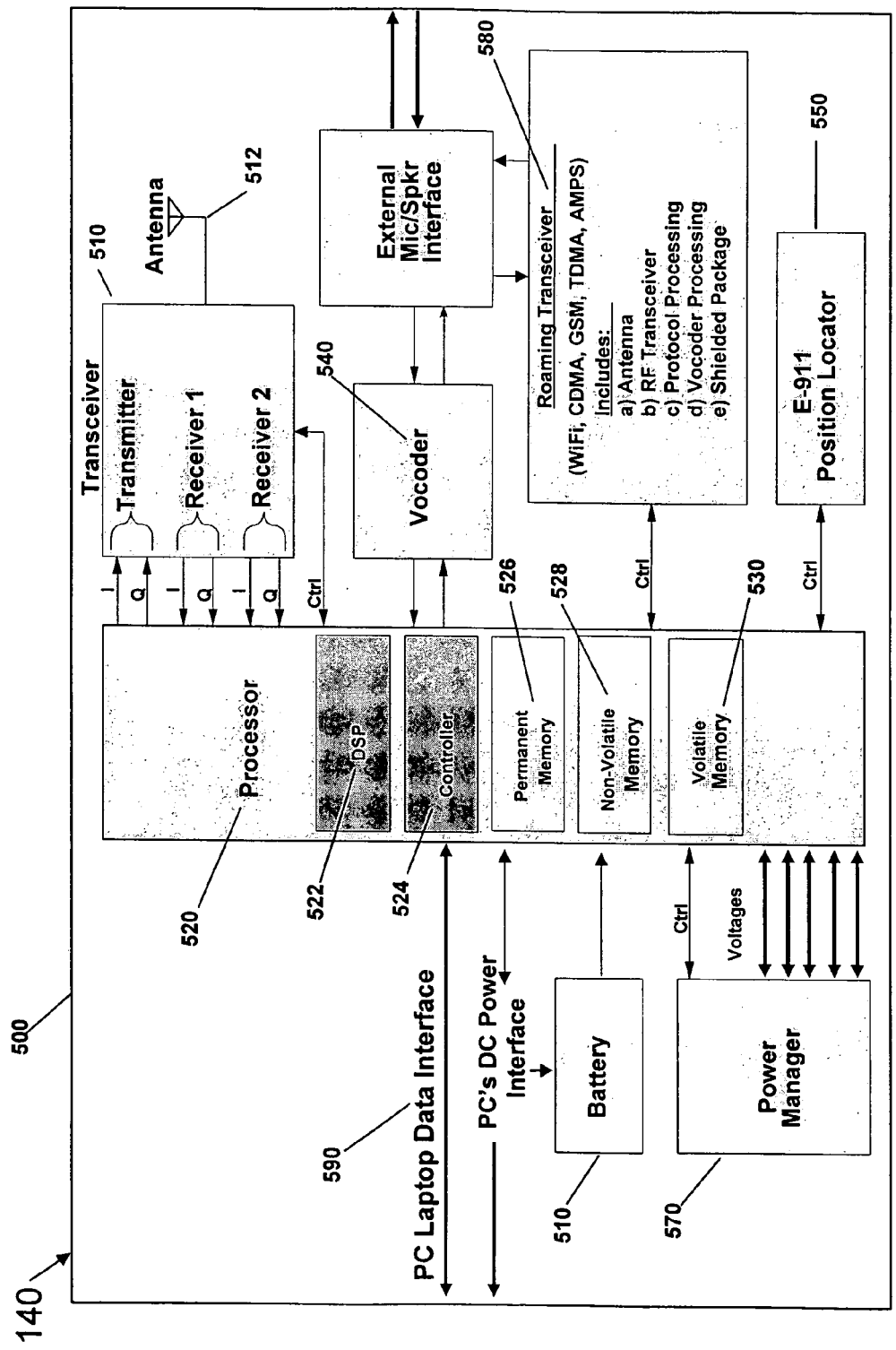
FIG. 19 shows a block diagram of a TSFD wireless PC-DatCom Card.

An alternate embodiment of the present invention, shown in FIG. 19, is an embodiment of the Personal Computer TSFD Multi-mode Wireless access card, also known as the TSFD Personal Computer Data Communication Card (TSFD wireless PC-DatCom) 500. The TSFD network can send and receive signals with any TSFD wireless device within the network. A specific device utilizing this technology is the TSFD wireless PC-DatCom 500, a circuit board "card" suitable for plugging into a laptop Personal Computer. Virtually every PC laptop manufacturer now offers the option for the computer user to insert a "WiFi card" in their computer for wireless Internet connectivity. This feature gives the user quick, wireless Internet connectivity for sending and receiving e-mail, sending in reports, managing business or "Surfing the Web", all without wires. WiFi is available all over the world in places called "hotspots." Cafes, hotels, offices and homes are all converting to this convenient form of connectivity. Also, available, are services from such carriers as T-Mobile® and Verizon® for a dedicated subscription wireless Internet service broadcast over an entire community or city. The TSFD network is already designed to allow a subscriber to send and receive data at data rates of up to 1 Mbps over existing "PCS" frequencies through TSFD wireless handsets 300, TSFD wireless PC-DatCom Cards 500, TSFD wireless ComDocs 900 or TSFD wireless X-DatComs 400. With the inclusion of a TSFD wireless PC-DatCom Card, the TSFD network can communicate directly with an existing PC laptop. Further, the PC-DatCom Card 500 includes multi-mode operations: TSFD, WiFi, CDMA, TDMA, and GSM for data transfer. Selection of network or transmission choice is made by the PC laptop user on a PC screen "popup" window. Communication to existing wall mounted IR communications terminals is also featured. Full service TSFD wireless telephone service can be accessed over the TSFD network, where available, with the PC Laptop card, through screen features of the PC. CCAP and CCAP+ data transfers are possible where another computer is also fitted with the TSFD PC Laptop card and each is a TSFD Network subscriber.

In another embodiment of the present invention, FIG. 19—diagram 140, a TSFD wireless PC-DatCom Card's operational methodologies and components are shown. The TSFD wireless PC-DatCom Card 500 includes all the features and functions of a TSFD wireless handset as described in FIG. 14, and many of those found in a TSFD wireless ComDoc in FIG. 15 and the TSFD wireless X-DatCom of FIG. 18. The TSFD wireless PC-DatCom Card 500 includes a transceiver 510 and antenna 512. The transceiver 510 consists of two receivers, one transmitter, and two programmable frequency synthesizers. The antenna 512 may be integrated into the transceiver, or may be a modular type that plugs into the unit. The transceiver transmit power is adjustable in 3 dB steps over a 50 dB range relative to the maximum transmit power. The gain of the transceiver antenna 512 is in the range of 0 to 2.5 dBi under controlled conditions. The transceiver 510 is capable of simultaneously receiving and demodulating two signals on independently programmed frequencies. The transceiver architecture includes an 80-MHz offset oscillator to facilitate switching between transmit and receive operations on a single channel pair without needing to re-program a frequency synthesizer. A processor 520 provides centralized control to the TSFD wireless PC-DatCom Card 500 and includes a digital signal processing (DSP) 522 for demodulating signals, a controller 524 for display/keypad servicing, and permanent, non-volatile and volatile memory 526. Firmware is embedded in the processor memory to implement protocols, control the user interfaces for the display, keypad, menus, etc., and control the application program interface (API) for the secondary mode protocol. The firmware includes a bootstrap loader that is stored in permanent memory 526 to enable download of the main code. The main code is stored in non-volatile memory 528 so that it is not lost in the absence of power, but can be overwritten by subsequent downloads, e.g., firmware updates. In addition to the main code, there also exist a number of configuration variables that are downloaded to activate the TSFD wireless PC-DatCom Card 500. These configuration variables set the user's phone number and services subscribed, and are also stored in non-volatile memory. The TSFD wireless PC-DatCom Card 500 firmware also manages non-volatile user memory for storage of phone book names and numbers. The Processor 520 shall have peripheral interfaces to the following elements:

Vocoder 540
Transceiver 510
Keypad 562
Display 560
Power Manager 570
Secondary Transceiver 580

Permanent memory 526 is utilized for the processor bootstrap firmware and electronic serial number. Each TSFD wireless PC-DatCom Card 500 contains a unique electronic serial number in permanent memory 426. The serial number permits a minimum of 1 billion unique serial numbers. Bootstrap software is also contained in permanent memory 526 to enable download of the operational software through an external data port 590. The nonvolatile read/write memory 528 is used for storing initialization parameters and phone book data so that battery removal or replacement does not require re-initialization. Each TSFD wireless PC-DatCom Card 500 contains its phone number in non-volatile memory. The operational software is downloadable to change features or otherwise update the code. The operational software is stored in non-volatile memory 528. The operational software is downloadable using capabilities of the bootstrap software, an external data port, and external software. The TSFD wireless PC-DatCom Card 500 is capable of maintaining user data in non-volatile memory 528, such as phone book entries. The TSFD wireless PC-DatCom Card 500 includes a vocoder (voice coder/decoder) 540 for processing the digitized voice signals. The vocoder 540 compresses and channel code the digitized voice data in order to meet the voice quality requirement and to enable implementation of the RF and communication protocols. The TSFD wireless PC-DatCom Card 500 includes a microphone 502, speaker 504, and an interface 508 for the microphone 502 and the speaker 504. The TSFD wireless PC-DatCom Card 500 may accept an external microphone input signal and shall provide an external speaker output signal. The TSFD wireless PC-DatCom Card 500 includes a power manager 570 to assist in extending battery life or facilitating input of fluctuating alternative power voltages. The TSFD wireless PC-DatCom Card 500 includes a rechargeable battery 510, but is also capable of connection to an external power source through an external power interface or through the inductive coupled recharge coil 590 in its case. The TSFD wireless PC-DatCom Card 500 includes an optional secondary transceiver 580 to serve as a secondary or alternate mode to the wireless communication system described. The secondary transceiver implements one or more of the following standard wireless protocols:

PCS CDMA (IS-95)
PCS TDMA (IS-136)
GSM 1400
AMPS

The Wireless Fidelity (WiFi) Personal Computer protocol is also included for broadband communications and the TSFD proprietary Red Fang Protocol for ultra-broadband, ultra short range communications.

The secondary transceiver 580 includes functions for an antenna, RF transceiver, protocol processing, and vocoder processing. The TSFD wireless PC-DatCom Card 500 also includes provisions for a position locator function to support the enhanced 911 (E911) requirements if needed. The TSFD wireless PC-DatCom Card 500 includes an optional PSTN line capture module 452 for connection to one or more PSTN lines. This option enables a telephone jack to be provided on the TSFD wireless PC-DatCom Card 500 for connecting fixed telephone handsets 456 and computer modems to the PSTN lines 554.

In a further embodiment of this invention, this technology reveals a functionality unknown in any other wireless WiFi PC card technology, i.e., the control of other major wireless systems, when utilizing carefully controlled, coded or encrypted access.

Operational Static State Control by the TSFD Wireless PC-DatCom 500

1. A TSFD wireless PC-DatCom 500 is used to command a TSFD wireless ComDoc to exercise Static State Control of a PC Home Computer via the TSFD wireless ComDoc's peripheral interface connections.
2. A TSFD wireless PC-DatCom 500 is used to command a TSFD wireless ComDoc to exercise Static State Control of a cable modem for access by the TSFD wireless device to the Internet via the TSFD wireless ComDoc's peripheral interface connections.
3. A TSFD wireless PC-DatCom 500 is used to command a TSFD wireless ComDoc to exercise Static State Control of a PSTN/DSL modem for access by the TSFD wireless device to the Internet via the TSFD wireless ComDoc's peripheral interface connections.
4. A TSFD wireless PC-DatCom 500 is used to command a TSFD wireless ComDoc to exercise Static State Control of a LAN modem for access by the TSFD wireless device to the Internet via the TSFD wireless ComDoc's peripheral interface connections.
5. A TSFD wireless PC-DatCom 500 is used to command a TSFD wireless ComDoc to exercise Static State Control of an External Hard Drive for the retrieval of digital data via the TSFD wireless ComDoc's peripheral interface connections.

6. A TSFD wireless PC-DatCom 500 is used to command a TSFD wireless ComDoc to exercise Static State Control of a CD/DVD Drive for the retrieval of digital data via the TSFD wireless ComDoc's peripheral interface connections.
7. A TSFD wireless PC-DatCom 500 is used to command a TSFD wireless ComDoc to exercise Static State Control of an Infrared Data Sensor via the TSFD wireless ComDoc's peripheral interface connections.
8. A TSFD wireless PC-DatCom 500 is used to command a TSFD wireless ComDoc to exercise Static State Control of an External Video Camera via the TSFD wireless ComDoc's peripheral interface connections.
9. A TSFD wireless PC-DatCom 500 operating in any one of the following alternate protocols: PCS, TDMA, CDMA, AMPS or GSM protocols is used to command a TSFD wireless ComDoc to exercise Static State Control of a PC Home Computer via the TSFD wireless ComDoc's peripheral interface connections.
10. A PCS, TDMA, CDMA, AMPS or GSM protocol wireless handset is used to command a TSFD wireless ComDoc to exercise Static State Control of a cable modem for access by the PCS, TDMA, CDMA, AMPS or GSM protocol wireless device to the Internet via the TSFD wireless ComDoc's peripheral interface connections.
11. A TSFD wireless PC-DatCom 500 operating in any one of the following alternate protocols: PCS, TDMA, CDMA, AMPS or GSM protocols is used to command a TSFD wireless ComDoc to exercise Static State Control of a PSTN/DSL modem for access by the PCS, TDMA, CDMA, AMPS or GSM protocols wireless device to the Internet via the TSFD wireless ComDoc's peripheral interface connections.
12. A TSFD wireless PC-DatCom 500 operating in any one of the following alternate protocols: PCS, TDMA, CDMA, AMPS or GSM protocols is used to command a TSFD wireless ComDoc to exercise Static State Control of a LAN modem for access by the PCS, TDMA, CDMA, AMPS or GSM protocols wireless device to the Internet via the TSFD wireless ComDoc's peripheral interface connections.
13. A TSFD wireless PC-DatCom 500 operating in any one of the following alternate protocols: PCS, TDMA, CDMA, AMPS or GSM protocols is used to command a TSFD wireless ComDoc to exercise Static State Control of an External Hard Drive for the retrieval of digital data via the TSFD wireless ComDoc's peripheral interface connections.
14. A TSFD wireless PC-DatCom 500 operating in any one of the following alternate protocols: PCS, TDMA, CDMA, AMPS or GSM protocols is used to command a TSFD wireless ComDoc to exercise Static State Control of a CD/DVD Drive for the retrieval of digital data via the TSFD wireless ComDoc's peripheral interface connections.
15. A TSFD wireless PC-DatCom 500 operating in any one of the following alternate protocols: PCS, TDMA, CDMA, AMPS or GSM protocols is used to command a TSFD wireless ComDoc to exercise Static State Control of an Infrared Data Sensor via the TSFD wireless ComDoc's peripheral interface connections.
16. A TSFD wireless PC-DatCom 500 operating in any one of the following alternate protocols: PCS, TDMA, CDMA, AMPS or GSM protocols is used to command a TSFD wireless ComDoc to exercise Static State Control of an External Video Camera via the TSFD wireless ComDoc's peripheral interface connections.
17. A TSFD wireless PC-DatCom 500 is used to command a TSFD wireless X-DatCom to exercise Static State Control of a PC Home Computer via the TSFD wireless X-DatCom's optional peripheral interface connections.
18. A TSFD wireless PC-DatCom 500 is used to command a TSFD wireless X-DatCom to exercise Static State Control of a cable modem for access by the TSFD wireless device to the Internet via the TSFD wireless X-DatCom's optional peripheral interface connections.
19. A TSFD wireless PC-DatCom 500 is used to command a TSFD wireless X-DatCom to exercise Static State Control of a PSTN/DSL modem for access by the TSFD wireless device to the Internet via the TSFD wireless X-DatCom's optional peripheral interface connections.
20. A Personal TSFD wireless PC-DatCom 500 is used to command a TSFD wireless X-DatCom to exercise Static State Control of a LAN modem for access by the TSFD wireless device to the Internet via the TSFD wireless X-DatCom's optional peripheral interface connections.
21. A TSFD wireless PC-DatCom 500 is used to command a TSFD wireless X-DatCom to exercise Static State Control of an External Hard Drive for the retrieval of digital data via the TSFD wireless X-DatCom's optional peripheral interface connections.
22. A TSFD wireless PC-DatCom 500 is used to command an TSFD wireless X-DatCom to exercise Static State Control of a CD/DVD Drive for the retrieval of digital data via the TSFD wireless X-DatCom's optional peripheral interface connections.
23. A TSFD wireless PC-DatCom 500 is used to command a TSFD wireless X-DatCom to exercise Static State Control of an Infrared Data Sensor via the TSFD wireless X-DatCom's optional peripheral interface connections.
24. A Personal Computer TSFD Multi-mode Wireless access card (TSFD wireless PC-DatCom) 500 is used to command a TSFD wireless X-DatCom to exercise Static State Control of an External Video Camera via the TSFD wireless X-DatCom's optional peripheral interface connections.
25. A TSFD wireless PC-DatCom 500 operating in any one of the following alternate protocols: PCS, TDMA, CDMA, AMPS or GSM protocols is used to command a TSFD wireless X-DatCom to exercise Static State Control of a PC Home Computer via the TSFD wireless X-DatCom's optional peripheral interface connections.
26. A TSFD wireless PC-DatCom 500 operating in any one of the following alternate protocols: PCS, TDMA, CDMA, AMPS or GSM protocols is used to command a TSFD wireless X-DatCom to exercise Static State Control of a cable modem for access by the TSFD wireless handset operating in any one of the following alternate protocols: PCS, TDMA, CDMA, AMPS or GSM protocols to the Internet via the TSFD wireless X-DatCom's optional peripheral interface connections.
27. A TSFD wireless PC-DatCom 500, via a secure access code, may be used to instruct the Parallel-configured Network Extender Central Processor (PNECP); wherein the PNCEP is composed of PNE Central Processors 830a & 830b comprising a whole and complete PNE Central Processor system, to exercise Static State Control over the Subscriber Database, located on a website on the Internet, containing all TSFD wireless handsets 300, TSFD wireless PC-DatCom Cards 500, TSFD wireless ComDocs 900 and TSFD wireless X-DatComs 400 for activation, deactivation and billing privileges by predetermined and defined software parameters stored in the PNECP's internal Memory.

28. A TSFD wireless PC-DatCom 500, via a secure access code, may be used to instruct the Parallel-configured Network Extender Central Processor (PNECP); wherein the PNCEP is composed of PNE Central Processors 830a & 830b comprising a whole and complete PNE Central Processor system, to exercise Static State Control over the Subscriber Database, located on a website on the Internet, containing all TSFD wireless handsets 300, TSFD wireless PC-DatCom Cards 500, TSFD wireless ComDocs 900 and TSFD wireless X-DatComs 400 for activation, deactivation and billing privileges by external instructions from a keypad, touch-active video screen within the PNE 800 housing or by such portable data storage medium as will facilitate uploading new data control instructions when inserted in the PNECP's data drives.

29. A TSFD wireless PC-DatCom 500, via a secure access code, may be used to instruct the Parallel-configured Network Extender Central Processor (PNECP); wherein the PNCEP is composed of PNE Central Processors 830a & 830b comprising a whole and complete PNE Central Processor system, to exercise Static State Control over the Subscriber Database, located on a website on the Internet, containing all TSFD wireless and sets 300, TSFD wireless PC-DatCom Cards 500, TSFD wireless ComDocs 900 and TSFD wireless X-DatComs 400 for activation, deactivation and billing privileges by programming instructions received by transmissions from remotely located TSFD Network authorized personnel via the TSFD Network.

30. A TSFD wireless PC-DatCom 500, via a secure access code, may be used to instruct the Parallel-configured Network Extender Central Processor (PNECP); wherein the PNCEP is composed of PNE Central Processors 830a & 830b comprising a whole and complete PNE Central Processor system, to exercise Static State Control over the Subscriber Database, located on a website on the Internet, containing all TSFD wireless handsets 300, TSFD wireless PC-DatCom Cards 500, TSFD wireless ComDocs 900 and TSFD wireless X-DatComs 400 for activation, deactivation and billing privileges by programming instructions received by transmissions from remotely located TSFD Network authorized personnel via the PSTN, the Internet, direct copper connections using DS-1 connections, direct fiber connections using OC-3 links, radio links with the DS-1 hardware, an Earth-Satellite ground station for direct two-way communications with telecom satellites, the sending and receiving of short haul, ultra-wide-band optical communications via modulated Laser links.

31. A TSFD wireless PC-DatCom 500, via a secure access code, may be used to instruct the Parallel-configured Network Extender Central Processor (PNECP); wherein the PNCEP is composed of PNE Central Processors 830a & 830b comprising a whole and complete PNE Central Processor system, to exercise Static State Control over the Subscriber Database, located on a website on the Internet, containing all TSFD wireless handsets 300, TSFD wireless PC-DatCom Cards 500, TSFD wireless ComDocs 900 and TSFD wireless X-DatComs 400 for activation, deactivation and billing privileges by transmissions from the Parallel Computing Artificial Intelligence-based Distributive Routing Computer located within the Environmental Housing of the Network Extender.

32. A TSFD wireless PC-DatCom 500, via a secure access code, may be used to instruct the Parallel-configured Network Extender Central Processor (PNECP); wherein the PNCEP is composed of PNE Central Processors 830a & 830b comprising a whole and complete PNE Central Processor system, to exercise Static State Control over the Subscriber Database, located on a website on the Internet, containing all TSFD wireless handsets 300, TSFD wireless PC-DatCom Cards 500, TSFD wireless ComDocs 900 and TSFD wireless X-DatComs 400 for activation, deactivation and billing privileges by transmissions from an Parallel Computing Artificial Intelligence-based Distributive Routing Computer located within the TSFD Network Extender's operational service area of captive Signal extenders 600 during a catastrophic failure within the TSFD Network.

33. A TSFD wireless PC-DatCom 500 operating in any one of the following alternate protocols: PCS, TDMA, CDMA, AMPS or GSM protocols, via a secure access code, may be used to instruct the Parallel-configured Network Extender Central Processor (PNECP); wherein the PNCEP is composed of PNE Central Processors 830a & 830b comprising a whole and complete PNE Central Processor system, to exercise Static State Control over the Subscriber Database, located on a website on the Internet, containing all TSFD wireless handsets 300, TSFD wireless PC-DatCom Cards 500, TSFD wireless ComDocs 900 and TSFD wireless X-DatComs 400 for activation, deactivation and billing privileges by predetermined and defined software parameters stored in the PNECP's internal Memory.

34. A TSFD wireless PC-DatCom 500 operating in any one of the following alternate protocols: PCS, TDMA, CDMA, AMPS or GSM protocols, via a secure access code, may be used to instruct the Parallel-configured Network Extender Central Processor (PNECP); wherein the PNCEP is composed of PNE Central Processors 830a & 830b comprising a whole and complete PNE Central Processor system, to exercise Static State Control over the Subscriber Database, located on a website on the Internet, containing all TSFD wireless handsets 300, TSFD wireless PC-DatCom Cards 500, TSFD wireless ComDocs 900 and TSFD wireless X-DatComs 400 for activation, deactivation and billing privileges by external instructions from a keypad, touch-active video screen within the NE housing or by such portable data storage medium as will facilitate uploading new data instructions when inserted in the PNECP's data drives.

35. A TSFD wireless PC-DatCom 500 operating in any one of the following alternate protocols: PCS, TDMA, CDMA, AMPS or GSM protocols, via a secure access code, may be used to instruct the Parallel-configured Network Extender Central Processor to exercise Static State Control over the Subscriber Database, located on a website on the Internet, containing all TSFD wireless handsets 300, TSFD wireless PC-DatCom Cards 500, TSFD wireless ComDocs 900 and TSFD wireless X-DatComs 400 for activation, deactivation and billing privileges by programming instructions received by transmissions from remotely located TSFD Network authorized personnel via the TSFD Network.

36. A TSFD wireless PC-DatCom 500 operating in any one of the following alternate protocols: PCS, TDMA, CDMA, AMPS or GSM protocols, via a secure access code, may be used to instruct the Parallel-configured Network Extender Central Processor to exercise Static State Control over the Subscriber Database, located on a website on the Internet, containing all TSFD wireless handsets 300, TSFD wireless PC-DatCom Cards 500, TSFD wireless ComDocs 900 and TSFD wireless X-DatComs 400 for activation, deactivation and billing privileges by programming instructions received by transmissions from remotely located TSFD Network authorized personnel via the PSTN, the Internet, direct copper connections using DS-1 connections, direct fiber connections using OC-3 links, radio links with the DS-1 hardware, an Earth-Satellite ground station for direct two-way communications with telecom satellites, the sending and receiving of short haul, ultra-wide-band optical communications via modulated Laser links.

37. A TSFD wireless PC-DatCom 500 operating in any one of the following alternate protocols: PCS, TDMA, CDMA, AMPS or GSM protocols, via a secure access code, may be used to instruct the Parallel-configured Network Extender Central Processor to exercise Static State Control over the Subscriber Database, located on a website on the Internet, containing all TSFD wireless handsets 300, TSFD wireless PC-DatCom Cards 500, TSFD wireless ComDocs 900 and TSFD wireless X-DatComs 400 for activation, deactivation and billing privileges from programming instructions received by transmissions from the Parallel Computing Artificial Intelligence-based Distributive Routing Computer located within the Environmental Housing of the Network Extender.

38. A TSFD wireless PC-DatCom 500 operating in any one of the following alternate protocols: PCS, TDMA, CDMA, AMPS or GSM protocols, via a secure access code, may be used to instruct the Parallel-configured Network Extender Central Processor to exercise Dynamic State Control over the Subscriber Database, located on a website on the Internet, containing all TSFD wireless handsets 300, TSFD wireless PC-DatCom Cards 500, TSFD wireless ComDocs 900 and TSFD wireless X-DatComs 400 for activation, deactivation and billing privileges from programming instructions received by transmissions from an Parallel Computing Artificial Intelligence-based Distributive Routing Computer located within the TSFD Network Extender's dynamic service area of captive Signal extenders 600 during a catastrophic failure within the TSFD Network.

Operational Dynamic State Control by the TSFD Multi-Mode Wireless Access Card (TSFD Wireless PC-DatCom) 500

1. A TSFD wireless PC-DatCom 500 is used to command a TSFD wireless ComDoc to exercise Dynamic State Control of a PC Home Computer via the TSFD wireless ComDoc's peripheral interface connections.
2. A TSFD wireless PC-DatCom 500 is used to command a TSFD wireless ComDoc to exercise Dynamic State Control of a cable modem for access by the TSFD wireless device to the Internet via the TSFD wireless ComDoc's peripheral interface connections.
3. A TSFD wireless PC-DatCom 500 is used to command a TSFD wireless ComDoc to exercise Dynamic State Control of a PSTN/DSL modem for access by the TSFD wireless device to the Internet via the TSFD wireless ComDoc's peripheral interface connections.
4. A TSFD wireless PC-DatCom 500 is used to command a TSFD wireless ComDoc to exercise Dynamic State Control of a LAN modem for access by the TSFD wireless device to the Internet via the TSFD wireless ComDoc's peripheral interface connections.
5. A TSFD wireless PC-DatCom 500 is used to command a TSFD wireless ComDoc to exercise Dynamic State Control of an External Hard Drive for the retrieval of digital data via the TSFD wireless ComDoc's peripheral interface connections.
6. A TSFD wireless PC-DatCom 500 is used to command a TSFD wireless ComDoc to exercise Dynamic State Control of a CD/DVD Drive for the retrieval of digital data via the TSFD wireless ComDoc's peripheral interface connections.
7. A TSFD wireless PC-DatCom 500 is used to command a TSFD wireless ComDoc to exercise Dynamic State Control of an Infrared Data Sensor via the TSFD wireless ComDoc's peripheral interface connections.
8. A TSFD wireless PC-DatCom 500 is used to command a TSFD wireless ComDoc to exercise Dynamic State Control of an External Video Camera via the TSFD wireless ComDoc's peripheral interface connections.
9. A TSFD wireless PC-DatCom 500 operating in any one of the following alternate protocols: PCS, TDMA, CDMA, AMPS or GSM protocols is used to command a TSFD wireless ComDoc to exercise Dynamic State Control of a PC Home Computer via the TSFD wireless ComDoc's peripheral interface connections.
10. A PCS, TDMA, CDMA, AMPS or GSM protocol wireless handset is used to command a TSFD wireless ComDoc to exercise Dynamic State Control of a cable modem for access by the PCS, TDMA, CDMA, AMPS or GSM protocol wireless device to the Internet via the TSFD wireless ComDoc's peripheral interface connections.
11. A TSFD wireless PC-DatCom 500 operating in any one of the following alternate protocols: PCS, TDMA, CDMA, AMPS or GSM protocols is used to command a TSFD wireless ComDoc to exercise Dynamic State Control of a PSTN/DSL modem for access by the PCS, TDMA, CDMA, AMPS or GSM protocols wireless device to the Internet via the TSFD wireless ComDoc's peripheral interface connections.
12. A TSFD wireless PC-DatCom 500 operating in any one of the following alternate protocols: PCS, TDMA, CDMA, AMPS or GSM protocols is used to command a TSFD wireless ComDoc to exercise Dynamic State Control of a LAN modem for access by the PCS, TDMA, CDMA, AMPS or GSM protocols wireless device to the Internet via the TSFD wireless ComDoc's peripheral interface connections.
13. A TSFD wireless PC-DatCom 500 operating in any one of the following alternate protocols: PCS, TDMA, CDMA, AMPS or GSM protocols is used to command a TSFD wireless ComDoc to exercise Dynamic State Control of an External Hard Drive for the retrieval of digital data via the TSFD wireless ComDoc's peripheral interface connections.
14. A TSFD wireless PC-DatCom 500 operating in any one of the following alternate protocols: PCS, TDMA, CDMA, AMPS or GSM protocols is used to command a TSFD wireless ComDoc to exercise Dynamic State Control of a CD/DVD Drive for the retrieval of digital data via the TSFD wireless ComDoc's peripheral interface connections.
15. A TSFD wireless PC-DatCom 500 operating in any one of the following alternate protocols: PCS, TDMA, CDMA, AMPS or GSM protocols is used to command a TSFD wireless ComDoc to exercise Dynamic State Control of an Infrared Data Sensor via the TSFD wireless ComDoc's peripheral interface connections.

16. A TSFD wireless PC-DatCom 500 operating in any one of the following alternate protocols: PCS, TDMA, CDMA, AMPS or GSM protocols is used to command a TSFD wireless ComDoc to exercise Dynamic State Control of an External Video Camera via the TSFD wireless ComDoc's peripheral interface connections.
17. A TSFD wireless PC-DatCom 500 is used to command a TSFD wireless X-DatCom to exercise Dynamic State Control of a PC Home Computer via the TSFD wireless X-DatCom's optional peripheral interface connections.
18. A TSFD wireless PC-DatCom 500 is used to command a TSFD wireless X-DatCom to exercise Dynamic State Control of a cable modem for access by the TSFD wireless device to the Internet via the TSFD wireless X-DatCom's optional peripheral interface connections.
19. A TSFD wireless PC-DatCom 500 is used to command a TSFD wireless X-DatCom to exercise Dynamic State Control of a PSTN/DSL modem for access by the TSFD wireless device to the Internet via the TSFD wireless X-DatCom's optional peripheral interface connections.
20. A TSFD wireless PC-DatCom 500 is used to command a TSFD wireless X-DatCom to exercise Dynamic State Control of a LAN modem for access by the TSFD wireless device to the Internet via the TSFD wireless X-DatCom's optional peripheral interface connections.
21. A TSFD wireless PC-DatCom 500 is used to command a TSFD wireless X-DatCom to exercise Dynamic State Control of an External Hard Drive for the retrieval of digital data via the TSFD wireless X-DatCom's optional peripheral interface connections.
22. A TSFD wireless PC-DatCom 500 is used to command a TSFD wireless X-DatCom to exercise Dynamic State Control of a CD/DVD Drive for the retrieval of digital data via the TSFD wireless X-DatCom's optional peripheral interface connections.
23. A TSFD wireless PC-DatCom 500 is used to command a TSFD wireless X-DatCom to exercise Dynamic State Control of an Infrared Data Sensor via the TSFD wireless X-DatCom's optional peripheral interface connections.
24. A TSFD wireless PC-DatCom 500 is used to command a TSFD wireless X-DatCom to exercise Dynamic State Control of an External Video Camera via the TSFD wireless X-DatCom's optional peripheral interface connections.
25. A TSFD wireless PC-DatCom 500 operating in any one of the following alternate protocols: PCS, TDMA, CDMA, AMPS or GSM protocols is used to command a TSFD wireless X-DatCom to exercise Dynamic State Control of a PC Home Computer via the TSFD wireless X-DatCom's optional peripheral interface connections.
26. A TSFD wireless PC-DatCom 500 operating in any one of the following alternate protocols: PCS, TDMA, CDMA, AMPS or GSM protocols is used to command a TSFD wireless X-DatCom to exercise Dynamic State Control of a cable modem for access by the TSFD wireless handset operating in any one of the following alternate protocols: PCS, TDMA, CDMA, AMPS or GSM protocols to the Internet via the TSFD wireless X-DatCom's optional peripheral interface connections.
27. A TSFD wireless PC-DatCom 500, via a secure access code, may be used to instruct the Parallel-configured Network Extender Central Processor (PNECP); wherein the PNCEP is composed of PNE Central Processors 830*a* & 830*b* comprising a whole and complete PNE Central Processor system, to exercise Dynamic State Control over the Subscriber Database, located on a website on the Internet, containing all TSFD wireless handsets 300, TSFD wireless PC-DatCom Cards 500, TSFD wireless ComDocs 900 and TSFD wireless X-DatComs 400 for activation, deactivation and billing privileges by predetermined and defined software parameters stored in the PNECP's internal Memory.
28. A TSFD wireless PC-DatCom 500, via a secure access code, may be used to instruct the Parallel-configured Network Extender Central Processor (PNECP); wherein the PNCEP is composed of PNE Central Processors 830*a* & 830*b* comprising a whole and complete PNE Central Processor system, to exercise Dynamic State Control over the Subscriber Database, located on a website on the Internet, containing all TSFD wireless handsets 300, TSFD wireless PC-DatCom Cards 500, TSFD wireless ComDocs 900 and TSFD wireless X-DatComs 400 for activation, deactivation and billing privileges by external instructions from a keypad, touch-active video screen within the PNE housing or by such portable data storage medium as will facilitate uploading new data instructions when inserted in the PNECP's data drives.
29. A TSFD wireless PC-DatCom 500, via a secure access code, may be used to instruct the Parallel-configured Network Extender Central Processor to exercise Dynamic State Control over the Subscriber Database, located on a website on the Internet, containing all TSFD wireless handsets 300, TSFD wireless PC-DatCom Cards 500, TSFD wireless ComDocs 900 and TSFD wireless X-DatComs 400 for activation, deactivation and billing privileges by programming instructions received by transmissions from remotely located TSFD Network authorized personnel via the TSFD Network.
30. A TSFD wireless PC-DatCom 500, via a secure access code, may be used to instruct the Parallel-configured Network Extender Central Processor to exercise Dynamic State Control over the Subscriber Database, located on a website on the Internet, containing all TSFD wireless handsets 300, TSFD wireless PC-DatCom Cards 500, TSFD wireless ComDocs 900 and TSFD wireless X-DatComs 400 for activation, deactivation and billing privileges by programming instructions received by transmissions from remotely located TSFD Network authorized personnel via the PSTN, the Internet, direct copper connections using DS-1 connections, direct fiber connections using OC-3 links, radio links with the DS-1 hardware, an Earth-Satellite ground station for direct two-way communications with telecom satellites, the sending and receiving of short haul, ultra-wide-band optical communications via modulated Laser links.
31. A TSFD wireless PC-DatCom 500, via a secure access code, may be used to instruct the Parallel-configured Network Extender Central Processor to exercise Dynamic State Control over the Subscriber Database, located on a website on the Internet, containing all TSFD wireless handsets 300, TSFD wireless PC-DatCom Cards 500, TSFD wireless ComDocs 900 and TSFD wireless X-DatComs 400 for activation, deactivation and billing privileges from programming instructions received by transmissions from the Parallel Computing Artificial Intelligence-based Distributive Routing Computer located within the Environmental Housing of the Network Extender.
32. A TSFD wireless PC-DatCom 500, via a secure access code, may be used to instruct the Parallel-configured Network Extender Central Processor to exercise Dynamic State Control over the Subscriber Database, located on a website on the Internet, containing all TSFD wireless handsets 300, TSFD wireless PC-DatCom Cards 500, TSFD wireless ComDocs 900 and TSFD wireless X-DatComs 400 for activation, deactivation and billing privileges from programming instructions received by transmissions from an Parallel Computing Artificial Intelligence-based Distributive Routing Computer located within the TSFD Network Extender's dynamic service area of captive Signal extenders 600 during a catastrophic failure within the TSFD Network.

33. A TSFD wireless PC-DatCom 500 operating in any one of the following alternate protocols: PCS, TDMA, CDMA, AMPS or GSM protocols, via a secure access code, may be used to instruct the Parallel-configured Network Extender Central Processor (PNECP); wherein the PNCEP is composed of PNE Central Processors 830*a* & 830*b* comprising a whole and complete PNE Central Processor system, to exercise Dynamic State Control over the Subscriber Database, located on a website on the Internet, containing all TSFD wireless handsets 300, TSFD wireless PC-DatCom Cards 500, TSFD wireless ComDocs 900 and TSFD wireless X-DatComs 400 for activation, deactivation and billing privileges by predetermined and defined software parameters stored in the PNECP's internal Memory.

34. A TSFD wireless PC-DatCom 500 operating in any one of the following alternate protocols: PCS, TDMA, CDMA, AMPS or GSM protocols, via a secure access code, may be used to instruct the Parallel-configured Network Extender Central Processor (PNECP); wherein the PNCEP is composed of PNE Central Processors 830*a* & 830*b* comprising a whole and complete PNE Central Processor system, to exercise Dynamic State Control over the Subscriber Database, located on a website on the Internet, containing all TSFD wireless handsets 300, TSFD wireless PC-DatCom Cards 500, TSFD wireless ComDocs 900 and TSFD wireless X-DatComs 400 for activation, deactivation and billing privileges by external instructions from a keypad, touch-active video screen within the NE housing or by such portable data storage medium as will facilitate uploading new data instructions when inserted in the PNECP's data drives.

35. A TSFD wireless PC-DatCom 500 operating in any one of the following alternate protocols: PCS, TDMA, CDMA, AMPS or GSM protocols, via a secure access code, may be used to instruct the Parallel-configured Network Extender Central Processor to exercise Dynamic State Control over the Subscriber Database, located on a website on the Internet, containing all TSFD wireless handsets 300, TSFD wireless PC-DatCom Cards 500, TSFD wireless ComDocs 900 and TSFD wireless X-DatComs 400 for activation, deactivation and billing privileges by programming instructions received by transmissions from remotely located TSFD Network authorized personnel via the TSFD Network.

36. A TSFD wireless PC-DatCom 500 operating in any one of the following alternate protocols: PCS, TDMA, CDMA, AMPS or GSM protocols, via a secure access code, may be used to instruct the Parallel-configured Network Extender Central Processor to exercise Dynamic State Control over the Subscriber Database, located on a website on the Internet, containing all TSFD wireless handsets 300, TSFD wireless PC-DatCom Cards 500, TSFD wireless ComDocs 900 and TSFD wireless X-DatComs 400 for activation, deactivation and billing privileges by programming instructions received by transmissions from remotely located TSFD Network authorized personnel via the PSTN, the Internet, direct copper connections using DS-1 connections, direct fiber connections using OC-3 links, radio links with the DS-1 hardware, an Earth-Satellite ground station for direct two-way communications with telecom satellites, the sending and receiving of short haul, ultra-wide-band optical communications via modulated Laser links.

37. A TSFD wireless PC-DatCom 500 operating in any one of the following alternate protocols: PCS, TDMA, CDMA, AMPS or GSM protocols, via a secure access code, may be used to instruct the Parallel-configured Network Extender Central Processor to exercise Dynamic State Control over the Subscriber Database, located on a website on the Internet, containing all TSFD wireless handsets 300, TSFD wireless PC-DatCom Cards 500, TSFD wireless ComDocs 900 and TSFD wireless X-DatComs 400 for activation, deactivation and billing privileges from programming instructions received by transmissions from the Parallel Computing Artificial Intelligence-based Distributive Routing Computer located within the Environmental Housing of the Network Extender.

38. A TSFD wireless PC-DatCom 500 operating in any one of the following alternate protocols: PCS, TDMA, CDMA, AMPS or GSM protocols, via a secure access code, may be used to instruct the Parallel-configured Network Extender Central Processor to exercise Dynamic State Control over the Subscriber Database, located on a website on the Internet, containing all TSFD wireless handsets 300, TSFD wireless PC-DatCom Cards 500, TSFD wireless ComDocs 900 and TSFD wireless X-DatComs 400 for activation, deactivation and billing privileges from programming instructions received by transmissions from an Parallel Computing Artificial Intelligence-based Distributive Routing Computer located within the PNE's dynamic service area of captive PSEs 600 during a catastrophic failure within the TSFD Network.

V. Parallel-Configured TSFD Signal Extenders

Figure 20:
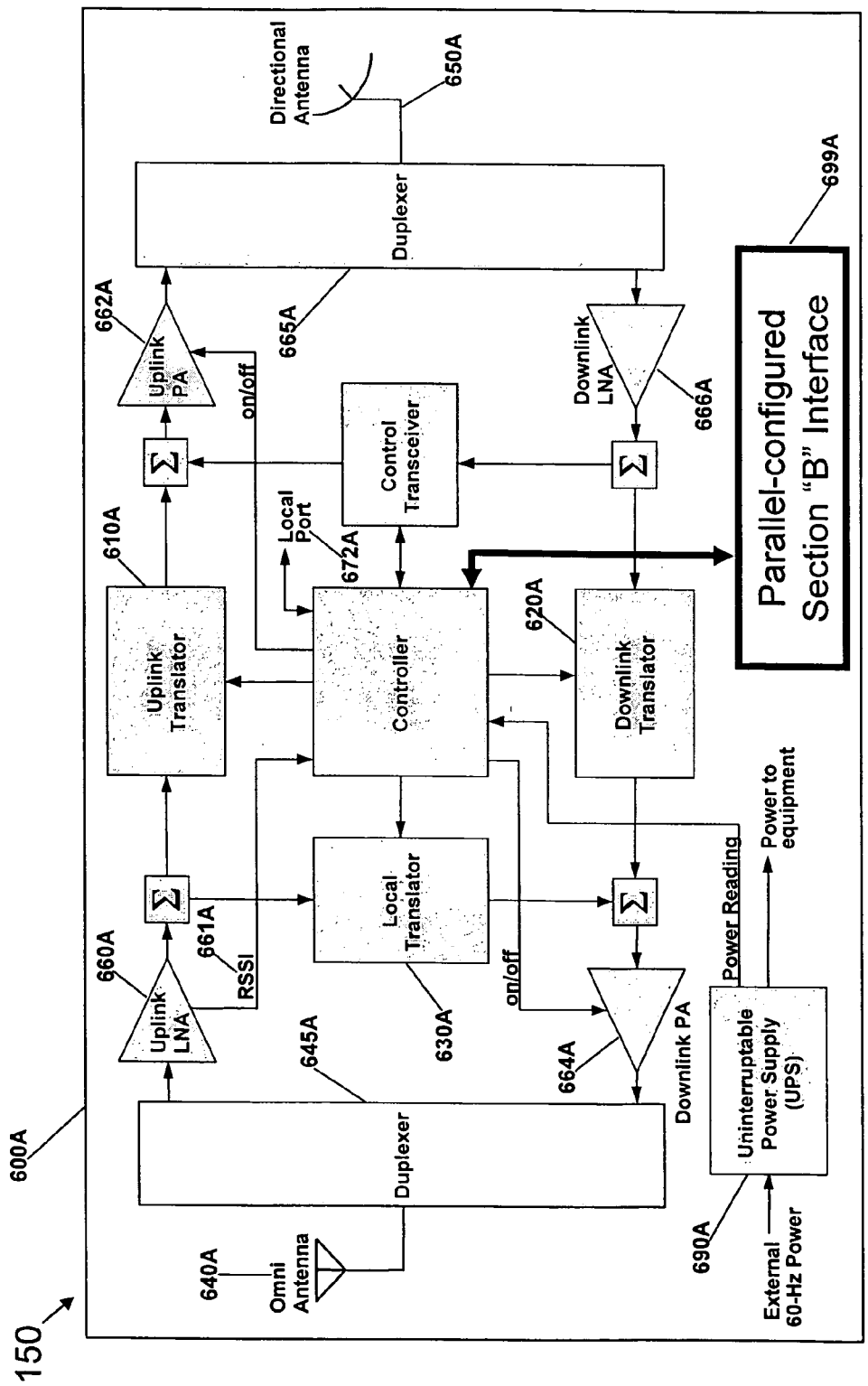
FIG. 20 shows of a block diagram of section "A" of a Parallel-configured TSFD Signal Extender
Figure 21:
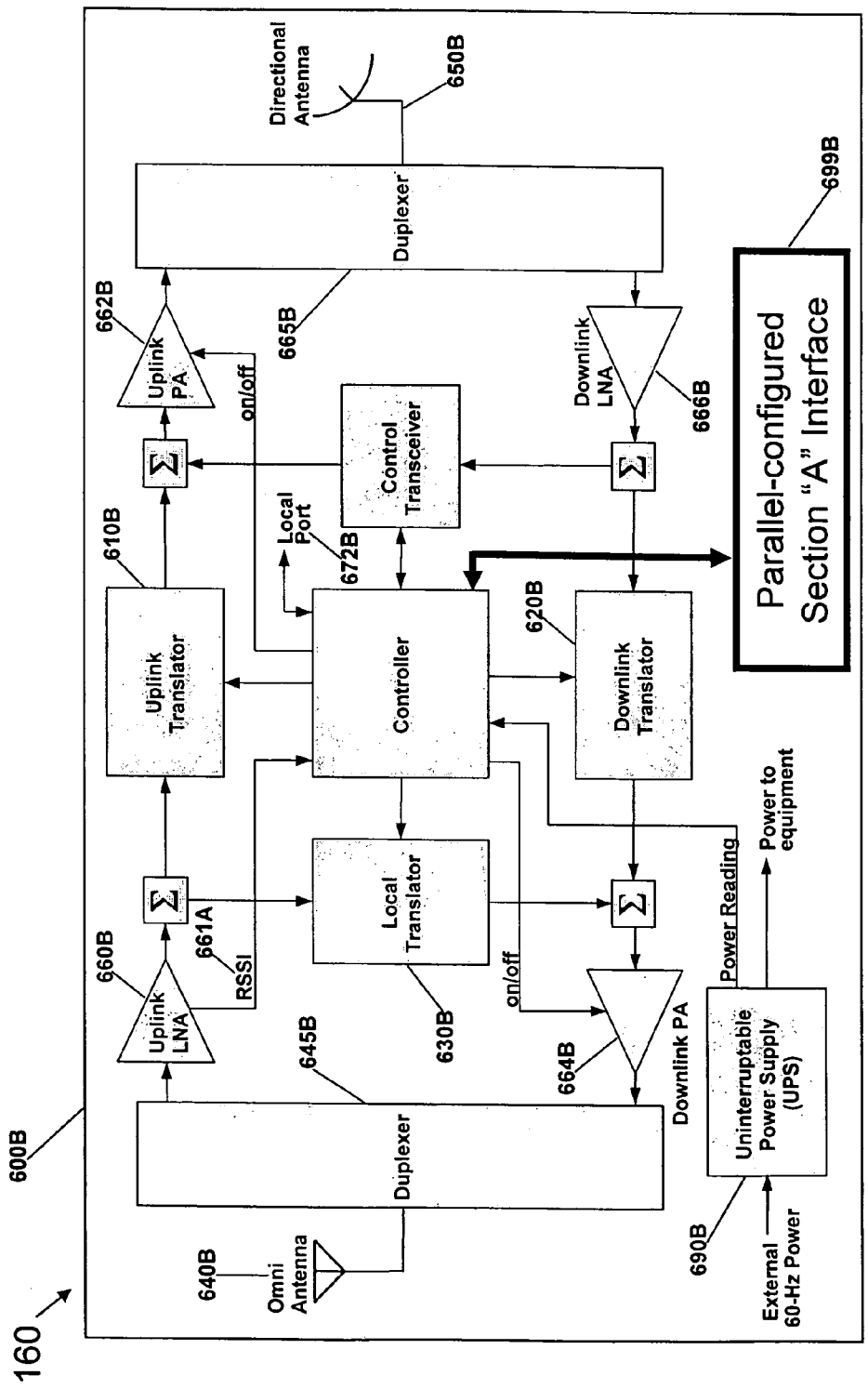
FIG. 21 shows of a block diagram of section "B" of a Parallel-configured TSFD Signal Extender.

Turning now to FIG. 20 and FIG. 21, FIG. 20 and FIG. 21 show block diagrams 150 and 160, in two complete sections; A and B respectively, of a whole and complete (when combined during operations) PSE 600. Each section is a functional and independent Signal Extender that works in parallel independent of the other section such that each section is providing a backup to the other section in case of failure of one section. This configuration of the PSE is termed as the Parallel-configuration, and the Signal Extender is termed Parallel-configured Signal Extender. The PSE 600 serves as a signal relay and frequency-translator between TSFD wireless handsets 300 and either a PNE 800 or other TSFD wireless handsets 300. It receives blocks of data in the PCS low band and up-converts them for re-transmission in the PCS high band, as discussed in relation to FIG. 4 through FIG. 7. In this relay process, the PSE 600 amplifies the radio frequency signals to increase system range and coverage. The distinguishing feature of the PSE 600 is that it does not switch, process, or demodulate individual channels or signals; it is limited in function to relaying blocks of RF spectrum. This functional simplicity is intended to yield low infrastructure cost. The only deviation from this design is to enable access to no more than four PSTN landlines as a routing backup during a PNE's catastrophic failure. Even this access is accomplished however, on-site through the wireless connectivity of four or more TSFD wireless ComDocs 900 attached to landlines. This approach eliminates structural and physical design changes to the PSEs 600 and keeps costs low. The Parallel Computing Artificial Intelligence Distributive Routing Network merely makes suggestions for the PSE's 600 to follow: More landlines and TSFD wireless ComDocs 900 would raise the cost; however, never would these additions ever approach the expense of altering the PSE 600 design. This approach would also yield the cost benefits of modular expansion should the need arise. Frequency translation is the primary function of the PSE 600. Three such translator functions shall be provided as follows:

Translator Type Relay Path Uplink TSFD wireless handset to PNE Downlink PNE to Local TSFD wireless handset to TSFD wireless handset; each translator is defined by the center frequency of the input spectrum block, the bandwidth of the block, and an up-conversion offset. The input center frequency is a programmable parameter based on the licensed PCS block (A-F) and the microcell type (A1-3, B1-3, C1-3); see FIG. 3, FIG. 4 and FIG. 5. The bandwidth and up-conversion offset depend on the PCS block type (ABC or DEF). The three PSE 600 translator functions operate with the same bandwidth specifications. The bandwidth is fixed at 275 kHz for 5-MHz PCS block types (DEF) or at 825 for 15-MHz PCS block types (ABC). Signals more than 50 kHz from the band edges are rejected by at least 20 dB relative to the band centers. Signals more than 250 kHz from the band edges are rejected by at least 40 dB relative to the band centers. The three PSE 600 translator functions operate with the same frequency accuracy specifications. The input center frequency is accurate to within 2 kHz and the up-conversation offset is accurate to within 500 Hz. The uplink translator 610 translates a block of handset signals to the PNE 800. The programmable up-conversion offset is 82.5 MHz for 5-MHz PCS block types (DEF) or 87.5 MHz for 15-MHz PCS block types (ABC). The programmable input center frequency is determined according to the following expression:

$$Fedge+Fguard+Bandwidth*(Extended+0.5)$$

where Fedge, Fguard, and Bandwidth are given in the table presented in FIG. 27, which shows PCS block parameters for PSE 600 frequency translators. The Table presented in FIG. 28 shows the values of extended and local microcell type parameters for PSE 600 frequency translators used for the determination of center frequencies.

In a detailed illumination of the present invention, the internal component number designators; i.e. (translator 620 for example) will be stated as 620a & 620b, as the Parallel-configured nature of the PSE's hardware and the internal operating software of FIG. 20 and FIG. 21 must be addressed together.

The downlink translator 620a & 620b translates a block of signals from a PNE 800 to the TSFD wireless handsets 300, TSFD wireless X-DatComs 400, TSFD wireless PC-DatCom Cards 500, TSFD wireless ComDocs 900. The programmable up-conversion offset is 77.5 MHz for 5-MHz PCS block types (DEF) or 72.5 MHz for 15-MHz PCS block types (ABC). The programmable input center frequency is determined according to the following expression:

$$Fmid+Fguard+Bandwidth*(Extended+0.5)$$

where Fmid, Fguard, and Bandwidth are given in FIG. 27, and values for Extended are given in FIG. 28. The local translator 630a & 630b translates a block of TSFD wireless handset 300, TSFD wireless X-DatCom 400, TSFD wireless PC-DatCom Card 500, TSFD wireless ComDoc 900 signals to other TSFD wireless handsets 300, TSFD wireless X-DatComs 400, TSFD wireless PC-DatCom Cards 500, TSFD wireless ComDocs 900. The up-conversion offset is fixed to 80 MHz. The programmable input center frequency is determined according to the following expression:

$$Fedge+Fguard+Bandwidth*(Local+0.5)$$

where Fedge, Fguard, and Bandwidth are given in FIG. 27, and the value for Local is given in FIG. 28. The omni antenna 640a & 640b is used for omni-directional PSE 600 communication with handsets 300 in a microcell. The antenna gain is between 2 dBi and 6 dBi. The directional antenna 650a & 650b is used for directional PSE 600 communication with the fixed PNE site. The antenna gain is 15 dBi, with a front-to-back ratio greater than 25 dB. Duplexers 645a & 645b, 655a & 655b are used to achieve isolation of the antenna signals between the transmit and receive frequency bands. This is required to allow full duplex, i.e., simultaneous transmit and receive, operation of the PSE 600. The duplexers 645a & 645b, 655a & 655b provide transmit-receive (and receive-transmit) isolation of at least 80 dB. An uplink low noise amplifier (LNA) 660a & 660b is used to receive the TSFD wireless handset 300, TSFD wireless X-DatCom 400, TSFD wireless PC-DatCom Card 500, TSFD wireless ComDoc 900 signals for the uplink translator 610a & 610b and local translator 630a & 630b. The uplink LNA 660a & 660b provides a received signal strength indicator (RSSI) 661a & 661b output to the PSE 600a & PSE 600b controller 670a & 670b, indicating a measure of the aggregate TSFD wireless handset 300, TSFD wireless X-DatCom 400, TSFD wireless PC-DatCom Card 500, TSFD wireless ComDoc 900 transmission activity in the microcell. An uplink power amplifier (PA) 662a & 662b is used to transmit the up-converted TSFD wireless handset 300, TSFD wireless X-DatCom 400, TSFD wireless PC-DatCom Card 500, TSFD wireless ComDoc 900 signals to the PNE 800. The uplink PA 662a & 662b provides an output level of at least 26 dBm across the entire PCS High band (1930 to 1990 MHz). The uplink PA 662a & 662b is able to transmit 66 signals at +4 dBm each simultaneously without damage. The uplink PA 662a & 662b also provides means for enabling and disabling the output. A downlink low noise amplifier (LNA) 666a & 666b is used to receive PNE signals for the Downlink Translator 620a & 620b. A downlink power amplifier (PA) 664a 664b is used to transmit the up-converted TSFD wireless handset 300, TSFD wireless X-DatCom 400, TSFD wireless PC-DatCom Card 500, TSFD wireless ComDoc 900 signals to a PNE 800. The downlink PA 664a & 664b provides an output level of at least 48 dBm across the entire PCS High band (1930 to 1990 MHz). The downlink PA 664 is able to transmit 99 signals at +25 dBm each simultaneously without damage. The downlink PA 664a & 664b also provides means for enabling and disabling the output.

PSE power amplifier gains of the three RF paths (uplink, downlink, local) are independently adjustable in 3 dB steps over a 60 dB range from 37 to 97 dB. The gain adjustments are usually made manually during installation based on the microcell size.

A control transceiver 680a & 680b is used to receive commands from the PNE 800 on the reference channel (RC) downlink, and to transmit acknowledgments and status reports on the RC uplink. The controller 670a & 670b is used to program the PSE 600 configuration and monitor status for reporting. The controller 670a & 670b programs the PSE 600 configuration, which consists of the Uplink, Downlink, and Local Translator frequencies, and the Uplink/Downlink PA output on/off state. The following information must be provided to the Controller:

Microcell Type (A1-3, B1-3, C1-3)
PCS Block (A-F)
Desired PA Output State (enabled or disabled)

The PSE Translator frequencies are configured based on the microcell type and PCS band as described above. The controller 670a & 670b accepts remote commands from the PNE 800 via the control transceiver 680a & 680b for programming the PSE 600 configuration. The controller acknowledges the PNE commands. The controller also provides a local port 672a & 672b such as an RS-232 for local programming of the configuration in the field from an external laptop computer and for all communications with the resident Parallel Computing Artificial Intelligence Distributive Routing Network computer. Upon power-up, the controller 670a & 670b sets the PSE configuration to the last configuration programmed. The controller periodically transmits status reports to the PNE 800 via the control transceiver 680a & 680b. The following information is included in the status report:

Microcell type (A1-3, B1-3, C1-3)
PCS band (A-F)
PA output state (on or off)
Uplink LNA RSSI reading
Power draw reading
Power source state (external or battery backup)

An uninterruptible power supply (UPS) 690a & 690b is used to power the PSE 600 equipment and buffer it from the external power grid. In the event of an external power grid outage, the UPS battery backup capability is able to operate the PSE 600 for an extended period of time.

Turning now to FIGS. 20 and 21; in alternate embodiment of the present invention, the TSFD Protocol PSE 600, an asynchronous communications system package, is analogous to a greatly over simplified "mobile switching center" or MSC in a cellular or PCS system. While an MSC may be compared to a telephone CO (central office) or TO (toll office), the PNE 800 more closely compares to a PBX (Private Branch Exchange), which connects to a CO or TO. The PSE 600 enables the TSFD wireless communication systems to function independently of an external network when attached via an internal network, to a PNE 800. These TSFD wireless communication systems, in which PSEs 600 and PNEs 800 are integral parts, are deployed as networks. These networks consist of one or more fixed PNE sites, with a number of fixed PSE 600 tower sites. The PNE 800 may also be a fixed tower site. The networks are essentially the infrastructure required to service TSFD wireless handsets 300, TSFD wireless X-DatComs 400, TSFD wireless PC-DatCom Cards 500 and TSFD wireless ComDocs 900 in a given geographical area. PSE sites serve as the geographical "footprint" of this asynchronous wireless network, literally extending the range of the PNE 800, whose function more closely resembles a traditional PCS base station complex. In all but catastrophic situations, the PNE 800 provides PSE wireless device cliental a viable external network interface. With the aid of TSFD wireless ComDoc 900 technology, even the PNE 600 may interface with external networks, creating a unique disaster-backup system. Overseen by an advisory Parallel Computing Artificial Intelligence-based Distributive Routing System 1300, PSE 600 can mimic a PNE 800 call completion duties during PNE disruptions or failures.

In an alternate embodiment of the present invention, FIGS. 20 and 21 depict block diagrams (Section A and Section B) of a PSE 600. The combination of these two figures, FIGS. 20 and 21, represents a complete and whole PSE, a PSE 600. The PSE 600, Sections A and Sections B serve as wireless signal relays and frequency-translators between TSFD wireless handset 300 (or other wireless TSFD devices) and either a PNE 800 or other TSFD wireless handset 300 (or other wireless TSFD devices). The PSE 600, as an asynchronous device, does not disassemble the wireless signals it receives from TSFD wireless devices. It merely changes the whole signal to another frequency and sends it on, amplified. To be able to know on what channel to send the signal on, a suggestion is given by the PNE 800 as to the appropriate channel pair to use to complete the call. The PSE 600 also rebroadcasts the signals created to attempt to reach a particular phone or other TSFD wireless device within the PSE 600 broadcast area. This is a rebroadcast of the CIC or Call Initiation Channel. The PNE 800 and the PSE 600 work together to locate a TSFD wireless device that is the potential recipient of the call being rebroadcast by the PSE 600. It would do no good to attempt to reach a TSFD wireless device if that device was located in some other PSE 600 area or was out of service completely. Only after the recipient of the call acknowledges its presence and willing PNEs 800 to receive the call, is the call setup completed by the PSE 600 and the calling device. The pattern of frequencies used and vacant are not the purview of the PSE 600 as no electronics exist within the PSE 600 system to determine status of the available spectrum. Organization and recommendations of which channel pair to utilize, is the job of the PNE 800 or in the case of PNE 800 failure, the Parallel Computing Artificial Intelligence-based Distributive Call Routing System 1300; the AI system. The distribution of the channels utilized by an PSE 600 are to be determined by algorithms written to place calls close together, allocating unutilized groups of channel pairs for grouping together in the case of data transfer by CCAP or CCAP+. These Sub Protocols of TSFD acquire clumps of channels and aggregate them together for "Broadband" data transfer or for the TSFD sub-protocol, IDDT for live direct digital streaming of video packeted signals. Then, having completed the transfer, "snaps" back to a single voice/data channel to determine transfer success (bit rate error verification). At no time is the PSE 600 actually instrumental in decision making for such data transfers. Oversight by the PNE 800 is the primary determinate of channel allocation or, in the event of catastrophic failure, the "All Present and Observing" Parallel Computing Artificial Intelligence-based Distributive Routing System 1300.

An additional embodiment defines aspects of the present invention as: Communication with the PSE 600 can be accomplished in several ways: (though not limited to the presented examples)

1. Bi-directionally between PNE 800 and PSE 600 on the CIC (Call Initiation Channel) via dedicated wireless link
2. Bi-directionally between PNE 800 and PSE 600 on the CIC (Call Initiation Channel) via dedicated Fiber Optic link
3. Bi-directionally between PNE 800 and PSE 600 on the CIC (Call Initiation Channel) via dedicated PSTN link
4. Bi-directionally between PNE 800 and PSE 600 on the CIC (Call Initiation Channel) via dedicated Direct Optical link-modulated bi-directional laser link
5. Bi-directionally between PNE 800 and PSE 600 on the CMC (Call Maintenance Channel) via dedicated wireless link
6. Bi-directionally between PNE 800 and PSE 600 on the CMC (Call Maintenance Channel) via dedicated Fiber Optic link 7. Bi-directionally between PNE 800 and PSE 600 via CMC (Call Maintenance Channel) via dedicated PSTN link
8. Bi-directionally between PNE 800 and PSE 600 on the CMC (Call Maintenance Channel) via dedicated Direct Optical link-modulated bi-directional laser link
9. Bi-directionally between first PSE 600 and second PSE 600 on the CIC (Call Initiation Channel) via dedicated Fiber Optic link
10. Bi-directionally between first PSE 600 and second PSE 600 on the CIC (Call Initiation Channel) via dedicated PSTN link
11. Bi-directionally between first PSE 600 and second PSE 600 on the CIC (Call Initiation Channel) via dedicated Direct Optical link-modulated bi-directional laser link
12. Bi-directionally between first PSE 600 and second PSE 600 on the CMC (Call Maintenance Channel) via dedicated wireless link
13. Bi-directionally between first PSE 600 and second PSE 600 on the CMC (Call Maintenance Channel) via dedicated Fiber Optic link
14. Bi-directionally between first PSE 600 and second PSE 600 on the CMC (Call Maintenance Channel) via dedicated PSTN link
15. Bi-directionally between first PSE 600 and second PSE 600 on the CMC (Call Maintenance Channel) via dedicated Direct Optical link-modulated bi-directional laser link
16. Bi-directionally between a satellite ground station and PSE 600 on the CIC (Call Initiation Channel) via dedicated satellite ground station link
17. Bi-directionally between satellite ground station and PSE 600 on the CMC (Call Maintenance Channel) via dedicated satellite ground station link
18. Bi-directionally between the Parallel Computing Artificial Intelligence-based Distributive Routing System 1300 and PSE 600 on the AI Interface
19. Bi-directionally between any TSFD wireless device (within the broadcast area of the PSE 600) and the PSE 600 on the CIC (Call Initiation Channel) via wireless TSFD signals
20. Bi-directionally between any TSFD wireless device (within the broadcast area of the PSE 600) and the PSE 600 on the CMC (Call Maintenance Channel) via wireless TSFD signals
21. Bi-directional data transfer and systems maintenance of the PSE 600 via the PSE 600-PC interface In yet another embodiment of the invention; regarding operations of TSFD wireless ComDoc 900, the TSFD wireless PC-DatCom Card 500 and/or the TSFD wireless X-DatCom 400 wireless TSFD devices and communications with the PSE 600, all methods ascribed to operating TSFD wireless handset 300, i.e.; CIC, CMC, etc. would be utilized. Unless otherwise stated, the TSFD wireless handset 300 illustrated in this embodiment also applies to other TSFD wireless devices.

Example: TSFD wireless ComDoc 900 usage by TSFD wireless handset 300 owner within a PSE 600 domain. It would still be necessary for the TSFD wireless handset 300 to access the PNE 800 "knowledge" of channel pair assignments via the CIC and CMC channels in order to place and complete a call from the TSFD wireless handset 300 to the TSFD wireless ComDoc 900 to an external network of choice (home PSTN line, Internet, Home Computer attached to TSFD wireless ComDoc 900, etc.). However, serious reduction in PNE 800 call routing assistance and complete elimination of PNE 800 call interfaces to external networks (PSTN, Internet, etc.) would be achieved.

Figure 29:
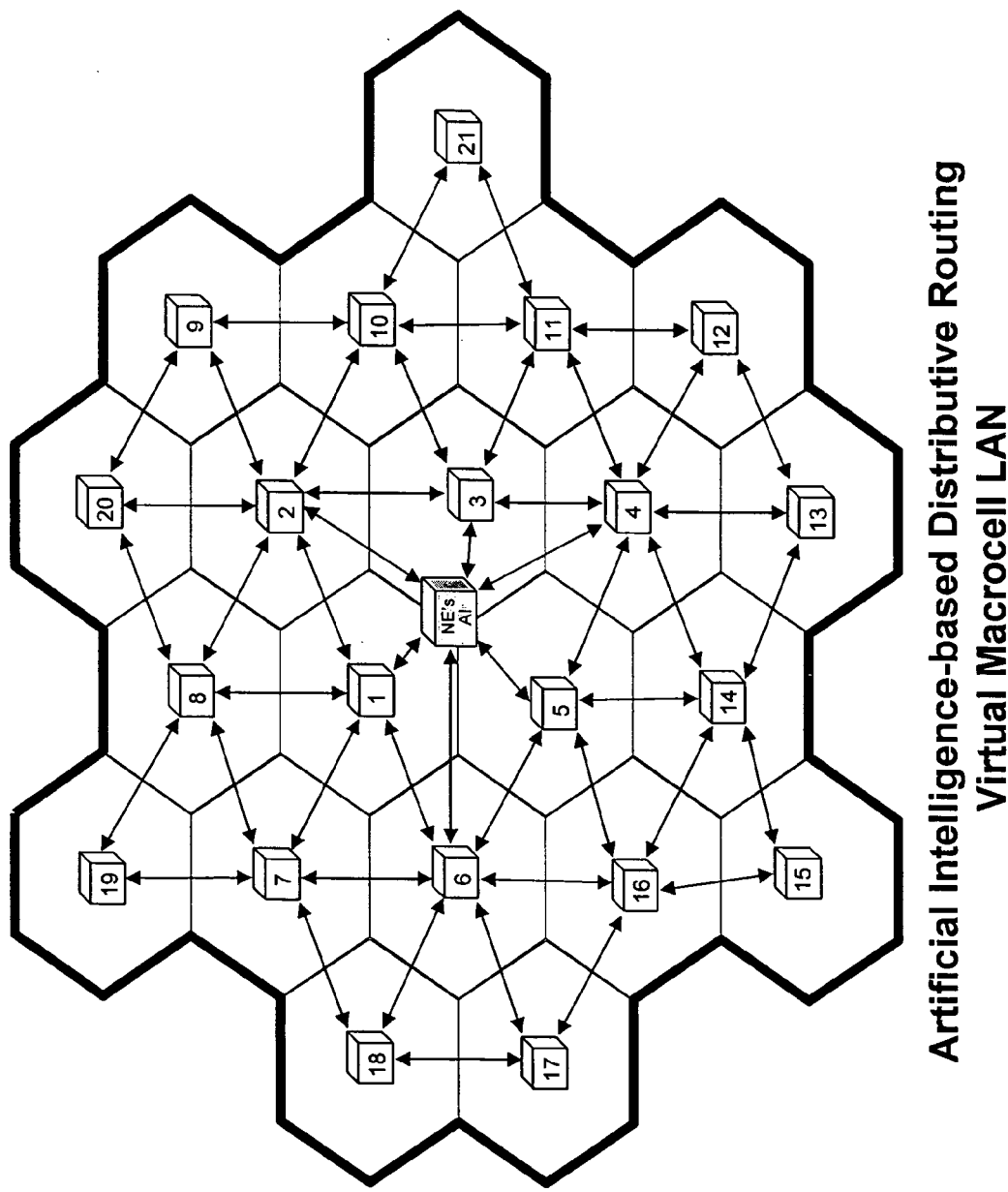
FIG. 29 shows the Artificial Intelligence-based Distributive Routing Virtual macrocell LAN.

The PNE 800 receives blocks of data in the PCS low band and up-converts them for re-transmission in the PCS high band, as discussed in relation to FIG. 4 through FIG. 7 and FIGS. 26 and 27. In this relay process, the PSE 600 amplifies the radio frequency signals to increase system range and coverage. The distinguishing feature of the PSE 600 is that it does not switch, process, or demodulate individual channels or signals; it is limited in function to relaying blocks of RF spectrum. This functional simplicity is intended to yield low infrastructure cost. Frequency translation is the primary function of the PSE 600. Three such translator functions shall be provided as follows:

Translator Type Relay Path
Uplink TSFD wireless handset 300 to PNE 800
Downlink PNE 800 to TSFD wireless handset 300
Local TSFD wireless handset 300 to TSFD wireless handset 300 Each translator is defined by the center frequency of the input spectrum block, the bandwidth of the block, and an up-conversion offset. The input center frequency is a programmable parameter based on the licensed PCS block (A-F) and the microcell type (A1-3, B1-3, C1-3). The bandwidth and up-conversion offset depend on the PCS block type (ABC or DEF). The three PSE 600 translator functions operate with the same bandwidth specifications. The 3-dB bandwidths are fixed at 275 kHz for 5-MHz PCS block types (DEF) or at 825 kHz for 15-MHz PCS block types (ABC). Signals more than 50 kHz from the band edges are rejected by at least 20 dB relative to the band centers. Signals more than 250 kHz from the band edges are rejected by at least 40 dB relative to the band centers. The three PSE 600 translator functions operate with the same frequency accuracy specifications. The input center frequency is accurate to within 2 kHz and the up-conversation offset is accurate to within 500 Hz. The uplink translator translates a block of TSFD wireless handset 300 signals to the PNE 800. The programmable up-conversion offset is 82.5 MHz for 5-MHz PCS block types (DEF) or 87.5 MHz for 15-MHz PCS block types (ABC). The programmable input center frequency is determined according to the following expression:

$$Fedge+Fguard+Bandwidth(Extended+0.5)$$

where Fedge, Fguard, and Bandwidth are given in the table presented in FIG. 29, which shows PCS block parameters for PSE 600 frequency translators. FIG. 30 shows the values of extended and local microcell type parameters for PSE 600 frequency translators used for the determination of center frequencies. The downlink translator translates a block of signals from a PNE 800 to the TSFD wireless handset 300. The programmable up-conversion offset is 77.5 MHz for 5-MHz PCS block types (DEF) or 72.5 MHz for 15-MHz PCS block types (ABC). The programmable input center frequency is determined according to the following expression:

$$Fmid+Fguard+Bandwidth(Extended+0.5)$$

where Fmid, Fguard, and Bandwidth are given in FIG. 29, and values for Extended are given in [FIG. 30]. The local translator translates a block of TSFD wireless handset 300 signals to other TSFD wireless handset 300. The up-conversion offset is fixed to 80 MHz. The programmable input center frequency is determined according to the following expression:

$$Fedge+Fguard+Bandwidth(Local+0.5)$$

where Fedge, Fguard, and Bandwidth are given in FIG. 29, and the value for Local is given in FIG. 30. The omni antenna is used for omni-directional PSE 600 communication with TSFD wireless handset 300 in a microcell. The antenna gain is between 2 dBi and 6 dBi. The directional antenna is used for directional PSEcommunication with the fixed PNE site. The antenna gain is 15 dBi, with a front-to-back ratio greater than 25 dB. The Optical Cable Interface utilizes a RF Transmission Translator (not shown) to interface an optical cable with the RF Duplexer section of the PSE 600 should there be no means of achieving a radio (antenna) PSE 600 to PSE 600 link. A similar Optical Cable interface method also enables PSE 600 to PNE 800 linkage should radio linkage fail. Internet linkage is also provided for active interface through the AI computer (not shown). This method would allow Internet telephony In a further embodiment of the present invention, duplexers are used to achieve isolation of the antenna signals between the transmit and receive frequency bands. This is required to allow full duplex, i.e., simultaneous transmit and receive, operation of the PSE 600. The duplexers provide transmit-receive (and receive-transmit) isolation of at least 80 dB. An uplink low noise amplifier (LNA) is used to receive the TSFD wireless handset signals for the uplink translator and local translator. The uplink LNA provides a received signal strength indicator (RSSI) output to the PSE controller, indicating a measure of the aggregate TSFD wireless handset transmission activity in the microcell. An uplink power amplifier (PA) is used to transmit the up-converted TSFD wireless handset signals to the PNE 800. The uplink PA provides an output level of at least 26 dBm across the entire PCS High band (1930 to 1990 MHz). The uplink PA is able to transmit 66 signals at +4 dBm each simultaneously without damage. The uplink PA also provides means for enabling and disabling the output. A downlink low noise amplifier (LNA) is used to receive PNE signals for the Downlink Translator. A downlink power amplifier (PA) is used to transmit the up-converted TSFD wireless handset signals to a PNE 800. The downlink PA provides an output level of at least 48 dBm across the entire PCS High band (1930 to 1990 MHz). The downlink PA is able to transmit 99 signals at +25 dBm each simultaneously without damage. The downlink PA also provides means for enabling and disabling the output. The PSE power amplifier gains of the three RF paths (uplink, downlink, local) are independently adjustable in 3 dB steps over a 60 dB range from 37 to 97 dB. The gain adjustments are usually made manually during installation based on the microcell size.

A control transceiver is used to receive commands from the PNE 800 on the reference channel (RC) downlink, and to transmit acknowledgments and status reports on the RC uplink. The controller is used to program the PSE 600 configuration and monitor status for reporting. The controller programs the PSE 600 configuration, which consists of the Uplink, Downlink, and Local Translator frequencies, and the Uplink/Downlink PA output on/off state. The following information must be provided to the Controller:

Microcell Type (A1-3, B1-3, C1-3)
PCS Block (A-F)
Desired PA Output State (enabled or disabled)

The PSE Translator frequencies; FIG. 28, are configured based on the microcell type and PCS band as described above. The controller accepts remote commands from the PNE 800 via the control transceiver for programming the PSE 600 configuration. The controller acknowledges the PNE 800 commands. The controller also provides a local port such as an RS-232 for local programming of the configuration in the field from an external laptop computer. Upon power-up, the controller sets the PSE 600 configuration to the last configuration programmed. The controller periodically transmits status reports to the PNE 800 via the control transceiver. The following information is included (but not limited to this example) in the status report:

Microcell type (A1-3, B1-3, C1-3)
PCS band (A-F)
PA output state (on or off)
Uplink LNA RSSI reading
Power draw reading
Power source state (external or battery backup)

An uninterruptible power supply 880 (UPS) is used to power the PSE 600 equipment and buffer it from the external power grid. In the event of an external power grid outage, the UPS battery backup capability is able to operate the PSE 600 for an extended period of time.

Further disclosure of the operational theory of the PSE 600 is presented by illuminating characteristics of system protocols, circuits and related physics of TSFD signal propagation, which are listed below:

1. Being an asynchronous device; i.e., a device that does not operate in a "Lock Step" fashion with other wireless devices. Serious savings in equipment costs can be garnered from the elimination of timing, multiplexing, modulation and demodulation, circuits within the PSE 600
2. Allowing each signal set (signals generated on one set of channel pairs) to merely be translated on to another set of channel pairs, amplified and rebroadcast, reduces PSE 600 circuit complexity; cost. A PSE 600 mimics a CB radio repeater as that system is akin to an "asynchronous" system.

Asynchronous functionality provides for the ability to cascade PSE 600 (sending a signal from one PSE 600 to another PSE 600 to another PSE 600 to a waiting TSFD wireless handset 300) signals over very long distances before the signal reaches a latency that is detectable (or objectionably) to a human's ear. This time maximum delay generated by repeating a signal over and over has been calculated to be about 80 milliseconds. That time delay translates into a PSE 600 to PSE 600 distance of almost 1,000 miles between starting TSFD wireless handset 300 and receiving TSFD wireless handset 300. The very best limit of a standard PCS base station utilizing a repeater is a theoretical limit of 27 miles. This number is based upon the knowledge that a wireless signal from one TSFD wireless handset 300 to another (with a base station and a repeater in between) must stay synchronized with both beginning TSFD wireless handset 300, the base station, the repeater and the receiving TSFD wireless handset 300. Measuring the speed of light as the constant for wireless signal transmission, 27 miles is the maximum distance a PCS signal may travel back and forth before loosing the synchronous "lock" on the signal required by the base station. No such limit exists with the PSE 600 TSFD Protocol as the beginning and ending wireless TSFD devices set the "lock" arrangements on the transmissions without regard to multiple PSE 600 re-transmissions. Were it not for an annoying time delay between sending and receiving TSFD signals between TSFD wireless handset 300 (Example: television reporters overseas demonstrate over 800 millisecond delays before responding to a question posed by a US reporter; due to this distance imposed delay), a TSFD signal could effectively be sent from the earth to the moon and back again with a delay of about 5½ seconds (5,000 milliseconds). Still, no synchronous "lock" would be required between an earth and a lunar handset.

Turning now to signal propagation: the PSE 600 demonstrates a simple, un-multiplexed signal transmission methodology wherein a signal is sent compressed 50%, received and decompressed and played back. While the decompression is occurring a signal on another channel is sent back to the sender of the 50% signal; also compressed 50%. Since this happens continuously (send, receive, send, receive) but never allowing both to send at the same time; the illusion of "Full Duplex" is created. This method, Time Shared Full Duplex or TSFD, eliminates the need for synchronous operations between TSFD wireless devices and a tower and expensive and complicated channel filtration to avoid crosstalk. Battery life is extended as transmissions are only on a 50% duty cycle. Excessive cranial exposure to microwave radiation is vastly reduced. Transmission of a clean, un-multiplexed signal allows for further signal propagation with less possibilities of failure due to an excessive bit error rate, interference by obstructions, multi-path, adverse atmospheric conditions, or excessive pressure on the electromagnetic spectrum due to broadcast overload. The TSFD propagation methodology has been likened to a rifle firing a projectile where as standard PCS propagation is analogous to a blast of bird shot from a shotgun. Rifle projectiles go further, shotgun projectiles drop quickly and lose power. However, on short distances, shotguns have their uses and their projectiles can be effective, as is WiFi for example.

The simple electronic package making up the PSE 600, does not require air conditioning or heating. Deviation in signal frequency generally attributed to temperature, is corrected by "locking" on to the GPS satellite system and correcting signal drift on a continuous, closed loop basis.

The number of effective channel pair within a PSE 600 broadcast capabilities is not fixed; i.e., it is a function of design not protocol. The TSFD system may be manufactured to operate on any frequency bandwidth between 50 megahertz and 5 gigahertz. Frequencies below 50 MHz do not have the capacity to carry enough calls to be economically effective. Distance is however a tremendous advantage between 50 and 450 MHz. Above 5 GHz, atmospheric limitations are the primary constraining factor. Distance also suffers as the signal is a line of sight, no forgiveness 800, short-haul functionality. Call carrying capacity is however, extremely efficient. Wherever the TSFD PSE 600 is scheduled to be deployed, licensing and frequency availability head the list. Call carrying capacity must be balanced with the other factors previously listed. Within the USA, the TSFD system is limited to the Blocked PCS spectrum and licensing arrangements. However, the TSFD system is not limited by spectrum frequency and must not be assumed to be constrained to the PCS Spectrum Block of the USA.

It must be noted that no signals are generated by the PSE 600 when there are no wireless calls being received and re-transmitted. Therefore, a TSFD wireless device that "wishes" to make a call and initiates the beginning procedures to do so has no predetermined set of channels emanating from the PSE 600 from which to choose. The TSFD wireless device, via the CIC and CMC channels, is given the suggestion of a frequency pair from which to choose. This pair is "created" by software within the device which reviews a library internally and references the stored frequencies to a GPS signal supplying a known value. Should any differences between the device's stored frequencies ascribed to a particular channel set and that of the referenced GPS adjustment factor be indicated, the device makes the necessary changes and commences broadcasting on the "assigned" channel pair.

After frequency translation and amplification by the PSE 600, a similar evaluation is made by the receiving TSFD wireless device to establish a solid link with the PSE 600. The receiving device received a frequency channel pair recommendation by the PNE 800 through the CIC and the CMC; relayed by the PSE 600. Once all parties accepted the suggestions and reported this acceptance to the PNE 800 via the PSE 600, the call initiation could be completed and conversation could begin. Still, the only frequencies emanating from the PSE 600 would be the first and second channel pairs utilized by the "connected" wireless devices; via the PSE 600. This yields low pressure on the electromagnetic spectrum and superior performance by the PSE 600 and the TSFD wireless devices operating within this "block" of frequencies assigned to their service. It lessens the chances of other adverse factors such as sunspots, rain, snow, sleet, dust, etc. causing disruptions of calls. It also improves signal clarity and reduces bit error rates overall.

PSE 600 may use whatever style of antenna deemed effective; i.e., directional, omni-directional, vertically polarized, horizontally polarized or any combination there of. Pre-manufactured "Smart" antennas are also allowed should such designs be deemed of value.

PSE 600 should have such internal and external security systems as to make them more likely to function for long periods of time. Security is defined as: any system both physical or software based, which secures the operation and functionality of the TSFD PSE 600 from unauthorized access or use. Cameras on a PSE 600 site should be used as well as motion sensors, locks, fences, signs, monitoring of noise within the PSE 600 electronics package, excessive heat detection (cutting torch), software-based detection of TSFD systems intrusion by hackers.

The TSFD wireless communication system is for the transmission of voice and data signals, enabling the establishing of a local communication path for transmitting and receiving signals between a local TSFD wireless handset 300 and a local communication docking bay within a same microcell via a PSE 600; establishing an extended communication path for transmitting and receiving signals between an extended TSFD wireless handset 300 and an extended communication docking bay located within different microcells positioned within a same macrocell via PSE 600 and a Parallel-configured Network Extender 800; establishing a distant communication path for transmitting and receiving signals between a distant TSFD wireless handset 300 and a distant communication docking bay located within different microcells positioned within different macrocells via PSE 600 and PNE 800; and asynchronously transmitting and receiving half-duplex signals over the communication paths using pairs of assigned communication path frequencies stabilized by a GPS-based frequency reference source.

This TSFD method enables the step of establishing a local communication path comprising the transmitting of signals from a local TSFD wireless handset 300 and a communication docking bay to a PSE 600; receiving and re-transmitting signals by the PSE 600 to the local TSFD wireless handset 300 and the communication docking bay; and receiving signals from the PSE 600 by a local TSFD wireless handset 300 and a communication docking bay.

The TSFD method also describes that half of the signals transmitted by a PSE 600 in a microcell are received by the TSFD wireless handset 300 and docking bays in the microcell in a high radio frequency band and half of the signals transmitted by the PSE 600 in a macrocell are received a PNE 800 in the macrocell in a high radio frequency band.

The TSFD method also shows the external network may be selected from the group consisting of a Public Switch Telephone Network 19, a fiber optic communication link, a coaxial cable, a public TCP/IP network, and a satellite communication link.

The TSFD method also shows that half of the signals received by a PSE 600 in a microcell are transmitted by TSFD wireless handset 300 and communication docking bays in the microcell in a low radio frequency band and half of the signals received by the PSE 600 in a microcell are transmitted by a PNE 800 in the macrocell in a low radio frequency band.

If examined further, the TSFD method shows that half of the signals transmitted by a PSE 600 in a microcell are received by the TSFD wireless handset 300 and communication docking bays in the microcell in a high radio frequency band and half of the signals transmitted by the PSE 600 in a microcell are received by a PNE 800 in the macrocell in a high radio frequency band.

This method, known as the Time Shared Full Duplex Protocol (TSFD), is the primary mode of operation comprising the TSFD wireless frequency protocol.

All TSFD wireless devices are multi-mode in functionality and as such, may select from any of the following group of wireless protocols consisting of (but not limited to) AMPS, D-AMPS, IS-95, IS-136, and GSM1 for their secondary mode of operation.

The TSFD method or protocol allows for the controlling an operational state of the wireless communication system by transmitting an operational state command to a PNE 800.

The TSFD Protocol allows the selection of external networks by a PNE 800 from the group consisting of a Public Switch Telephone Network (PSTN) 19, a fiber optic communication link, a coaxial cable, a public TCP/IP network, a Microwave link, a dedicated optical link, and a satellite communication link.

The TSFD network provides for the internal transmitting and receiving of information over a call maintenance channel for call completion, call request, 911 position report, call handoff frequency, call waiting notification, voice message notification, text message notification, and acknowledgement.

The TSFD network establishes that a microcell will comprise a geographical area containing one or more TSFD wireless handset 300 carried by mobile users, communication docking bays, and a PNE 600; and a macrocell comprise a geographical area containing between one and twenty one microcells, and a PNE 800.

The TSFD system is particularly suitable for operation in rural areas where population density is low and wireless coverage is either not currently available or not adequately serviced. The system is suitable for operation in the United States using the PCS spectrum (1850 or the Wireless Communications Service (WCS) spectrum at 2320 2360 MHz that are licensed by the Federal Communications Commission (FCC) or any other such frequency as may be determined suitable above 50 megahertz and less than 5 gigahertz. The TSFD wireless handset 300 and the TSFD wireless ComDoc 900 incorporate a modular multi-mode capability to extend the wireless service area with a potential variety of standard wireless formats and bands, such as AMPS, D-AMPS, IS-95, IS-136, and GSM1. This is an important feature because widespread deployment of a new wireless service takes appreciable time, and there are many other wireless standards from which to choose since these new customers may also venture into standard PCS or cellular markets. Besides the US rural market, other applications for present invention include emerging nations, especially those that presently have limited or no telephone service, and those communities or groups that require a stand alone wireless communication network that can be quickly and cost-effectively deployed.

There are many permutations and combinations of signal paths that are possible in the present system. For example, TSFD wireless handset 300 or TSFD wireless ComDoc 900 in the same microcell may communicate with one another via a PSE 600. TSFD wireless handset 300 or TSFD wireless ComDoc 900 in different microcells but within the dame macrocell may communicate with on another via PSE 600 and PNE 800. Since computers and conventional telephones may be connected to a TSFD wireless ComDoc 900, these devices may also communicate with other devices connected to the wireless network. Two or more computers may connect to one another via the wireless network at a minimum data rate of 56 kbps using Contiguous Channel Acquisition Protocol, or up to a maximum data rate of 250 kbps using Contiguous Channel Acquisition Protocol Plus; FIG. 10, via a single PSE 600. Similarly, since a laptop computer may be connected to a TSFD wireless handset 300, it may also communicate with other devices connected to the wireless network. Since a TSFD wireless ComDoc 900 may also be connected to a PSTN, cable or other communication network medium, a TSFD wireless handset 300 may communicate directly or indirectly via a PSE 600 to a TSFD wireless ComDoc 900 to a PSTN network or cable network. A TSFD wireless ComDoc 900 may also communicate via a PSE 600 and a PNE 800 to a PSTN network.

Within the TSFD system, the antenna pattern between the PSE 600 and TSFD wireless handset 300 is generally omni-directional since the TSFD wireless handset 300 are typically mobile throughout the surrounding area of the PSE 600. The antenna pattern between a TSFD wireless ComDoc 900 and a PSE 600 is also generally omni-directional, since the TSFD wireless ComDoc 900 operates on the same designated frequencies as the TSFD wireless handset 300 and may be moved to a new location at anytime. In contrast, the antenna pattern between the PSE 600 and PNE 800 can be a narrow beam since the PSE 600 and PNE 800 sites are both at fixed locations. The PSE 600 is analogous to a simplified "base transceiver station" or BTS in a cellular or PCS system. A key point to simplification is that the PSE 600 does not switch, process, or demodulate individual channels or calls. It is limited in function to relaying blocks of RF spectrum. The PNE 800 is a central hub and switch for interconnecting calls both within the system and to external networks such as the PSTN. The PNE 800 assists TSFD wireless handset 300 in establishing calls, assists in interconnecting TSFD wireless ComDoc 900 and TSFD wireless handset 300 within the TSFD service area, assists TSFD wireless ComDoc 900 to TSFD wireless ComDoc 900 data links within the TSFD service area, manages the voice/data and signaling channels, and effectively connects calls for PSEs 600 that are connected to the PNE 800. Since the PNE 800 must be in radio line-of-sight with the PSEs 600 that it services, its location site may be critical in system deployment. A hardware connection between the PSE 600 and the PNE 800 may substitute for difficult line-of-site deployments. The PNE 800 is analogous to a simplified "mobile switching center" or MSC in a cellular or PCS system. While an MSC may be compared to a telephone CO (central office) or TO (toll office), the PNE 800 more closely compares to a PBX (Private Branch Exchange), which connects to a CO or TO. The PNE 800 enables the wireless communication systems to function independently of an external network.

Within the PSE 600, each translator is defined by the center frequency of the input spectrum block, the bandwidth of the block, and an up-conversion offset. The input center frequency is a programmable parameter based on the licensed PCS block (A-F) and the microcell type (A1-3, B1-3, C1-3). The bandwidth and up-conversion offset depend on the PCS block type (ABC or DEF). The three PSE 600 translator functions operate with the same bandwidth specifications. The 3 bandwidth is fixed at 275 kHz for 5-MHz PCS block types (DEF) or at 825 for 15-MHz PCS block types (ABC). Signals more than 50 kHz from the band edges are rejected by at least 20 dB relative to the band centers. Signals more than 250 kHz from the band edges are rejected by at least 40 dB relative to the band centers. The three PSE 600 translator functions operate with the same frequency accuracy specifications. The input center frequency is accurate to within 2 kHz and the up-conversation offset is accurate to within 500 Hz. The uplink translator translates a block of TSFD wireless handset 300 signals to the PNE 800. The programmable up-conversion offset is 82.5 MHz for 5-MHz PCS block types (DEF) or 87.5 MHz for 15-MHz PCS block types (ABC). The programmable input center frequency is determined according to the following expression: $F_{edge}+F_{guard}+Bandwidth(Extended+0.5)$ where $F_{edge}$, $F_{guard}$, and Bandwidth are given in FIG. 29, which shows PCS block parameters for PSE 600 frequency translators.

In FIG. 29 $F_{edge}$ $F_{mid}$ $F_{guard}$ Bandwidth PCS Block (MHz) (MHz) (MHz) (MHz) A 1850 1857.5 0.012500 0.825000 B 1870 1877.5 C 1895 1902.5 D 1865 1867.5 0.037500 0.275000 E 1885 1887.5 F 1890 1892.5

FIG. 30 shows the values of extended and local microcell type parameters for PSE 600 frequency translators used for the determination of center frequencies.

Microcell Type Extended Local A1 0 1 B1 1 2 C1 2 0 A2 3 4 B2 4 5 C2 5 3 A3 6 7 B3 7 8 C3 8 6

The downlink translator translates a block of signals from a PNE 800 to the TSFD wireless handset 300. The programmable up-conversion offset is 77.5 MHz for 5-MHz PCS block types (DEF) or 72.5 MHz for 15-MHz PCS block types (ABC). The programmable input center frequency is determined according to the following expression:

$$F_{mid}+F_{guard}+Bandwidth(Extended+0.5)$$

where $F_{mid}$, $F_{guard}$, and Bandwidth are given in FIG. 29, and values for Extended are given in FIG. 30. The local translator translates a block of TSFD wireless handset 300 signals to other TSFD wireless handset 300.

The up-conversion offset is fixed to 80 MHz. The programmable input center frequency is determined according to the following expression:

$$F_{edge}+F_{guard}+Bandwidth(Local+0.5$$

where $F_{edge}$, $F_{guard}$, and Bandwidth are given in FIG. 29, and the value for Local is given in FIG. 30. The omni antenna is used for omni-directional PSE 600 communication with TSFD wireless handset 300 in a microcell. The antenna gain is between 2 dBi and 6 dBi. The directional antenna is used for directional PSE 600 communication with the fixed PNE 800 site. The antenna gain is 15 dBi, with a front-to-back ratio greater than 25 dB. Duplexers, are used to achieve isolation of the antenna signals between the transmit and receive frequency bands. This is required to allow full duplex, i.e., simultaneous transmit and receive, operation of the PSE 600. The duplexers, provide transmit-receive (and receive-transmit) isolation of at least 80 dB. An uplink low noise amplifier (LNA) is used to receive the TSFD wireless handset 300 signals for the uplink translator and local translator. The uplink LNA provides a received signal strength indicator (RSSI) output to the PSE 600 controller, indicating a measure of the aggregate TSFD wireless handset 300 transmission activity in the microcell. An uplink power amplifier (PA) is used to transmit the up-converted TSFD wireless handset 300 signals to the PNE 800. The uplink PA provides an output level of at least 26 dBm across the entire PCS High band (1930 to 1990 MHz). The uplink PA is able to transmit 66 signals at +4 dBm each simultaneously without damage. The uplink PA also provides means for enabling and disabling the output. A downlink low noise amplifier (LNA) is used to receive PNE 800 signals for the Downlink Translator. A downlink power amplifier (PA) is used to transmit the up-converted TSFD wireless handset 300 signals to a PNE 800. The downlink PA provides an output level of at least 48 dBm across the entire PCS High band (1930 to 1990 MHz). The downlink PA is able to transmit 99 signals at +25 dBm each simultaneously without damage. The downlink PA also provides means for enabling and disabling the output.

The PSE 600 power amplifier gains of the three RF paths (uplink, downlink, local) are independently adjustable in 3 dB steps over a 60 dB range from 37 to 97 dB. The gain adjustments are usually made manually during installation based on the microcell size.

A control transceiver is used to receive commands from the PNE 800 on the reference channel (RC) downlink, and to transmit acknowledgments and status reports on the RC uplink. The controller is used to program the PSE 600 configuration and monitor status for reporting. The controller programs the PSE 600 configuration, which consists of the Uplink, Downlink, and Local Translator frequencies, and the Uplink/Downlink PA output on/off state. The following information must be provided to the Controller:

Microcell Type (A1-3, B1-3, C1-3)
PCS Block (A-F)
Desired PA Output State (enabled or disabled)

The PSE 600 Translator frequencies are configured based on the microcell type and PCS band as described above. The controller accepts remote commands from the PNE 800 via the control transceiver for programming the PSE 600 configuration. The controller acknowledges the PNE 800 commands. The controller also provides a local port such as an RS-232 for local programming of the configuration in the field from an external laptop computer. Upon power-up, the controller sets the PSE 600 configuration to the last configuration programmed. The controller periodically transmits status reports to the PNE 800 via the control transceiver. The following information is included in the status report:

a. Microcell type (A1-3, B1-3, C1-3)
b. PCS band (A-F)
c. PA output state (on or off)
d. Uplink LNA RSSI reading
e. Power draw reading
f. Power source state (external or battery backup)

An uninterruptible power supply (UPS) is used to power the PSE 600 equipment and buffer it from the external power grid. In the event of an external power grid outage, the UPS battery backup capability is able to operate the PSE 600 for an extended period of time.

There is no formal or actual connection between the PSE 600 and the PSTN. The connection is accomplished by providing the PSE 600 its own set of TSFD wireless ComDocs 900.

VI. Parallel-Configures TSFD Network Extenders

Figure 22:
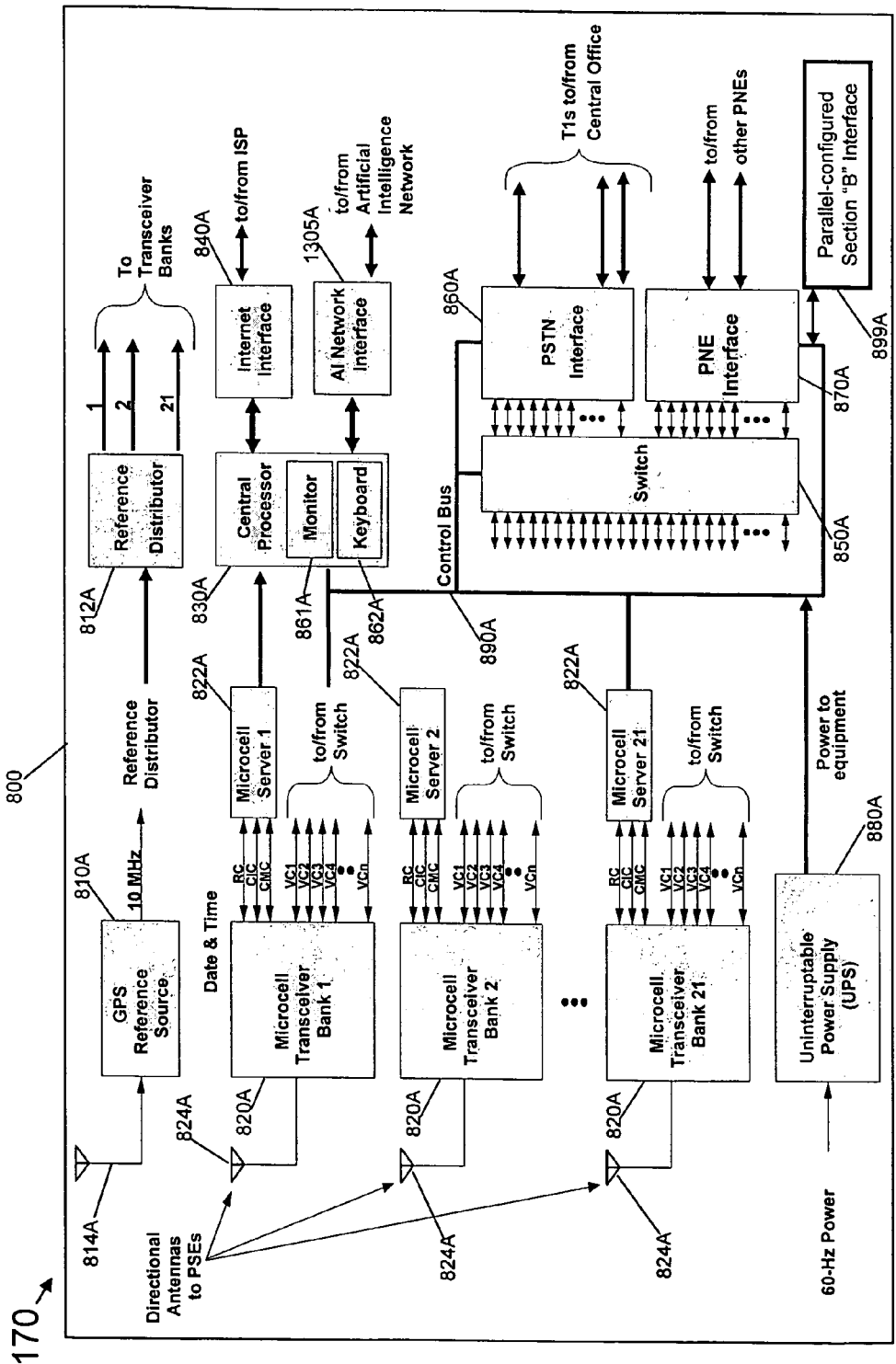
FIG. 22 shows section "A" in a block diagram of a Parallel-configured TSFD Network Extender.
Figure 23:
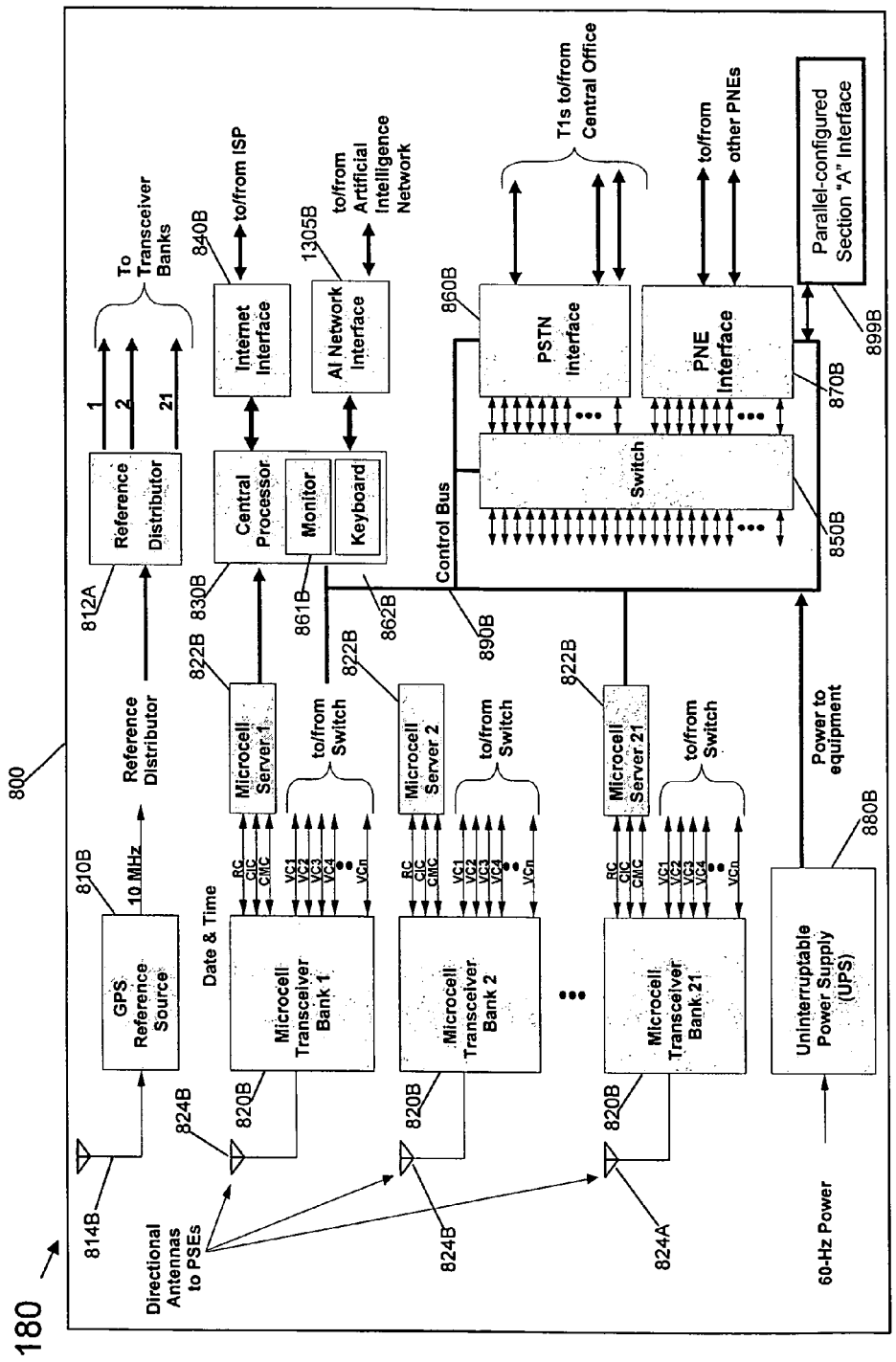
FIG. 23 shows section "B" in a block diagram of a Parallel-configured TSFD Network Extender.

Turning now to FIG. 22 and FIG. 23, FIG. 22 and FIG. 23 shows a PNE 800 where FIG. 22 represents Section A and FIG. 23 represents Section B; both Figures combined constituting a complete TSFD wireless Anchored component. Each section is a functional and independent Network Extender that works in parallel independent of the other section such that each section is providing a backup to the other section in case of failure of one section. This configuration of the PNE is termed as the Parallel-configuration, and the Network Extender is termed Parallel-configured Network Extender.

An alternative embodiment of the invention; the TSFD Protocol PNE 800, an asynchronous communications system package is analogous to a simplified "mobile switching center" or MSC in a cellular or PCS system. While an MSC may be compared to a telephone CO (central office) or TO (toll office), the PNE 800 more closely compares to a PBX (Private Branch Exchange), which connects to a CO or TO. The PNE 800 enables the TSFD wireless communication systems to function independently of an external network.

These TSFD wireless communication systems, in which PNE 800 are an integral part, are deployed as networks. These networks consist of one or more fixed PNE sites and a number of fixed, tower sites known as PSE sites, associated with each PNE 800. The PNE 800 may also be a fixed tower site. The networks are essentially the infrastructure required to service TSFD wireless handset 300, TSFD wireless X-DatComs 400, TSFD wireless PC-DatCom Cards 500 and TSFD wireless ComDocs 900 in a given geographical area. A network that includes multiple PNEs 800 must support the exchange of digital voice, signaling, data, remote system monitoring, sharing of system databases, voice-over IP, remote data retrieval, and remote control of instrumentation between PNE 800 in the network. These networks are isolated from external networks unless one or more PNE 800 are connected to a Public Switched Telephone Network (PSTN) 19, the Internet 15 (for Internet 15 services or voice-over-IP), to a dedicated fiber optic network, or other such external networks as may be required. With PSTN 19 access, these internal networks can support calls between isolated internal networks, as well as incoming and outgoing calls with other phones in the PSTN 19. Internet 15 access via Internet 15 service providers (ISPs) enable remote system monitoring, data entry, sharing of system databases, voice-over IP, remote data retrieval, and remote control of external devices while connection to a dedicated fiber optic cable provides a dedicated fiber optic network between PNEs 800 and or PSEs 600. The TSFD wireless communication system is comprised of macrocells, where each macrocell includes a PNE 800 communicating with a number of PSEs 600 that communicate with a number of TSFD wireless handsets 300, TSFD wireless X-DatComs 400, TSFD wireless PC-DatCom Cards 500 or TSFD wireless ComDocs 900. The PNEs 800 are connected together by communication backbones. PNEs 800 may also connect to a PSTN 19 via a trunk line to a central switching office. PNEs 800 may also connect to the Internet 15 via a connection to an Internet 15 service provider. Additional exotic external network interfaces may be provided: Satellite ground stations, microwave networks, Ham radio transceivers (in extreme emergencies), and line of sight optical communications links. Therefore, these wireless communication systems may also be interconnected through more traditional means: the Internet 15, a PSTN 19 connection, dedicated copper cables, dedicated fiber optic cables, dedicated microwave links, or a TSFD wireless ComDoc-to-PSTN 19 interface. The PNE 800 is the central routing point for a macrocell, and the external interface to other macrocells, a PSTN 19 and the Internet 15. The PNE 800 incorporates a Global Positioning System (GPS)-based reference source for use in stabilizing the local oscillators in wireless communication system transceivers.

In a detailed illumination of the present invention, the internal component number designators; i.e. (translator 820*a* & 820*b* for example) will be stated as 820*a* & 820*b*, as the Parallel-configured nature of the PNE's hardware and the internal operating software of FIG. 22 AND FIG. 23 must be addressed together; as the PNE is only complete with each Section functioning together.

The reference output frequency is 10 MHz at the nominal accuracy available from the GPS. The GRP reference source 810*a* & 810*ba* & 810*a* & 810*bb* provides a reference frequency used by the PNE 800 transceivers and transmitted to the PSEs 600, TSFD wireless handset 300, or TSFD wireless X-DatComs 400 via a Reference Channel downlink. In addition, the GRP reference source 810*a* & 810*ba* & 810*a* & 810*bb* provides date and time information for the macrocell, which is broadcast on the RC (Reference Channel) downlink. The GRP reference source 810*a* & 810*b* includes the GPS antenna and a backup reference source suitable to maintain frequency tolerance of RF (Radio Frequency) communication channels. The backup source is automatically selected in the event of GPS signal loss or receiver failure. A Reference Distributor 812*a* & 812*b* provides amplification and fan-out, as necessary, to feed the GPS reference signal to the microcell transceiver banks 820*a* & 820*b*. The PNE 800 uses directional antennas for communication with the fixed PSE 600 sites. The antenna gain is at least 15 dBi with a front-to-back ratio greater than 25 dB. There is one dedicated antenna for each PSE 600 supported by the PNE 800. Each PNE's 800 directional antenna for a microcell is connected to a microcell transceiver bank within the PNE 800. Each microcell transceiver bank contains a configurable number of transceivers for processing the extended path and signaling channels for the associated microcell. A microcell radio processor is contained within each macrocell receiver bank. Microcell servers connect to radios within the microcell transceiver banks 820*a* & 820*b* (inside the PNE 800) to perform control functions associated with a single microcell. The microcell server 822*a* & 822*b* communicates with the PNE central processor to route and manage calls that connect outside of the microcell. The PNE central processor is able to direct the microcell server 822*a* & 822*b* to promote a call from local mode to assisted mode, change frequency, or perform a handoff. The microcell server 822*a* & 822*b* coordinate control of calls on its microcell, including performing control operations of radios within its microcell transceiver banks 820*a* & 820*b*. The microcell servers 822*a* & 822*b* accumulate the data for the reference channel and feed it to the radio generating the RC. They also process requests on the CIC (Call Initiation Channel) and CMC (Call Maintenance Channel) and coordinate the required actions with the radios in its bank and the PNE central processor. A microcell server 822*a* & 822*b* may handle multiple transceiver banks. Each microcell server 822*a* & 822*b* includes an Ethernet interface to connect it to the local area network (LAN) of the PNE 800. This LAN connection permits the microcell server 822*a* & 822*b* to communicate with the PNE central processor and the radios to perform its control functions. The microcell server 822*a* & 822*b* coordinate communication between the PNE central processor and the microcell transceiver banks 820*a* & 820*b* in use. They also monitor non-responsive radios and dynamically remove them from the active use. The microcell server 822*a* & 822*b* are also able to relay status/diagnostic information and command shut down of radios not in an active configuration and to report these configuration changes to the PNE central processor. The microcell server 822*a* & 822*b* also monitor CIC and CMC requests and relay them to the PNE central processor and accept messages for the CIC and CMC and relay them to the microcell transceiver banks 820*a* & 820*b*. The PNE central processor coordinates call activity within the PNE 800. It processes call requests, call terminations, handoff requests, etc., and downloads control information to microcell server 822*a* & 822*b* and communicates with the PSTN 19 interface. The PNE central processor performs call setup, call tear down, call routing, and call handoff, and is responsible for performing authorization and billing. It is externally configurable over the Internet 15 using an Internet 15 interface. The PNE's 800 Central Processor essentially creates an electronic map of call activity within its domain: a Macrocell. This map is the combination of all known available channels in all microcells, all occupied channels, all contiguous channels, bandwidth availability for CCAP or CCAP+ data transfers; FIG. 9 & FIG. 10, the number of wireless sets in Active mode, Standby mode or Roaming mode. It also coordinates transfers (hand offs) from one microcell to another suggesting the next available frequency pairs to utilize and logging the previous calls into the Parallel Computing Artificial Intelligence-base Distributive Call Routing System 1300 system for analysis or assistance during a catastrophic failure. Tracking of frequency pairs utilized for wireless set to PSE 600 to TSFD wireless ComDoc or TSFD wireless X-DatCom to landline PSTN 19 and time of day for these activities. The PNE 800 Central Processor coordinates call activities for the macrocell, and performs authorization, billing, set up, and diagnostic functions. It coordinates calls originating or terminating within the macrocell. Calls may arrive from TSFD wireless handset 300 within the macrocell, TSFD wireless handset 300 within a distant macrocell with a dedicated link to this macrocell, or from a PSTN 19. This last case includes calls from a PSTN 19 connection over a dedicated PNE 800-PNE 800 link, since not every PNE 800 may have a PSTN 19 interface. Signaling from these various sources are evaluated and disposition of the call is determined. Calls may be routed in (but not limited to) the following ways:

1. Within a microcell using the local call mode (no PNE 800 handling of voice data)
2. Within the macrocell (routed through PNE 800 switch "a" & PNE 800 switch 800 "b" w/o decompression)
3. To a linked PNE 800 (routed through the PNE 800 switch "a" & PNE 800 switch 800 "b" to the linked PNE 800 w/o decompression)
4. To a local PSTN 19 connection (routed through the PNE 800 switch "a" & PNE 800 switch 800 "b" to the PSTN 19 gateway with decompression)
5. To a PSTN 19 connection on a remote PNE 800 (routed between NEs without decompression and then to PTSN with decompression)

Incoming calls are handled in a similar manner. The signaling is routed separately from the voice data. The PNE central processor provides source/destination information to the call terminating devices in the system (microcell server 822*a* & 822*b*/radios, PSTN 19 gateway, and remote PNE central processor/PSTN 19 gateway). It does not perform the routing function per PSE 600. For example, if there are two paths between two linked NEs, the PNE central processor depends on the switch to route the call appropriately. The software within the PNE central processor maintains a database of subscribers. Authorized users are able to add, delete, check status, and modify records associated with TSFD wireless handset 300 using the web page. Specifically, the PNE central processor performs the functions usually associated with the Authorization Center (AC), Home Location Register (HLR), and Visitor Location Register (VLR) of traditional cellular systems. The PNE 800 supports storage and programming of activation data using a secure web interface, which provides a way to program the information needed by the PNE 800 to activate TSFD wireless handset 300, TSFD wireless X-DatComs 400, TSFD wireless PC-DatCom Cards 500 or TSFD wireless ComDocs 900. The PNE central processor monitors outgoing calls, and accumulates a billing record of calls that are outside the calling region (i.e., toll calls). The billing record includes the TSFD wireless handset 300, TSFD wireless X-DatComs 400, TSFD wireless PC-DatCom Cards 500 or TSFD wireless ComDocs 900 placing the call via the PNE 800 and the PSTN 19 (i.e., account number), the number called, time of call, duration of call, and total charge for the call. This data is uploadable to a central billing system that is external to the PNE 800 over a secure communication link. No billing occurs for Long Distance calls placed via a TSFD wireless handset 300-PSE 600-TSFD wireless ComDoc-Home PSTN 19 line. This activity is however, noted and logged by the AI System to determine the load reduction on the PNE's 800 PSTN 19 Interface.

The PNE central processor handles set up information that is in addition to the subscriber records described above. The programmable information includes a unique identifier for the PNE 800, numbering information for PSTN 19 links, configuration values for the PNE 800 switch "a" & PNE 800 switch 800 "b", PSTN 19 interface, access to the Internet 15 (for wireless device web browsing) and PNE 800-PNE 800 links. It also includes configuration information for the microcells, including frequency block assignments, PSE 600 identifiers, encryption keys, and radio bank configuration (e.g., the number of radios in use for a particular bank). The PNE central processor supports electronic diagnostic activities of the PNE 800. Parallel activities are performed and logged by the AI system 1300.

The Internet 15 interface is the physical hardware that interconnects the PNE central processor to an Internet 15 service provider (ISP). The PNE 800 contains a mechanism to move (switch) voice/data between different radios, the PSTN 19, and external NEs. The switch is dynamically reconfigurable to permit calls to be routed automatically to the correct destination. The switch is fast enough to permit calls within a local wireless communication system to operate without perceptible delay. The PSTN 19 interface performs the protocol conversion between the typical PSTN 19 interfaces (T1 or E1) and the internal method used by the PNE 800 switch "a" & PNE 800 switch 800 "b". The PSTN 19 interface performs out-of-band signaling using Signaling System 7 (SS7) signaling protocol, such that the PNE 800 can act as a central office (CO). The PSTN 19 interface coordinates with the PNE central processor to place and receive calls involving the PSTN 19. The PNE 800 interface provides a fixed voice/data communication link for call routing to other NEs in the wireless network. The wireless communication system is configurable to support zero, one, or two external NEs. The PNE 800 interface supports three technology types: direct copper connections using DS-1 connections, direct fiber connections using OC-3 links, and radio links with the DS-1 bandwidth. The PNE 800 includes a control bus for routing data and control between the central processor and the microcell server 822*a* & 822*b*, a switch, a PNE 800 interface, and a PSTN 19 interface. The control bus may be a {fraction (10/100)}Mbps Ethernet LAN (local area network). An uninterruptible power supply (UPS) 880*a* & 880*b* is used to power the PNE 800 equipment and buffer it from the external power grid. In the event of an external power grid outage, the UPS battery backup capability is able to operate the PNE 800 for an extended period of time.

In an alternate embodiment of the present invention, specific Internal Systems: the GPS Reference Source and Distributor; where the PNE 800 shall incorporate a Global Positioning System (GPS)-based reference source 810*a* & 810*b* for use in stabilizing the local oscillators in TSFD system transceivers. The reference output frequency shall be 10 MHz at the nominal accuracy available from the GPS. The GRP reference source 810*a* & 810*b* shall be used by the PNE 800 transceivers and effectively transferred to the PSEs 600 and TSFD wireless handset 300 via the Reference Channel downlink. In addition, the GRP reference source 810*a* & 810*b* shall provide date and time information for the macrocell, which is broadcast on the RC downlink. The GRP reference source 810*a* & 810*b* shall include the GPS antenna, and a backup reference source suitable to maintain frequency tolerance of RF communications channels. The backup source shall automatically be selected in the event of GPS signal loss or receiver failure. The reference distributor shall provide amplification and fan-out, as necessary, to feed the GPS reference signal to the Microcell Transceiver Banks. The internal reference shall not be required to provide time-of-day information. The PNE 800 shall use directional antennas for communications with the fixed PSE 600 sites. The antenna gain shall be at least 15 dBi with a front-to-back ratio greater than 25 dB. There shall be one dedicated antenna for each PSE 600 supported by the PNE 800. Each antenna for a microcell shall be connected to a Microcell Transceiver Bank 820*a* & 820*b* within the PNE 800. Each Microcell Transceiver Bank 820*a* & 820*b* shall contain a configurable number of transceivers for processing the extended voice and signaling channels for the associated microcell. The microcell radio processor is central to the design of the radio bank. The processor shall be sized to support the functions of the PNE within its domain. The processor shall be software compatible with the TSFD wireless handset processor 320 (or other wireless TSFD devices with full software reuse. TSFD wireless handset processor 320 (where TSFD wireless handset means any TSFD mobile wireless device) shall have processor peripheral interfaces for interface to the following items within the PNE:

Vocoder (bi-directional)
Transmitter
Receiver
External Ethernet data connector

The microcell radio processor software shall support the functions of the PNE within its domain. The software shall be organized like the TSFD wireless handset 300 software (or other wireless TSFD device), with bootstrap software separate from the operational software. Software from the TSFD wireless handset 300 shall be reused for the microcell radio processor. Reusable software shall include (but shall not be limited to) the bootstrap, self-test, loader module, modulation, demodulation, and interface software (for common interfaces). The PNE software shall perform a minimum of the following protocols associated with the Ethernet interface:

Ethernet hardware interface
TCP/IP protocol stack
Berkeley sockets
H.248 (if necessary)

The software shall support conversion of voice, data or Integrated Direct Digital Transfer of live video streaming (packetized) with the TSFD Protocol; FIG. 11, between the internal TSFD format and μ-law. The software shall support operation as a control channel or voice channel. This configuration shall be possible under command from the PNE Central Processor or Microcell Server Processor (MSP 822*a* & 822*b*). The software shall also support providing diagnostic information to the PNE Central Processor or MSP 822*a* & 822*b* on demand. The software shall be able to shutdown the radio to conserve power or for the convenience of the PNE Central Processor or MSP 822*a* & 822*b*. The microcell server 822*a* & 822*b* within the PNE shall connect to radios within the channel bank to perform the control functions associated with a single microcell. The microcell server 822*a* & 822*b* shall communicate with the PNE central processor to route and manage calls that connect outside of the microcell. The PNE central processor shall be able to direct the microcell server 822*a* & 822*b* to promote a call from local mode to assisted mode, change frequency, or perform a handoff between microcells. The microcell server 822*a* & 822*b* shall coordinate control of calls on its microcell, including performing control operations of radios within its channel bank. The microcell server 822*a* & 822*b* shall accumulate the data for the reference channel and feed it to the radio generating the RC. It shall also process requests on the CIC and CMC and coordinate the required actions with the radios in its bank and the PNE central processor. A microcell server 822*a* & 822*b* shall be permitted to handle multiple radio banks.

The microcell server 822*a* & 822*b* processor (MSP 822*a* & 822*b*) shall be an industrial grade unit such as a single board computer. The processor shall include an Ethernet interface to connect it to the local area network (LAN) of the PNE 800. This LAN connection shall permit the MSP 822*a* & 822*b* to communicate with the PNE central processor, the radios to perform its control functions and the AI system. The MSP 822*a* & 822*b* shall be implemented using a ROMable operating system such as Windows XP. The MSP 822*a* & 822*b* shall permit its operating software to be downloaded for upgrade using a bootstrap configuration of the system. The MSP 822*a* & 822*b* shall include no rotating media for reliability. The MSP 822*a* & 822*b* software shall be a Windows application program. It shall coordinate communications between the PNE central processor and the microcell radio bank radios. The MSP 822*a* & 822*b* software shall relay signaling codes between the radios and the PNE central processor. The software shall also be able to relay status/diagnostic information and command shut down of radios not in use. It shall be able to monitor non-responsive radios and dynamically remove them from the active configuration. It shall be able to report these configuration changes to the PNE central processor. The MSP 822*a* & 822*b* software shall prepare the reference channel data and send it to the appropriate radio. It shall also monitor CIC and CMC requests and relay them to the PNE central processor. The software shall accept messages for the CIC and CMC and relay them to the radio. The PNE central processor shall coordinate call activity within the PNE 800. It shall process call requests, call terminations, handoff requests, etc. It shall download control information to microcell server 822*a* & 822*b* and communicate with the PSTN 19 interface control system. It shall perform call setup, call tear down, call routing, and call handoff. It shall be responsible for performing authorization and billing. It shall be externally configurable over the Internet 15 using a secure web interface. The status and controls available over the Internet 15 shall include stopping/starting individual PSEs 600, shutting down the entire system, monitoring system diagnostics, and managing user accounts such as activating new users. The PNE central processor shall be an industrial PC running Windows NT or XP. PNE Central Processor 830*a* & 830*b* Software; the PNE 800 Central Processor Software (PNECP 830*a* & 830*b*) shall coordinate call activities for the macrocell, and perform authorization, billing, set up, and diagnostic functions. The PNECP 830*a* & 830*b* (PNE 800 Central Processor Computer) shall coordinate calls originating or terminating within the macrocell. Calls may arrive from TSFD wireless handset 300 within the macrocell, TSFD wireless handset 300 within a distant macrocell with a dedicated link to this macrocell, or from the PSTN 19. The last case includes calls from a PSTN 19 connection over a dedicated PNE 800-PNE 800 link, since not every PNE 800 shall have a PSTN 19 interface. Signaling from these various sources are evaluated and disposition of the call is determined. Calls may be routed in the following ways:

Within a microcell using the local call mode (no PNE 800 handling of voice data)

Within the macrocell (routed through PNE 800 switch "a" & PNE 800 switch 800 "b" w/o decompression)

To a linked PNE 800 (routed through the PNE 800 switch "a" & PNE 800 switch 800 "b" to the linked PNE 800 w/o decompression)

To a local PSTN 19 connection (routed through the PNE 800 switch "a" & PNE 800 switch 800 "b" to the PSTN 19 gateway with decompression)

To a PSTN 19 connection on a remote PNE 800 (routed between NEs without decompression and then to PTSN with decompression)

Incoming calls are handled in a similar manner. The signaling shall be routed separately from the voice data. The PNECP 830a & 830b shall provide source/destination information to the call terminating devices in the system (microcell server 822a & 822b/radios, PSTN 19 gateway, and remote PNE central processor/PSTN 19 gateway). The PNECP 830a & 830b shall not perform the routing function per PSE 600. For example, if there are two paths between two linked NEs, the PNECP 830a & 830b shall depend on the switch to route the call appropriately.

The PNECP 830a & 830b shall provide call progress signaling out-of-band for the following situations: (but not limited to these examples)

Dial tone
 Busy signal (station is busy)
 Busy signal (network congestion is occurring)
 Ring return signal
 Recording warning signal
 Bong signal The PNECP 830a & 830b shall maintain a database of subscribers. The database will be maintainable using a secure website. Authorized users will be able to add, delete, check status, and modify records associated with TSFD wireless handsets 300, TSFD wireless X-DatComs 400, TSFD wireless PC-DatCom Cards 500 and TSFD wireless ComDocs 900 using the Subscriber Database website. The authorization function includes handling roaming TSFD wireless handsets 300, TSFD wireless X-DatComs 400, TSFD wireless PC-DatCom Cards 500 and TSFD wireless ComDocs 900. The PNECP 830a & 830b shall contact the appropriate remote TSFD system that is home to the roaming TSFD wireless handset 300, TSFD wireless X-DatCom 400, TSFD wireless PC-DatCom Card 500 and TSFD wireless ComDoc 900 and confirm authorization. Specifically, the PNECP 830a & 830b shall perform the functions usually associated with the Authorization Center (AC), Home Location Register (HLR), and Visitor Location Register (VLR) of traditional cellular systems.

The Operational State of the Subscriber Database can be controlled in the following manner by the PNE 800:

1. The PNE Central Processor 830a & 830b (PNECP 830a & 830b) exercises Static State Control over the Subscriber Database, located on a website on the Internet 15, containing all TSFD wireless handset 300, TSFD wireless X-DatComs 400, TSFD wireless PC-DatCom Cards 500 and TSFD wireless ComDocs 900 for activation, deactivation and billing privileges by predetermined and defined software parameters stored in the PNECP 830a & 830b's internal Memory.

2. The PNE Central Processor 830a & 830b (PNECP 830a & 830b) exercises Static State Control over the Subscriber Database, located on a website on the Internet 15, containing all TSFD wireless handset 300, TSFD wireless X-DatComs 400, TSFD wireless PC-DatCom Cards 500 and TSFD wireless ComDocs 900 for activation, deactivation and billing privileges by external instructions from a keypad, touch-active video screen within the PNE 800 housing or by such portable data storage medium as will facilitate uploading new data control instructions when inserted in the PNECP 830a & 830b's data drives.

3. The PNE Central Processor 830a & 830b (PNECP 830a & 830b) exercises Static State Control over the Subscriber Database, located on a website on the Internet 15, containing all TSFD wireless handset 300, TSFD wireless X-DatComs 400, TSFD wireless PC-DatCom Cards 500 and TSFD wireless ComDocs 900 for activation, deactivation and billing privileges by programming instructions received by transmissions from remotely located TSFD Network authorized personnel via the TSFD Network.

4. The PNE Central Processor 830a & 830b (PNECP 830a & 830b) exercises Static State Control over the Subscriber Database, located on a website on the Internet 15, containing all TSFD wireless handset 300, TSFD wireless X-DatComs 400, TSFD wireless PC-DatCom Cards 500 and TSFD wireless ComDocs 900 for activation, deactivation and billing privileges by programming instructions received by transmissions from remotely located TSFD Network authorized personnel via the PSTN 19, the Internet 15, direct copper connections using DS-1 connections, direct fiber connections using OC-3 links, radio links with the DS-1 hardware, an Earth-Satellite ground station for direct two-way communications with telecom satellites, the sending and receiving of short haul, ultra-wide-band optical communications via modulated Laser links.

5. The PNE Central Processor 830a & 830b (PNECP 830a & 830b) exercises Static State Control over the Subscriber Database, located on a website on the Internet 15, containing all TSFD wireless handset 300, TSFD wireless X-DatComs 400, TSFD wireless PC-DatCom Cards 500 and TSFD wireless ComDocs 900 for activation, deactivation and billing privileges by transmissions from the Parallel Computing Artificial Intelligence-base Distributive Call Routing System 1300-based Distributive Routing Computer located within the Environmental Housing of the PNE 800.

6. The PNE Central Processor 830a & 830b (PNECP 830a & 830b) exercises Static State Control over the Subscriber Database, located on a website on the Internet 15, containing all TSFD wireless handset 300, TSFD wireless X-DatComs 400, TSFD wireless PC-DatCom Cards 500 and TSFD wireless ComDocs 900 for activation, deactivation and billing privileges by transmissions from an Parallel Computing Artificial Intelligence-base Distributive Call Routing System 1300-based Distributive Routing Computer located within the TSFD PNE's 800 operational service area of captive PSEs 600 during a catastrophic failure within the TSFD Network.

The Dynamic State of the Subscriber Database can be controlled in the following manner by the PNE 800:

1. The PNE Central Processor 830*a* & 830*b* (PNECP 830*a* & 830*b*) exercises Dynamic State Control over the Subscriber Database, located on a website on the Internet 15, containing all TSFD wireless handset 300, TSFD wireless X-DatComs 400, TSFD wireless PC-DatCom Cards 500 and TSFD wireless ComDocs 900 for activation, deactivation and billing privileges by predetermined and defined software parameters stored in the PNECP 830*a* & 830*b*'s internal Memory.
2. The PNE Central Processor 830*a* & 830*b* (PNECP 830*a* & 830*b*) exercises Dynamic State Control over the Subscriber Database, located on a website on the Internet 15, containing all TSFD wireless handset 300, TSFD wireless X-DatComs 400, TSFD wireless PC-DatCom Cards 500 and TSFD wireless ComDocs 900 for activation, deactivation and billing privileges by external instructions from a keypad, touch-active video screen within the PNE 800 housing or by such portable data storage medium as will facilitate uploading new data instructions when inserted in the PNECP 830*a* & 830*b*'s data drives.
3. The PNE Central Processor 830*a* & 830*b* exercises Dynamic State Control over the Subscriber Database, located on a website on the Internet 15, containing all TSFD wireless handset 300, TSFD wireless X-DatComs 400, TSFD wireless PC-DatCom Cards 500 and TSFD wireless ComDocs 900 for activation, deactivation and billing privileges by programming instructions received by transmissions from remotely located TSFD Network authorized personnel via the TSFD Network.
4. The PNE Central Processor 830*a* & 830*b* exercises Dynamic State Control over the Subscriber Database, located on a website on the Internet 15, containing all TSFD wireless handset 300, TSFD wireless X-DatComs 400, TSFD wireless PC-DatCom Cards 500 and TSFD wireless ComDocs 900 for activation, deactivation and billing privileges by programming instructions received by transmissions from remotely located TSFD Network authorized personnel via the PSTN 19, the Internet 15, direct copper connections using DS-1 connections, direct fiber connections using OC-3 links, radio links with the DS-1 hardware, an Earth-Satellite ground station for direct two-way communications with telecom satellites, the sending and receiving of short haul, ultra-wide-band optical communications via modulated Laser links.
5. The PNE Central Processor 830*a* & 830*b* exercises Dynamic State Control over the Subscriber Database, located on a website on the Internet 15, containing all TSFD wireless handset 300, TSFD wireless X-DatComs 400, TSFD wireless PC-DatCom Cards 500 and TSFD wireless ComDocs 900 for activation, deactivation and billing privileges from programming instructions received by transmissions from the Parallel Computing Artificial Intelligence-base Distributive Call Routing System 1300-based Distributive Routing Computer located within the Environmental Housing of the PNE 800.
6. The PNE Central Processor 830*a* & 830*b* exercises Dynamic State Control over the Subscriber Database, located on a website on the Internet 15, containing all TSFD wireless handset 300, TSFD wireless X-DatComs 400, TSFD wireless PC-DatCom Cards 500 and TSFD wireless ComDocs 900 for activation, deactivation and billing privileges from programming instructions received by transmissions from an Parallel Computing Artificial Intelligence-base Distributive Call Routing System 1300-based Distributive Routing Computer located within the TSFD PNE 800's dynamic service area of captive PSEs 600 during a catastrophic failure within the TSFD Network.

PNE 800 Billing: the PNECP 830*a* & 830*b* shall monitor outgoing calls. Calls that are outside the TSFD calling region (i.e., toll calls) shall cause the PNECP 830*a* & 830*b* to accumulate a billing record. The billing record shall include the TSFD wireless handset 300, TSFD wireless ComDoc and/or TSFD wireless X-DatCom placing the call (i.e., account number), the number called, time of call, duration of call, such tariffs as apply and total charge for the call. This data shall be uploadable to a central TSFD billing system that is external to the PNE 800 over a secure Internet 15 link. The format of this billing data and location of storage is defined by whatever commercially available software is available and most suited to the task. PNE 800 Setup; the PNECP 830*a* & 830*b* shall include set up information on the secure website that is in addition to the subscriber records described above. The programmable information shall include a unique identifier for the PNE 800, numbering information for PSTN 19 links, configuration values for the PNE 800 switch "a" & PNE 800 switch 800 "b", PSTN 19 interface, and PNE 800-PNE 800 links. It shall also include configuration information for the microcells including frequency block assignments, PSE 600 identifiers, encryption keys, and radio bank configuration (e.g, the number of radios (and their position in the system) in use for a particular bank. Call-load handling algorithms, methods for securing and routing flexible bandwidth (CCAP or CCAP+) requests by subscribers for data transmissions within the PNE 800 Domain, dynamic (Ongoing and Pending Calls) storage of local voice and extended voice paths within the entire PNE 800 Macrocell, amount of PSTN 19 Interface usage (Call Load) savings generated by TSFD wireless handset 300, TSFD wireless X-DatCom 400, TSFD wireless PC-DatCom Card 500 and TSFD wireless ComDoc 900 Direct Access to PSTN 19 Landlines, shall also be stored. It must also be noted that the Parallel Computing Artificial Intelligence-base Distributive Call Routing System 1300-based Distributive Routing System 1300 shall have access to this setup information from the same secure website should the AI system detect a catastrophic failure of the PNE 800 or other such systems which could impair the PNE 800 from performing its assigned duties within the TSFD Network. PNE 800 Diagnostics; the PNECP 830*a* & 830*b* shall support diagnostic activities of the PNE 800. The PNECP 830*a* & 830*b* shall provide maintenance personnel a diagnostic interface over a secure website or on site from a keyboard, monitor and printer. The PNECP 830*a* & 830*b* shall provide the authorized user a way to command diagnostic reports from all subsystems (such as the microcell radio bank) and view the report data. The PNECP 830*a* & 830*b* shall also perform scheduled, automated, diagnostic tests of all subsystems and store these reports on the secure website. The PNECP 830*a* & 830*b* also delivers this accumulated diagnostic data to the AI Interface. PNE 800 Internet 15 Interface; the Internet 15 interface is the physical hardware that interconnects the PNE central processor to the Internet 15 service provider (ISP). This Interface shall provide security features from the latest commercially available software and hardware. The Internet 15 Interface shall access wideband cable ISP services.

In an alternate embodiment of the present invention, the AI Interface is the physical hardware that interconnects the PNE central processor to a discrete, Parallel Computing Artificial Intelligence-base Distributive Call Routing System 1300 software programmed PC style computer operating in the Microsoft Windows NT or XP format. The AI Interface allows an exchange of information between the PNE 800 Central Processor and the AI computer for the monitoring of internal electronic systems, efficiency of PNE 800 routing, call load evaluations, call distribution analysis between PSEs 600, number of TSFD wireless handset 300, TSFD wireless X-DatComs 400, TSFD wireless PC-DatCom Cards 500 and TSFD wireless ComDocs 900 present and active on the TSFD network, etc. The AI Interface allows communication with the PNE 800 Central Processor to suggest re-routing of excessive call loading, suggest redistribution of data traveling on the TSFD Network between TSFD wireless ComDoc's or TSFD wireless handset 300 and Computers utilizing the CCAP or CCAP+ Sub-protocol of TSFD or changing the operational state of ANY of the systems or subsystems on the TSFD Network. PNE 800 Switch; the PNE 800 shall contain mechanisms to move (switches) voice data between different radios, the PSTN 19, and external NEs. These switches shall be dynamically reconfigurable to permit calls to be routed automatically to the correct destination. They shall be fast enough to permit calls within a local TSFD network to operate without perceptible delay. These switches shall perform with minimal jitter so as to preserve near-toll-quality calls. Switches shall also be present to deactivate the Circuit "A" PNE 800 Primary Circuitry and activate Circuit "B" PNE 800 Secondary Circuitry during a catastrophic failure of the Primary System. This activation shall be dynamically reconfigurable by the AI System to affect the most reliable transfer of duties between the "A" and "B" circuits. PNE 800 PSTN 19 Interface; the PSTN 19 interface shall perform the protocol conversion between the typical PSTN 19 interfaces (T1 or E1) and the internal method used by the PNE 800 switch "a" & PNE 800 switch 800 "b". The PSTN 19 interface shall perform out-of-band signaling using Signaling System 7 (SS7) signaling protocol, such that the PNE 800 can act as a central office (CO). The PSTN 19 interface control computer shall coordinate with the PNE central processor to place and receive calls involving the PSTN 19. The number of external T1 or E1 lines connecting the PNE 800 with the PSTN 19 is entirely a function of the number of PSEs 600 deployed within the domain of the PNE 800; the macrocell. The number of wireless subscribers within the system will likely generate a PSTN 19 user connection level of approximately 12% based upon case histories of landline service. This will dictate the number of interface connections between PSE 600's and the PSTN 19 through the PNE 800. TSFD wireless ComDocs 900 however, will lighten this load as subscribers discover the ease of connecting to a landline that is unused. This alternative to external network connections lowers the business operating cost of the PNE 800 system operator and further simplifies the infrastructure. Further simplicity is ensured as the calling load on the PNE 800 can be reduced giving the PNE 800 a lower failure rate due to electronic fatigue.

The PNE 800 Interface shall provide a fixed voice/data communications link for call routing to other NEs in the TSFD network. The PNE 800 design shall be configurable to support zero, one, or two external NEs. The PNE 800 Interface design supports five technology types as follows. First, direct copper connections using DS-1 connections shall be supported. Second, direct fiber connections using OC-3 links are supported. Third, radio links with the DS-1 hardware. Fourth, an Earth-Satellite ground station for direct two-way communications with telecom satellites. Fifth, a method for the sending and receiving of short haul, ultra-wide-band optical communications via modulated Laser links. The PNE 800 design architecture permits redundant links between NEs for network reliability.

The PNE 800 shall include a Control Bus for routing data and control between the Central Processor and the Microcell Servers, Switch, PNE 800 Interface, and PSTN 19 interface. The Control Bus may be a $10/100$ Mbit Ethernet LAN (local area network).

The Uninterruptible Power Supply (UPS) is used to power the PNE 800 equipment and buffer it from the external power grid. The PNE 800 equipment power draw from the UPS will not exceed 2,500 Watts. In the event of an external power grid outage, the UPS battery backup capability shall be able to operate the PNE 800 for at least one hour. The batteries shall be rated to last at least 5 years in the field without replacement. The UPS shall include a master power switch. The environmental package for the electronics at the PNE 800 shall provide dry, clean, temperature-controlled air for the PNE 800 electronics. The package shall also provide lightning protection for enclosed equipment. Security and controlled access are included in the computer controlled entry interlocks. Biometrics may be utilized to admit only those individuals specifically certified within the security system's database. Unauthorized attempts to access the environmental enclosure of a PNE 800 will alert the AI system and authorized personnel.

In a further illumination of the present invention, the Operational State of all TSFD Subsystems can be controlled in the following manner by the PNE 800:

1. The PNE Central Processor 830*a* & 830*b* (PNECP 830*a* & 830*b*) exercises Static State Control over all TSFD wireless handset 300, TSFD wireless X-DatComs 400, TSFD wireless PC-DatCom Cards 500 and TSFD wireless ComDocs 900 for activation, deactivation and billing privileges by predetermined and defined software parameters stored in the PNECP 830*a* & 830*b*'s internal Memory.
2. The PNE 800 exercises Static State Control over all TSFD wireless handset 300, TSFD wireless X-DatComs 400, TSFD wireless PC-DatCom Cards 500 and TSFD wireless ComDocs 900 for activation, deactivation and billing privileges by external instructions from a keypad, touch-active video screen within the PNE 800 housing or by such portable data storage medium as will facilitate uploading new data instructions when inserted in the PNECP 830*a* & 830*b*'s data drives.
3. The PNE Central Processor 830*a* & 830*b* exercises Static State Control over all TSFD wireless handset 300, TSFD wireless X-DatComs 400, TSFD wireless PC-DatCom Cards 500 and TSFD wireless ComDocs 900 for activation, deactivation and billing privileges by programming instructions received by transmissions from remotely located TSFD Network authorized personnel via the TSFD Network.
4. The PNE Central Processor 830*a* & 830*b* exercises Static State Control over all TSFD wireless handset 300, TSFD wireless X-DatComs 400, TSFD wireless PC-DatCom Cards 500 and TSFD wireless ComDocs 900 for activation, deactivation and billing privileges by programming instructions received by transmissions from remotely located TSFD Network authorized personnel via the PSTN 19, the Internet 15, direct copper connections using DS-1 connections, direct fiber connections using OC-3 links, radio links with the DS-1 hardware, an Earth-Satellite ground station for direct two-way communications with telecom satellites, the sending and receiving of short haul, ultra-wide-band optical communications via modulated Laser links.

5. The PNE Central Processor 830a & 830b exercises Static State Control over all TSFD wireless handset 300, TSFD wireless X-DatComs 400, TSFD wireless PC-DatCom Cards 500 and TSFD wireless ComDocs 900 for activation, deactivation and billing privileges from programming instructions received by transmissions from the Parallel Computing Artificial Intelligence-base Distributive Call Routing System 1300-based Distributive Routing Computer located within the Environmental Housing of the PNE 800.

6. The PNE Central Processor 830a & 830b exercises Static State Control over all TSFD wireless handset 300, TSFD wireless X-DatComs 400, TSFD wireless PC-DatCom Cards 500 and TSFD wireless ComDocs 900 for activation, deactivation and billing privileges from programming instructions received by transmissions from an Parallel Computing Artificial Intelligence-base Distributive Call Routing System 1300-based Distributive Routing Computer located within the TSFD PNE's 800 operational service area of captive PSEs 600 during a catastrophic failure within the TSFD Network.

7. The PNE Central Processor 830a & 830b exercises Static State Control over all PSEs 600 for activation and deactivation by programming instructions received from predetermined and defined software parameters stored in the PNECP's 830a & 830b internal Memory.

8. The PNE Central Processor 830a & 830b exercises Static State Control over all PSEs 600 for activation and deactivation by external programming instructions received from a keypad, touch-active video screen within the PNE 800 housing or by such portable data storage medium as will facilitate uploading new data instructions when inserted in the PNECP 830a & 830b's data drives.

9. The PNE Central Processor 830a & 830b exercises Static State Control over all PSEs 600 for activation and deactivation by programming instructions received by transmissions from remotely located TSFD Network authorized personnel via the TSFD Network.

10. The PNE Central Processor 830a & 830b exercises Static State Control over all PSEs 600 for activation and deactivation by programming instructions received by transmissions from remotely located TSFD Network authorized personnel via the PSTN 19, the Internet 15, direct copper connections using DS-1 connections, direct fiber connections using OC-3 links, radio links with the DS-1 hardware, an Earth-Satellite ground station for direct two-way communications with telecom satellites, the sending and receiving of short haul, ultra-wide-band optical communications via modulated Laser links.

11. The PNE Central Processor 830a & 830b exercises Static State Control over all PSEs 600 for activation and deactivation by programming instructions received by hard-wired data transmissions from the Parallel Computing Artificial Intelligence-base Distributive Call Routing System 1300-based Distributive Routing Computer located within the Environmental Housing of the PNE 800.

12. The PNE Central Processor 830a & 830b exercises Static State Control over all PSEs 600 for activation and deactivation by programming instructions received by transmissions from an Parallel Computing Artificial Intelligence-base Distributive Call Routing System 1300-based Distributive Routing Computer located within the TSFD PNE 800's operational service area of captive PSEs 600 during a catastrophic failure within the TSFD Network.

The Dynamic State of all TSFD Subsystems can be controlled in the following manner by the PNE 800:

1. The PNE Central Processor 830a & 830b (PNECP 830a & 830b) exercises Dynamic State Control over all TSFD wireless handset 300, TSFD wireless X-DatComs 400, TSFD wireless PC-DatCom Cards 500 and TSFD wireless ComDocs 900 for activation, deactivation and billing privileges by predetermined and defined software parameters stored in the PNECP 830a & 830b's internal Memory.

2. The PNE 800 exercises Dynamic State Control over all TSFD wireless handset 300, TSFD wireless X-DatComs 400, TSFD wireless PC-DatCom Cards 500 and TSFD wireless ComDocs 900 for activation, deactivation and billing privileges by external instructions from a keypad, touch-active video screen within the PNE 800 housing or by such portable data storage medium as will facilitate uploading new data instructions when inserted in the PNECP 830a & 830b's data drives.

3. The PNE Central Processor 830a & 830b exercises Dynamic State Control over all TSFD wireless handset 300, TSFD wireless X-DatComs 400, TSFD wireless PC-DatCom Cards 500 and TSFD wireless ComDocs 900 for activation, deactivation and billing privileges by programming instructions received by transmissions from remotely located TSFD Network authorized personnel via the TSFD Network.

4. The PNE Central Processor 830a & 830b exercises Dynamic State Control over all TSFD wireless handset 300, TSFD wireless X-DatComs 400, TSFD wireless PC-DatCom Cards 500 and TSFD wireless ComDocs 900 for activation, deactivation and billing privileges by programming instructions received by transmissions from remotely located TSFD Network authorized personnel via the PSTN 19, the Internet 15, direct copper connections using DS-1 connections, direct fiber connections using OC-3 links, radio links with the DS-1 hardware, an Earth-Satellite ground station for direct two-way communications with telecom satellites, the sending and receiving of short haul, ultra-wide-band optical communications via modulated Laser links.

5. The PNE Central Processor 830a & 830b exercises Dynamic State Control over all TSFD wireless handset 300, TSFD wireless X-DatComs 400, TSFD wireless PC-DatCom Cards 500 and TSFD wireless ComDocs 900 for activation, deactivation and billing privileges from programming instructions received by transmissions from the Parallel Computing Artificial Intelligence-base Distributive Call Routing System 1300-based Distributive Routing Computer located within the Environmental Housing of the PNE 800.

6. The PNE Central Processor 830a & 830b exercises Dynamic State Control over all TSFD wireless handset 300, TSFD wireless X-DatComs 400, TSFD wireless PC-DatCom Cards 500 and TSFD wireless ComDocs 900 for activation, deactivation and billing privileges from programming instructions received by transmissions from an Parallel Computing Artificial Intelligence-base Distributive Call Routing Computer located within the TSFD PNE 800's dynamic service area of captive PSEs 600 during a catastrophic failure within the TSFD Network.

7. The PNE Central Processor 830a & 830b exercises Dynamic State Control over all PSEs 600 for activation and deactivation by programming instructions received from predetermined and defined software parameters stored in the PNECP 830*a* & 830*b*'s internal Memory.

8. The PNE Central Processor 830*a* & 830*b* exercises Dynamic State Control over all PSEs 600 for activation and deactivation by external programming instructions received from a keypad, touch-active video screen within the PNE 800 housing or by such portable data storage medium as will facilitate uploading new data instructions when inserted in the PNECP 830*a* & 830*b*'s data drives.

9. The PNE Central Processor 830*a* & 830*b* exercises Dynamic State Control over all PSEs 600 for activation and deactivation by programming instructions received by transmissions from remotely located TSFD Network authorized personnel via the TSFD Network.

10. The PNE Central Processor 830*a* & 830*b* exercises Dynamic State Control over all PSEs 600 for activation and deactivation by programming instructions received by transmissions from remotely located TSFD Network authorized personnel via the PSTN 19, the Internet 15, direct copper connections using DS-1 connections, direct fiber connections using OC-3 links, radio links with the DS-1 hardware, an Earth-Satellite ground station for direct two-way communications with telecom satellites, the sending and receiving of short haul, ultra-wide-band optical communications via modulated Laser links.

11. The PNE Central Processor 830*a* & 830*b* exercises Dynamic State Control over all PSEs 600 for activation and deactivation by programming instructions received by hard-wired data transmissions from the Parallel Computing Artificial Intelligence-base Distributive Call Routing System 1300-based Distributive Routing Computer located within the Environmental Housing of the PNE 800.

12. The PNE Central Processor 830*a* & 830*b* exercises Dynamic State Control over all PSEs 600 for activation and deactivation by programming instructions received by transmissions from an Parallel Computing Artificial Intelligence-base Distributive Call Routing System 1300-based Distributive Routing Computer located within the TSFD PNE 800's dynamic service area of captive PSEs 600 during a catastrophic failure within the TSFD Network.

PNE 800 RF Transmission Methodology: the present Time Shared Full Duplex (TSFD) PNE 800 and corresponding wireless communication system utilizes the Broadband PCS radio frequency spectrum, licensed in the United States by the FCC (Federal Communications Commission).

It should be noted however, TSFD is not limited technologically and may also be programmed for operations at other available frequencies around the world. TSFD may also be operated at substantially more restricted bandwidths or fundamentally higher frequencies than conventional PCS. The frequency range of 50 MHz to 5 GHz have been proven suitable for TSFD Protocol operations; however, with lower frequencies creating a substantial reduction in users of wireless devices when on the system. It has also been shown that a substantial transmission range increase is observed in the lower frequencies with a significant reduction in signal degradation. Frequencies above the "Hydrogen absorption" frequency (around 2.4 GHz) exhibit easy signal degradation with significant losses attributed to fog, rain, smog, pine needles, obstructions, etc., yet yielding an extraordinary subscriber load. Distance is also significantly decreased and line-of-sight is essential. Shorter distance means greater numbers of PSEs 600 increasing deployment costs. The frequency range that the Time Shared Full Duplex (TSFD) PNE 800 and corresponding wireless communication system covers in this U.S.A. disclosure, FIG. 4 and FIG. 5, is between 1850 megahertz and 1990 megahertz, and includes PCS low band and PCS high band. Licenses must be acquired for one or more PCS blocks, designated by the United States Federal Communications Commission as blocks "A through F". The PCS low band 42 is reserved for PSE 600 Receive frequencies, and the high band 44 for PSE 600 Transmit frequencies. Half of each band is reserved for signals between the PSEs 600 and the TSFD wireless handset 300, or between PSE 600's, TSFD wireless ComDocs 900 and TSFD wireless X-DatComs 400, with the other half for signals between the PSEs 600 and the PNE 800. A TSFD wireless ComDoc and the TSFD wireless X-DatCom communicate with a PSE 600 in the same manner that a TSFD wireless handset 300 communicates with a PSE 600. With duplex filtering and 80-MHz separation between the low band and high band, the PSE 600 can simultaneously receive and transmit signals without compromising receiver sensitivity. This frequency plan allows calls to take place asynchronously, which simplifies the design. Although many possible timing architectures may be used in the present wireless communication system, an asynchronous system architecture is selected to provide the best fit to the key requirements of cost, range and user density. This architecture or transmission "protocol" further simplifies the operations of the PNE 800 as this vital system component coordinates, but does not ultimately control, TSFD Network operations. Asynchronous operation of the present wireless communication system allows greater flexibility in system geographic layout, simpler digital protocol, and channel separation structure. Conventional digital cellular and PCS systems are designed such that synchronous operation with a tower structure is a necessity. CDMA cellular/PCS systems require synchronous operation to insure demodulation and precise coordination of power control and TDMA cellular/PCS systems require synchronous operation to prevent time slot interference. Synchronous operation allows the system design to make very efficient use of the assigned spectrum (high user density) for a given size geographic area for a trade-off in system complexity, cost, and flexibility. Synchronous operations require substantially more electronic hardware and far more complex software than the presently disclosed asynchronous wireless communications system. The present wireless communication system has lower density requirements (rural environment), so the advantages of asynchronous operation became very beneficial to the required cost effectiveness of the present system design. The present Time Shared Full Duplex (TSFD) PNE 800 and corresponding wireless communication system allows the PCS bands to be further divided into sub-bands dedicated for each of the 9 microcell types. Each microcell uses the sub-bands assigned for its particular type (alpha-numeric designator A1, A2, A3, B1, B2, B3, C1, C2, or C3) in order to preclude interference with adjacent microcells (since adjacent microcells are never of the same type). As illustrated in FIG. 3 and FIG. 4, these microcell sub-bands are 825 kHz wide for PCS blocks ABC, and 275 kHz wide for blocks DEF. The definition of 9 microcell types provides two additional non-adjacent types beyond the minimum 7 that are required for a hexagonal cell layout with frequency division multiple access (FDMA) shown below in "The Macrocell Frequency Division Multiple Access" diagram.

In an alternate embodiment, turn now to the territorial illustration, FIG. 3, of the Operational Domain of a PNE 800 servicing its corresponding wireless communication system.

For a microcell in this disclosed cell pattern illustrated in FIG. 3, the additional two non-adjacent types are the other two alpha designators with the same numeric designator. For example, the sub-bands for microcell types A2 and C2 are not used in the microcells adjacent to microcell B2. Sub-bands A1ML, A2ML, A3ML, B1ML, B2ML, B3ML, C1ML, C2ML and C3ML are assigned to communication from a TSFD wireless handset 300, TSFD wireless X-DatCom 400, TSFD wireless PC-DatCom Card 500 and TSFD wireless ComDoc 900 to a PSE 600. Sub-bands A1MH, A2MH, A3MH, B1MH, B2MH, B3MH, C1MH, C2MH and C3MH are assigned to communication from a PSE to a TSFD wireless handset 300, TSFD wireless X-DatCom 400, TSFD wireless PC-DatCom Card 500 and TSFD wireless ComDoc 900. Sub-bands A1XL, A2XL, A3XL, B1XL, B2XL, B3XL, C1XL, C2XL and C3XL are assigned to communication from a PNE 800 to a Signal Extender. Sub-bands A1XH, A2XH, A3XH, B1XH, B2XH, B3XH, C1XH, C2XH and C3XH are assigned to communication from a PSE to a PNE 800.

In a further embodiment of this invention, FIG. 4 illustrates the Sub-band communication layout in a TSFD Protocol system coordinated by a TSFD PNE 800.

In an alternate embodiment of the invention, FIG. 22 and FIG. 23 further illustrate: PNE 800 Rf Transmission Methodology; within the Operational Domain of a TSFD PNE 800 servicing its corresponding wireless communication system, the PNE 800 utilizes a de facto centralized call logging system. Although, the PNE 800 does not switch calls within Microcells; i.e. between (portable TSFD Devices) separate TSFD wireless handset 300 or TSFD wireless handset 300, TSFD wireless X-DatComs 400, TSFD wireless PC-DatCom Cards 500 or TSFD wireless ComDocs 900, the PNE 800 does keep track of all used and unused "channels" within each Microcell. A PNE 800 does complete routing from discrete PSE's 600 to other wireless devices or to external networks. Registration of TSFD wireless handset 300 (digital locking of a wireless TSFD wireless handset 300 into a PCS tower's control—Time code or Code control synchronous system) within a network, typical of PCS style wireless devices, is not required within the PNE's 800 territorial domain. This is unnecessary within TSFD protocol rules. However, when a portable TSFD device is "On" and ready for communication (sending or receiving) it does notify the PNE 800 of its presence through the nearest PSE 600's Call Initiation Channel, CIC. This "presence" and its Microcell Numerical Designation are logged as a reference by the PNE 800. Further announcements are unnecessary as the device is in a "Standby" mode ready for receiving a call. The wireless device receives ALL requests for a call "Connect" and merely references its own number against the number broadcast over the CIC for an acknowledged completion. No signals or carriers are generated in any channel pairs (Upper and Lower Frequency Blocks, as illustrated in FIG. 4) unless a call is initiated. This low "pressure" on the electromagnetic environment reduces noise and completely eliminates crosstalk in the TSFD network. With this concept established, it is prudent to define the role of the PNE 800 in frequency stability throughout the TSFD Network; the TSFD PNE 800 has been shown to provide a GPS-based and Network rebroadcast timing signal. The primary necessity of such a signal is the fact that no broadcast carriers exist in any systems in the TSFD network unless transmissions are in play. Therefore, it becomes necessary to establish certainty that a "Channel Pair" (say, Channel Pair Number 98) in one wireless device are the exact frequency Pair in all other wireless devices within the TSFD Network. Frequency drift in a narrowband transmission system is not acceptable. Locking in the GPS signal allows for frequency feedback loops to constantly retune digitally controlled frequency circuits to correct any potential frequency drift. Temperature variations due to crystal frequency drift in an oscillator are thus avoided and greatly simplified. However, it is extremely important to provide a temperature controlled backup crystal frequency oscillator for this reference frequency in every PNE 800 should the GPS system fail from some event such as a solar flare or a meteor shower.

In an alternate embodiment of the present invention, the terms Backup Systems—Redundancy are examined; wherein a PNE 800 cannot afford to be "offline". There will however, be inevitable events which render the system inoperative. It is therefore, imperative to specify electronic redundancy. Redundancy in its purest form however; i.e., a complete duplicate-backup system, is rejected in favor of a live, a deployment of parallel active circuitry capable of assuming total operations should any one of the separate circuits become inoperative.

As illustrated in FIG. 22 and FIG. 23 of this embodiment of the invention, the entire circuitry of the PNE 800 is operated in parallel should there be any detected system failure. Internally, the volatile memory is not specifically backed up but operates in a Circuit A's, FIG. 22 and Circuit B's, FIG. 23, parallel architecture. The hard drive in Circuitry "A" runs fulltime as a live drive; i.e. a drive which is fully operational with an exact working copy of all drive information. Such a parallel hard drive system is also found in the Secondary Circuitry "B" backup. This second drive pair also continuously acts as live drives to the Circuitry "A" drive pair. This assures a continuity of operations and information retention should Circuitry "A" fail completely. Administration of a switchover during failure is managed by the AI system. All switchovers of mechanical or electronic nature are accomplished by digital control over switching and routing devices and circuits for that purpose by the AI system or manually by keyboard instructions from human technicians. Further, all electronic subsystems in all TSFD PNE's 800 Circuitry "A" and in Circuitry "B", are wired to provide test points that are continuously monitored for safe operations by the AI Oversight system. A performance log is generated and stored for human and AI analysis. Following any suspicious (out of system specifications) measurements, the AI system alerts human service technical personnel via fax, wireless device, landline telephone, pager or other such method that has been established. The AI system incorporates vocalization and speech to precisely identify the problem aurally over the telephone or wireless device.

GPS-Based Wireless Device Location System within the Domain of a TSFD Protocol PNE 800; the triangulation analysis of Signal Extender-received distress calls from wireless devices located within the Domain of a TSFD PNE's 800 Microcells is the job of AI's analysis system. Individual wireless devices receive, continuously, the time, date and PSE Identification code via the nearest PSE 600. They also receive the GPS timing code for circuit stabilization. When a distress call to 911 is generated by the device user, the device bursts a 2 watt coded signal out to the surrounding area. The signal is burst for a period of milliseconds on the Distress Channel reserved for such communication and repeated until it is acknowledged automatically by the nearest PSE's Distress Call Sensor.

The PSE 600 time and date stamps the received signal and compares it to the encoded time and date stamp broadcast from the wireless device. The Distress Sensor and AI system in the PSE 600 calculate the distance measurement code generated by the subtraction time of the PSE 600 time and the Device time or transmission. This code is sent to the PNE 800. It is assumed that a 2 watt signal will be received by at least two other PSEs 600. Since the PSE 600's do not have a way to determine device direction from their towers, a distance circle is generated around the PSE 600's receiving the distress signal within the AI software. Since the individual PSE 600's are generally different distances from the distress caller's transmission point, the PSE 600's distance circles should intersect on a hypothetical AI map. This location is determined by the PNE 800 AI system and will then determine the exact transmission point of the distress call. Once the position is precisely resolved, the PNE's AI system 1300 will initiate a call to local civil authorities with a patch-through call completion from the distressed caller. Completion time should be well within 45 seconds for the caller's location to appear on the EMS Call Center operator's computer screen. The format of this exercise in an interface mode with civil authorities will be that format which is required in whatever location the TSFD PNE's 800 Domain occupies. Scientific estimates of TSFD PNE 800 AI Analyzed location for wireless device distress calls within a Macrocell are projected to be within 1 to 10 meters of certainty; based upon timing frequencies utilized.

Figure 24:
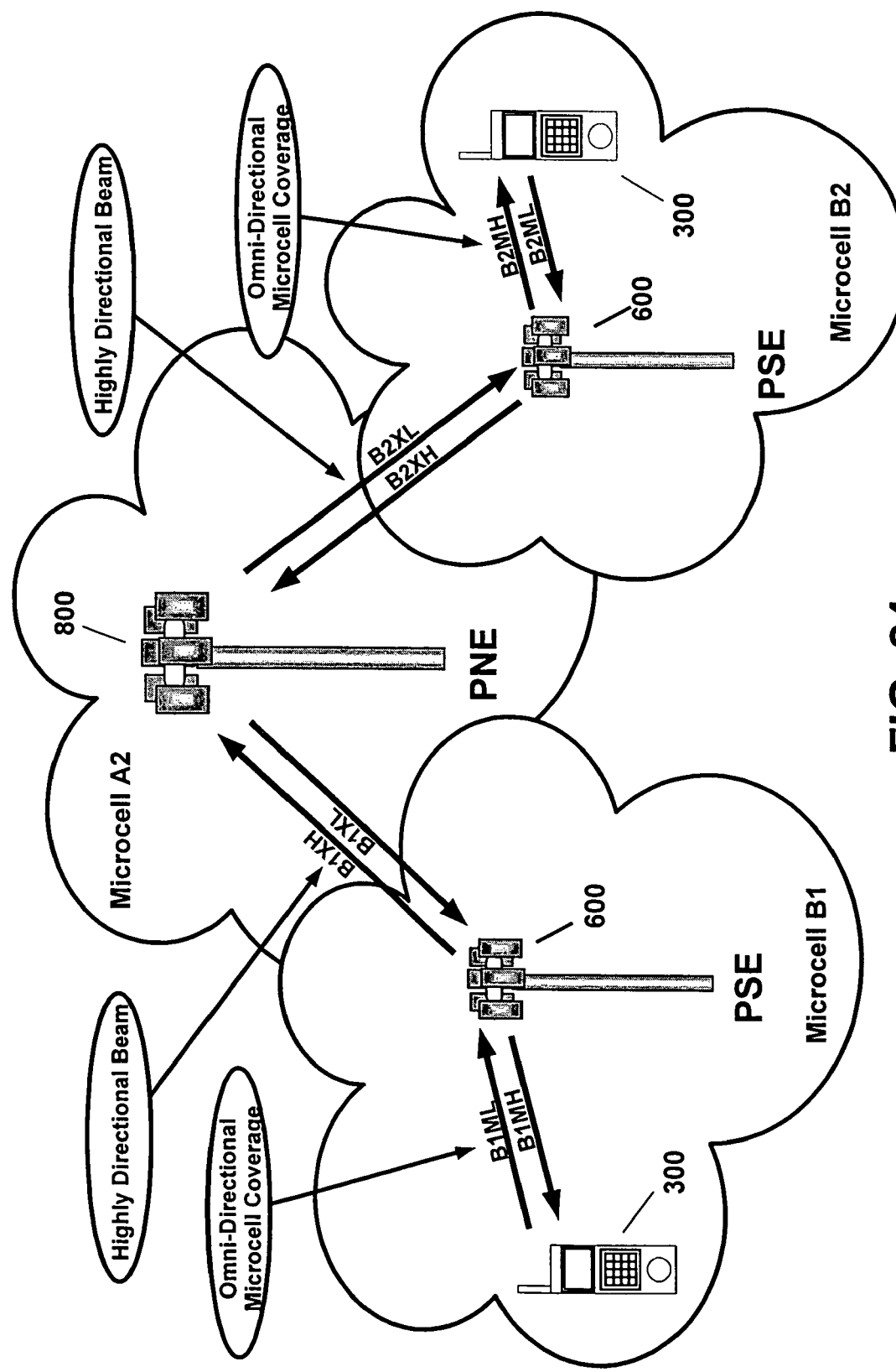
FIG. 24 shows a diagram of possible signal paths between 3 microcells and the TSFD communication frequency blocks utilized.
Figure 25:
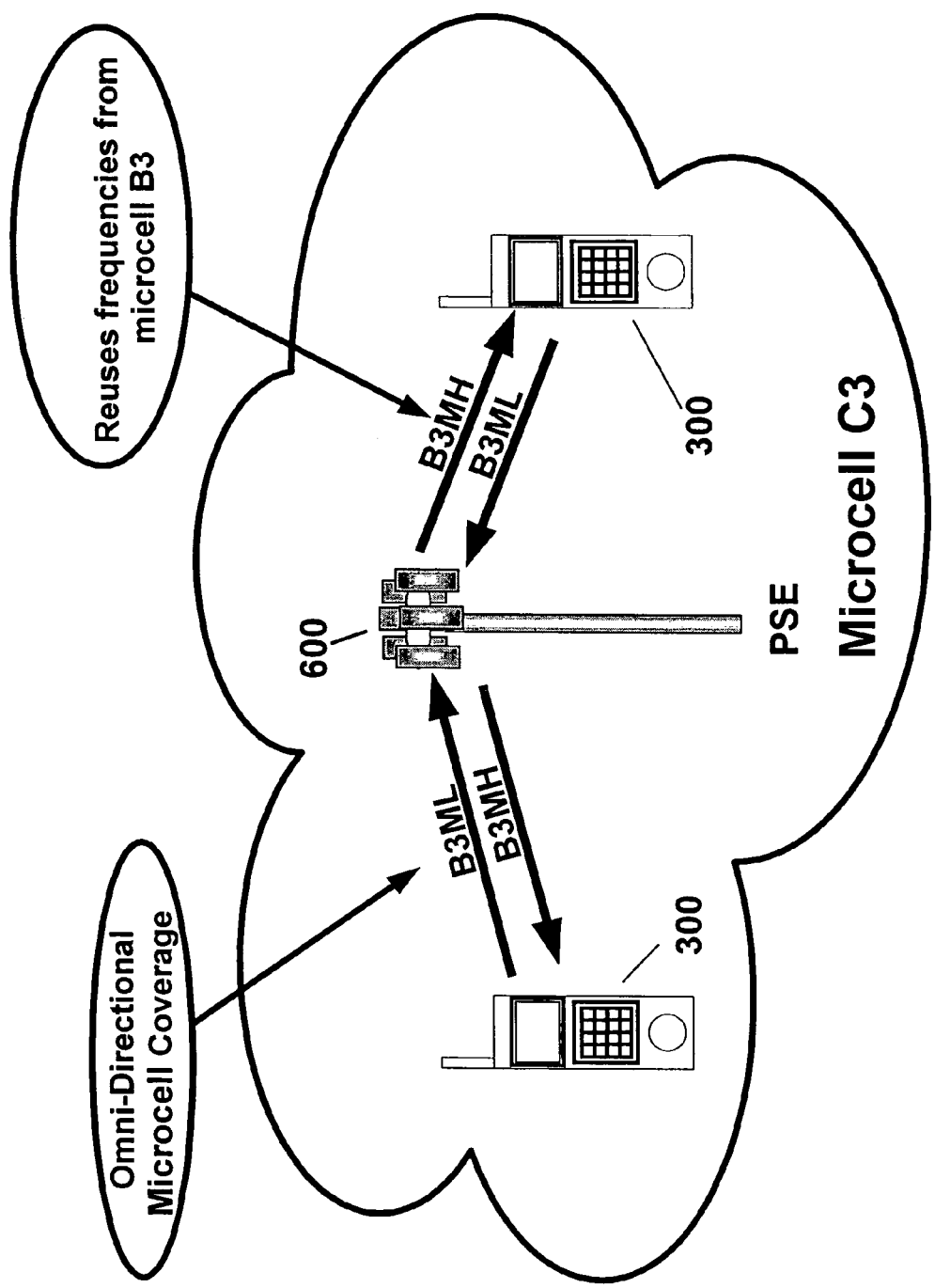
FIG. 25 shows a diagram of possible signal paths within a single microcell and the TSFD communications frequency blocks utilized.

In a further embodiment of the present invention, the methodologies of RF transmission oversight and routing must be detailed and examined and the specific responsibilities of the PNE 800 disclosed. FIG. 24 and FIG. 25 depict the physical relationships between TSFD wireless handset 300, PSEs 600, a PNE 800, microcells and a macrocell.

A macrocell is able to utilize the full amount of PCS spectrum that is licensed. This is achieved by including at least one microcell of each of the 9 types (A1-3, B1-3, and C1-3) in a macrocell, previously referenced. In addition, spectrum may be reused within a macrocell among non-adjacent microcells and through the use of directional antennas for the PSE 600-to-PNE 800 communication links, which are between fixed sites. The radio frequency (RF) waveform is produced using GMSK (Gaussian Minimum Shift Keying) modulation with a data rate of 16 kbps. Baseband filtering limits the 3-dB channel bandwidth to 12.5 kHz. The resultant waveform is a "constant envelope" type, meaning that there is no intended amplitude modulation. The wireless communication system RF coverage and range depend upon the RF parameters of the system (frequency, bandwidth, transmit power, receive sensitivity, antenna gain, etc.), the radio horizon, and the amount of signal occlusion in the line-of-sight between the PSE 600 and TSFD wireless handset 300. The RF parameters are specified so that the radio horizon is normally the limiting factor. The radio horizon is a function of the antenna heights and curvature of the earth. As an example, a PSE 600 antenna on top of a 100-foot tower can "see" TSFD wireless handset 300 located out to about 14 miles actual ground distance from the base of the tower. Terrain and man-made structures present the potential for signal occlusions, i.e., non-line-of-sight conditions, which reduce effective coverage and range. Urban propagation models for RF signals show a significant decrease in range compared to clear line-of-sight conditions. For example, the RF conditions that yield 253 miles of range when operated with a clear line-of-sight yield only 4 miles with the urban model. The deployment of the wireless communication system in rural areas alleviates the potential for urban occlusions, but terrain is still a factor. Microcell/macrocell layout and PSE 600/PNE 800 antenna site selection will be required for each installation based on careful planning, consideration, and test of the propagation conditions and physical constraints of the geographical area. The use of the 1.9-GHz PCS spectrum affects the range, amount of multi-path generated, and signal penetration capability compared to other frequency bands such as VHF and UHF, and therefore must be considered in site layout and planning.

In an additional embodiment of the invention, the phrase: TSFD PNE 800: Channelization Protocol is examined and illustrated. It is extremely important to understand the role of the PNE 800 in the operations of the entire TSFD Device compliment. Though autonomous in operation and design, all TSFD wireless systems and subsystems depend on the "guidance" of the PNE 800. When a call is made from one TSFD wireless handset 300 ("handset" can be understood to mean, in this discussion, any TSFD wireless devices) to another within a single microcell (within the coverage of one tower), the PNE 800 provides critical spectrum data allowing the TSFD wireless devices to access channels which are unoccupied. This data is also critical should one or both of the wireless sets physically leave the transmission area of the originating tower. Help with choosing a path for the signal to be maintained, (a handoff) is the job of the PNE 800. Knowing the previously occupied channels are now vacant is imperative. It therefore becomes extremely necessary for the system as a whole to "log" this change in location should another wireless set try to access the area where the first two devices originated. Without the PNE 800 keeping track of what channels are occupied throughout the entire system, the wireless sets would have to be extremely complicated and cumbersome. Channel monitoring by each TSFD wireless device (TSFD wireless handset 300, TSFD wireless X-DatComs 400, TSFD wireless PC-DatCom Cards 500 or TSFD wireless ComDocs 900) of ALL channels would be required and knowledge of the availability of channel pairs in other microcells would be unknown. A detailed knowledge of the methods and techniques of signal packaging, transmission and receiving between all TSFD wireless systems and subsystems is critical to understanding the "oversight role" of a TSFD PNE 800. How the spectrum is allocated and managed within the "domain" of a PNE 800 is of extreme importance. The PNE 800 makes suggestions on the routing or actually connects calls between wireless sets located in different microcells or from wireless sets within the TSFD system to telephones outside the PNE's 800 Domain. None of these actions can take place without methodologies (switching and allocation algorithms) inherent in the central processor of the PNE's 800 core electronics.

In an additional embodiment of the invention, the phrase: PNE 800 Radio Frequency Channelization Plan is reviewed and illustrated. The channelization protocol includes elements of control (signaling) and data (voice/data). The available RF spectrum is broken down into voice/data and signaling channels. To further illustrate an additional embodiment of the invention, FIG. 26 describes the number of channels per microcell per PCS block. All of these channels are "administered" by the PNE 800. Local Path channels, of which there are thousands (frequency reuse within the domain of the PNE 800), are tracked and suggestions for routing are made to the TSFD wireless devices attempting to complete calls without their signal traveling through the PNE 800. Knowing which channel pair is available for transmission without having to search the spectrum keeps the complexity of the TSFD wireless devices to a minimum. It also facilitates handing off the call when the wireless device begins moving outside the Local Path (Local Path: calls within a single PSE 600 where another wireless device is also residing) calling parameter; i.e. to another PSE 600. The total number of extended plus local channels may not be available for simultaneous use. A minimum total of 96 channels are required. Channels are comprised of a transmit/receive pair of frequencies separated by 80 MHz. The TSFD wireless handset 300 uplink (TSFD wireless handset 300 to PNE 800) uses two channel halves, one for TSFD wireless handset 300 to PSE 600, and one for PSE 600 to PNE 800. Similarly, the TSFD wireless handset 300 downlink (PNE 800 to TSFD wireless handset 300) uses the other halves of the same two channels, one for PNE 800 to PSE 600, and one for PSE 600 to TSFD wireless handset 300. The PSE 600 provides the necessary frequency translation for both the uplink and downlink; without demodulation or timing, as in traditional PCS systems. TSFD wireless handset 300 and PNE 800 channel pairs are different, but 80 MHz separates each pair. The fixed 80-MHz offset is built into the TSFD wireless handset 300 and PNE 800 transceiver designs to allow for microsecond switching between receive and transmit functions. Local path calls present an exception to the channel concept described in the preceding discussion because these calls do not have an uplink/downlink with the PNE 800. As a result, they use only one channel pair, which is shared between the two TSFD wireless handsets 300. The PSE 600 is still required to provide the frequency translation. However, as mentioned before, the PNE 800 is still required to advise exactly which channel pair is available within the microcell, though no voice/data signals during the call actually enter the PNE 800 for switching. Voice or data frames and packets are used to exchange information between a TSFD wireless handset 300, a TSFD wireless PC-DatCom Card 500, a TSFD wireless ComDoc, a TSFD wireless X-DatCom or a PNE 800. A number of voice data channels (VDCs) are used in each microcell to carry voice/data call traffic in the wireless communication system. Each VDC is dedicated to a single call (i.e., voice/data channels are not multiplexed) to simplify the design. Two VDC types are defined, extended path and local path. Four fixed physical frequencies from the microcell sub-band spectrum are allocated for each extended VDC (i.e., uplink from TSFD wireless handset 300 to PSE 600, uplink from PSE 600 to PNE 800, downlink from PNE 800 to PSE 600, and downlink from PSE 600 to TSFD wireless handset 300).

Further illustrative of the present invention: in contrast, the frequencies for the local VDCs are allocated from the sub-band spectrum of one of the two non-adjacent microcell types, which are identified by different alpha, but same numeric designator. For example, in microcell type B2, the local VDCs use the frequencies from microcell type A2 or C2. Since these cells are non-adjacent, interference is precluded. It is noted that for the local VDC, only two fixed physical frequencies are required (i.e., uplink from TSFD wireless handset 300 to PSE 600, downlink from PSE 600 to TSFD wireless handset 300) since the PNE 800 is not utilized. Local VDCs are contained within the microcell, while extended VDCs are connected through the PNE 800 to other microcells, macrocells, and/or the PSTN 19. Calls between TSFD wireless handset 300 located in the same microcell use local VDCs to increase system capacity by reducing the number of calls switched through the PNE 800. The use of separate sub-band blocks for extended and local path/data channels allows the PSE 600 to relay the extended VDCs to the PNE 800, and the local VDCs back within the microcell for receipt by other TSFD wireless handset 300. The number of VDCs in a microcell depends on the amount of spectrum that is available: 38 VDCs (19 local, 19 extended) in a 5-MHz block (D, E, or F) or 96 VDCs (63 max local, 63 max extended) in a 15-MHz block (A, B, or C). One VDC is required for each call in a microcell. Extended VDCs support one TSFD wireless handset 300 or TSFD wireless ComDoc. Local VDCs support two TSFD wireless handsets 300, or a TSFD wireless handset 300 and a TSFD wireless ComDoc, but still only one call. The advantage of the local VDC is that the TSFD wireless handset 300 share the channel (which saves a VDC), and the complementary channels for the uplink/downlink are not required (which saves two more VDCs). The result is one channel pair required versus four channel pairs for an extended path call. Whenever one of the TSFD wireless handset 300 on a local VDC call leaves the microcell, the call must be handed off to separate extended VDCs for each TSFD wireless handset 300. The VDC protocol is half-duplex on the physical channel, but is effectively full duplex from the user's perspective. This is achieved by buffering and encoding the digitized voice data, and transmitting it in packets at a higher data rate than is required for realtime decoding. As a result, the TSFD wireless handset 300 or any TSFD wireless device, is able to toggle back and forth between its transmit and receive functions at an even rate (50% transmit, 50% receive). The alternating transmit-receive "ping-pong" approach of TSFD is an advantage over traditional methods. (also saves batteries in a mobile wireless set and reduces head exposure to microwave emissions due to 50% active transmissions) Full-duplex transmit and receive functionality is not required of the TSFD wireless handset 300 or other wireless TSFD devices. Consequently the TSFD architecture specifies a transmit/receive (TR) switch instead of a duplexer, to significantly reduce cost, size, and weight. A 40 ms voice frame (20 ms transmit window, 20 ms receive window) will also be utilized, based on the vocoder (voice encoder/decoder) packet size. The frame length sets the minimum buffering delay since the voice signal must be fully acquired in realtime and packetized before transmission. Delays due to frame lengths much above 40 ms may become perceptible to the user. On the other hand, short frame lengths much less than 40 ms reduce efficiency and are not desired. Some call maintenance actions require that the TSFD wireless handset 300 drop a voice frame. This may be perceptible to the user but will be an infrequent occurrence. This approach allows the TSFD wireless device to use only one transmitter to conserve size, weight, power consumption, and cost. A small amount of in-band signaling data is available on the VDC, for example, DTMF (dual-tone multi-frequency) codes for digits dialed during a call, and call progress codes including hangup indication. This in-band signaling data is called "OH" for overhead data. 40 ms encoded voice frames are compressed into a transmit window voice packet and transmitted from the TSFD wireless handset 300 with overhead data OH. The voice and overhead packets are received as a received window voice packets by a TSFD wireless device and decompressed into 40 ms decoded voice frames. The reverse of this process is being carried on by another TSFD wireless device compressing and transmitting to the and TSFD wireless handset 300 where the voice frame is decompressed and decoded by the TSFD wireless handset 300. All TSFD wireless devices, including the PNEs 800 and PS's 600 are designed to use four channel Contiguous Channel Acquisition Protocol (CCAP) data frames and packets between a TSFD wireless handset 300 and another TSFD wireless device. 40 ms encoded voice frames are compressed into a transmit window data packet, reviewed and overseen by the PNE 800, which comprises four contiguous voice channels, and transmitted from the TSFD wireless handset 300 with overhead data OH. The data and overhead packets are received as a received window data packets by any TSFD wireless device and decompressed into 40 ms decoded data frames. The reverse of this process is carried on by another TSFD wireless device compressing and transmitting to the TSFD wireless handset 300, TSFD wireless X-DatCom 400, TSFD wireless PC-DatCom Card 500 and TSFD wireless ComDoc 900 where the data frame is decompressed and decoded. By using four contiguous voice channels to transmit data, the channel bandwidth is increased four-fold, or up to approximately 56 kbps. This feature enables a laptop computer connected to any mobile TSFD wireless device to communicate at a 56 kbps rate with a desktop computer connected to a TSFD wireless ComDoc. Other communication paths are also possible, such as a laptop connected to a TSFD wireless handset 300 communicating via a TSFD wireless ComDoc and a PSTN 19 to an Internet 15 service provider. If twelve contiguous voice channels were available to transmit data using a CCAP+ protocol; FIG. 10, the channel bandwidth may be increased twelve-fold, or up to approximately 250 kbps. The added bandwidths are obtained by adding adjacent channels together to obtain a higher data rate. Even more bandwidth is possible, though not disclosed within this document.

In an additional embodiment of the present invention, it is significant to note that all CCAP or CCAP+ transmissions are provided "pathways" within the PNE's 800 domain by the PNE 800 on a Call Initiation Channel. The PNE 800 knows (keeps an active log), as does the Parallel Computing Artificial Intelligence-base Distributive Call Routing System 1300-based Distributive Routing System 1300, exactly which channels are adjacent and available. More significantly, when a CIC request is made from any TSFD wireless device for any call, the PNE 800 makes a concerted effort to suggest grouping call channels fairly close together within each wireless Transceiver (PNE's 800 and PSE 600's) microcell that handles the transfer of signals as to establish a section of the spectrum for the possible transfer of data. This action by the PNE 800 is governed by mathematical models; algorithms, which detail the parameters of call channel usage. To avoid encroaching upon existing calls, all TSFD wireless devices agree to use these suggestions for call routing provided by the PNE 800. In creating the TSFD PNE 800 Reference Channel Framing, a single, shared Reference Channel (RC) is used in each microcell for broadcast to TSFD wireless handset 300 and TSFD wireless ComDocs 900, generated, initially, by the PNE 800. Four fixed physical frequencies from the microcell sub-band spectrum are allocated for the RC (i.e., uplink from TSFD wireless handset 300 to PSE 600, uplink from PSE 600 to PNE 800, downlink from PNE 800 to PSE 600, and downlink from PSE 600 to TSFD wireless handset 300), although the TSFD wireless handset 300, TSFD wireless ComDoc and TSFD wireless X-DatCom uplink is not utilized. The TSFD wireless handset 300, TSFD wireless ComDocs 900, TSFD wireless PC-DatCom Cards 500 and TSFD wireless X-DatCom's read the RC to identify the presence of service. Without the RC, the TSFD wireless handset 300, TSFD wireless X-DatComs 400, TSFD wireless PC-DatCom Cards 500 and TSFD wireless ComDocs 900 are inoperable. This eliminates the autonomous TSFD wireless devices from migrating into a service where they are not licensed to operate. Besides identifying wireless communication system service, the RC is used by the TSFD wireless handset 300, TSFD wireless ComDocs 900 and TSFD wireless X-DatCom's to adjust their internal frequency reference (typically a voltage-controlled temperature-compensated crystal oscillator or VCTCXO). This adjustment capability allows the TSFD wireless device to achieve increased frequency accuracy and stability and thus improved bit-error performance in demodulation of signals. The following information (thought not limited to the information listed) is also provided to the TSFD wireless handset 300, TSFD wireless ComDoc and TSFD wireless X-DatCom on the RC:

1. Date and Time
2. Microcell/Macrocell Identification Code
3. TSFD wireless handset 300/TSFD wireless ComDoc/TSFD wireless X-DatCom Attention Codes (supports the CMC, described below)
4. Broadcast Text Messages The PNE 800 also transmits special commands on the RC downlink that are addressed to the PSE 600 rather than the TSFD wireless handset 300, TSFD wireless ComDocs 900 or TSFD wireless X-DatCom's. These commands are used to remotely enable/disable the PSE 600 and assign the microcell type (which sets the frequency sub-blocks for use). Remote control of the microcell type provides system frequency agility. The RC uplink, while not used by the TSFD wireless handset 300, TSFD wireless X-DatComs 400, TSFD wireless PC-DatCom Cards 500 and TSFD wireless ComDocs 900, is used by the PSE 600 for command acknowledgement and status reporting to the PNE 800. There are 9 unique RC frequencies in the wireless communication system, one for each microcell type. TSFD wireless handset 300, TSFD wireless X-DatComs 400, TSFD wireless PC-DatCom Cards 500 and TSFD wireless ComDocs 900 continually scan the RCs in order to identify the TSFD wireless handset 300, TSFD wireless X-DatComs 400, TSFD wireless PC-DatCom Cards 500 and TSFD wireless ComDocs 900 microcell/macrocell location. This is accomplished by monitoring the RC power levels and reading the microcell/macrocell ID codes. Real-time tracking of TSFD wireless handset 300 microcell location is important for mobile wireless communication because handoffs are required when TSFD wireless handset 300 move between microcells. This feature could also apply to TSFD wireless ComDocs 900 and TSFD wireless X-DatComs 400, if they were to be relocated. In order to facilitate RC scanning while a call is active, TSFD wireless handset 300, TSFD wireless X-DatComs 400, TSFD wireless PC-DatCom Cards 500 and TSFD wireless ComDocs 900 architecture includes two parallel receivers; one dedicated to the VDC, and the other dedicated to RC scanning. TSFD wireless handset 300, TSFD wireless ComDocs 900, TSFD wireless PC-DatCom 500 and TSFD wireless X-DatCom's 400 receive functions are limited to about 50% duty factor when on a call. The length of the TSFD wireless handset 300, TSFD wireless X-DatComs 400, TSFD wireless PC-DatCom Cards 500 and TSFD wireless ComDocs 900 receive window is 20 ms based on the vocoder packet size. At the system 16 kbps data rate, 20 ms amounts to 320 bits. In order for the TSFD wireless handset 300, TSFD wireless X-DatCom 400, TSFD wireless PC-DatCom Card 500 and TSFD wireless ComDoc 900 to ensure receipt of a complete RC message, the message length must be less than ½ of the TSFD wireless handset 300/TSFD wireless ComDoc or TSFD wireless X-DatCom's receive window, or 10 ms, which amounts to 160 bits. In this case, for design purposes, the RC frame is limited to 150 bits. In order to meet this size limitation, data may be distributed across multiple frames resulting in a superframe. For example, broadcast messages are distributed across a superframe with only a few bytes in each frame. Each RC frame within the superframe is repeated four consecutive times before advancing to the next frame; this is referred to as a block. Each block should be the same length as the 40 ms transmit/receive voice frame. Repeating the RC frame transmission four times ensures that a complete 10-ms RC frame will fall within the 20-ms TSFD wireless handset 300/TSFD wireless ComDoc or TSFD wireless X-DatCom's receive window no matter where the receive window begins within the 40-ms block.

Additional embodiment of the present invention follows: wherein the TSFD PNE 800 Dedicated Service Sub-Protocol (DSSP) is used; the TSFD PNE 800 and all components within the TSFD system may be programmed to operate within a secure environment wherein the broadcasts of all systems and sub-systems are fully encrypted. Such operations could be utilized where a TSFD network provided frequency hopping, encrypted communications; i.e., for military or government deployment. This form of communications would be extremely difficult to decode as the signals would not be "tagged' with traditional message header information and would not remain on any given channel for any predictable time. Encryption and hopping algorithms would be changed rapidly by the PNE 800 and each TSFD wireless device would receive a code for determining the pattern.

The Parallel Computing Artificial Intelligence Computer-Based Distributive Routing System Turning now to FIG. 29 and FIG. 30, The Artificial Intelligence (AI) Computer Network is part of the Parallel Computing Artificial Intelligence-based Distributive Routing System (PACI), 1300 which is resident, but decentralized in the TSFD wireless communication system. The system comprise a network of computers; FIG. 29 and FIG. 30, having an AI computer residing in each PSE 600; wherein FIG. 29's numerical designators—1-21 define the AI computers, and each computer having an Artificial Intelligence software program to gather information regarding timely calling data, routing and wireless device use histories and to analyze the information for recommending or executing alternative communication paths within the entire system of the PSE 600 and the PNE 800 during excessive peak hours loading of the PNE 800 or during a catastrophic failure of any PSE 600 or the PNE 800; see FIG. 29 and FIG. 30. For example, the AI system learns by constantly polling all wireless devices for usage, polls the TSFD wireless ComDoc 900 several times a day and night to ask if the landline connected to it is in use and constantly watches the PNE 800 to determine call loading and signs of failure. A limit may also be set on the number of calls that the PNE 800 is handling that in turn triggers the Parallel Computing AI (PCAI) system to recommend to the system wireless sets with TSFD wireless ComDoc 900 use them or to PSEs 600 with dedicated TSFD wireless ComDoc 900 and PSTN lines to take the load off the PNE 800. In a preferred embodiment, the limit is 95% capacity at the PNE 800. The information obtained by the PCAI system can also be used to re-direct the communication paths to optimize call loads of the PSE 600 and PNE 800 in the system, or to bypass any failed PSE 600 or PNE 800 in the system The PCAI 1300 system may further report the day's gathered information to each of the other PSE 600 for comparative analysis and making logical suggestions to the handsets 300, TSFD wireless X-DatComs 400, TSFD wireless PC-DatComs 500 and TSFD wireless ComDocs 900 operating within the system. The PC Artificial Intelligence System 1300 may further be programmed to gather relevant data from remotely placed external data communications modules by means of a wireless protocol established for operations of the system. The wireless protocol is established for operations of the system interfaced with a network including but not limited to Public Switch Telephone Network 19 lines 800, a fiber optic communication link, a coaxial cable, a public TCP/IP network, a directional emergency tower to tower microwave link, a satellite communication link, a communication docking bay routed to other destinations and data collection devices selected by the Artificial Intelligence System.

In a further embodiment of the present invention, the PCAI 1300 system further observes and administers the TSFD protocol during an active catastrophic event in major TSFD Anchored Components. Within this purview of methodologies, the PCAI 1300 system administers the TSFD Protocol which utilizes the PCS spectrum as illustrated in FIG. 5. The PCS low band is reserved for PSE 600 receive frequencies, and the high band for PSE 600 transmit frequencies. Half of each band is reserved for signals between the PSEs 600 and the TSFD wireless handsets 300, between PSE's 600 and TSFD wireless ComDocs 900, or between PSE 600 and TSFD wireless X-DatComs 400 with the other half for signals between the PSEs 600 and the PNE 800. Regarding the wireless communications system depicted in FIG. 5, a TSFD wireless ComDoc 900 communicates with a PSE 600 in the same manner that a TSFD wireless handset 300 communicates with a PSE 600 and an TSFD wireless X-DatCom 400 also communicates with a PSE 600 in the same manner that a TSFD wireless handset 300 communicates with a PSE 600. With duplex filtering and 80-MHz separation between the low band and high band; as described in FIG. 4 & FIG. 5, the PSE 600 can simultaneously receive and transmit signals without compromising receiver sensitivity. This frequency plan, also administered by the PCAI during catastrophic failures, allows calls to take place asynchronously, which simplifies the design. Although, many possible timing architectures may be used in the present wireless communication system, an asynchronous system architecture was selected to provide the best fit to the key requirements of cost, range, user density and human limitations to perceptibility of delayed audio signals within the TSFD Protocol network. Asynchronous operation of the present wireless communication system allows greater flexibility in system geographic layout, simpler digital protocol, and channel separation structure. Conventional digital cellular and PCS systems are designed such that synchronous operation is a necessity. CDMA cellular/PCS systems require synchronous operation to insure demodulation and precise coordination of power control and TDMA cellular/PCS systems require synchronous operation to prevent time slot interference. Synchronous operation allows the system design to make very efficient use of the assigned spectrum (high user density) for a given size geographic area for a trade-offs in system complexity, cost, flexibility and limits on relaying signals within a cell site's control. The present wireless communication system has lower density requirements (rural environment), so the advantages of asynchronous operation became very beneficial to the required cost effectiveness 800 of the present system design. Human physiology is unable to detect delays in an audio signal of up to 80 milliseconds. Advantages of this asynchronous operation becomes very beneficial when sending signals from PSE 600 to PSE 600 over great distances that approach this 80 millisecond human threshold of detectability. Estimates by wireless engineers are in excess of 1,000 miles for the relaying of voice signals within this asynchronous system before the user becomes aware of a delay in the audio. No synchronous PCS system can even approach distances as great as 27 miles when relaying/repeating audio signals within a given cell tower's control; restricted by the speed of light and the absolute requirement to stay synchronized with the tower from which the audio signal derived and in which the TSFD wireless handset 300 is registered operationally. FIG. 5 also shows how the PCS bands are further divided into sub-bands dedicated for each of the 9 microcell types. Each microcell uses the sub-bands assigned for its particular type (alpha-numeric designator A1, A2, A3, B1, B2, B3, C1, C2, or C3) in order to preclude interference with adjacent microcells (since adjacent microcells are never of the same type). The microcell sub-bands are 825 kHz wide for PCS blocks ABC, and 275 kHz wide for blocks DEF. The definition of 9 microcell types provides two additional non-adjacent types beyond the minimum 7 that are required for a hexagonal cell layout with FDMA shown in FIG. 3. For a microcell in the cell pattern illustrated in FIG. 3, the additional two non-adjacent types are the other two alpha designators with the same numeric designator. For example, the sub-bands for microcell types A2 and C2 are not used in the microcells adjacent to microcell B2. Sub-bands A1ML, A2ML, A3ML, B1ML, B2ML, B3ML, C1ML, C2ML and C3ML are assigned to communication from a TSFD wireless handset 300, a TSFD wireless PC-DatCom Card, a TSFD wireless ComDoc 900 or an TSFD wireless X-DatCom 400 to a PSE 600. Sub-bands A1MH, A2MH, A3MH, B1MH, B2MH, B3MH, C1MH, C2MH and C3MH are assigned to communication from a PSE 600 to a TSFD wireless handset 300, a TSFD wireless PC-DatCom Card, a TSFD wireless ComDoc 900 or an TSFD wireless X-DatCom 400. Sub-bands A1XL, A2XL, A3XL, B1XL, B2XL, B3XL, C1XL, C2XL and C3XL are assigned to communication from a PNE 800 to a PSE 600. Sub-bands A1XH, A2XH, A3XH, B1XH, B2XH, B3XH, C1XH, C2XH and C3XH are assigned to communication from a PSE 600 to a PNE 800.

Again within a catastrophic failure, the PCAI system administers the TSFD system controlling PSE 600 power amplifier gains of the three RF paths (uplink, downlink, local), independently adjusting the system, as needed, in 3 dB steps over a 60 dB range from 37 to 97 dB. The gain adjustments are usually made manually during installation based on the microcell size. The PCAI system takes the place of human or mere mechanical intervention.

In another embodiment of the present invention, The Parallel Computing Artificial Intelligence (AI) Computer Network is presented in FIG. 29 and FIG. 30; wherein the Parallel Computing Artificial Intelligence (AI) Computer Network 1300 is part of the Parallel Computing Artificial Intelligence-based Distributive Routing System 1300 which is resident but decentralized over the entire the system. The system comprises a network of computers having a computer residing in each PSE, see FIG. 20 and FIG. 21, and each computer having an Parallel Computing Artificial Intelligence software program to gather information regarding timely calling data, routing and wireless device use histories and to analyze the information for recommending or executing alternative communication paths within the entire system of the PSEs 600 and the PNE 800 during excessive peak hours loading of the PNE or during a catastrophic failure of any PSE or the PNE. For example, the AI system learns by constantly polling all wireless devices for usage, polls the TSFD wireless ComDocs 900 several times a day and night to ask if the landline connected to it is in use and constantly watches the PNE to determine call loading and signs of failure. A limit may also be set on the number of calls that the PNE 800 is handling that in turn triggers the AI system 1300 to recommend to the system wireless sets with TSFD wireless ComDocs 900 use them or to PSEs with dedicated TSFD wireless ComDocs 900 and PSTN lines to take the load off the PNE. In a preferred embodiment, the limit is 95% capacity at the PNE. The information obtained by the AI system can also be used to re-direct the communication paths to optimize call loads of the PSEs 600 and PNEs 800 in the system, or to bypass any failed PSEs 600 or PNEs 800 in the system.

The AI system 1300 may further report the day's gathered information to each of the other PSEs 600 for comparative analysis and making logical suggestions to the TSFD wireless handsets 300, communications docking bays and External Data Communications Modules operating within the system. The Parallel Computing Artificial Intelligence System may further be programmed to gather relevant data from remotely placed external data communications modules by means of a wireless protocol established for operations of the system. The wireless protocol is established for operations of the system interfaced with a network including but not limited to four Public Switch Telephone Network 19 lines, a fiber optic communication link, a coaxial cable, a public TCP/IP network, a directional emergency tower to tower microwave link, a satellite communication link, a communication docking bay routed to other destinations and data collection devices selected by the Parallel Computing Artificial Intelligence System.

In an alternate embodiment, the Parallel Computing Artificial Intelligence-Based Distributive Routing for Time-Shared Full Duplex Wireless System's Physical Hardware, Resources required and Data Variables are defined:
1. TSFD Wireless TSFD wireless handsets 300
2. TSFD Wireless TSFD wireless ComDoc 900
3. TSFD Wireless TSFD wireless X-DatComs 400
4. TSFD Wireless Personal Computer Cards
5. TSFD Wireless PSEs 600
6. TSFD Wireless PNE 800
7. TSFD Dedicated Wirelines
8. TSFD Dedicated Fiber Optic Lines
9. TSFD Dedicated Microwave Links
10. TSFD Dedicated Optical Laser Links
11. TSFD Dedicated Satellite Links
12. TSFD Customer Database
13. TSFD Customer Database Internet Storage Address In additional disclosure of the present invention, Spatials are considered by the AI System for making accurate decisions:
1. Time of Day
2. Time Zone
3. Day
4. Month
5. Year
6. GPS Code
7. Geographic Location
8. Location of TSFD Wireless TSFD wireless handset during a Distress Call
9. Location of PSE's
10. Location of PNE's
11. Location of TSFD Wireless TSFD wireless handsets 300 during Operation
12. Location of TSFD wireless ComDoc 900 during Operation
13. Location of TSFD wireless X-DatCom during Operation The present invention requires the AI system to consider Firm Determinants necessary to make comprehensive decisions:
1. Length of "Air-Time" on Customer Contract
2. Status of Customer Billing
3. Status of Equipment-Go/No-Go
4. PNE 800 Electrical Power
5. PSE Electrical Power
6. Internet Interface Availability for PNE 800
7. PSTN Interface Lines Availability
8. Satellite Link Availability
9. TSFD wireless handsets 300-TSFD wireless ComDoc 900-TSFD wireless X-DatComs 400 Availability to Receive a Call Variables within the TSFD wireless system which the AI System must consider:
1. Length of Call by Each Customer
2. Length of Time PNE 800 "Manages" a Call
3. Length of Time a PSE "Extends" a Call
4. Length of Time Needed to Complete a Call
5. Length of Time Needed to Locate a Customer-Emergency 911
6. Length of Time Allocated to a billed Customer
7. Length of Time Allocated to a Prepaid Customer
8. Length of Time Spent Sending or Receiving TSFD wireless X-DatCom Data
9. Size of Customer Database
10. Duplication Rules for a Customer Database-backup
11. Calls Completed Within PSE Domain Only
12. Calls Routed Through PSE-TSFD wireless ComDoc 900-Landline
13. Calls Routed Through PSE-PNE-PSTN Interface
14. Calls Routed Through PSE-PNE-Internet Interface
15. Calls Routed Through PSE-PNE-PSE-TSFD Wireless Device
16. Calls Routed Through PSTN to TSFD Network Further describing the AI system's attributes, the TSFD Systems Internal Software enabled for AI Interactions are disclosed:
1. TSFD Wireless TSFD wireless handset Internal Software
2. TSFD Wireless TSFD wireless ComDoc 900 Internal Software
3. TSFD Wireless TSFD wireless X-DatCom Internal Software
4. TSFD Wireless Personal Computer Card Internal Software
5. TSFD Wireless PSE Internal Software
6. TSFD Wireless PNE 800 Internal Software
7. TSFD Wireless Locator—911 Distress Software-PNE
8. TSFD Wireless Locator—911 Distress Software-PSE
9. PNE 800—Computer Internet Customer Billing Software
10. Anti-Hacker TSFD Systems Security Software Plots of relevant factors and data from which the AI system must draw conclusions and make logical deductions:
1. Map of Calling Patterns within a PNE 800 Domain
2. Subset Maps of Calling Patterns within Individual PSE Domains
3. Map of Calling Patterns to External Networks via the PNE
4. Map of Calling Patterns to External Networks via the PSE-Dedicated TSFD wireless ComDoc 900
5. Map of Calling Patterns to External Networks via Subscriber TSFD wireless ComDoc 900
6. Map of Known Distress Calls and PSE's Responsible for Response In an alternate illumination of the present invention, General TSFD-AI Operational Assumptions are disclosed: the TSFD Parallel Computing Artificial Intelligence-based Distributive Routing System 1300 will use up to 22 PC's within a Macrocell, parallel computing and analyzing data. Various levels of "override" control of the TSFD Macrocell functionality by the AI System only occurs wherein there are failures of the physical TSFD hardware (PSE's or the PNE) or failure of the proprietary TSFD routing software inherent in the PNE 800.

Judgments made by the TSFD Parallel Computing Artificial Intelligence-based Distributive Routing System 1300 are based entirely on preset parameters for the following (though not every possible parameter can be presented):

1. TSFD Network system operations (known values for TSFD hardware electronic test point levels)
2. preset parameters for TSFD Network system subscriber wireless device calling loads at the PNE 800
3. preset parameters for TSFD Network system subscriber wireless device calling loads at each PSE
4. preset parameters for TSFD Network system subscriber call distributions over specific and available PSE channels-reserving room for CCAP & CCAP+ Data Transfers and IDDT live video streaming
5. preset parameters for TSFD Network system subscriber call distributions over specific and available PNE 800 channels
6. preset parameters for TSFD Network system subscriber call distributions to specific and available PNE 800-PSTN Interface lines.

In a further embodiment of the present invention, technical Disclosures of the Parallel Computing Artificial Intelligence-based System: The general concept of a Parallel Computing Artificial Intelligence-based Distributive Routing System 1300 is one of an "oversight entity" keeping track of every possible transaction performed within a TSFD Macrocell Network. This system would generate operational models, virtual maps, flow charts, electronic component diagnosis reports, and efficiency reports. Further, the AI System would "take over" the functions of a PNE 800, i.e., wherein the PNE had failed and call routing had to be performed across the numerous PSEs 600 individually, composing a TSFD Macrocell. Armed with detailed functionality and operational histories of every TSFD subsystem and wireless device ever operated within the network, the AI virtual entity would perform extensive logic deductions, thereby generating systematic and logical courses of actions best suited to TSFD system conditions and the ultimate satisfaction of the TSFD Network subscriber. The specific Parallel Computing Artificial Intelligence-based software to perform these actions is commercially available, but must be extensively adapted to TSFD Network conditions. This AI System would also be suitable to perform electronic component monitoring-reporting, defined systems analysis, Erlong evaluations and prescribed measurements within synchronous wireless systems, i.e., those composed of traditional base stations and the occasional PCS style repeater.

In an alternate embodiment; Parallel Computing Artificial Intelligence-based Distributive Routing 1300 and the Virtual Macrocell LAN; FIG. 29: the Parallel Computing Artificial Intelligence-based Distributive Routing System 1300 is composed of a group of computers of the Personal Computer style, industrial grade, with superior features and performance linked together by a dedicated Local Area Network (LAN); illuminated in FIG. 28. The primary computer in the group would reside near, but not within, a PNE 800, with all other computers residing in the electronic component environmental housing of each PSE. All units would share information and be programmed to operate as a single "entity" via the TSFD LAN. Any single computer could be disconnected and the system would still function. The term "parallel computing" would be an operational function of the system, wherein a task could be distributed at the same time to several units for analysis. Failure of analysis would then be less likely since the transactions would be computed in "parallel". Resulting data (answers to the transaction) would be utilized by the first system to complete the task. The action of watching every TSFD Wireless Network transaction would not include listening to the content of each data transmission or phone call. However, this feature would be available on systems sold to the government or military and could include biometric analysis of caller's true identity and corresponding speech recognition patterns.

In another embodiment of the invention FIG. 32 illuminates the Parallel Computing Artificial Intelligence-based Distributive Routing and the In a further embodiment; Virtual Macrocell WAN, wherein; The Parallel Computing Artificial Intelligence-based Distributive Routing System 1300 is composed of a group of computers; FIG. 30 wherein the Alpha designators indicate the primary macrocell AI computers, of the Personal Computer style, industrial grade, with superior features and performance linked together by a dedicated Wide Area Network (WAN). This network consists of multiple Macrocells linked in a Wide Area Network (WAN) wherein each PNE's 800 Parallel Computing Artificial Intelligence-based Distributive Routing computer network is linked to other such PNE 800 systems. The purpose of this WAN is the exchange of information during catastrophic failures or for the gathering of extensive, WAN wide data to determine the most effective operation of linked AI Systems governing specific networks.

Further, such a WAN analysis would yield informative data for future systems.

A further embodiment of this invention describes functionality unknown in any other wireless technology, i.e., the control of major wireless systems, subsystems, and individual devices when utilizing carefully controlled, coded or encrypted access. Static State Control by the AI System:

1. A Parallel Computing Artificial Intelligence-based Distributive Routing System 1300 is used to exercise Static State Control of any TSFD wireless handset via the TSFD Network.
2. A Parallel Computing Artificial Intelligence-based Distributive Routing System 1300 is used to exercise Static State Control of any TSFD wireless ComDoc 900 via the TSFD Network.
3. A Parallel Computing Artificial Intelligence-based Distributive Routing System 1300 is used to exercise Static State Control of any TSFD wireless X-DatCom via the TSFD Network.
4. A Parallel Computing Artificial Intelligence-based Distributive Routing System 1300 is used to exercise Static State Control of any TSFD PC Laptop Wireless Cards; i.e. TSFD wireless PC-DatCom Cards 500, via the TSFD Network.
5. A Parallel Computing Artificial Intelligence-based Distributive Routing System 1300 is used to command a TSFD wireless ComDoc 900 to exercise Static State Control of any TSFD PC Laptop Wireless Cards; i.e. TSFD wireless PC-DatCom Cards 500, via the TSFD Network.
6. A Parallel Computing Artificial Intelligence-based Distributive Routing System 1300 is used to command a TSFD wireless ComDoc 900 to exercise Static State Control of a PC Home Computer via the TSFD wireless ComDoc 900 peripheral interface connections.
7. A Parallel Computing Artificial Intelligence-based Distributive Routing System 1300 is used to command a TSFD wireless ComDoc 900 to exercise Static State Control of a cable modem for access by a specific TSFD wireless device to the Internet via the TSFD wireless ComDoc 900 peripheral interface connections.
8. A Parallel Computing Artificial Intelligence-based Distributive Routing System 1300 is used to command a TSFD wireless ComDoc 900 to exercise Static State Control of a PSTN/DSL modem for access by a specific TSFD wireless device to the Internet via the TSFD wireless ComDoc 900 peripheral interface connections.
9. A Parallel Computing Artificial Intelligence-based Distributive Routing System 1300 is used to command a TSFD wireless ComDoc 900 to exercise Static State Control of a LAN modem for access by a specific TSFD wireless device to the Internet via the TSFD wireless ComDoc 900 peripheral interface connections.
10. A Parallel Computing Artificial Intelligence-based Distributive Routing System 1300 is used to command a TSFD wireless ComDoc 900 to exercise Static State Control of an External Hard Drive for the retrieval of digital data via the TSFD wireless ComDoc 900 peripheral interface connections.
11. A Parallel Computing Artificial Intelligence-based Distributive Routing System 1300 is used to command a TSFD wireless ComDoc 900 to exercise Static State Control of a CD/DVD Drive for the retrieval of digital data via the TSFD wireless ComDoc 900 peripheral interface connections.
12. A Parallel Computing Artificial Intelligence-based Distributive Routing System 1300 is used to command a TSFD wireless ComDoc 900 to exercise Static State Control of an Infrared Data Sensor via the TSFD wireless ComDoc 900 peripheral interface connections.
13. A Parallel Computing Artificial Intelligence-based Distributive Routing System 1300 is used to command a TSFD wireless ComDoc 900 to exercise Static State Control of an External Video Camera via the TSFD wireless ComDoc 900 peripheral interface connections.
14. A Parallel Computing Artificial Intelligence-based Distributive Routing System 1300 is used to command an TSFD wireless X-DatCom to exercise Static State Control of a PC Home Computer via the TSFD wireless X-DatCom's optional peripheral interface connections.
15. A Parallel Computing Artificial Intelligence-based Distributive Routing System 1300 is used to command an TSFD wireless X-DatCom to exercise Static State Control of any or all TSFD PC Laptop Wireless Cards; i.e. TSFD wireless PC-DatCom Cards 500, via the TSFD Network.
16. A Parallel Computing Artificial Intelligence-based Distributive Routing System 1300 is used to command an TSFD wireless X-DatCom to exercise Static State Control of a cable modem for access by a specific TSFD wireless device to the Internet via the TSFD wireless X-DatCom's optional peripheral interface connections.
17. A Parallel Computing Artificial Intelligence-based Distributive Routing System 1300 is used to command an TSFD wireless X-DatCom to exercise Static State Control of a PSTN/DSL modem for access by a specific TSFD wireless device to the Internet via the TSFD wireless X-DatCom's optional peripheral interface connections.
18. A Parallel Computing Artificial Intelligence-based Distributive Routing System 1300 is used to command an TSFD wireless X-DatCom to exercise Static State Control of a LAN modem for access by a specific TSFD wireless device to the Internet via the TSFD wireless X-DatCom's optional peripheral interface connections.
19. A Parallel Computing Artificial Intelligence-based Distributive Routing System 1300 is used to command an TSFD wireless X-DatCom to exercise Static State Control of an External Hard Drive for the retrieval of digital data via the TSFD wireless X-DatCom's optional peripheral interface connections.

20. A Parallel Computing Artificial Intelligence-based Distributive Routing System 1300 is used to command an TSFD wireless X-DatCom to exercise Static State Control of a CD/DVD Drive for the retrieval of digital data via the TSFD wireless X-DatCom's optional peripheral interface connections.
21. A Parallel Computing Artificial Intelligence-based Distributive Routing System 1300 is used to command an TSFD wireless X-DatCom to exercise Static State Control of an Infrared Data Sensor via the TSFD wireless X-DatCom's optional peripheral interface connections.
22. A Parallel Computing Artificial Intelligence-based Distributive Routing System 1300 is used to command an TSFD wireless X-DatCom to exercise Static State Control of an External Video Camera via the TSFD wireless X-DatCom's optional peripheral interface connections.
23. A Parallel Computing Artificial Intelligence-based Distributive Routing System 1300, via a secure access code, may be used to instruct the PNE Central Processor (PNECP); wherein the PNCEP is composed of PNE Central Processors 830*a* & 830*b* comprising a whole and complete PNE Central Processor system, to exercise Static State Control over the Subscriber Database, located on a website on the Internet, containing all TSFD wireless handsets 300, TSFD wireless ComDoc 900 TSFD wireless X-DatComs 400 and TSFD wireless PC-DatCom Cards 500 for activation, deactivation and billing privileges by predetermined and defined software parameters stored in the PNECP's internal Memory.
24. A Parallel Computing Artificial Intelligence-based Distributive Routing System 1300, via a secure access code, may be used to instruct the PNE Central Processor (PNECP); wherein the PNCEP is composed of PNE Central Processors 830*a* & 830*b* comprising a whole and complete PNE Central Processor system, to exercise Static State Control over the Subscriber Database, located on a website on the Internet, containing all TSFD wireless handsets 300, TSFD wireless ComDoc 900 TSFD wireless X-DatComs 400 and TSFD wireless PC-DatCom Cards 500 for activation, deactivation and billing privileges by external instructions from a keypad, touch-active video screen within the PNE housing or by such portable data storage medium as will facilitate uploading new data control instructions when inserted in the PNECP's data drives.
25. A Parallel Computing Artificial Intelligence-based Distributive Routing System 1300, via a secure access code, may be used to instruct the PNE Central Processor (PNECP); wherein the PNCEP is composed of PNE Central Processors 830*a* & 830*b* comprising a whole and complete PNE Central Processor system, to exercise Static State Control over the Subscriber Database, located on a website on the Internet, containing all TSFD wireless handsets 300, TSFD wireless ComDoc 900 TSFD wireless X-DatComs 400 and TSFD wireless PC-DatCom Cards 500 for activation, deactivation and billing privileges by programming instructions received by transmissions from remotely located TSFD Network authorized personnel via the TSFD Network.
26. A Parallel Computing Artificial Intelligence-based Distributive Routing System 1300, via a secure access code, may be used to instruct the PNE Central Processor (PNECP); wherein the PNCEP is composed of PNE Central Processors 830*a* & 830*b* comprising a whole and complete PNE Central Processor system, to exercise Static State Control over the Subscriber Database, located on a website on the Internet, containing all TSFD wireless handsets 300, TSFD wireless ComDoc 900 TSFD wireless X-DatComs 400 and TSFD wireless PC-DatCom Cards 500 for activation, deactivation and billing privileges by programming instructions received by transmissions from remotely located TSFD Network authorized personnel via the PSTN, the Internet, direct copper connections using DS-1 connections, direct fiber connections using OC-3 links, radio links with the DS-1 hardware, an Earth-Satellite ground station for direct two-way communications with telecom satellites, the sending and receiving of short haul, ultra-wide-band optical communications via modulated Laser links.
27. A Parallel Computing Artificial Intelligence-based Distributive Routing System 1300, via a secure access code, may be used to instruct the PNE Central Processor (PNECP); wherein the PNCEP is composed of PNE Central Processors 830*a* & 830*b* comprising a whole and complete PNE Central Processor system, to exercise Static State Control over the Subscriber Database, located on a website on the Internet, containing all TSFD wireless handsets 300, TSFD wireless ComDoc 900 TSFD wireless X-DatComs 400 and TSFD wireless PC-DatCom Cards 500 for activation, deactivation and billing privileges by transmissions from the Parallel Computing Artificial Intelligence-based Distributive Routing Computer located within the Environmental Housing of the PNE 800.
28. A Parallel Computing Artificial Intelligence-based Distributive Routing System 1300, via a secure access code, may be used to instruct the PNE Central Processor (PNECP); wherein the PNCEP is composed of PNE Central Processors 830*a* & 830*b* comprising a whole and complete PNE Central Processor system, to exercise Static State Control over the Subscriber Database, located on a website on the Internet, containing all TSFD wireless handsets 300, TSFD wireless ComDoc 900 TSFD wireless X-DatComs 400 and TSFD wireless PC-DatCom Cards 500 for activation, deactivation and billing privileges during a catastrophic failure within the TSFD Network.

Dynamic State Control by the AI System:

1. A Parallel Computing Artificial Intelligence-based Distributive Routing System 1300 is used to exercise Dynamic State Control of any TSFD wireless handset via the TSFD Network.
2. A Parallel Computing Artificial Intelligence-based Distributive Routing System 1300 is used to exercise Dynamic State Control of any TSFD wireless ComDoc 900 via the TSFD Network.
3. A Parallel Computing Artificial Intelligence-based Distributive Routing System 1300 is used to exercise Dynamic State Control of any TSFD wireless X-DatCom 400 via the TSFD Network.
4. A Parallel Computing Artificial Intelligence-based Distributive Routing System 1300 is used to exercise Dynamic State Control of any TSFD PC Laptop Wireless Cards; i.e. TSFD wireless PC-DatCom Cards 500, via the TSFD Network.
5. A Parallel Computing Artificial Intelligence-based Distributive Routing System 1300 is used to command a TSFD wireless ComDoc 900 to exercise Dynamic State Control of any TSFD PC Laptop Wireless Cards; i.e. TSFD wireless PC-DatCom Cards 500, via the TSFD Network.

6. A Parallel Computing Artificial Intelligence-based Distributive Routing System 1300 is used to command a TSFD wireless ComDoc 900 to exercise Dynamic State Control of a PC Home Computer via the TSFD wireless ComDoc 900 peripheral interface connections.
7. A Parallel Computing Artificial Intelligence-based Distributive Routing System 1300 is used to command a TSFD wireless ComDoc 900 to exercise Dynamic State Control of a cable modem for access by a specific TSFD wireless device to the Internet via the TSFD wireless ComDoc 900 peripheral interface connections.
8. A Parallel Computing Artificial Intelligence-based Distributive Routing System 1300 is used to command a TSFD wireless ComDoc 900 to exercise Dynamic State Control of a PSTN/DSL modem for access by a specific TSFD wireless device to the Internet via the TSFD wireless ComDoc 900 peripheral interface connections.
9. A Parallel Computing Artificial Intelligence-based Distributive Routing System 1300 is used to command a TSFD wireless ComDoc 900 to exercise Dynamic State Control of a LAN modem for access by a specific TSFD wireless device to the Internet via the TSFD wireless ComDoc 900 peripheral interface connections.
10. A Parallel Computing Artificial Intelligence-based Distributive Routing System 1300 is used to command a TSFD wireless ComDoc 900 to exercise Dynamic State Control of an External Hard Drive for the retrieval of digital data via the TSFD wireless ComDoc 900 peripheral interface connections.
11. A Parallel Computing Artificial Intelligence-based Distributive Routing System 1300 is used to command a TSFD wireless ComDoc 900 to exercise Dynamic State Control of a CD/DVD Drive for the retrieval of digital data via the TSFD wireless ComDoc 900 peripheral interface connections.
12. A Parallel Computing Artificial Intelligence-based Distributive Routing System 1300 is used to command a TSFD wireless ComDoc 900 to exercise Dynamic State Control of an Infrared Data Sensor via the TSFD wireless ComDoc 900 peripheral interface connections.
13. A Parallel Computing Artificial Intelligence-based Distributive Routing System 1300 is used to command a TSFD wireless ComDoc 900 to exercise Dynamic State Control of an External Video Camera via the TSFD wireless ComDoc 900 peripheral interface connections.
14. A Parallel Computing Artificial Intelligence-based Distributive Routing System 1300 is used to command an TSFD wireless X-DatCom to exercise Dynamic State Control of a cable modem for access by a specific TSFD wireless device to the Internet via the TSFD wireless X-DatCom's optional peripheral interface connections.
15. A Parallel Computing Artificial Intelligence-based Distributive Routing System 1300 is used to command an TSFD wireless X-DatCom to exercise Dynamic State Control of any or all TSFD PC Laptop Wireless Cards; i.e. TSFD wireless PC-DatCom Cards 500, via the TSFD Network.
16. A Parallel Computing Artificial Intelligence-based Distributive Routing System 1300 is used to command an TSFD wireless X-DatCom to exercise Dynamic State Control of a PSTN/DSL modem for access by the TSFD wireless device to the Internet via the TSFD wireless X-DatCom's optional peripheral interface connections.
17. A Parallel Computing Artificial Intelligence-based Distributive Routing System 1300 is used to command an TSFD wireless X-DatCom to exercise Dynamic State Control of a LAN modem for access by a specific TSFD wireless device to the Internet via the TSFD wireless X-DatCom's optional peripheral interface connections.
18. A Parallel Computing Artificial Intelligence-based Distributive Routing System 1300 is used to command an TSFD wireless X-DatCom to exercise Dynamic State Control of an External Hard Drive for the retrieval of digital data via the TSFD wireless X-DatCom's optional peripheral interface connections.
19. A Parallel Computing Artificial Intelligence-based Distributive Routing System 1300 is used to command an TSFD wireless X-DatCom to exercise Dynamic State Control of a CD/DVD Drive for the retrieval of digital data via the TSFD wireless X-DatCom's optional peripheral interface connections.
20. A Parallel Computing Artificial Intelligence-based Distributive Routing System 1300 is used to command an TSFD wireless X-DatCom to exercise Dynamic State Control of an Infrared Data Sensor via the TSFD wireless X-DatCom's optional peripheral interface connections.
21. A Parallel Computing Artificial Intelligence-based Distributive Routing System 1300 is used to command an TSFD wireless X-DatCom to exercise Dynamic State Control of an External Video Camera via the TSFD wireless X-DatCom's optional peripheral interface connections.
22. A Parallel Computing Artificial Intelligence-based Distributive Routing System 1300, via a secure access code, may be used to instruct the PNE Central Processor (PNECP); wherein the PNCEP is composed of PNE Central Processors 830*a* & 830*b* comprising a whole and complete PNE Central Processor system, to exercise Dynamic State Control over the Subscriber Database, located on a website on the Internet, containing all TSFD wireless handsets 300, TSFD wireless ComDoc 900 TSFD wireless X-DatComs 400 and TSFD wireless PC-DatCom Cards 500 for activation, deactivation and billing privileges by predetermined and defined software parameters stored in the PNECP's internal Memory.
23. A Parallel Computing Artificial Intelligence-based Distributive Routing System 1300, via a secure access code, may be used to instruct the PNE Central Processor (PNECP); wherein the PNCEP is composed of PNE Central Processors 830*a* & 830*b* comprising a whole and complete PNE Central Processor system, to exercise Dynamic State Control over the Subscriber Database, located on a website on the Internet, containing all TSFD wireless handsets 300, TSFD wireless ComDoc 900 TSFD wireless X-DatComs 400 and TSFD wireless PC-DatCom Cards 500 for activation, deactivation and billing privileges by external instructions from a keypad, touch-active video screen within the PNE housing or by such portable data storage medium as will facilitate uploading new data instructions when inserted in the PNECP's data drives.
24. A Parallel Computing Artificial Intelligence-based Distributive Routing System 1300, via a secure access code, may be used to instruct the PNE Central Processor to exercise Dynamic State Control over the Subscriber Database, located on a website on the Internet, containing all TSFD wireless handsets 300, TSFD wireless ComDoc 900 TSFD wireless X-DatComs 400 and TSFD wireless PC-DatCom Cards 500 for activation, deactivation and billing privileges by programming instructions received by transmissions from remotely located TSFD Network authorized personnel via the TSFD Network.

25. A Parallel Computing Artificial Intelligence-based Distributive Routing System 1300, via a secure access code, may be used to instruct the PNE Central Processor to exercise Dynamic State Control over the Subscriber Database, located on a website on the Internet, containing all TSFD wireless handsets 300, TSFD wireless ComDoc 900 TSFD wireless X-DatComs 400 and TSFD wireless PC-DatCom Cards 500 for activation, deactivation and billing privileges by programming instructions received by transmissions from remotely located TSFD Network authorized personnel via the PSTN, the Internet, direct copper connections using DS-1 connections, direct fiber connections using OC-3 links, radio links with the DS-1 hardware, an Earth-Satellite ground station for direct two-way communications with telecom satellites, the sending and receiving of short haul, ultra-wide-band optical communications via modulated Laser links.

Monocell System

In a distinct and alternate embodiment of the present invention, the satellite ground station interface can enable a single PSE 600 to operate virtually in an autonomous mode when the entire system is powered by a solar cell or wind electrical power system. Such a system is known as the PSE-Monocell. This operation could provide a modern wireless communications system for some remote village where no other telephonic communication is available or an extremely remote commercial/industrial outpost. The TSFD wireless devices in the village could be recharged by an alternate energy source, such as but is not limited to solar cells, and communication between device owners would be enabled by the PSE 600 (the central relay point in the system), without any PNE 800 whatsoever. Call routing and determinations of frequency pair availability would clearly be in the operational purview of every TSFD wireless device. These autonomous devices would merely poll a set of frequencies to determine availability and then place the call via the CIC, completing the call via the CMC wherein the assigned channel pairs would be agreed upon by each TSFD wireless device.

Calls outside the TSFD wireless system via a satellite ground station could easily be assigned to a set of channels reserved for such transactions with a simple version of the Parallel Computing Artificial Intelligence-based Call Routing (small PC embedded within the PSE 600) enabling the PSE 600 to mimic a fully functional PNE 800 with "External Network Interface" capabilities through dedicated wireless TSFD wireless ComDoc interfaces. Actual external interface connections would not exist and would be achieved wirelessly by the attachment of TSFD wireless ComDoc 900 devices to the external networks, radios or satellite earth stations. GPS monitoring by the PSE 600 as the primary method of frequency/channel stability would be essential. Such systems would be extremely inexpensive and highly reliable.

The monocell wireless system may further comprise a Parallel Computing Artificial Intelligence-based Call Routing system to monitor and analyze communication paths within and system and to allow the PSE to mimic the function of a PNE. External interface connections to an external network can be achieved wirelessly via a TSFD wireless ComDoc attached to the external network. The monocell system may include a method for collecting revenue from each wireless set operating within the monocell system. Examples of methods for collecting revenue are disclosed in U.S. Pat. Nos. 6,141,531 and 6,842,617. In another embodiment, the monocell wireless system allows transmission in the CCAP or CCAP+ sub-protocol from one wireless device to another wireless device within the monocell system. In yet another embodiment, the monocell system can be controlled remotely by another wireless device outside the system via a satellite. In a further embodiment, the wireless devices in the monocell system can be remotely controlled by another wireless device outside the system via a satellite. Examples of methods to control the system or a wireless device in the system are disclosed in U.S. Pat. Nos. 6,374,078 and 6,842,617.

Additional Terms and Definitions

To further disclosure and illuminate aspects of the present invention, the following Additional Terms and Definitions of the TSFD wireless system are described:
1. PolyCons
2. Red Fang Protocol
3. Migrated Channel Data
4. Fuzzy Switch Logic
5. PolyPath
6. MonoCell
7. Dynamic Network Expansion
8. Integrated Direct Data Transfer (IDDT
9. PolySets
10. Domains
11. Mobile Devices
12. Anchored Systems
13. Digital Image Capture or Stereoscopic Direct Data Transfer 1. PolyCon is a term defined as the multiple (poly) communications avenues available to all independent and autonomous TSFD wireless devices within a TSFD network or externally. Example: A TSFD wireless ComDoc 900 is said to have seventeen PolyCons. A TSFD wireless X-DatCom 400 is said to have an unknown number of PolyCons available. (We just do not know what all this device can be attached to or just how many of these hookups are possible.)

2. Red Fang Protocol is an Ultra-Wide Band—Ultra Low Power version of the TSFD Protocol operated at 5 Gigahertz. Bandwidth can be varied as necessary and generally communications are limited to 3 feet distance with line of sight as the optimum operating mode.

3. Migrated Channel Data is that data transmitted over the TSFD network that is subjected to frequency hopping for security.

4. Fuzzy Switch Logic: An "AI" term to describe the actions of the AI system 1300 in making a firm decision from a number of reasonable choices.

5. PolyPath: Multiple alternate routes suggested by the AI system 1300 for routing calls around a failed TSFD component. As "AI" term; "Fuzzy Logic" rules would determine which "suggestion" to be chosen and implemented. Example: the permutations of "Moves on a chessboard".

6. MonoCell System is a TSFD cell site that can stand alone for the coverage of a small town, village or rural area where no other connection is made to another cell site. The MonoCell can be connected via fiber or earth satellite to the rest of the world wirelessly via dedicated TSFD wireless ComDocs 900 but is not a part of any other cell site. The site can handle very few to several hundred TSFD wireless handsets. The site has no PNE requirements. This site is totally powered by solar, wind or a combination. The system is essentially a wholly autonomous and sophisticated PSE 600.

7. Dynamic Network Expansion: The process of adding more PSE's 800 to a Macrocell.

8. Integrated Direct Data Transfer: the term describing the continuous flow of data over the TSFD network during a CCAP or CCAP+ data transfer through the activation of a temporary TSFD Sub-Protocol routine within a standard TSFD transmission; FIG. 11. The IDDT sub-protocol is dynamic as the bandwidth utilized may be varied.

9. PolySets are multiple but distinct data analysis results created by different "parallel processing" PC's; FIG. 29, where each has been given a task to analyze overall Macrocell data. It will be rare to have varying results but it could be possible. The fastest computer wins unless its data differs from all the others. At that point, another task is assigned without the winning computer being included. A primary computer; the PNE AI computer, performs the selections of these PolySet solutions. Major variations could be attributed to the usage of AI algorithms differing from other PC's. Applications include analysis of traffic patterns of call loading, peak usage, off network access by TSFD devices, etc.

10. Domains are defined as the area of influence a TSFD Anchored System influences or controls; i.e., approximately 114 square miles comprises the domain of the average TSFD PSE 600.

11. Mobile TSFD wireless devices are defined as the following TSFD wireless devices; TSFD wireless handsets 300, TSFD wireless X-DatComs 400, TSFD wireless PC-DatCom Cards, and TSFD wireless ComDocs.

12. Anchored TSFD Systems are defined as TSFD PNEs 800 and TSFD PSEs 600 wherein their locations are immovable and fixed.

13. Digital Image Capture or Stereoscopic Direct Data Transfer and live video streaming; wherein the various Mobile TSFD wireless devices can be equipped with a pair of digital cameras enabling the devices to capture or to send still, live, recorded video images or stereoscopic live digital images for recovery by another TSFD wireless device wherein a virtual reality stereoscopic display viewer has been attached.

Although the present invention has been described in detail with reference to certain preferred embodiments, it should be apparent that modifications and adaptations to those embodiments may occur to persons skilled in the art without departing from the spirit and scope of the present invention as set forth in the following claims.

While specific embodiments have been illustrated and described, numerous modifications come to mind without departing from the spirit of the invention and the scope of protection is only limited by the scope of the accompanying claims.

What is claimed is:

1. A method of operating a parallel-configured Time-Shared Full Duplex (TSFD) wireless communication system for voice and data signals, the system comprising one or more macrocells and each macrocell having a plurality of microcells and the method comprises:

establishing a local communication path for transmitting and receiving signals between a local TSFD wireless device and a remotely placed local TSFD wireless device within a same microcell via a Parallel-configured Signal Extender (PSE);

operating the PSE by operating first and second signal extenders in parallel and independent of each other yet sharing information with each other and upon failure of one of the first and second signal extenders the other one of the first and second signal extenders continues operation and maintains communications;

establishing an extended communication path for transmitting and receiving signals between an extended TSFD wireless device and a remotely placed extended TSFD wireless device located within different microcells positioned within a same macrocell via PSEs and a Parallel-configured Network Extender (PNE);

operating the PNE by operating first and second network extenders in parallel and independent of each other yet sharing information with each other and upon failure of one of the first and second network extenders the other one of the first and second network extenders continues operation and maintains communications;

establishing a distant communication path for transmitting and receiving signals between a distant TSFD wireless device and a remotely placed distant TSFD wireless device located within different microcells positioned within different macrocells via PSEs and PNEs;

asynchronously transmitting and receiving half-duplex signals over the communication paths using pairs of assigned communication path frequencies stabilized by a GPS-based frequency reference source;

monitoring and analyzing the communication paths by a system-resident and decentralized Parallel Computing Artificial Intelligence-based Distributive Routing System; and re-directing the communication paths to ensure call loads of the PSE and PNE in the system do not exceed a predetermined limit for each PSE or PNE, to optimize call loads of the PSE and PNE in the system, or to bypass any failed PSE or PNE in the system;

wherein the TSFD wireless device is selected from the group consisting of TSFD wireless handsets, TSFD wireless Personal Computer Data Communication Cards (TSFD wireless PC-DatCom Cards), TSFD wireless Data Communication Modules (TSFD wireless DatComs), and TSFD wireless Communication Docking Bays (TSFD wireless ComDocs), and wherein the transmitting and receiving signals between a TSFD wireless device or PSE or a PNE and another TSFD) wireless device or a PSE or PNE is conducted asynchronously with a primary Time-Shared Full Duplex (TSFD) wireless protocol.

2. The method of claim 1 wherein establishing a local communication path comprises:

transmitting signals from the local TSFD wireless devices to the PSE;

receiving and re-transmitting signals by the PSE to the local TSFD wireless devices; and receiving signals from the PSE by the local TSFD wireless devices.

3. The method of claim 1 wherein establishing an extended communication path comprises:

transmitting signals from the extended TSFD wireless devices to the PSE;

receiving and re-transmitting signals from the extended TSFD wireless devices by the PSE to a PNE; receiving and re-transmitting signals from the PSE by the PNE to the PSE;

receiving and retransmitting signals from the PNE by the PSE to the extended TSFD wireless devices; and receiving signals from the PSE by the extended TSFD wireless devices.

4. The method of claim 1 wherein establishing a distant communication path comprises:

transmitting signals from the distant TSFD wireless devices to the PSEs;

receiving and re-transmitting signals from the distant TSFD wireless devices by the PSEs to the PNEs;

receiving and re-transmitting signals from the PSEs by a PNE to another PNE;

receiving and re-transmitting signals from a PNE by another PNE to PSEs;

receiving and re-transmitting signals from PNEs by PSEs to the distant TSFD wireless devices; and receiving signals from PSEs by the distant TSFD wireless devices.

5. The method of claim 4 wherein receiving and re-transmitting signals by a PNE to another PNE is selected from the group consisting of transmitting signals over a Public Switch Telephone Network (PSTN), transmitting signals over a fiber optic communication link, transmitting signals over a coaxial cable, transmitting signals over a public TCP/IP network, and transmitting signals over a satellite communication link, 6. The method of claim 1 wherein half of the signals received by a PSE in a microcell may be transmitted by TSFD wireless devices in the microcell in a low radio frequency band and half of the signals received by the PSE in a macrocell may be transmitted by a PNE in the macrocell in a low radio frequency band.

7. The method of claim 1 wherein half of the signals transmitted by a PSE in a microcell may be received by a TSFD wireless device in the microcell in a high radio frequency band and half of the signals transmitted by the PSE in a macrocell may be received by a PNE in the macrocell in a high radio frequency band.

8. The method of claim 1 wherein establishing a local voice communication path between a local TSFD wireless device and a remotely placed local TSFD wireless device comprises using two fixed frequencies in a sub-band spectrum for establishing a local voice channel.

9. The method of claim 1 wherein establishing a local data communication path under a four channel Contiguous Channel Acquisition Protocol between a local TSFD wireless device and a remotely placed local TSFD wireless device comprises using two fixed frequencies having a bandwidth of four times the bandwidth of a local voice channel by combining four contiguous voice channels.

10. The method of claim 1 wherein establishing a local data communication path under a twelve channel Contiguous Channel Acquisition Protocol Plus between a local TSFD wireless device and a remotely placed local TSFD wireless device under a twelve channel Contiguous Channel Acquisition Protocol Plus comprises using two fixed frequencies having a bandwidth of twelve times the bandwidth of a local voice channel by combining twelve contiguous voice channels.

11. The method of claim 1 wherein establishing an extended voice communication path comprises using four fixed frequencies in a sub-band spectrum for establishing an extended voice channel.

12. The method of claim 1 wherein establishing an extended data communication path under a four channel Contiguous Channel Acquisition Protocol between an extended TSFD wireless device and a remotely placed extended TSFD wireless device comprises using four fixed frequencies having a bandwidth of four times the bandwidth of an extended voice channel by combining four contiguous voice channels.

13. The method of claim 1 wherein establishing an extended data communication path under a twelve channel Contiguous Channel Acquisition Protocol Plus between an extended TSFD wireless device and a remotely placed extended TSFD wireless device comprises using four fixed frequencies having a bandwidth of twelve times a bandwidth of an extended voice channel by combining twelve contiguous voice channels.

14. The method of claim 1 wherein establishing a distant voice communication pat comprises using four fixed frequencies in a sub-band spectrum for establishing a distant voice channel.

15. The method of claim 1 wherein establishing a distant data communication path under a four channel Contiguous Channel Acquisition Protocol between a distant TSFD wireless device and a remotely placed distant TSFD wireless device comprises using four fixed frequencies having a bandwidth of four times the bandwidth of a distant voice channel by combining four contiguous voice channels.

16. The method of claim 1 wherein establishing a distant data communication path under a twelve channel Contiguous Channel Acquisition Protocol Plus between a distant TSFD wireless device and a remotely placed distant TSFD wireless device comprises using four fixed frequencies having a bandwidth of twelve times a bandwidth of a distant voice channel by combining twelve contiguous voice channels.

17. The method of claim 1 further comprises establishing a communication path for transmitting and receiving signals between a TSFD wireless device and an external network via a PSE and a PNE connected to the external network.

18. The method of claim 17, wherein the external network is selected from the group consisting of a Public Switch Telephone Network (PSTN), a fiber optic communication link, a coaxial cable, a public TCP/IP network, and a satellite communication link.

19. The method of claim 1 further comprises establishing a communication path for transmitting and receiving signals between a TSFD wireless device and an external network via a TSFD wireless device connected to the external network.

20. The method of claim 19 wherein the external network is selected from the group consisting of a Public Switch Telephone Network (PSTN), a fiber optic communication link, a coaxial cable, a public TCP/IP network, and a satellite communication link.

21. The method of claim 1 further comprises establishing a communication path for transmitting and receiving signals between a TSFD wireless device and a local communication network.

22. The method of claim 1 wherein the transmitting and receiving signals further comprises a secondary mode of operation selected from the group consisting of wireless protocols and landline protocols.

23. The method of claim 22 wherein the wireless protocol is selected from the group consisting of AMPS, D-AMPS, IS-95, IS-136, and GSM1900.

24. The method of claim 1 further comprising operating the TSFD wireless device in a secondary synchronous mode transmitting and receiving signals with a synchronous wireless device.

25. A method of operating a parallel-configured Time-Shared Full Duplex (TSFD) wireless communication system for voice and data signals, the system comprising one or more macrocells and each macrocell having a plurality of microcells, and the method comprises:

establishing a local communication path for transmitting and receiving signals between a local TSFD wireless device and a remotely placed local TSFD wireless device within a same microcell comprising:

receiving and transmitting signals between the local TSFD wireless device and a Parallel-configured Signal Extender (PSE);

receiving and transmitting signals between the PSE, the local TSFD wireless device and the remotely placed local TSFD wireless device;

receiving and transmitting signals between the remotely placed local TSFD wireless device and the PSE; and operating the PSE by operating first and second signal extenders in parallel and independent of each other yet sharing information with each other and upon failure of one of the first and second signal extenders the other one of the first and second signal extenders continues operation and maintains communications;

establishing an extended communication path for transmitting and receiving signals between an extended TSFD wireless device and a remotely placed extended TSFD wireless device within different microcells positioned within a same macrocell comprising:

transmitting and receiving signals between die extended TSFD wireless device and a first PSE; transmitting and receiving signals between the first PSE and a Parallel- configured Network Extender (PNE);

transmitting and receiving signals between the PNE and a second PSE, transmitting and receiving signals between the second PSE and the remotely placed extended TSFD wireless device;

transmitting and receiving signals between the remotely placed extended TSFD wireless device and the second PSE; and operating the PNE by operating first and second network extenders in parallel and independent of each other yet sharing information with each other and upon failure of one of the first and second network extenders the other one of the first and second network extenders continues operation and maintains communications;

establishing a distant communication path for transmitting and receiving signals between a distant TSFD wireless device and a remotely placed distant TSFD wireless device within different microcells positioned within different macrocells comprising:

transmitting and receiving signals between the distant TSFD wireless device and a first PSE;

transmitting and receiving signals between the first PSE and a first PNE;

transmitting and receiving signals between the first PNE and a second PNE;

transmitting and receiving signals between the second PNE and a second PSE;

transmitting and receiving signals between the second PSE and the remotely placed distant TSFD wireless device; and transmitting and receiving signals between the remotely placed distant TSFD wireless device and the second PSE;

asynchronously transmitting and receiving half duplex signals over the communication paths using pairs of assigned communication path frequencies stabilized by a GPS-based frequency reference source;

monitoring and analyzing the communication paths by a system-resident and decentralized Parallel Computing Artificial Intelligence-based Distributive Routing System; and re-directing the communication paths to ensure call loads of the PSE and PNE in the system do not exceed a predetermined limit for each PSE or PNE, to optimize call loads of the PSE and PNE in the system, or to bypass any failed PSE or PNE in the system;

wherein the TSFD wireless device is selected from the group consisting of: TSFD wireless handsets, TSFD wireless Personal Computer Data Communication Cards (TSFD wireless PC-DatCom Cards), TSFD wireless Data Communication Modules (TSFD wireless DatComs), and TSFD wireless Communication Docking Bays (TSFD wireless ComDocs), and wherein the transmitting and receiving signals between a TSFD wireless device or PSE or a PNE and another TSFD wireless device or a PSE or PNE is conducted asynchronously with a primary Time-Shared Full Duplex (TSFD) wireless protocol.

26. The method of claim 25 wherein transmitting signals between the first PNE and the second PNE is selected from the group consisting of transmitting signals over a Public Switch Telephone Network (PSTN), transmitting signals over a fiber optic communication link, transmitting signals over a coaxial cable, transmitting signals over a public TCP/IP network, and transmitting signals over a satellite communication link.

27. The method of claim 25 wherein transmitting signals from the TSFD wireless device to the PSE is in a low radio frequency band and transmitting signals from the PSE to the TSFD wireless device is in a high radio frequency band, transmitting signals from the PSE to the PNE is in a high radio frequency band and transmitting signals from the PNE to the PSE is in the low radio frequency band, and transmitting signals between the PNE is on a high data rate system backbone.

28. The method of claim 27 wherein half of the signals received by a PSE in a microcell is transmitted by TSFD wireless devices in the microcell in a low radio frequency band and half of the signals received by the PSE in a microcell is transmitted by a PNE in the macrocell in a low radio frequency band.

29. The method of claim 25 wherein half of the signals transmitted by a PSE in a microcell is received by TSFD wireless devices in the microcell in a high radio frequency band and half of the signals transmitted by the PSE in a microcell is received by a PNE in the macrocell in a high radio frequency band.

30. The method of claim 25 wherein transmitting and receiving signals comprises using Frequency Division Multiple Access techniques for determining sub-bands in the high and low radio frequency bands.

31. The method of claim 25 wherein transmitting and receiving signals comprises using Gaussian Minimum Shift Keying modulation for producing a radio frequency waveform.

32. The method of claim 25 wherein the transmitting and receiving signals further comprises a secondary mode of operation selected from the group consisting of wireless protocols and landline protocols.

33. The method of claim 32 wherein the wireless protocol is selected from the group consisting of AMPS, D-AMPS, IS-95, IS-136, and GSM1900.

34. The method of claim 25 further comprises controlling an operational state of the TSFD wireless communication system by transmitting an operational state command to a PNE from the TSFD wireless device wherein the operational state command is a static operational command or a dynamic operational command.

35. The method of claim 25 wherein establishing a local voice communication path between a local TSFD wireless device and a remotely placed local TSFD wireless device may comprise using two fixed frequencies in a sub-band spectrum for establishing a local voice channel.

36. The method of claim 25 wherein establishing a local data communication path under a four channel Contiguous Channel Acquisition Protocol between a local TSFD wireless device and a remotely placed local TSFD wireless device comprises using two fixed frequencies having a bandwidth of four times the bandwidth of a local voice channel by combining four contiguous voice channels.

37. The method of claim 25 wherein establishing a local data communication path under a twelve channel Contiguous Channel Acquisition Protocol Plus between a local TSFD wireless device and a remotely placed local TSFD wireless device comprises using two fixed frequencies having a bandwidth of twelve times the bandwidth of a local voice channel by combining twelve contiguous voice channels.

38. The method of claim 25 wherein establishing an extended voice communication path comprises using four fixed frequencies in a sub-band spectrum for establishing an extended voice channel.

39. The method of claim 25 wherein establishing an extended data communication path under a four channel Contiguous Channel Acquisition Protocol between an extended TSFD wireless device and a remotely placed extended TSFD wireless device comprises using four fixed frequencies having a bandwidth of four times the bandwidth of an extended voice channel by combining four contiguous voice channels.

40. The method of claim 25 wherein establishing an extended data communication path under a twelve channel Contiguous Channel Acquisition Protocol Plus between an extended TSFD wireless device and a remotely placed extended TSFD wireless device comprises using four fixed frequencies having a bandwidth of twelve times the bandwidth of an extended voice channel by combining twelve contiguous voice channels.

41. The method of claim 25 wherein establishing a distant voice communication path may comprise using four fixed frequencies in a sub-band spectrum for establishing a distant voice channel.

42. The method of claim 25 wherein establishing a distant data communication path under a four channel Contiguous Channel Acquisition Protocol between a distant TSFD wireless device and a remotely placed distant TSFD wireless device comprises using four fixed frequencies having a bandwidth of four times the bandwidth of a distant voice channel by combining four contiguous voice channels.

43. The method of claim 25 wherein establishing a distant data communication path under a twelve channel Contiguous Channel Acquisition Protocol Plus between a distant TSFD wireless device and a remotely placed distant TSFD wireless device comprises using four fixed frequencies having a bandwidth of twelve times the bandwidth of a distant voice channel by combining twelve contiguous voice channels.

44. The method of claim 25 further comprises establishing a communication path for transmitting and receiving signals between a TSFD wireless device and an external network via another TSFD wireless device connected to the external network.

45. The method of claim 44 wherein the external network is selected from the group consisting of a Public Switch Telephone Network, a fiber optic communication link, a coaxial cable, a public TCP/IP network, and a satellite communication link.

46. The method of claim 25 wherein transmitting signals comprises digitizing, buffering and encoding voice frames and transmitting the voice frames in packets at a date rate that is at least twice that required for real-time decoding, whereby transmitting time requires less than half of real time, and receiving signals may comprise receiving and decoding the voice frame packets at a data rate that is equal to that required for real-time decoding, whereby receiving time requires less than half of real-time.

47. The method of claim 25 further comprises transmitting and receiving information over a reference channel for providing a TSFD wireless device and another TSFD wireless device with time and date information, microcell and macrocell identification code, attention codes, and broadcast text messages.

48. The method of claim 25 further comprises transmitting and receiving information over a call initiation channel for handling TSFD wireless device and receiving Mobile TSFD wireless device initial registration, periodic registration, authorization and short identification (ID) assignment, call requests, call frequency assignment, call progress prior to voice and data channel use, and acknowledgement, wherein the method may further comprise transmitting and receiving information over a call maintenance channel for call completion, call request, 911 position report, call handoff frequency, call waiting notification, voice message notification, text message notification, and acknowledgement.

49. The method of claim 25 further comprising operating the TSFD wireless device in a secondary synchronous mode transmitting and receiving signals with a synchronous wireless device.

50. A parallel-configured Time-Shared Full Duplex (TSFD) wireless communication system for voice and data signals comprises:
  one or more macrocells and each macrocell having a plurality of microcells;
  a TSFD wireless set comprising one or more TSFD wireless devices selected from TSFD wireless handsets, TSFD wireless Communication Docking Bays (TSFD wireless ComDocs), TSFD wireless External Data Communication Modules (TSFD wireless X-Dat-Coms), and TSFD wireless Personal Computer Data Communication Cards (TSFD wireless PC-DatCom Cards);
  a Parallel-configured TSFD Signal Extender (PSE) located in the microcell, the PSE having first and second signal extenders interfaced with each other and operating independently of each other, the first and second signal extenders having a parallel configuration such that upon failure of one of the first and second signal extenders the other one of the first and second signal extenders continues to operate and maintain communications;
  a Parallel-configured TSFD Network Extender (PNE) located in the macrocell, the PNE having first and second network extenders interfaced with each other and operating independently of each other, the first and second network extenders having a parallel configuration such that upon failure of one of the first and second network extenders the other one of the first and second network extenders continues to operate and maintain communications;
  means for establishing a local communication path for transmitting and receiving signals between a local TSFD wireless device and a remotely placed local TSFD wireless device within a same microcell via a PSE;
  means for establishing an extended communication path for transmitting and receiving signals between an extended TSFD wireless device and a remotely placed extended TSFD wireless device located within different microcells positioned within a same macrocell via PSE and a PNE;
  means for establishing a distant communication path for transmitting and receiving signals between a distant TSFD wireless device and a remotely placed distant TSFD wireless device located within different microcells positioned within different macrocells via PSE and PNE;

means for asynchronously transmitting and receiving half-duplex signals over the communication paths using pairs of assigned communication path frequencies stabilized by a GPS-based frequency reference source; and a system-resident and decentralized Parallel Computing Artificial Intelligence-based Distributive Routing System for monitoring and analyzing the transmitted and received signals over the communication paths resulting in re-directing the communication paths to ensure call loads of the PSE and PNE in the system do not exceed a predetermined limit for each PSE or PNE, to optimize call loads of the PSE and PNE in the system, or to bypass any failed PSE or PNE in the system; and wherein the transmitting and receiving signals between a TSFD wireless device or PSE or a PNE and another TSFD wireless device or a PSE or PNE is conducted asynchronously with a primary Time-Shared Full Duplex (TSFD) wireless protocol.

51. The system of claim 50, wherein the means for establishing a local communication path for transmitting and receiving signals between a local TSFD wireless device and a remotely placed local TSFD wireless device within a same microcell via a PSE comprises:

a local TSFD wireless device;

a PSE;

a remotely placed local TSFD wireless device within the same microcell;

wherein the local TSFD wireless device encodes voice and data frame packets and transmitting these packets as radio frequency signals in a low radio frequency band; the PSE receives, amplifies, and shifts a frequency of the local TSFD wireless device and the local TSFD wireless devices' signals in the low radio frequency band to a high radio frequency band and transmitting the high radio frequency band signals; the remotely placed local TSFD wireless device receives signals in the high radio frequency band from the PSE and decodes the received signals into a voice and data frame packet; the remotely placed local TSFD wireless device encodes voice and data frame packet and transmits these packets as radio frequency signals in a low radio frequency band; and the local TSFD wireless device receives signals in the high radio frequency band from the PSE and decodes the received signals into a voice and data frame packet.

52. The system of claim 50 wherein the means for establishing an extended communication path for transmitting and receiving signals between an extended TSFD wireless device and a remotely placed extended TSFD wireless device within different microcells positioned within a same macrocell via PSE and a PNE comprises:

an extended TSFD wireless device;

a first PSE;

a PSE;

a second PSE; and a remotely placed extended TSFE wireless device;

wherein the extended TSFD wireless device encodes voice and data frame packet and transmits these packets as radio frequency signals in a low frequency band; the first PSE receives, amplifies, and shifts a frequency of the extended TSFD wireless device signals in the low radio frequency band to a high radio frequency band and transmitting the high radio frequency band signals from the first PSE to the PNE; the PNE receives, amplifies, and shifts a frequency of PSE signals in the high radio frequency band to a low radio frequency band and transmitting the low radio frequency band signals from the PNE to selected PSEs; the second PSE receives, amplifies, and shifts a frequency of the PNE signals in the low frequency band to a high radio frequency band and transmits the high radio frequency band signals; the remotely placed extended TSFD wireless device receives the second PSE signals in the high radio frequency band and decodes the received signals into a voice and data frame packet; the remotely placed extended TSFD wireless device encodes voice and data frame packet and transmits these packets as radio frequency signals in a low frequency band; the second PSE receives, amplifies, and shifts a frequency of the TSFD wireless handset signals in the low radio frequency band to a high radio frequency band and transmitting the high radio frequency band signals from the second PSE to the PNE; the first PSE receives, amplifies, and shifts a frequency of the PNE signals in the low frequency band to a high radio frequency band and transmits the high radio frequency band signals; and the extended TSFD wireless device receives the first PSE signals in the high radio frequency band and decodes the received signals into a voice and data frame packet.

53. The system of claim 50 wherein the means for establishing a distant communication path for transmitting and receiving signals between a distant TSFD wireless device and a remotely placed distant TSFD wireless device within different microcells positioned within different macrocells via PSEs and PNEs comprises:

a distant TSFD wireless device;

a remotely placed distant TSFD wireless device within different microcells positioned within different macrocells;

a first PNE;

a first PSE;

a second PNE; and a second PSE;

wherein the first PNE receives, amplifies first PSE signals from a first PSE and transmits the first PSE signals to a second PNE over a dedicated communication link; and the second PNE receives and shifts a frequency of first PSE signals in the high radio frequency band to a low radio frequency band and transmitting the low radio frequency band signals from the second PNE to the second PSE.

54. The system of claim 50 wherein the TSFD wireless device further comprises external communication paths for transmitting and receiving signals between the TSFD wireless device and an external communication network to enable TSFD wireless device and devices associated with another TSFD wireless device to connect to the external network through the TSFD wireless device.

55. The system of claim 54 wherein the external network is selected from the group consisting of a Public Switch Telephone Network, a fiber optic communication link, a coaxial cable, a public TCP/IP networks and a satellite communication link.

56. The system of claim 50 wherein the TSFD wireless device further comprises local communication paths for transmitting and receiving signals between the TSFD wireless device and a local communication network.

57. The system of claim 50 further comprises using a secondary mode of operation selected from the group of wireless protocols and landline protocols.

58. The system of claim 57 wherein the wireless protocol is selected from the group consisting of AMPS, D-AMPS, IS-95, IS-136, and GSM1900.

59. The system of claim 50 wherein:
- a microcell comprises a geographical area containing one or more wireless devices and a PSE; and
- a macrocell comprises a geographical area containing between one and twenty one microcells, and a PNE.

60. The system of claim 50 wherein the TSFD wireless device comprises:
- a processor for controlling TSFD wireless device operation comprising a digital signal processor, a controller, and memory;
- a user interface comprising a display, a keypad, visual indication or, audio annunciator, microphone and speaker, a vocoder connected to a microphone and speaker interface;
- a power manager, battery and power source;
- an external data interface;
- connections for fixed telephone handset extensions;
- connections to a Public Switch Telephone Network;
- a primary mode transceiver having a transmitter and two receivers connected to an omni-directional antenna for use with a TSFD protocol; and
- an optional secondary mode transceiver for providing service using another standard protocol selected from the group consisting of wireless protocols and landline protocols.

61. The system of claim 60 wherein the wireless protocol is selected from the group consisting of AMPS, D-AMPS, IS-95, IS-136, and GSM1900.

62. The system of claim 50 wherein the TSFD wireless device includes an optional interface connection to an infrared data interface, an external keyboard interface, an external monitor interface, a video camera interface, A Wireless Fidelity (WiFi) Link, a Red Fang link, a Bluetooth interface, a LAN/cable modem interface, an enhanced 911 (E-911) position locator interface, a GPS position locator interface, a hard drive interface, a CD/DVD drive interface, a Public Switch Telephone Network modem interface, or an external antenna interface.

63. The system of claim 50 wherein the TSFD wireless device transmits voice and data packets half of the time and receives voice and data packets half of the time when in use.

64. The system of claim 50 wherein a TSFD wireless device communicates directly with another TSFD wireless device using the TSFD wireless protocol without communicating via a signal or network extender.

65. The system of claim 50 wherein the TSFD wireless device has a secondary synchronous mode that transmits and receives signals with a synchronous wireless device.

* * * * *